(12) United States Patent
Pennington, III et al.

(10) Patent No.: US 12,074,546 B2
(45) Date of Patent: Aug. 27, 2024

(54) DYNAMICALLY CONFIGURABLE HARDWARE SYSTEM FOR MOTOR SYSTEM AND METHOD FOR OPERATING SAME

(71) Applicant: TAU MOTORS, INC., Redwood City, CA (US)

(72) Inventors: Walter Wesley Pennington, III, Menlo Park, CA (US); Ethan Bagget Swint, Redwood City, CA (US); Matthias Preindl, New York, NY (US); Gregory Gordon Stevenson, San Carlos, CA (US); Matthew J Rubin, Indianapolis, IN (US); Anthony Da Costa, Los Altos, CA (US)

(73) Assignee: TAU MOTORS, INC., San Carlos, CA (US)

( * ) Notice: Subject to any disclaimer, the term of this patent is extended or adjusted under 35 U.S.C. 154(b) by 0 days.

(21) Appl. No.: 18/560,061

(22) PCT Filed: May 13, 2022

(86) PCT No.: PCT/US2022/029276
§ 371 (c)(1),
(2) Date: Nov. 9, 2023

(87) PCT Pub. No.: WO2022/241269
PCT Pub. Date: Nov. 17, 2022

(65) Prior Publication Data
US 2024/0258944 A1 Aug. 1, 2024

Related U.S. Application Data

(60) Provisional application No. 63/188,374, filed on May 13, 2021.

(51) Int. Cl.
*H02P 25/20* (2006.01)
(52) U.S. Cl.
CPC .................................. *H02P 25/20* (2013.01)
(58) Field of Classification Search
CPC .. H02P 1/38; H02P 25/20; H02P 23/14; H02P 27/14; H02K 1/02; H02K 1/165;
(Continued)

(56) References Cited

U.S. PATENT DOCUMENTS

| 4,338,534 A | 7/1982 | Broadway et al. |
| 2006/0273686 A1 | 12/2006 | Edelson et al. |

(Continued)

OTHER PUBLICATIONS

International Search Report and Written Opinion issued in corresponding PCT Application No. US2022/029276, issued Sep. 8, 2022.

*Primary Examiner* — Said Bouziane
(74) *Attorney, Agent, or Firm* — Quarles & Brady, LLP

(57) ABSTRACT

A reconfigurable electric motor (or machine) that may be reconfigured to improve performance given particular motor conditions. The motor is part of a motor system including a stator, a rotor, a microinverter network including a plurality of microinverters, and a motor controller including processing circuitry. The motor controller controls the plurality of microinverters to drive the motor in accordance with a first configuration of a plurality of motor configurations. The motor controller determines, based on determined motor conditions, to reconfigure the motor from the first configuration to a second configuration, where the first configuration has a first pole count that is different than a second pole count of the second configuration. The motor controller further controls the plurality of microinverters to drive the motor in accordance with the second configuration.

39 Claims, 58 Drawing Sheets

(58) Field of Classification Search
CPC ...... H02K 1/246; H02K 1/24; H02K 2203/09; H02K 3/50; H02K 3/28
See application file for complete search history.

(56) References Cited

U.S. PATENT DOCUMENTS

2015/0048705 A1    2/2015  Davey et al.
2016/0056747 A1*  2/2016  Mao ................. H02K 17/14
                                            318/777

* cited by examiner

*FRONT-VIEW*

REAR-VIEW

FRONT-VIEW

REAR-VIEW

FRONT-VIEW

REAR-VIEW

DYNAMICALLY CONFIGURABLE HARDWARE SYSTEM FOR MOTOR SYSTEM AND METHOD FOR OPERATING SAME

CROSS-REFERENCE TO RELATED APPLICATIONS

This application represents the U.S. national stage entry of International Application No. PCT/US2022/029276 filed May 13, 2022, which claims priority to U.S. Provisional Application No. 63/188,374, titled "Dynamically Configurable Hardware System for Motor System and Method for Operating Same," filed on May 13, 2021, which is hereby incorporated by reference in its entirety.

STATEMENT REGARDING FEDERALLY SPONSORED RESEARCH

N/A

TECHNICAL FIELD

Technology described herein relates generally to electric motors, and more particularly, to the configurability of electric motors.

BACKGROUND

Electric motors of various types have been produced and used in many industries and contexts. A particular type of motor may be selected and designed to have certain characteristics that are desirable for particular use cases, such as efficiency levels, maximum/minimum torque output levels, maximum/minimum speed levels, and the like.

SUMMARY OF THE DISCLOSURE

Within a particular application, operating characteristics of a motor may vary widely depending on the context of that application. For example, in some contexts, an electric motor serving as a traction motor in a vehicle may be requested to provide high torque, while in other contexts, low torque output is acceptable. An electric motor may be designed to provide adequate performance in each of the contexts. However, by balancing design considerations to provide adequate performance in each of the contexts, the electric motor may be operating sub-optimally in each of the contexts. For example, rather than designing a motor with a certain number of magnetic poles, stator windings, rotor windings, teeth, etc. to optimize high torque output (e.g., providing high torque output in a power-efficient manner), the motor may be designed to have a number of poles, stator windings, rotor windings, etc. that can provide the range of torques needed in the application at a particular average power efficiency. However, in the high torque context, the motor may be operating less efficiently than possible if the motor was designed specifically for high torque contexts; and, in low torque contexts, the motor may be operating less efficiently than possible if the motor was designed specifically for low torque contexts. Further, traditional permanent magnet machines cannot reconfigure their pole counts as the rotor has permanent fields, and poles, defined by the magnetic material. This makes such rotor designs immutable and static in nature where the topology of the rotor, or number of pole pairs in the machine, cannot change based on the operatorial context.

Embodiments described herein relate to a reconfigurable, or adaptable, electric motor that may be reconfigured to improve performance given particular motor conditions (e.g., motor current, motor voltage, motor power, motor torque, present motor configuration, received motor command (torque or speed)). For example, this reconfiguration may refer to changing the pole count, winding pattern, magnetomotive force (mmf) distribution, current distribution, and/or voltage distribution within an electric machine's stator and/or rotor.

In one embodiment, a method is provided for controlling a motor. The method includes controlling microinverters of a microinverter network to drive the motor in accordance with a first configuration of a plurality of motor configurations. The method further includes determining one or more motor conditions of the motor, and determining, based on the one or more motor conditions, to reconfigure the motor from the first configuration to a second configuration of the plurality of motor configurations. The first configuration has a first pole count that is different than a second pole count of the second configuration. The method further includes controlling the microinverters of the microinverter network to drive the motor in accordance with the second configuration.

In some examples, the microinverter network is a stator microinverter network that regulates power to stator slot conductors, wherein the first pole count is a first stator pole count, and wherein the second pole count is a second stator pole count.

In some examples, each of the microinverters includes a first direct current (DC) terminal coupled to a first DC bus source, a second direct current terminal coupled to a second DC bus source, and power switching elements selectively connecting the first DC bus source and the second DC bus source to at least one of the stator slot conductors.

In some examples, the first DC bus source is a DC bus bar ring.

In some examples, the microinverters each include an inverter microcontroller, and wherein controlling microinverters to drive the motor in accordance with the second configuration comprises: receiving, by the inverter microcontrollers, control commands from a central microcontroller; and controlling, by each inverter microcontroller, the power switching elements of the microinverter having the inverter microcontroller with control signals generated based on the control commands.

In some examples, controlling microinverters to drive the motor in accordance with the second configuration comprises: receiving, by the power switching elements of the microinverters, control signals from a central microcontroller.

In some examples, the microinverters include a first subset of microinverters on a first axial side of a stator of the motor and a second subset of microinverters on a second axial side of the stator that is opposed the first axial side, each microinverter of the first subset of microinverters coupled to at least one microinverter of the second subset of microinverters by a conductor of the stator slot conductors.

In some examples, the microinverters are rotor microinverters that rotate with a rotor of the motor and regulate power to rotor slot conductors, wherein the first pole count is a first rotor pole count, and wherein the second pole count is a second rotor pole count.

In some examples, determining to reconfigure the motor to the second configuration based on the motor conditions comprises: determining a cost for the first configuration based on the one or more motor conditions; and determining a cost for the second configuration based on the one or more motor conditions.

In some examples, the second pole count is greater than the first pole count, and wherein determining to reconfigure the motor to the second configuration based on the motor conditions comprises: determining that a torque command of the one or more motor conditions exceeds a torque threshold.

In some examples, the first configuration and the second configuration define one or more of a pole count, winding pattern, mmf-distribution, current distribution, and/or voltage distribution within the motor (e.g., of the stator and/or the rotor of the motor).

In another embodiment, a motor system is provided that includes a stator assembly of a motor, a rotor assembly of the rotor, a microinverter network including a plurality of microinverters and an electronic motor controller including processing circuitry. The stator assembly includes a plurality of teeth extending radially from a stator base and a plurality of slots, wherein a slot of the plurality of slots is between each pair of adjacent teeth of the plurality of teeth. Each slot is configured to receive at least one stator slot conductor of a plurality of stator slot conductors of the stator assembly. The rotor assembly is configured to rotate relative to the stator assembly. The electronic motor controller is configured control the plurality of microinverters to drive the motor in accordance with a first configuration of a plurality of motor configurations. The electronic motor controller is further configured to determine one or more motor conditions of the motor and to determine, based on the motor conditions, to reconfigure the motor from the first configuration to a second configuration of the plurality of motor configurations. The first configuration has a first pole count that is different than a second pole count of the second configuration. The electronic motor controller is further configured to control the plurality of microinverters to drive the motor in accordance with the second configuration.

In some examples, the microinverter network is a stator microinverter network that regulates power to stator slot conductors, wherein the first pole count is a first stator pole count, and wherein the second pole count is a second stator pole count.

In some examples, each of the plurality of microinverters includes a positive direct current terminal coupled to a positive DC bus source, a negative direct current terminal coupled to a negative DC bus source, and power switching elements selectively connecting the positive DC bus source and the negative DC bus source to at least one stator slot conductor of the stator slot conductors.

In some examples, each of the plurality of microinverters includes an inverter microcontroller, and wherein, to control the plurality of microinverters to drive the motor in accordance with the second configuration, the electronic motor controller is further configured to send control commands to the inverter microcontrollers; and each inverter microcontroller is configured to control the power switching elements of the microinverter having the inverter microcontroller with control signals generated based on the control commands.

In some examples, to control the microinverters to drive the motor in accordance with the second configuration, the electronic motor controller is further configured to: send control signals to the power switching elements of the microinverters.

In some examples, the plurality of slots includes N slots, and the stator microinverter network has at least N/2 microinverters.

In some examples, to determine to reconfigure the motor to the second configuration based on the motor conditions, the electronic motor controller is further configured to: determine a cost for the first configuration based on the motor conditions and a torque demand; and determine a cost for the second configuration based on the motor conditions and the torque demand.

In some examples, the second pole count is greater than the first pole count and, to determine to reconfigure the motor to the second configuration based on the motor conditions, the electronic motor controller is further configured to: determine that a torque demand exceeds a torque threshold.

In some examples, the plurality of slots includes N slots, and the stator microinverter network has one selected from a group of N microinverters, 2×N microinverters, and 4×N microinverters.

In some examples, the stator microinverter network includes a printed circuit board assembly, and the plurality of microinverters are positioned on the printed circuit board assembly, each of the plurality of microinverters including: at least two power switching elements, and a terminal connected to a stator slot conductor of the plurality of stator slot conductors that passes through a slot of the plurality of slots.

In some examples, the system further includes: a first direct current (DC) bus source at a first axial end of the stator assembly; and a second DC bus source at the first axial end of the stator assembly and located radially inward of the first DC bus source, wherein the plurality of microinverters are positioned on the printed circuit board assembly at different circumferential positions, and wherein each of the plurality of microinverters further includes: a first DC terminal connected to the first DC bus source, and a second DC terminal connected to the second DC bus source.

In some examples, the first DC bus source is a DC bus bar ring.

In some examples, the printed circuit board assembly is a first printed circuit board assembly and the plurality of microinverters on the first printed circuit board assembly is a first subset of microinverters, and wherein the stator microinverter network further includes: a second printed circuit board assembly on a second axial end of the stator assembly that is opposite the first axial end of the stator assembly; and a second subset of the plurality of microinverters positioned on the second printed circuit board assembly, each of the second subset of microinverters including: at least two power switching elements, and a terminal connected to one of the stator slot conductors that is connected to a microinverter of the first subset of microinverters on the first axial end.

In some examples, the system further includes a third DC bus source at the second axial end of the stator assembly; and a fourth DC bus source at the second axial end of the stator assembly and located radially inward of the third DC bus source.

In some examples, the microinverter network is a rotor microinverter network including: a printed circuit board assembly on a first axial end of the rotor assembly; and a plurality of rotor microinverters positioned on the printed circuit board assembly, each of the plurality of rotor microinverters including: at least two power switching elements, and a rotor terminal connected to a rotor slot conductor that passes through a slot of a plurality of rotor slots of the rotor assembly.

In some examples, the rotor assembly further includes at least a first permanent magnet around which a first rotor slot conductor is wound.

In some examples, the microinverter network is a rotor microinverter network, and wherein, to control the plurality of microinverters to drive the motor in accordance with the second configuration, the electronic motor controller is further configured to transmit control signals to the rotor microinverter network using embedded communications via the at least one stator slot conductor of the stator assembly.

In some examples, the microinverter network is a stator microinverter network, and wherein, to control the plurality of microinverters to drive the motor in accordance with the second configuration, the electronic motor controller is further configured to transmit control signals to a rotor inverter to reconfigure the rotor assembly to have a different pole count in the second configuration than in the first configuration.

In some examples, the stator microinverter network includes a plurality of transverse printed circuit boards on a first axial end of the stator assembly, and each of the transverse printed circuit boards includes at least one microinverter of the plurality of microinverters, each of the plurality of microinverters including: at least two power switching elements, and a terminal connected to a stator slot conductor of the plurality of stator slot conductors that passes through a slot of the plurality of slots.

In some examples, the system further includes a laminated direct current (DC) bus bar ring interconnecting each of the transverse printed circuit boards.

In some examples, the laminated DC bus bar ring includes positive polarity laminated conductors and negative polarity laminated conductors that are interleaved.

In some examples, the system further includes a communication ring interconnecting each of the transverse printed circuit boards, wherein the electronic motor controller is configured to communicate with the plurality of microinverters on the transverse printed circuit boards via the communication ring.

In some examples, the microinverter network is a rotor microinverter network including: one or more printed circuit boards of a rotor cartridge assembly positioned within a rotor shaft of the rotor assembly.

In some examples, the rotor microinverter network further includes: a plurality of rotor microinverters positioned on the one or more printed circuit boards, each of the plurality of rotor microinverters including: at least two power switching elements, and a rotor terminal connected to a rotor slot conductor that passes through a slot of a plurality of rotor slots of the rotor assembly.

In some examples, the system further includes an annular rotor printed circuit board positioned on an axial end of the rotor assembly and providing a conductive connection between the rotor terminal and the rotor slot conductor.

In another embodiment, a method is provided that includes controlling an inverter network to drive the motor in accordance with a first configuration of a plurality of motor configurations. The motor further includes determining one or more motor conditions of the motor; and determining, based on the one or more motor conditions, to reconfigure the motor from the first configuration to a second configuration of the plurality of motor configurations. The first configuration has a first pole count that is different than a second pole count of the second configuration. The motor further includes controlling the inverter network to drive the motor in accordance with the second configuration.

In some examples, the motor includes a rotor assembly and a stator assembly, and the inverter network is at least one selected from a group of: a rotor inverter fixed to the rotor assembly of the motor that rotates with the rotor assembly during operation of the motor; a rotor inverter off-board the rotor assembly that remains stationary with respect to the stator assembly during operation of the motor; a rotor microinverter network fixed to the rotor assembly of the motor that rotates with the rotor assembly during operation of the motor; and a stator microinverter network fixed to the stator assembly of the motor.

In another embodiment, a motor system is provided that includes a stator assembly of a motor, a rotor assembly of the rotor, an inverter network, and an electronic motor controller including processing circuitry. The stator assembly includes a plurality of teeth extending radially from a stator base and a plurality of slots, wherein a slot of the plurality of slots is between each pair of adjacent teeth of the plurality of teeth. Each slot is configured to receive at least one stator slot conductor of a plurality of stator slot conductors of the stator assembly. The rotor assembly of the motor is configured to rotate relative to the stator assembly. The electronic motor controller is configured to control the inverter network to drive the motor in accordance with a first configuration of a plurality of motor configurations. The electronic motor controller is further configured to determine one or more motor conditions of the motor; and to determine, based on the one or more motor conditions, to reconfigure the motor from the first configuration to a second configuration of the plurality of motor configurations. The first configuration has a first pole count that is different than a second pole count of the second configuration. The electronic motor controller is further configured to control the inverter network to drive the motor in accordance with the second configuration.

In some examples, the inverter network is at least one selected from a group of: a rotor inverter fixed to the rotor assembly of the motor and configured to rotate with the rotor assembly during operation of the motor; a rotor inverter off-board the rotor assembly and configured to remain stationary with respect to the stator assembly during operation of the motor; a rotor microinverter network fixed to the rotor assembly of the motor and configured to rotate with the rotor assembly during operation of the motor; and a stator microinverter network fixed to the stator assembly of the motor.

The foregoing and other aspects and advantages of the present disclosure will appear from the following description. In the description, reference is made to the accompanying drawings that form a part hereof, and in which there is shown by way of illustration an embodiment or embodiments. These embodiments do not necessarily represent the full scope of the invention, however, and reference is therefore made to the claims and herein for interpreting the scope of the invention. Like reference numerals will be used to refer to like parts from Figure to Figure in the following description.

BRIEF DESCRIPTION OF THE DRAWINGS

FIGS. 3A-1 to 3B are diagrams of respective rotor drive circuits for the system of FIG. 1 in accordance with some embodiments.

FIGS. 6V to 6AC illustrate another example of a motor assembly in accordance with some embodiments.

FIGS. 6AD to 6AK illustrate another example of a motor assembly in accordance with some embodiments.

FIGS. 6AJ to 6AQ illustrate another example of a motor assembly in accordance with some embodiments.

FIG. 6AR illustrates an exploded view of a rotor cartridge assembly in accordance with some embodiments.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "comprising," "including," "containing," "having," and variations thereof herein is meant to encompass the items listed thereafter and equivalents thereof as well as additional items. Additionally, the terms "connected" and "coupled" are used broadly and encompass both direct and indirect connecting and coupling, and may refer to physical or electrical connections or couplings. Furthermore, the phase "and/or" used with two or more items is intended to cover the items individually and both items together. For example, "a and/or b" is intended to cover: a; b; and a and b. As used herein, the terms "substantially," "approximately," and the like may refer to a value that is + or −1% (i.e., plus or minus 1 percent), + or −5%, + or −10% of the intended amount, value, angle, or other quantity.

Figure 1:
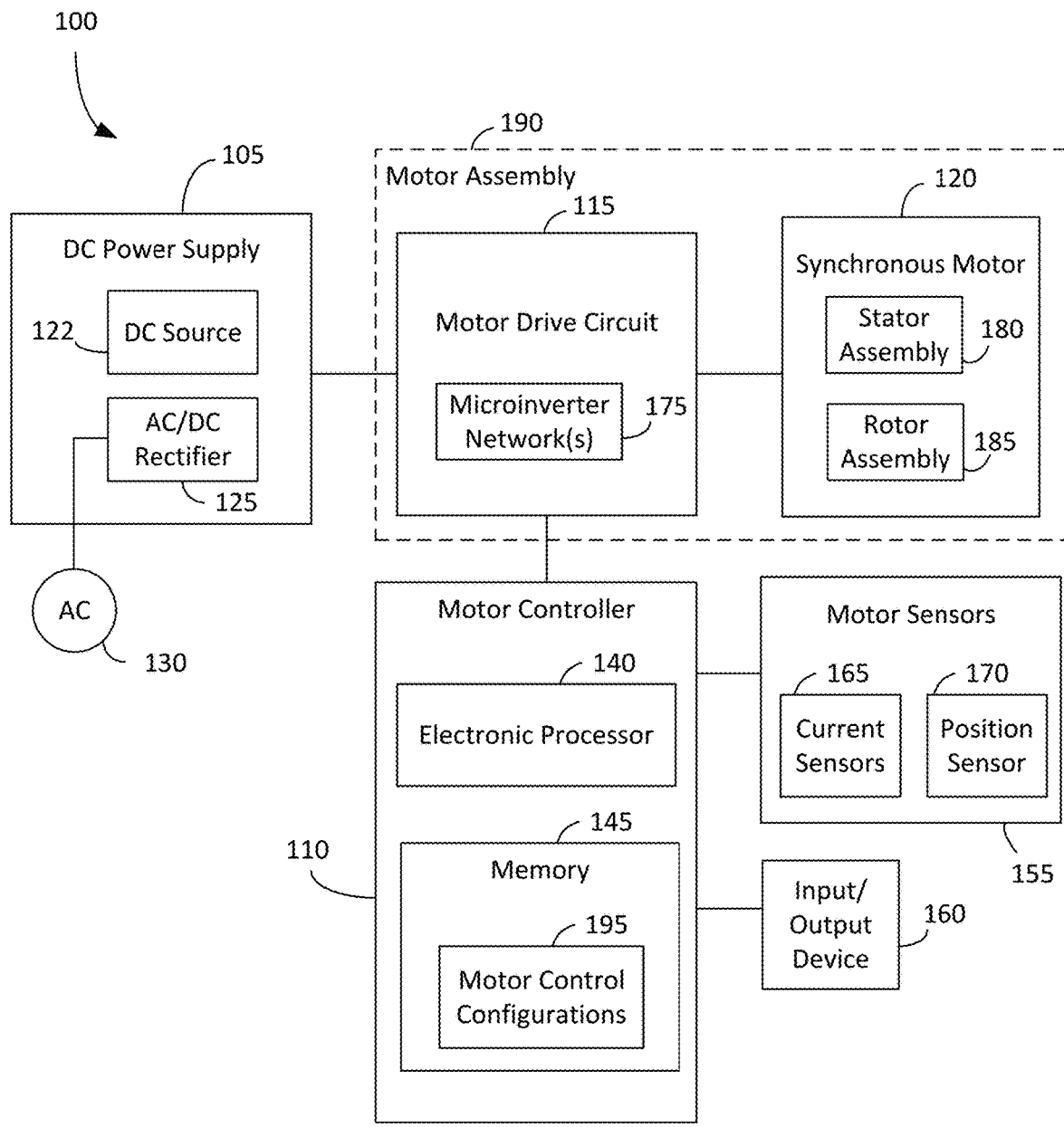
FIG. 1 is a diagram of a synchronous motor system in accordance with some embodiments.

FIG. 1 illustrates a synchronous motor system 100, according to some embodiments. The motor system 100 includes a power supply 105, a motor controller 110, a motor drive circuit 115, and a synchronous motor 120. The power supply 105 provides direct current (DC) power to the motor drive circuit 115. In some embodiments, the power supply 105 includes a DC power source 122 that provides the DC power to the motor drive circuit 115. The DC power source 122 may be, for example, one or more batteries, photovoltaic cells, or the like. In some embodiments, the power supply 105 includes an AC/DC rectifier 125 that receives alternative current (AC) power from an AC power source 130, which may be a utility grid or external generator. In these embodiments, the AC/DC rectifier 125 outputs the DC power to the motor drive circuit 115. In some embodiments, the AC power source 130 is part of the power supply 105 (e.g., in the case of an on-site wind turbine or generator). In some embodiments, the power supply 105 includes both the DC power source 122 and the AC/DC rectifier 125, and the DC power from the power supply 105 to the motor drive circuit 115 is provided from one or both sources. Although not illustrated, the DC power supply 105 is also configured to supply power to other components of the motor system 100, including the motor controller 110.

The motor controller 110 controls the motor drive circuit 115 to control the application of power from the DC power supply 105 to the motor 120 to drive rotation of the motor 120. The motor controller 110 includes an electronic processor 140 and a memory 145 (collectively, processing circuitry) and is coupled to the motor drive circuit 115, motor sensors 155, and an input/output device 160. Generally, the motor controller 110 monitors characteristics of the motor 120 (e.g., based on signals received from the motor sensors 155) and, based on these characteristics, provides control signals to the motor drive circuit 115 to control the application of power from the DC power supply 105 to the motor 120 to drive rotation of the motor 120.

The input/output device 160 may include one or more of displays, touchscreens, touchscreen displays, keyboards, mice, pushbuttons, dials, pedals, and the like. In some embodiments, the input/output device 160 is configured to receive operational parameters, such as motor speed command or motor torque command. In some embodiments, the operational parameters are provided to the motor controller 110 for use in determining control signals for providing to the motor drive circuit 115 to control the motor 120.

The motor sensors 155 include current sensors 165 and a position sensor 170 for determining the position of a rotor of the motor 120. In some embodiments, additional or fewer motor sensors are included in the motor sensors 155. For example, the motor sensors 155 may also include one or more voltage sensors, vibration sensors, temperature sensors, and the like. In some embodiments, current and/or voltage sensors are provided for each stator phase and/or each rotor phase of the motor 120. In some examples, the motor controller 110 infers a first motor characteristic (e.g., current or voltage), rather than directly sensing the motor characteristic. Accordingly, in some embodiments, for example, one or more of the current sensors 165 is/are not included in the motor system 100. For example, the motor controller 110 may be configured to determine rotor current or a state of the motor configuration via a voltage sensor (or sensors) on the stator assembly 180 (e.g., that is sensing back electromotive force (back emf)). In another example, the motor controller 110 is configured to infer incremental inductance via sensing voltage and/or current, and changes thereto with respect to time.

Additionally, in some examples, the motor controller 110 implements "sensorless" control that derives rotor position through monitoring of current and or voltage of the motor 120, such that a separate position sensor 170 may not be included in the motor sensors 155. The motor controller 110 may determine the position or rotational speed of the rotor through back emf estimation (e.g., based on voltage changes in stator windings), or through high frequency signal injection/perturbation. For example, the motor controller 110 may inject a perturbation into the motor assembly 190 to prevent the motor assembly 190 from operating at steady-state over meaningful periods of time. Such a signal can be used to prevent unobservable conditions, e.g. unidentifiable position, or force energy exchange between the stator and rotor. Typically, a perturbation is chosen with a frequency that is at least 1-2, 2-5, or 5-10 times higher than a fundamental frequency of the motor assembly 190 to prevent an interaction with torque generation resulting in e.g. torque ripple.

The memory 145 includes one or more of a read only memory (ROM), random access memory (RAM), or other non-transitory computer-readable media. The electronic processor 140 is configured to, among other things, receive instructions and data from the memory 145 and execute the instructions to, for example, carry out the functionality of the motor controller 110 described herein, including the process (or flowchart) 1200 of FIG. 12, as well as the processes (or flowcharts) 1400, 1500, 1600, 1700, 1800, 1900, and 2000 of FIGS. 14-20. For example, the memory 145 includes control software defining, among other things, a plurality of motor configurations for the motor 120. As described in further detail below, generally, the electronic processor 140 may be configured to execute the control software to monitor the motor 120, receive motor commands, to select a motor configuration from a plurality of motor configurations, and to drive the motor drive circuit 115 in accordance with a selected motor configuration to drive the motor 120. In some embodiments, instead of or in addition to executing software from the memory 145 to carry out the functionality of the motor controller 110 described herein, the electronic processor 140 includes one or more hardware circuit elements configured to perform some or all of this functionality.

Although the motor controller 110, the electronic processor 140, and the memory 145 are each illustrated as a respective, single unit, in some embodiments, one or more of these components is a distributed component. For example, in some embodiments, the electronic processor 140 includes one or more microprocessors and/or hardware circuit elements.

The motor drive circuit 115 further includes one or more microinverter networks 175. As explained with respect to FIGS. 2A to 2B and 3A-1 to 3B, the microinverter networks 175 may include a stator microinverter network, a rotor microinverter network, or both a stator and a rotor microinverter network. Each of the one or more microinverter networks 175 includes a plurality of microinverters that are controlled by the motor controller 110 to regulate the supply of current to the synchronous motor 120.

The synchronous motor 120 includes a stator assembly 180 and a rotor assembly 185. The stator assembly 180 includes a plurality of stator windings (see windings 215 of FIGS. 2A-2B) that are selectively driven with current to induce magnetic fields that rotate the rotor assembly 185. Staying on FIG. 1, the rotor assembly 185 may further include or be coupled to a rotor shaft (e.g., rotor shaft 406 of FIG. 4A) that is rotated with the rotor assembly 185 (i.e., the rotor shaft may be rotationally fixed to the rotor assembly 185). The rotor shaft may be further coupled to a load (e.g., a drive train of an electric vehicle or another motor-driven device).

In some embodiments, the synchronous motor 120 is a wound field synchronous motor (WFSM), and the rotor assembly 185 includes field windings that are selectively driven with current to induce magnetic fields that interact with the magnetic fields of the stator assembly 180 to rotate the rotor assembly 185. In other embodiments, the rotor assembly 185 includes a combination of a permanent magnets and field windings. In still other embodiments, the rotor assembly 185 includes permanent magnets, but no rotor field windings. Accordingly, although the features disclosed herein are primarily described with respect to WFSM-type motors, the features are also applicable to other motor types and operational schemes which may be synchronous or otherwise. Thus, in some embodiments, the motor 120 is not a synchronous motor but, rather, another type of motor (e.g., an asynchronous motor or a motor with a permanent magnet rotor (without rotor field windings)). Nevertheless, operation of the dynamically reconfigurable machine can happen under synchronous conditions, where such synchronous conditions overcome the inefficiencies of asynchronous operating systems wherein low power factors and high reactive currents can reduce efficiency or prevent efficient operation of a machine. Further, some embodiments of synchronous machines described herein include use of stranded conductors, bar windings, litz wire, or the like (e.g., for the windings on the rotor), which spreads out current across a larger conductor for more efficient and thermally stable operation versus solid conductors or conductors that may be present on an asynchronous machine (e.g., squirrel cage), which may pool current on the surface of the exterior of the rotor.

Further, as is well known, an electric machine serving as an electric motor that outputs mechanical power from input electric power may also operate in reverse and serve as an electric generator that outputs electric power from input mechanical power. Accordingly, for ease of description, the electric machines described herein will generally be referred to as motors (e.g., the synchronous motor 120), but are meant to also encompass electric generators and devices that may operate as both an electric motor and an electric generator.

Collectively, the synchronous motor 120 and the motor drive circuit 115, including the microinverter network(s) 175, may be referred to as a motor assembly 190. In some embodiments, other portions of the motor system 100 are included in the motor assembly 190, such as the motor controller 110, the DC power supply 105, the motor sensors 155, and the input/output device 160.

The motor controller 110 may further include a plurality of motor control configurations 195, with each of the motor control configurations 195 being associated with a different motor configuration for the motor assembly 190. As explained in further detail below, execution of a particular motor control configuration by the motor controller 110 causes the motor assembly 190 to enter and be controlled in a particular motor configuration. Each motor configuration may be associated with, for example, stator pole configuration, a rotor pole configuration, or both. For example, each motor control configuration 195 may define a motor driving scheme or technique that causes the motor controller 110 to provide control signals to the microinverter network(s) 175 to drive the synchronous motor 120 in such a way as to have the stator pole configuration and/or rotor pole configuration for the particular motor configuration. Further, in some examples, a particular motor configuration defines one or more of a pole count, winding pattern, mmf-distribution, current distribution, and/or voltage distribution within the motor 120 (e.g., of the stator assembly 180, the rotor assembly 185, or both).

As illustrated, the memory 145 may store the plurality of motor control configurations 195 for the motor assembly 190. Each motor control configuration may include a control instruction set and/or control parameters that, when executed by the electronic processor 140, cause the motor assembly 190 to operate in a particular motor configuration. In some examples, rather than software-based motor control configurations 195 stored in the memory 145, one or more of the motor control configurations 195 are implemented in whole or in part using equivalent hardware circuits. Accordingly, each particular motor control configuration for configuring the motor assembly 190 may implemented by the motor controller 110 through software (and execution thereof), hardware, or various combinations thereof.

Before turning to the various drive circuits and stator and rotor microinverter networks of FIGS. 2A-3B, we provide a general discussion of microinverters as provided herein. A microinverter may include a node that may switch its connection between two other electrical nodes, where a node may be considered portions of a circuit that are connected by a conductive element at substantially the same voltage or such that the voltage between any two points within a node is negligible. A microinverter module may include one or more microinverters, which may or may not share common nodes or whose nodes may be connected to each other through common circuit elements. A microinverter network may include microinverters, or microinverter modules, in communication with each other via common communications, common fixed nodes, and/or common switch nodes. A microinverter may include power semiconductor devices that may operate in frequencies of 100 s of Hz or greater, including up to several Mhz. These power semiconductor devices may be IGBTs, FETS, MOFETS, IGCTs, or the like. These power semiconductor devices of a microinverter are connected to define a circuit, including the polarity thereof. A microinverter may also be described as an independently controlled subunit that can coordinate its action with other such subunits to apply a voltage, or convey a current, through an electrical network within an electric machine. A microinverter may not convey the entirety of the power of the system, but through the synchronization of the microinverters in the network, a microinverter network can define a full power circuit for the system through either global or local control, or a combination thereof.

In the context of an electric machine or motor, a microinverter can control the voltage or current response in a slot, or set of slots, which define a subset of a machine, where such subset of a machine may be changed, or reconfigured during operation independently or in concert with any other microinverter or microinverter module in the microinverter network. A microinverter may operate independently of any other microinverter in the machine.

A microinverter network may include a global and local controller, where such local controller may control at least one microinverter module or microinverter. A microinverter network is electrically defined (e.g., configured and reconfigured) and may not use mechanical relays or the like for reconfiguration.

A microinverter network may include at least two microinverters, or microinverter modules, where each microinverter (or microinverter module) may act in concert of other microinverters (or microinverter modules) of a given set, but a microinverter (or microinverter modules) may change its membership between sets of coordinating microinverters (or microinverter modules).

A microinverter network may be used to impose a varying mmf pattern of shape within an electric machine. A microinverter in isolation may be insufficient to enable full operation of a machine. However, it is a fully functional subunit that can impose a voltage upon, or current into, a terminal of a machine based on a range of inputs such as a high or low command, or a reference torque from which an operating state is determined to impose its own voltage upon, or current into, a terminal of an electric machine.

A microinverter network may be used in place of end windings of an electric machine and/or may determine the relative phase or pitch count of an electric machine.

Microinverters (or microinverter modules) within a microinverter network may operate in concert to impose mmf distribution, which could have a variable numbers of poles, variable pole pitches, and/or a variable distributions of mff within a pole. By doing so, a machine is no longer limited to certain pole slot combinations as demanded by traditional fixed designs.

A microinverter network can alter the flow of an electron within an electric machine. A microinverter may be responsible for imposing a voltage on a terminal of the machine and may work in concert with other microinverters to impose a current into a terminal of the machine whose path may be variable within the combinations of other microinverters within the microinverter network. A microinverter may form a functional circuit for current flow with any other microinverter in the microinverter network.

In operation, a microinverter network may be flexible and made up of multiple subunits within a machine. In some embodiments, microinverters are in close contact with a machine such that conductors through slots are connected directly to microinverter terminals or nodes to provide a desired mmf pattern within the machine for the amount of resistive losses incurred in the system. Additionally, a necessary or desired mmf distribution may not be a sinusoidal distribution as per traditional machine design.

Figure 2A:
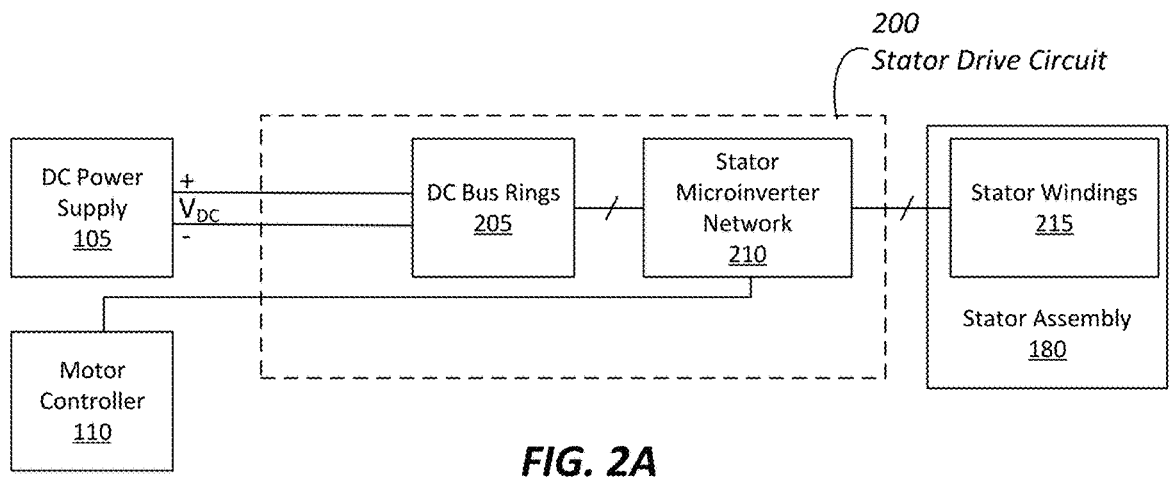
FIGS. 2A-2B are diagrams of respective stator drive circuits for the system of FIG. 1 in accordance with some embodiments.
Figure 2B:
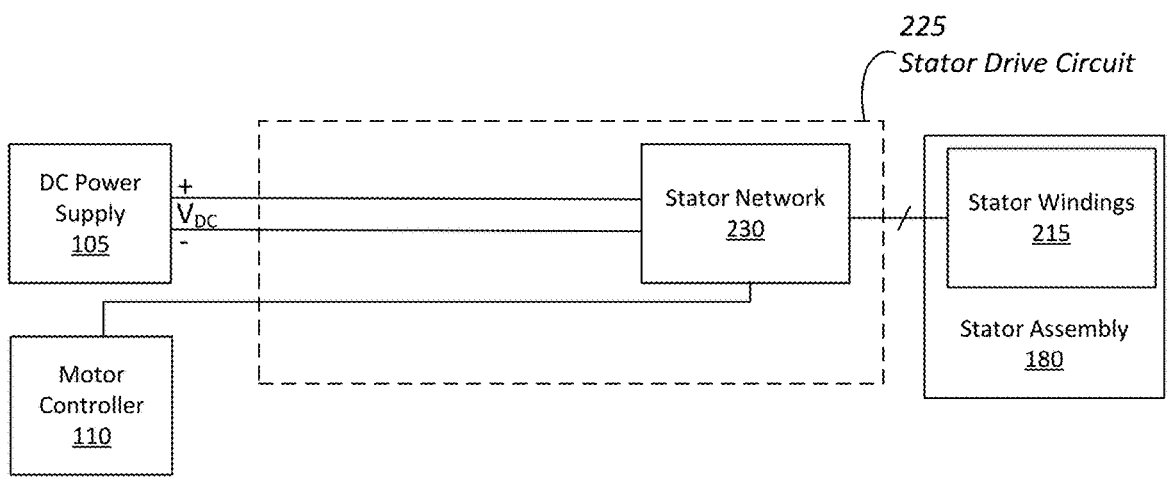

Turning now to FIGS. 2A and 2B, alternate arrangements for a stator drive circuit of the drive circuit 115 of FIG. 1 are illustrated. More particularly, FIG. 2A illustrates a stator drive circuit 200. The stator drive circuit 200 is a part of the drive circuit 115 that connects the DC power supply 105 to stator windings 215 of the stator assembly 180. The stator drive circuit 200 includes one or more DC bus rings 205 and a stator microinverter network 210. The DC bus rings 205 are conductive rings that are connected to the DC power supply 105 to receive power. The DC bus rings 205 are further connected to the stator microinverter network 210. The motor controller 110 controls the stator drive circuit 200 and, in particular, the stator microinverter network 210, to selectively drive the stator windings 215 with current from the DC bus rings 205 to induce magnetic fields that rotate the rotor assembly 185 (of FIG. 1). As described in further detail below, the stator microinverter network 210 may be configured by the motor controller 110 into a plurality of configuration states, each configuration state associated with a different number of stator poles. Thus, for at least this reason, the stator microinverter network 210 may define, at least in part, the configuration of the motor 120. In some embodiments the power electronics of the stator microinverter network 210 may be embedded on, or within the stator. In other embodiments the power electronics of the stator microinverter network 210 may be located or packaged separate from the stator. Similarly, in some embodiments, the power electronics of a rotor microinverter network (e.g., rotor microinverter network 310, described below, e.g., with respect to FIG. 3A) may be embedded on, or within the rotor. In other embodiments the power electronics of the rotor microinverter network may be located or packaged separate from the rotor.

FIG. 2B illustrates a stator drive circuit 225. The stator drive circuit 225 is a part of the drive circuit 115 that connects the DC power supply 105 to the stator windings 215 of the stator assembly 180. The stator drive circuit 225 includes a stator inverter network 230 that is connected to the DC power supply 105 to receive power. The stator inverter network 230 is further connected to the stator windings 215 and to the motor controller 110. The motor controller 110 controls the stator drive circuit 225 and, in particular, the stator inverter network 230, to selectively drive the stator windings 215 with current from the DC power supply 105 to induce magnetic fields that rotate the rotor assembly 185 (of FIG. 1).

The stator inverter network 230 includes, for example, a plurality of power switching elements connected in a bridge configuration. The power switching elements are semiconductor switching devices such as, for example, a field effect transistor (FET) (e.g., a metal-oxide-semiconductor field effect transistors (MOSFETs)), a bipolar junction transistor (BJT), or insulated gate bipolar transistor (IGBT). The stator inverter network 230 may include an output terminal for each phase of the synchronous motor 120. For example, in embodiments of the synchronous motor 120 having three phases, the stator inverter network 230 may include three output terminals, each connected to a terminal of a respective phase of the synchronous motor 120. The motor controller 110 may control the stator inverter network 230 to generate a drive signal at each output terminal to drive each phase of the motor with a respective drive signal. The drive signal is a periodic signal at some multiple greater than, or equal to, one with respect to the machine. The microinverter network enables the driving of varying such multiples in accordance to an operating condition.

Figures 1, 3A:
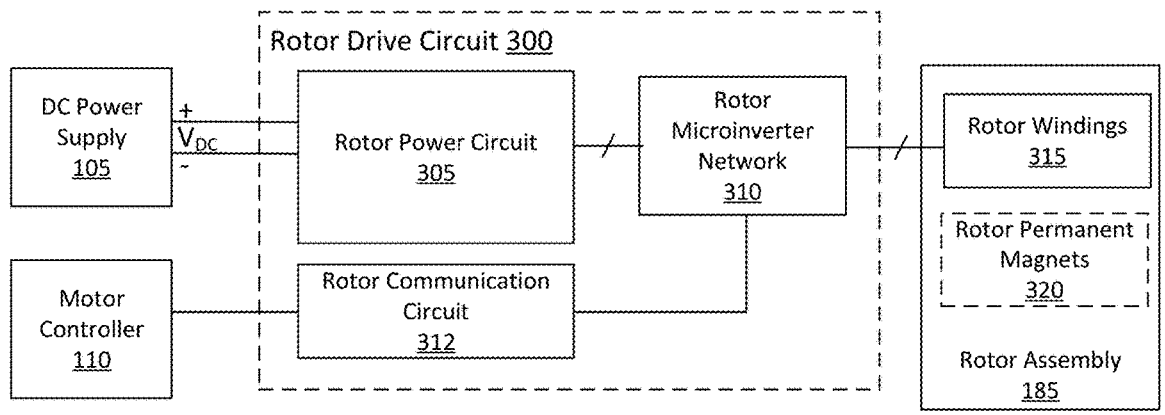

FIGS. 3A-1, 3A-2, and 3B illustrate alternate arrangements for a rotor drive circuit of the drive circuit 115 of FIG. 1. More particularly, FIG. 3A-1 illustrates a rotor drive circuit 300. The rotor drive circuit 300 is a part of the drive circuit 115 that connects the DC power supply 105 to the rotor field windings 315 of the rotor assembly 185). The rotor drive circuit 300 includes a rotor power circuit 305, a rotor microinverter network 310, and a rotor communication circuit 312. The rotor power circuit 305 is connected to the DC power supply 105 to receive power. The rotor power circuit 305 is further connected to the rotor microinverter network 310. The rotor microinverter network 310 includes power switching elements that, depending on their conduction state, define a polarity of each rotor field winding 315. The motor controller 110 communicates with the rotor microinverter network 310 via the rotor communication circuit 312 to control the rotor drive circuit 300 and, in particular, the rotor microinverter network 310. More particularly, the motor controller 110 controls the rotor microinverter network 310 to selectively drive the rotor field windings 315 with current from the rotor power circuit 305 to induce magnetic fields that rotate the rotor assembly 185 (of FIG. 1).

In some embodiments, the rotor assembly 185 includes permanent magnets 320 in addition to the rotor windings 315. The permanent magnets 320 include permanent magnetic (PM) material that may be used to assist in torque generation by providing a permanent source of magnetomotive force (mmf) on the rotor assembly 185. This addition of the permanent magnets 320 may help to decrease losses in certain embodiments by reducing an amount of current carried on the rotor windings 315, or by changing an inductance profile of the synchronous motor 120 (e.g., to shape a saliency or reluctance of the synchronous motor 120). In some embodiments, one or more of the permanent magnets 320 are wound (e.g., one of the rotor field windings 315 is wrapped around each wound magnet of the permanent magnets 320). The winding can be constructive to the permanent magnet field to amplify the mmf. In some embodiments (e.g., a bidirectional embodiments), the PM material can be opposed by the winding to demagnetize the PM material, whereby the PM could be magnetized under the opposite configuration. Example PM materials for these (de)-fluxing embodiments include Alnico, ferrite, SmCo, FeCrCo alloys, Arnokrome 5 or materials that tend to have a low coercivity but high remanence. PM material with small amounts of higher coercivity material, such as NeFeB, may also be used. Other lamination materials such as cobalt, Arnokrome 5, hydrogen annealed pure iron (Vim Var core iron) laminations may also be used to offer bulk coercivity and high saturation capabilities.

In some embodiments, one or more of the permanent magnets 320 is not wound by a rotor field winding 315. As described in further detail below, the rotor microinverter network 310 may be configured by the motor controller 110 into a plurality of configuration states, each configuration state associated with a different number of rotor poles.

The rotor microinverter network 310 rotates with the rotor assembly 185 during operation of the motor 120. The rotor power circuit 305 provides a power coupling between the power supply 105, which is stationary (i.e., non-rotating), and the rotor microinverter network 310, which rotates. Thus, the rotor power circuit 305 may include a stationary portion and a rotary portion.

In some embodiments, the rotor power circuit 305 includes a slip ring of conductors as the rotary portion and conductive brushes as the stationary portion. Each of the conductors may be coupled to a rotor shaft or another portion of the rotor assembly 185 to rotate therewith, and each of the conductors is connected to the rotor microinverter network 310. The conductive brushes includes at least one conductive brush per conductor of the slip ring and maintain an electrical connection with the associated conductors of the slip ring as the slip ring rotates with the rotor assembly 185.

In some embodiments, the rotor power circuit 305 includes non-contact power transmission from the stationary portion to the rotary portion. For example, the rotor power circuit 305 may include a slip ring providing one or more capacitive couplings or one or more inductive couplings. For each inductive coupling, a first conductor on the stationary portion forms a first winding that wirelessly transfers power to a second conductor on the rotary portion forms a second winding. In some embodiments, the first conductor and second conductor may be in the form of opposing, substantially flat coils that are facing one another. Each additional inductive coupling may include an additional conductor pair forming an additional inductor.

A first example inductive coupling 382 is shown in FIGS. 3C-3G. The inductive coupling 382 includes a rotating coil assembly 383 affixed to a rotor assembly (e.g., the rotor assembly 185) and a stationary coil assembly 384 affixed to a stator assembly (e.g., the stator assembly 180) or another stationary housing or element of the motor system 100. The rotating coil assembly 383 may include a first coil (or coils), and the stationary coil assembly 384 may include a second coil (or coils).

Figures 2, 3A:
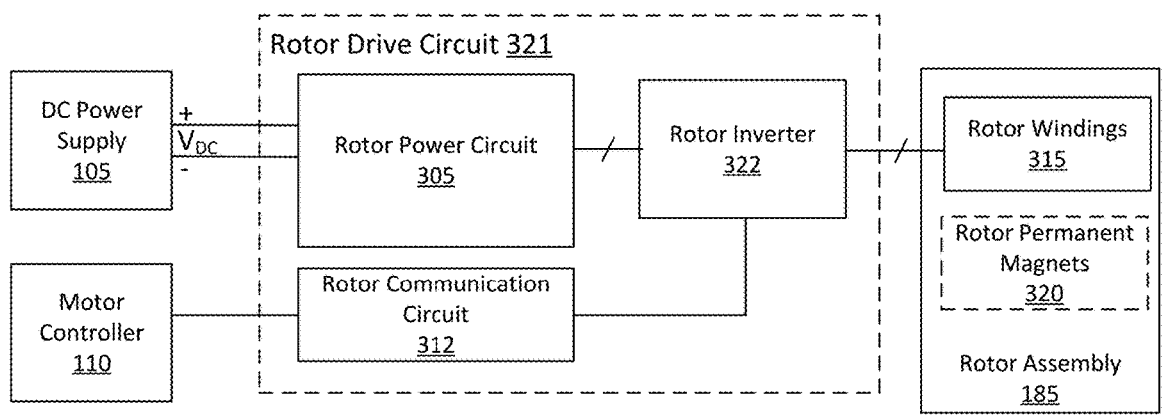
Figure 3B:
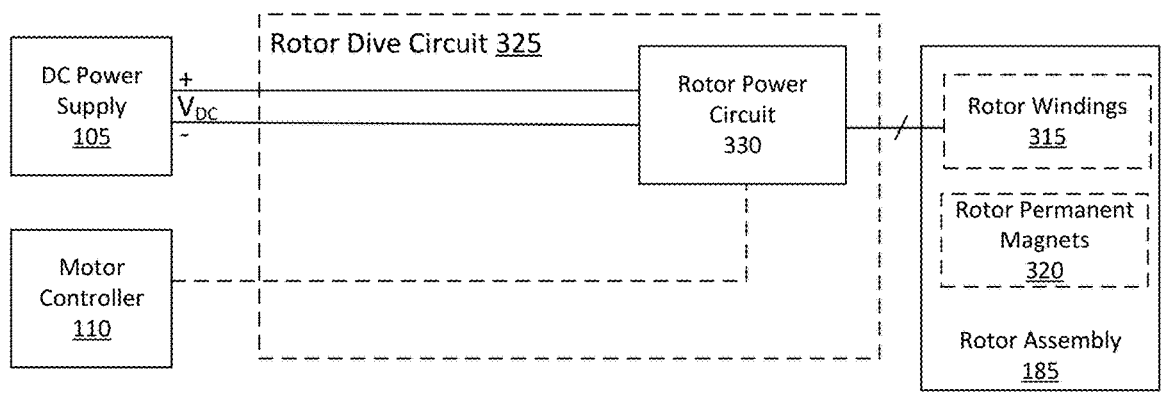
Figure 3C:
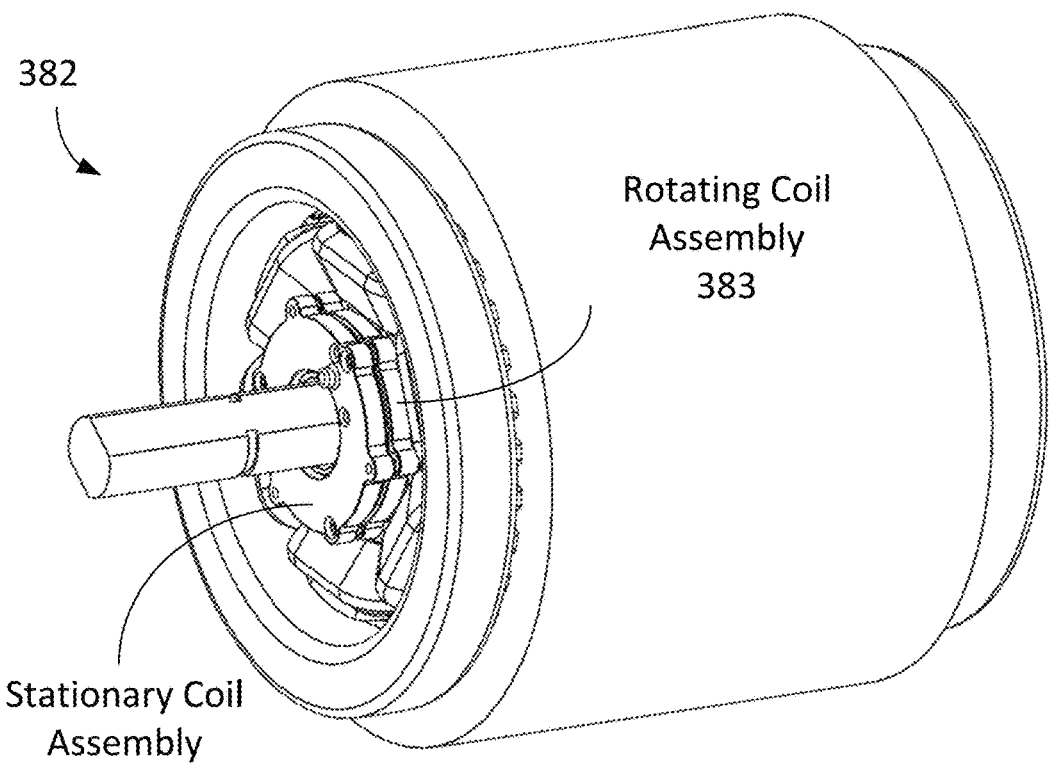
FIGS. 3C-3G illustrate wireless couplings for embedded power transfer and/or communications with the rotor for the system of FIG. 1 in accordance with some embodiments.
Figure 3D:
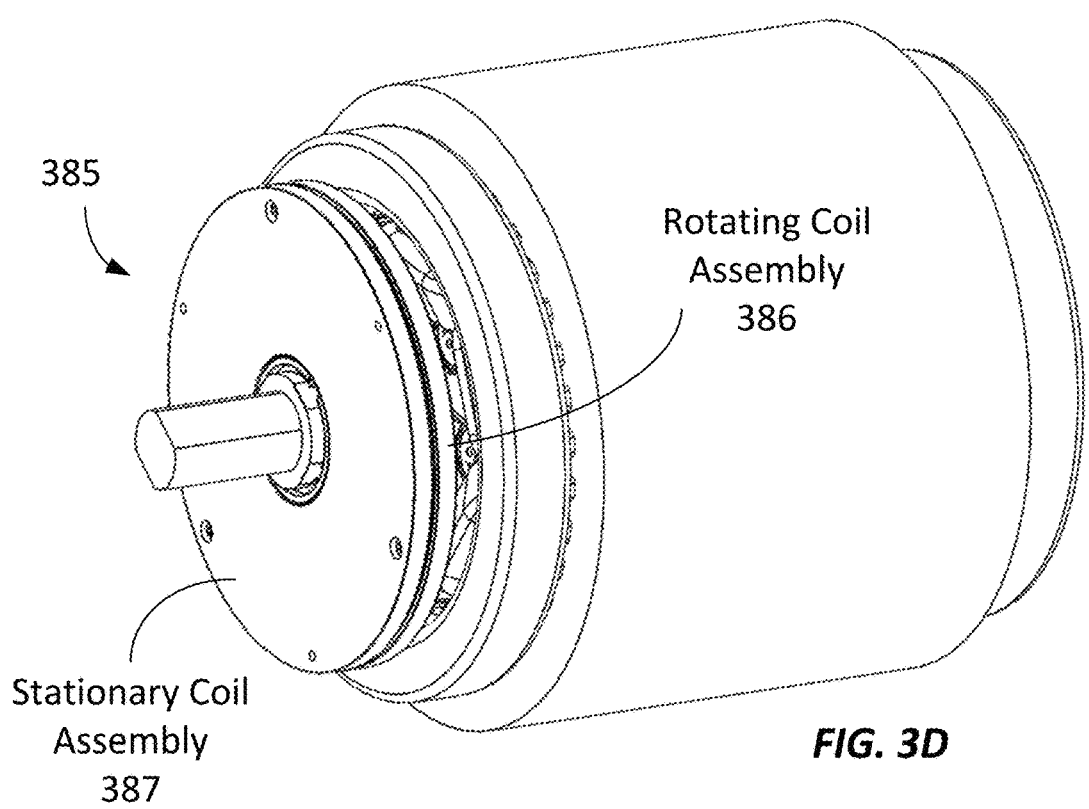

A second example inductive coupling 385 is shown in FIG. 3D. The inductive coupling 385 includes a rotating coil assembly 386 affixed to a rotor assembly (e.g., the rotor assembly 185) and a stationary coil assembly 387 affixed to a stator assembly (e.g., the stator assembly 180) or another stationary housing or element of the motor system 100. The rotating coil assembly 386 may include a first coil (or coils), and the stationary coil assembly 387 may include a second coil (or coils).

For each capacitive coupling in a slip ring of the rotor power circuit 305, a first conductor on the stationary portion that wirelessly transfers power to a second conductor on the rotary portion forms a capacitor. In some embodiments, the first conductor and second conductor may be in the form of an inner cylinder that is set within an outer cylinder (i.e., a nested cylinders with radial gap). In some embodiments, the first conductor and second conductor may be in the form of respective discs separated by an axial gap. Each additional capacitive coupling of the slip ring may include an additional conductor pair forming an additional capacitor. Thus, the slip ring may be a multilayer capacitor, with each layer providing a separate capacitive coupling (e.g., for communication and/or power transfer).

In some embodiments, the couplings 382 and/or 385 are conductive couplings, where the rotating coil assemblies 383 and 386 includes a first conductor (or conductors) and the stationary coil assemblies 384 and 387 includes a second conductor (or conductors), where each pair of conductors (one stationary, one rotary) together form a capacitor.

Figure 3E:
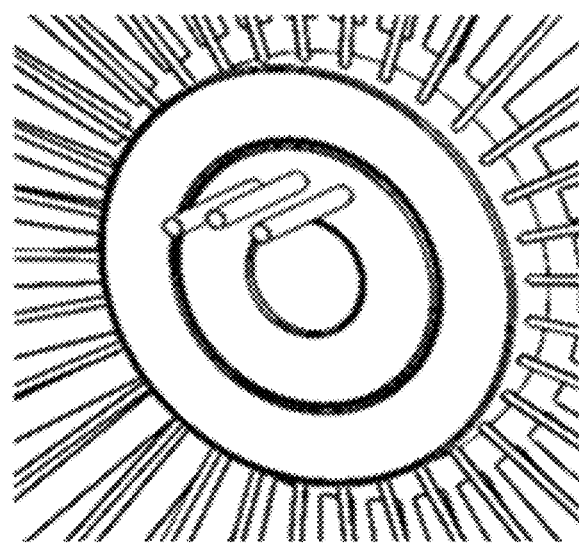
Figure 3F:
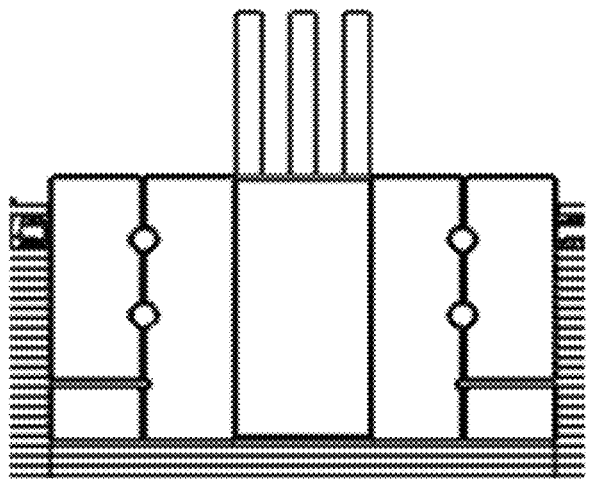
Figure 3G:
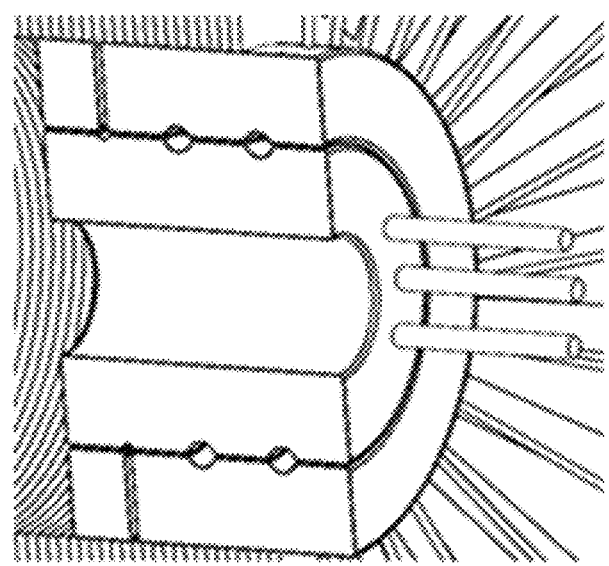

Additionally, example capacitive couplings for slip rings are shown in FIGS. 3E, 3F, and 3G illustrate respective views of an example nested-type capacitive coupling.

In some embodiments, the stationary portion includes one or more of the stator windings 215 that wirelessly transfers power to the rotor field windings 315 or auxiliary rotor coil(s), referred to as embedded power transfer. More particularly, the stator windings 215 may be driven with field-oriented controls having specific perturbations for power transfer. The perturbations may have a frequency that is at least 1-5× higher than the fundamental frequency of current in the stator windings 215 in some embodiments, 2-10× higher than the fundamental frequency in other embodiments, and/or greater than 10× higher than a fundamental frequency in still further embodiments. The perturbations create an AC excitation on the rotor field windings 315 that can be rectified, stored, and then used to drive the rotor field windings 315.

More particularly, $i_d$, $i_q$, and $i_z$ represent the currents at fundamental frequency represented in a direct-quadrature-zero (DQZ) reference system (e.g., principal control components). The Z component may also be referred to as the Null component. The DQZ reference system is a rotating reference frame that is a product of Clarke transform and Park transform, and that may be used for analyzing and controlling the synchronous motor 120. For example, the DQZ reference frame may illustrate three-phase stator and rotor quantities in a single rotating reference frame as a linear time-invariant system. The motor controller 110 may inject a perturbation into the DQZ system of the synchronous motor 120 to prevent the DQZ system from operating at steady-state over meaningful periods of time. Such an injected perturbation or signal can be used to prevent unobservable conditions, e.g. unidentifiable position, to force energy exchange between the stator assembly 180 and the rotor components (i.e., the rotor assembly 185 and/or rotor microinverter network 310), and/or to transfer data or state.

The injected perturbation may include a pulsating signal or signals along a predefined D, Q or Z axis (of the DQZ reference frame) or a vector that rotates at high-frequency in the DQ space (of the DQZ reference frame). For clarity, the rotor may define the D-axis and a signal or perturbation may be included in this. The injected signal can be a current or voltage vector that is added by the motor controller 110. In some examples, a current vector injection may be at lower frequency (below current control bandwidth) and a voltage injection may be at higher frequency (above current control bandwidth). The injected signal or perturbation may work to transmit power, data, or both between the stator and rotor, including their microinverter network(s).

These injected perturbations create an AC excitation composed of one or more signals that are imposed on a quasi-DC signal in the synchronous reference frame. The perturbations injected into the stator windings may directly correlate to rotor current or power on the rotor windings 315, which can be rectified into a coil or captured by a microinverter network on the rotor. The rotor microinverter network may also capture the power in a capacitor or any such energy storage device. Thus, one or more high frequency control channels are provided to transfer power or information between stator assemble 180 and the rotor assembly 185 and rotor microinverter network 310, where such coupling is permitted (e.g., the d-axis of the synchronous motor in the DQZ reference frame). Amongst other strategies, vector modulation can be employed to help define the perturbations.

In a field-oriented sense, the perturbation control strategy may be broken down into the current signals $i_d$, $i_q$, and $i_z$ at the fundamental frequency represented in the DQZ system. Then, the motor controller 110 may add an independent excitation in one or more of the DQZ axes that is imposed onto the fundamental currents resulting in a total stator current as follows:

$$i_{d_{total}} = i_d + i_{d_{excitation}}$$

$$i_{q_{total}} = i_q + i_{q_{excitation}}$$

$$i_{z_{total}} = i_z + i_{z_{excitation}}$$

where $i_{d_{excitation}}$, $i_{q_{excitation}}$, and $i_{z_{excitation}}$ are the independent perturbation signals that can be selected by the motor controller 110. In some embodiments, the perturbations can be chosen to be sinusoidal, for example, to simplify analysis. These perturbations can be further described as:

$$i_{d_{excitation}} = m_d \cos(w_d t)$$

$$i_{q_{excitation}} = m_q \sin(w_q t)$$

$$i_{z_{excitation}} = m_z \cos(w_z t)$$

The perturbation magnitude and frequency can be chosen independently per dimension. In some embodiments, the perturbations may be applied to a single axis, where no perturbation is applied to the other two axes, and the perturbations are used to generate a field excitation for power transfer, as well as: (1) D-axis perturbation can be used to transfer power to the rotor assembly 185 directly and/or in an attempt to minimize torque ripple or maximize torque; (2) Q-axis perturbation can be used if the d-axis perturbation is insufficient or in combination with d-axis perturbation to form a rotating vector injection; and (3) Z-axis perturbation has no effect (or substantially no effect) on the torque ripple and does not require knowledge of the DQ reference system; however, the motor system 100 may require a Z-axis conduction path to implement the z-axis perturbations, which is not available in some motor drives.

An alternative approach is the injection of a rotating vector selecting $m_d = m_q = m$ and $w_d = w_q = w$. With reference to the below equations, the vector injection may focus on the first two dimensions, D and Q of the DQZ reference frame. The vector injection can be combined with Z-axis injection, as well.

$$i_{dqz_{excitation}} = [i_{d_{excitation}}; i_{q_{excitation}}; i_{z_{excitation}}]$$

$$i_{dq_{excitation}} = P^{-1}(w\ t)[m; 0; 0] = [m \cos(w\ t); m \sin(w\ t); 0]$$

where $$P^{-1} = [\cos(\alpha), -\sin(\alpha), 0; \cos(\alpha), \sin(\alpha), 0; 0, 0, 1]$$

Figure 3H:
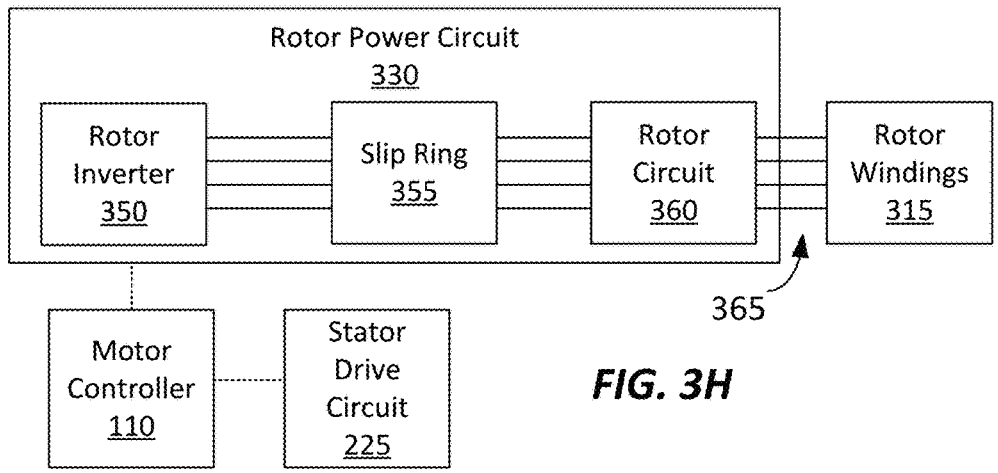
FIGS. 3H-3J are diagrams of respective rotor drive circuits for the system of FIG. 1 in accordance with some embodiments.
Figure 3I:
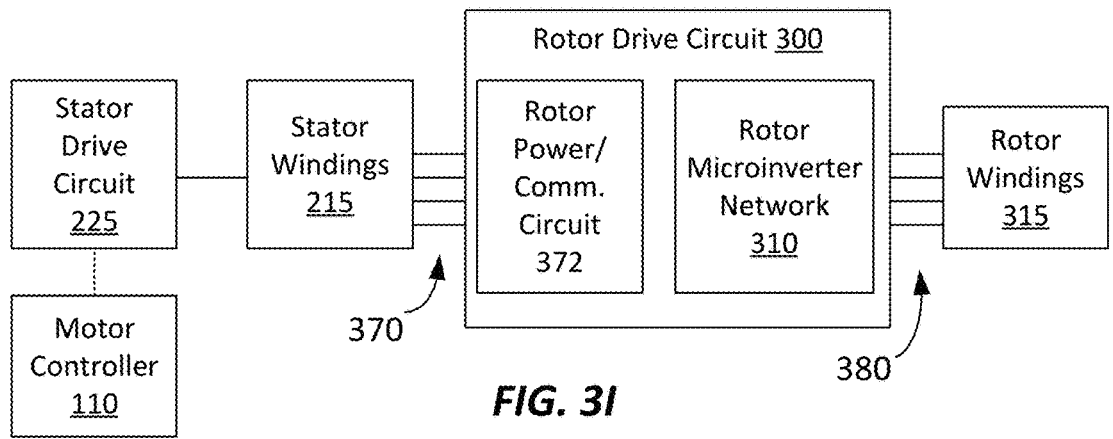
Figure 3J:
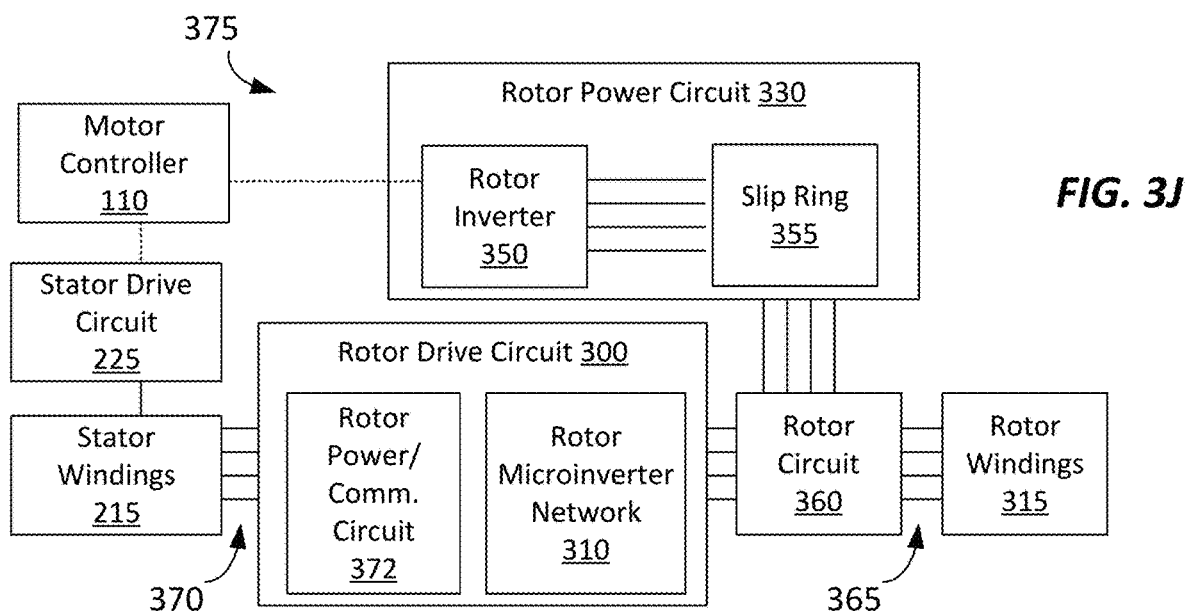
Figure 3K:
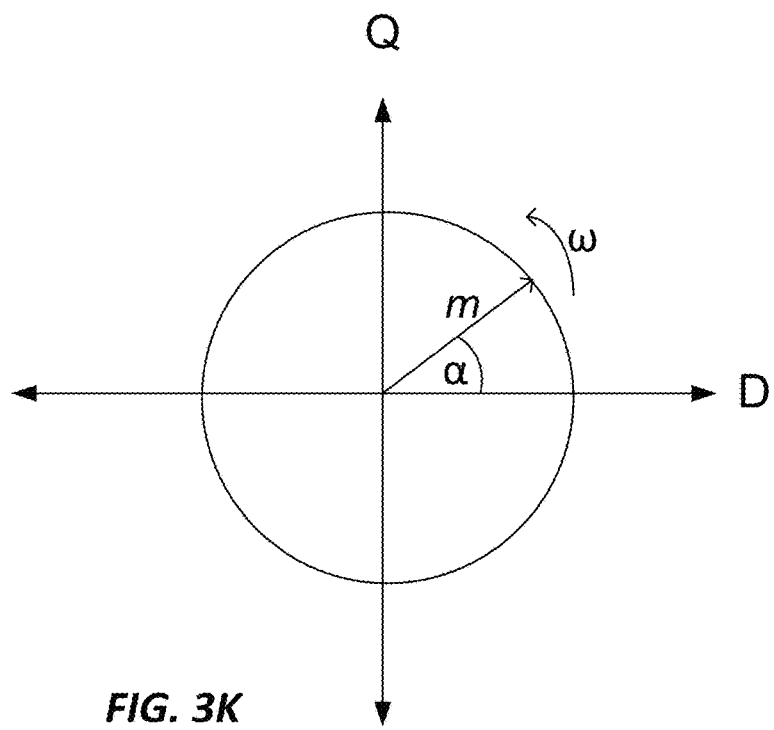
FIG. 3K illustrates a diagram of a vector injection in a DQ space in accordance with some embodiments.

The vector injection may describe vector motion that has constant magnitude and constant angular velocity, and describes a circle in the DQ space (see FIG. 3K). Hence, this concept can be realized as the generation of a rotating magnetic field resulting in a constant overall perturbation.

Vector modulation may be directly used to couple the rotor where the rotor structure permits, either the D- or Q-axis (or Z-axis, when applicable), and may be embodied in either amplitude modulation (AM), current angle modulation (CAM), or both. The relative effectiveness of AM vs CAM is proportionate to both the magnitude and the percent change of the modulation (the latter of which is frequency modulation, FM). FM may be further used, in conjunction with the circuit topology and devices, to establish resonance.

Amplitude modulation (AM) at a given current angle can be used to transfer power to an AC coil (rotor windings 315 or auxiliary coil), where maximum power is transferred at the current angle (as defined by the D- and Q-axes) of maximum coupling to the rotor coil. For instance, for a rotor coil on the Q-axis with respect to the synchronous DQZ reference frame, maximum power transfer would occur at a modulation on 90 degree electrical (where 0 degree electrical is defined as the D-axis of the synchronous reference frame). An AC coil on the D-axis of the synchronous reference frame would have maximum coupling at 0 degree electrical in the synchronous reference frame. AM can be defined by a magnitude and a frequency.

Current angle modulation (CAM) can be used to transfer power to the rotor windings 315 or an auxiliary coil of the rotor, where oscillations in current angle are defined about a set operating point of current angle as defined by the D- and Q-axes (e.g., maximum torque per amp, MTPA). CAM perturbations can be defined by an oscillation, a magnitude, and a frequency and can also be represented as a complementary amplitude modulation of the D- and Q-axis quantities, with the vector sum of D/Q axes being maintained at a constant magnitude.

Varying the frequency of the modulation (FM) of the stator's mmf magnitude can affect the response of the system, or effectiveness of power transfer. Additionally, the controls and circuit can be tuned such that they put the system near the LRC resonance point on the rotor windings 315 or auxiliary coil of the rotor.

In a microinverter network where each coil may be operated independently, such as at least some embodiments of the stator microinverter networks 210 and the rotor microinverter networks 310, there may be one or more periodic drive signals in the machine, each with a quasi-DC component with one or more AC signals for transferring power or information between stator and rotor. Each one of these periodic drive signals, or set of drive signals, may be described by their own DQZ reference frame as described above. For clarity, this applies to both the rotor and/or stator.

In the context of a microinverter network, there may be multiple DQ reference frames occurring at different multiples within the machine. Within each DQ system, there is a quasi-DC component and one or more AC components (sinusoidal, trapezoidal, square wave, etc.) of varying amplitudes and frequencies. Modulations in amplitude or frequency of the AC components can be utilized to transmit power or information between stator and rotor.

In one configuration example, operating in pure quadrature in a four pole rotor embodiment ($\theta_e = 90°$), $I_Q = I_{mag}$, $I_D = 0$, and $I_z = 0$, such that $I_{D,mod}$ and/or $I_{z,mod}$ are modulations imposed over 0 signals. However, $I_{D,mod}$ and/or $I_{z,mod}$ need not be modulations over a 0 signal. For example, if $\theta_e \neq 90°$, then $I_{D,mod}$ is a modulation over a non-zero DC value in the synchronous reference frame. Note that "DC" signals in the D/Q reference frame are nominal quasi-DC signals representing a transformation of, for example, three-phase alternating into the synchronous reference frame for a given operating point, and the quasi-DC signals can change for different motor states.

In some implementations, data signals included in $I_{D,mod}$, $I_{Q,mod}$, and/or $I_{z\_mod}$ are separate data signal excitations carrying independent data and can be treated essentially separately. However, in some implementations, data signals are embedded in a combination of two or more of $I_{D,mod}$, $I_{Q,mod}$, and $I_{z\_mod}$, e.g., in a modulation of current angle and/or total current magnitude. In some implementations, the rotor circuit configuration can help define the controllable axes available for interaction with the stator through data signal excitations.

"Power transfer" and associated terms refer to stator-rotor couplings that energize the rotor windings sufficiently to generate non-negligible magnetomotive force. "Data signal transfer" and associated terms (e.g., data signals) refer to stator-rotor couplings that primarily represent data transfer, e.g., do not energize the rotor windings sufficiently to generate non-negligible electromotive force or for the purpose of torque production.

In some cases, power transfer may be differentiated from data signal transfer by a magnitude of power transferred. For example, power transfer may be associated with at least ten times, at least 100 times, or at least 1000 times as much power transferred from the stator windings to the rotor windings as data signal transfer. In some cases, power transfer may be differentiated from data signal transfer by a magnitude of associated stator voltages. For example, stator voltages associated with power transfer may at least ten times, at least 100 times, or at least 1000 times stator voltages associated with data signals. In some cases, power transfer may be differentiated from data signal transfer by a frequency at which the transfer occurs. For example, currents and/or magnetic fields representative of data signal transfer may oscillate at frequencies that are at least ten times, at least 100 times, or at least 1000 times the frequencies of currents and/or magnetic fields representative of power transfer. In some cases, power transfer may be differentiated from data signal transfer by forms of the respective stator currents.

Implementations are not limited to the D-axis coupling and Q-axis coupling examples described explicitly in this disclosure. In general, field coupling (torque control, power transfer, and/or data signals) from the stator to the rotor can be implemented across a variety of controllable channels (axes) within the motor. Torque control, power transfer, and/or data signal transfer may be performed using oscillating stator-side currents that control torque, couple power, and/or transfer data signals on one, two, or more of these axes, based on appropriate stator topologies, rotor topologies, and/or excitation patterns. In some cases, axes are shared between functions, and in some cases an axis is dedicated exclusively to a single function. For example, power transfer may be performed on a first axis, and data signals may be transmitted over a second, different axis, or one axis may be used for both, given appropriate rotor circuit topology.

In addition, although some embodiments according to this disclosure do not include stator-rotor coupling elements besides windings, some embodiments do include additional coupling elements, e.g., brushes, slip-rings, optical transmitters/sensor, etc. These additional coupling elements may, in some embodiments, be used for data signal transmission and/or power transfer, representing alternative controllable axes alongside the field-coupled axes.

Besides the various ways in which functions can be distributed across different controllable axes, functions can also be distributed across different rotor windings. A first rotor winding may be used for data signal transfer, a second, different rotor winding may be used for power transfer, and torque control may be performed by couplings to one or both of the first and second rotor windings, or by a coupling to a third winding. Moreover, windings that perform different functions may be exposed to the same flux from the stator (e.g., form a pole pair), or may be exposed to different fluxes. In some implementations, one rotor winding is used for both data signal transfer and power transfer.

Various control schemes may be used for control of active rectifier circuits. Some control schemes are "self-synchronizing" in that they do not require the transmission of special data signals from the stator to the rotor; rather, rotor-side circuits control the active rectifier circuits based on currents induced in the rotor windings by the same D-axis and/or Q-axis currents that energize the rotor windings and drive movement of the rotor (e.g., based on power transfer signals and/or torque control signals). Other control schemes are "signal-driven" in that they include encoded data signals e.g., data signals that are embedded into stator winding-to-rotor winding D-axis currents and/or Q-axis currents (e.g., embedded into power transfer signals or torque control signals) to pass motor status data from the stator to the rotor. Signal-driven control schemes may alternatively or additionally include data signals on an axis separate from axes used for power transfer and/or torque control. Some control schemes include both self-synchronizing and signal-driven features. Because stator-side currents may correspond to stator-side voltages, a scheme including signals embedded in currents may correspond to an equivalent scheme including signals embedded in voltages. Implementations described in this disclosure in reference to signals in stator-side voltages may be equivalent to, and may also describe, signals in stator-side currents, and vice-versa.

These schemes do not necessarily require additional stator-to-rotor coupling elements; rather, in some implementations, signals are transmitted using the stator windings and rotor windings that are already used for rotor winding energization and movement. This can help reduce costs and increase performance and flexibility compared to schemes that incorporate special detectors, sensors, wired or wireless connections, or brushes to transmit signals from stator to rotor.

Figure 21B:
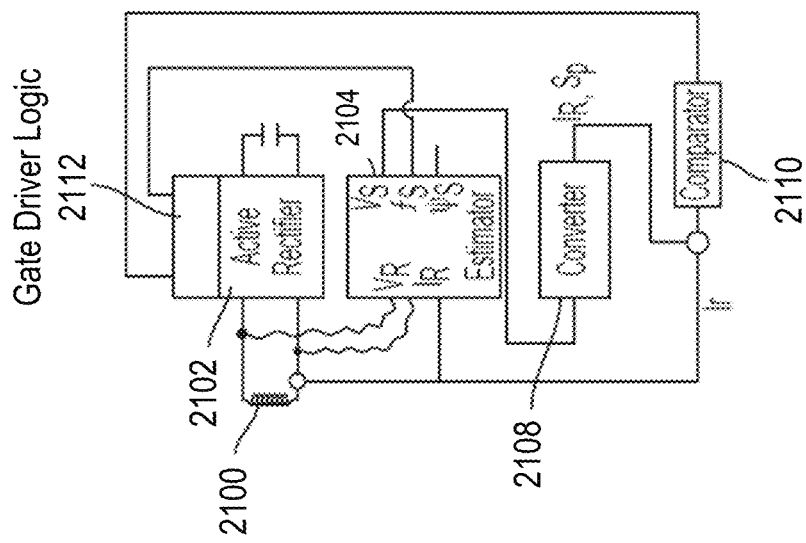
FIGS. 21A and 21B illustrate schematic diagrams of example rotor control circuit topology that can be used with aspects of this disclosure.
Figure 21A:
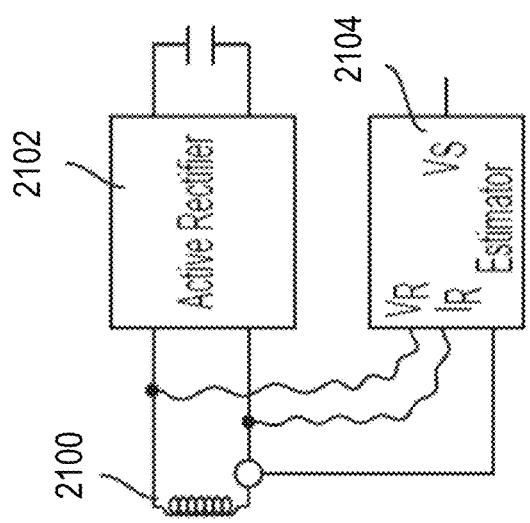

FIG. 21A shows an example circuit schematic for rotor control. In this example, a rotor winding 2100 is coupled to an active rectifier circuit 2102 that rectifies currents in the rotor winding 2100. An estimator unit 2104 is configured to measure or estimate rotor current $I_R$ and rotor voltage $V_R$ and, based on these values, determine an estimated stator AC voltage $V_S$. Based on $V_S$, the estimator unit 2104 controls switchable elements of the active rectifier circuit 2102 to impose the desired timings and levels on the rotor currents. The active rectifier circuit 2102 and estimator unit 2104 may be implemented by, for example, a microinverter as described herein, such as a microinverter 720 of FIGS. 7A and 7C described below or a microinverter 760 of FIGS. 7B and 7D described below. Here, the active rectifier 2102 may be implemented as a pair of power switching elements 730 (see FIGS. 7C and 7D) and the estimator unit 2104 may be implemented by a microinverter controller 725 (FIG. 7C) or a control signal interface 785 (FIG. 7D). In the case of a microinverter network (e.g., microinverter network 210 and/or 310) including a plurality of microinverters, each microinverter may implement a respective active rectifier circuit 2102 and estimator unit 2104.

For example, for some configurations of the stator and voltage windings, the stator voltage $V_S$ is related to $I_R$ and $V_R$ by the equation $V_S = L_k \cdot dI_k/dt + V_R$, where $L_k$ is an effective leakage inductance between the stator and rotor and $I_k$ is the rotor leakage current (the injection component of the rotor current). Rotor-side measurement or estimation of $I_k$ and $V_R$ therefore allows for the estimation of $V_S$. This is a self-synchronizing calculation because $V_S$ is estimated based on rotor currents/voltages induced by power transfer signals and/or torque control signals, not based on distinct data signals.

While this equation represents one possible model of the stator-rotor system, other models may alternatively be used to estimate stator-side values based on voltages and/or currents in the rotor windings. For example, a digital memory in the estimator unit 2104 may store one or more mathematical models of the stator-rotor system and use these models in conjunction with digital logic to determine estimated stator signal parameters.

Examples of control functions that may be performed based on $V_S$ include one or more of the following. A phase of a stator AC voltage is estimated, and the rotor current/voltage waveform is controlled in quadrature to control power transfer (e.g., to maximize power transfer). A frequency of the stator AC voltage is estimated, and the rotor current/voltage waveform is controlled to have a frequency matching the frequency of the stator AC voltage or to have a different predefined relationship with the stator AC voltage. An amplitude of the stator AC voltage is estimated, and the rotor voltage waveform is controlled to have an amplitude matching the amplitude of the stator AC voltage or twice the amplitude of the stator AC voltage, or to have a different predefined relationship with the stator AC voltage.

It may not be necessary to measure or estimate both $V_S$ and $I_S$; rather, in some implementations only one of these values is measured or estimated, and control functions are performed based on that measurement or estimation.

FIG. 21B shows a detailed example of a self-synchronizing control scheme. A rotor winding 2100 is coupled to an active rectifier circuit 2102 that rectifies currents in the rotor winding 100. An estimator unit 2106 is configured to measure or estimate rotor current $I_R$ and rotor voltage $V_R$ and, based on these values, determine an estimated stator AC voltage $V_S$, an estimated stator AC injection frequency $f_s$, and an estimated stator AC injection phase $\varphi_s$.

Based on the injection frequency $f_s$, a converter unit 2108 determines a corresponding rotor current set point $I_{R,Sp}$. The determination is made based on a predetermined relationship between $f_s$ and $I_{R,Sp}$. For example, in some implementations more power is transferred at lower stator AC injection frequencies, such that the predetermined relationship dictates $I_{R,Sp}$ having an inverse relationship to $f_s$.

The rotor current set point $I_{R,Sp}$ and the measured or estimated rotor current $I_R$ are fed into a comparator 2110 that provides an input to a gate drive unit 2112, the input being used by the gate drive unit 2112 to cause the rotor current to match the rotor current set point. For example, in some implementations, the rotor phase $\varphi_R$ is adjusted to increase or decrease a relative phase between the stator AC voltage and rotor voltage/current based on the estimated stator AC injection phase $\varphi_S$. The relative phase adjusts an amount of power transferred and therefore regulates the rotor current.

The gate drive unit 2112 controls switching elements (e.g., transistors) in the active rectifier circuit 2102, e.g., by modulations of transistor gate or transistor base voltages.

In this example, the estimated stator AC voltage $V_S$ is not fed directly into the gate drive unit 2112, the comparator 2110, or another rotor logic unit; however, in some implementations $V_S$ is also, or instead, used in logic operations used to control elements of the active rectifier circuit 2102.

In various implementations, other logic operations besides the ones in this example may be used to cause the rotor currents/voltages to have a particular magnitude, frequency, phase, or other parameter, based on measured or estimated rotor currents and/or voltages induced by stator voltages. Estimator units may take, as input, data besides measured or estimated $V_R$ and $I_R$; for example, instead of or in addition to measuring or estimating these values, a rotor circuit may detect polarity-switching events in $V_R$ and/or $I_R$ and make estimations based on those events. In addition, besides the example estimated stator-side parameters $V_S$, $f_s$, and $\varphi_S$, other stator-side parameters may be estimated, e.g., stator current Is or stator current/voltage polarity switching events. Phase-locked loop methods may be used to synchronize the rotor frequency to the stator frequency, to set a particular relative phase of the rotor frequency, or to perform other rotor-side controls.

Like with FIG. 21A, the active rectifier circuit 2102, estimator unit 2104, converter 2108, comparator 2110, and gate driver logic 2112 may be implemented by, for example, a microinverter as described herein, such as a microinverter 720 of FIGS. 7A and 7C described below or a microinverter 760 of FIGS. 7B and 7D described below. Here, the active rectifier 2102 may be implemented as a pair of power switching elements 730 (see FIGS. 7C and 7D) and the estimator unit 2104, converter 2108, comparator 2110, and gate driver logic 2112 may be implemented by a microinverter controller 725 (FIG. 7C) or a control signal interface 785 (FIG. 7D). In the case of a microinverter network (e.g., microinverter network 210 and/or 310) including a plurality of microinverters, each microinverter may implement a respective circuit as shown in FIG. 21B including the active rectifier circuit 2102, estimator unit 2104, converter 2108, comparator 2110, and gate driver logic 2112.

Figure 22B:
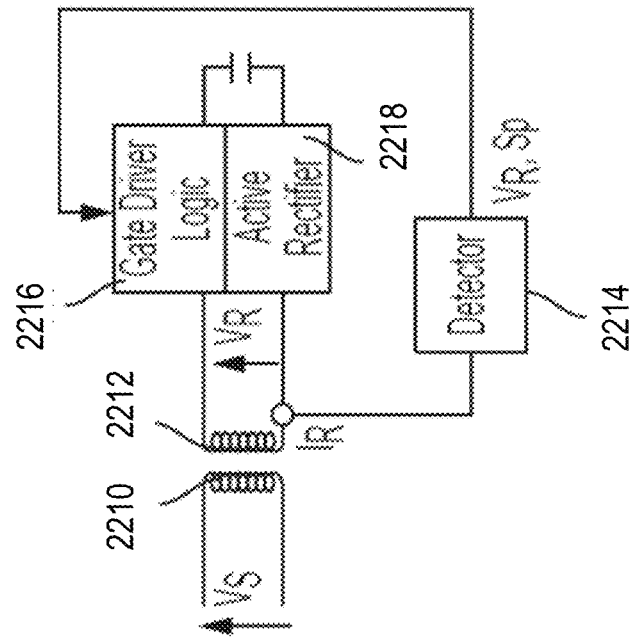
FIG. 22A illustrate a plot of voltages over time for components of an example electric machine FIG. 22B illustrate a schematic diagram of an example rotor control circuit topology that can be used with aspects of this disclosure
Figure 22A:
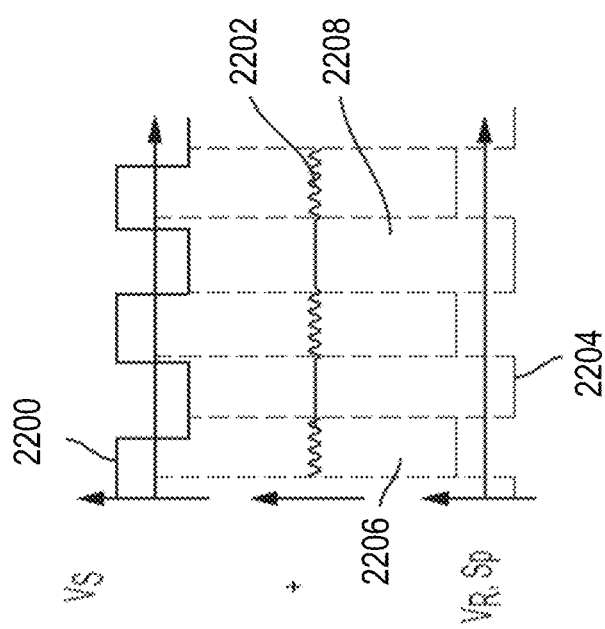

FIG. 22A shows an example of stator-side voltages used in a signal-driven rotor control scheme. Stator-side power transfer voltages 2200 are used to perform power transfer to rotor windings, as described throughout this disclosure. However, in addition to the power transfer voltages 2200 (which could equally be, for example, torque control voltages, in various implementations), an additional data signal 2202 is embedded in the stator winding voltage and, in this example (not universally), along the same controllable axis as the power transfer voltages 2200. The data signal is used by a detector unit in the rotor to control a resulting rotor voltage set point 2204. In this example, both power transfer and data signal transmission are performed over the D-axis in the synchronous reference frame, and both couplings are to the same rotor winding 2212. However, as noted above, this need not be the case in general.

The data signal 2202 is configured to have a significantly higher frequency than the power transfer voltage 2200 that is also coupled along the same controllable axis as the data signal 2202. For example, in some implementations the power transfer voltage or torque control voltage has a frequency between 100 Hz and 500 Hz, and the data signal has a frequency between 1 kHz and 10 KHz. In addition, the frequency of the data signal may be less than two times a switching frequency of the stator inverter, e.g., less than 1/10 of the switching frequency of the stator inverter.

Data signals and power transfer signals need not have a particular frequency relationship to torque control signals and the underlying movement (e.g., rotational frequency) of the rotor. For example, data signals and power transfer signals need not be higher-order harmonics of torque control signals. Rather, the drive frequency (frequency of torque control signals) may be independent of frequencies of other signals (e.g., power transfer signals and data signals), and changes in motor operating state need not be reflected in corresponding changes in, for example data signals. For example, changing rotor speeds can correspond synchronously to changing torque control speeds, while data signal frequencies and/or power signal frequencies can be maintained constant or can be modulated for FM data transmission.

For example, during a first mode of operation, the torque control signal may have a frequency $f_1$; during a second mode of operation, the torque control signal may have a frequency $f_2$ different from $f_1$; and data signals and/or power transfer signals during both modes of operation may have a constant frequency or a frequency that modulates from a constant frequency to perform FM data transfer.

This decoupling of the different stator-rotor interactions provides enhanced flexibility to rotor-side circuit designs, which need not be restricted to signal transfer based on rotor operating condition.

In the example of FIG. 22A, the data signal 2202 transmits binary on/off data to a rotor winding. When the data signal 2202 is on/active (e.g., during timespan 2206), the rotor voltage set point 2204 is controlled to be positive. When the data signal 2202 is off/inactive (e.g., during timespan 2207), the rotor voltage set point 2204 is controlled to be negative. Therefore, the data signal 2202 causes the rotor voltage set point 2204 (and therefore the rotor voltage, ignoring non-idealities and switching delays) to have a frequency matching the power transfer voltage 2200 with a 90° phase lag.

Operationally, the example control scheme of FIG. 22A may be implemented by including a high-pass or band-pass filter in a detector unit in the rotor, such that the detector unit can isolate the data signal 2202 from the power transfer voltage 2200 and adjust the rotor voltage set point 2204 accordingly.

The example of FIG. 22A includes simple binary data transmission to control a polarity of rotor voltage. However, many other types of data may be sent using the methods described here. For example, besides mere polarity information, actual set point values for rotor current, rotor voltage, rotor frequency, and/or rotor phase could be sent by appropriate configuration of stator-side data signals and complementary configuration of rotor-side detector units and other switching and logic elements. The data signal may be in one or more of a variety of formats. For example, amplitude modulation (AM) and/or frequency modulation (FM) may be used to transmit data in the data signal from the stator to the rotor.

FIG. 722B shows a schematic diagram of an example topology implementing the example signal-driven rotor control scheme of FIG. 22A. Data signals, which may encode control information among other information, are embedded in a voltage in a stator winding 2210 and induce corresponding voltages in a rotor winding 2212. A detector unit 2214 measures an overall rotor current $I_R$ (in other implementations, other rotor parameters may be measured instead or additionally) and extracts from the overall rotor current a signal current that is indicative of or represents the data signal including the encoded information. The detector unit 2214 employs predetermined logic to generate a rotor voltage set point $V_{R,sp}$ based on the signal current. The rotor voltage set point $V_{R,sp}$ is used by a gate drive unit 2216 to control switching elements in an active rectifier 2218 and, in particular, to cause the switching elements to make the rotor voltage equal to the rotor voltage set point $V_{R,sp}$.

The detector unit 2214 is configured to correctly extract and interpret detected data signals (i.e., decode the encoded information) and to provide output to the gate drive unit 2216 that will be understood by the gate drive unit 2216 to control the active rectifier 2218. This detector unit 2214 may include "hardcoding" through analog circuitry configured to extract particular types of signals from detected rotor currents and/or voltages and to provide corresponding output, configurable digital logic programmed to perform the extraction and output, or a mixture of these elements. For example, a filtering circuit of the detector unit 2214 may first isolate the data signals, an analog to digital converter of the detector unit 2214 may convert the data signals into a digital data stream, and a microprocessor of the detector unit 2214 may analyze the digital data stream to obtain an output (e.g., a rotor voltage frequency set point) and pass the output to the gate drive unit 2216, which implements the necessary switching operations to cause rotor operation to conform to the output.

Like with FIGS. 21A and 21B, the active rectifier circuit 2218, detector 2214, and gate driver logic 2216 may be implemented by, for example, a microinverter as described herein, such as a microinverter 720 of FIGS. 7A and 7C described below or a microinverter 760 of FIGS. 7B and 7D described below. Here, the active rectifier 2218 may be implemented as a pair of power switching elements 730 (see FIGS. 7C and 7D) and the detector 2214 and gate driver logic 2216 may be implemented by a microinverter controller 725 (FIG. 7C) or a control signal interface 785 (FIG. 7D). In the case of a microinverter network (e.g., microinverter network 210 and/or 310) including a plurality of microinverters, each microinverter may implement a respective circuit as shown in FIG. 22B including the active rectifier circuit 2218, detector 2214, and gate driver logic 2216.

A microprocessor on the rotor (e.g., microinverter controller 725) might be powered by, for example, one or more capacitors on the rotor, e.g., one or more capacitors included in an active rectifier of the rotor. Because these capacitors are indirectly charged by the stator, they begin in an uncharged state when the motor is off, and the microprocessor therefore is also off. However, in some implementations, the active rectifier acts passively until the capacitors are charged and the microprocessor is powered and able to control switching operations.

Microprocessors may alternatively or additionally be powered by a dedicated low-voltage transformer included in or on the rotor, e.g., an additional coil mounted on the rotor and arranged to couple to a controllable axis that is also used for power transfer. The turn count of the additional coil may be configured to provide the voltage needed by the microprocessors for operation. The power transfer signals therefore also provide separate, dedicated power to the microprocessors to enable active rectification.

In some implementations, microprocessors are alternatively or additionally powered by a rotor power supply, e.g., a battery included in the rotor.

Although this disclosure sometimes refers to data signals as being "embedded" in other signals, in some implementations the data signals (in a D/Q formulation) are not "embedded" in a non-zero signal but, rather, are the only signal along a given controllable axis.

In some implementations, self-synchronized and signal-driven control schemes are used simultaneously or in conjunction with one another. For example, self-synchronization might be used to control rotor voltage frequency, and data signals might be extracted and interpreted to control rotor current set point.

Collectively, the detector unit 2214, the gate drive unit 2216, and any other units and/or circuits involved in controlling the active rectification (e.g., the comparator 2110 and the converter unit 2108 shown in FIG. 21B), whether based on controls or in a self-synchronized manner, may be referred to as a rotor control unit.

Further discussion of transferring power or information between stator and rotor can be found in PCT Application No. PCT/US2022/019040, filed on Mar. 4, 2022, and titled "Wirelessly Transferring Power within an Electric Machine with Actively Rectified Rotor Windings," which is herein incorporated by reference.

In other embodiments, a temporal or spatial displacement of signals can be captured by, or coupled to, the rotor and rotor circuitry for control. However, signal components can be discretized by the rotor circuit and not subjected strictly to time or spatial domains.

Local flux variations occur naturally as the rotor assembly 185 rotates due to slotting effects and may also be used to transfer power by generating an AC response due a change in flux linkages. When relying on these variations, the motor controller 110 may not include the high frequency variation/perturbation in the entire magnetic field. Although this approach may generate less losses (e.g., switching and core losses), these variations may not be fully controllable because the variations are a function of the rotor rotational speed. This approach may be most effective at a specific rotational speed of the rotor assembly 185, and that speed may change given the desired torque, speed, and operating mode of the machine.

In some embodiments, the motor controller implements a hybrid excitation scheme to avoid reliance on merely one technique. For example, in one hybrid scheme, the motor controller 110 uses an AC imposition in addition to local flux variations. This approach provides for explicit control through the AC signal and the benefit of efficiency of the local flux variations. This hybrid approach may be implemented, for example, with the motor controller 110 relying on the AC signal at low rotor rotational speed, and high torque conditions, or when the motor controller 110 implements a large torque step. Then, the motor controller 110 uses the local flux variations under lower torque, high speed conditions where the flux demand would not be as high.

The rotor communication circuit 312 provides a communication coupling between the controller 110, which is stationary (i.e., non-rotating), and the rotor microinverter network 310, which rotates. The communication coupling may allow bidirectional communication or unidirectional communication. Thus, the rotor communication circuit 312 may, like the rotor power circuit 305, also include a stationary portion and a rotary portion. In some embodiments, the stationary portion and rotary portion may be a layered or nested structure of alternating stationary and moving components. For example, the stationary portion may lie on the inside of a rotational shaft, to which the rotary portion is affixed.

Like the rotor power circuit 305, the rotor communication circuit 312 may include a slip ring of conductors as the rotary portion and conductive brushes as the stationary portion. In some embodiments, the rotor communication circuit 312 includes a non-contact (wireless) data transmission between the stationary portion and the rotary portion. The non-contact coupling may include a capacitive or inductive coupling, such as described with respect to the rotor power circuit 305. Further, the rotor communication circuit 312 may include a non-contact coupling between a stationary portion that includes one or more of the stator windings 215 and a rotary portion that includes the rotor field windings 315 or auxiliary rotor coils or devices. More particularly, the stator windings 215 may be driven with field-oriented controls having specific perturbations for data transfer, which are detected and decoded by the rotor microinverter network 310 as AC, quasi-AC, or pulsating DC excitations on the rotor field windings 315 or auxiliary coils or devices. The data may be transmitted using the AM, FM, or a combination of AM and FM, using the techniques described above with respect to embedded power transfer. When used to transmit data, this transmission technique may be referred to as embedded communications.

In some embodiments, the embedded communications are bidirectional. In other words, in some embodiments, the motor controller 110 injects perturbations into the stator windings 215 to communicate data to the rotor (e.g., the rotor microinverter network 310, the rotor assembly 185, or another rotor circuit) via the rotor windings 315 or auxiliary rotor coil(s), and the rotor (e.g., the rotor microinverter network 310 or other rotor circuit) injects perturbations into the rotor windings 315 or auxiliary rotor coil(s) to communicate data via the stator windings 215 (e.g., to the motor controller 110 or stator microinverter network 210).

Figure 3M:
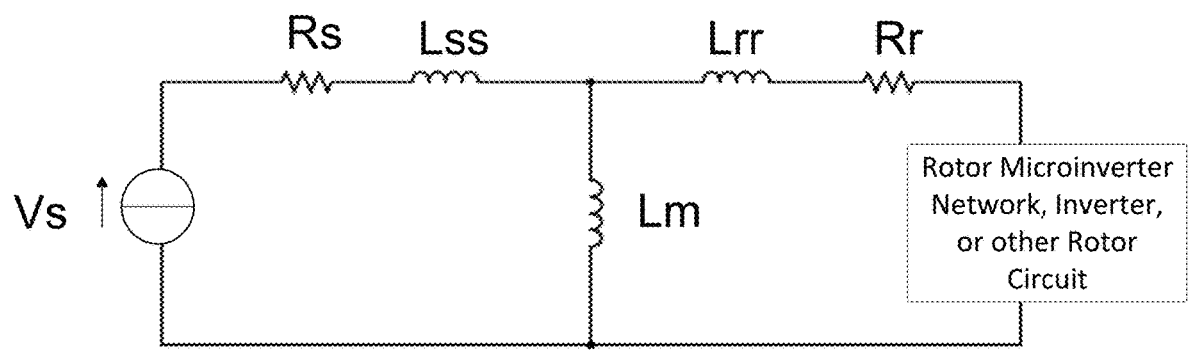
FIG. 3M illustrates different types of wireless transmissions from a stator windings to a rotor in accordance with some embodiments.
Figure 3L:
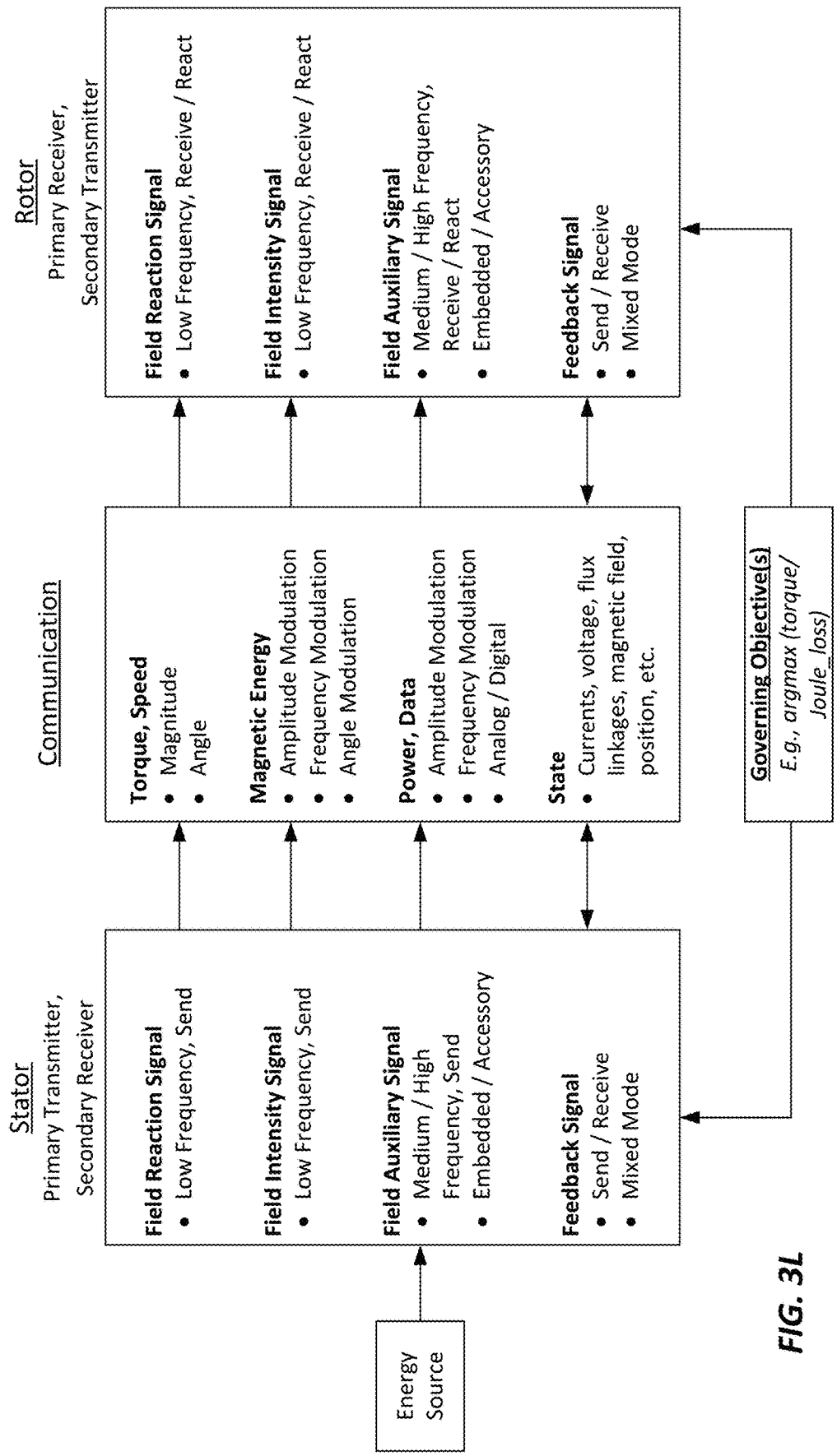
FIG. 3L illustrates a diagram of a vector injection in a DQ space in accordance with some embodiments.

Accordingly, in the synchronous motor 120, the stator and rotor may transmit wireless signals or energy for several purposes. For example, the diagram of FIG. 3L illustrates different types of wireless transmissions from the stator windings 215 to the rotor windings 315 (or, in some cases, auxiliary rotor coils or devices), including: (1) field reaction signals, (2) field intensity signals, (3) field auxiliary signals (e.g., embedded power and data transmissions), and (4) feedback signals (e.g., embedded data transmissions). As a particular example, the field auxiliary signals may include data communications from the motor controller 110 to the rotor microinverter network 310 (or the rotor inverter 322 described below) to configure the rotor assembly into a particular pole configuration, as described in further detail below (see, e.g., first and second configurations of the flowchart 1200 in FIG. 12). Further, FIG. 3M illustrates an example equivalent circuit for use in embedded power transfer and embedded communication.

Additionally, the use of microinverter networks of the stator and/or rotor provides advantages for the wireless power transfer and/or wireless communication transfer. As described in further detail below, the use of microinverters (for the stator, rotor, or both) enables additional control capabilities, such as the ability to control the current and/or voltage on individual windings, rather than pole or phase-level control of a group of windings within a pole or phase. For clarity, windings may also refer to slots or phases of a machine. Such additional control capabilities enables more precise control of the timing and location of the injected perturbations in the stator windings and/or rotor windings used for wireless power transfer and wireless communication. As a result, for example, the timing and location of the injected perturbations can be selected to maximize, increase, or improve the efficiency of the wireless power transfer or communications, the amount of wireless power transferred (e.g., per unit time), the amount of data communicated (e.g., per unit time), the distribution of wireless power transfer or communication across windings (or channels), the amount of communication channels simultaneously operating, the effectiveness or robustness of communication (e.g., through redundancy), the data (e.g., bits) per transmission power unit (e.g., milliwatt), and the like.

For example, with individually controllable rotor phases provided by a rotor microinverter network (e.g., for wireless power transfer or communication), the motor assembly can more-effectively communicate by transmitting or communicating more data or power (e.g., each phase being a separate communication or power transfer channel), by providing more robust communication (e.g., redundancy over multiple channels), and/or by reducing transmission power or baud rate on any one channel via distributing the communication or transfer load across more than one channel.

A microinverter network, such as the microinverter network(s) 175, the stator microinverter network 210, the rotor microinverter network 310, and/or the microinverter network 715, may be described by a collection of local modules or microinverters that comprise the network. The network of modules may be controlled by a global controller that governs the system's primary desired operating mode. Given a global control signal for a desired operating mode, each local microinverter module may determine its own local response to such a global control signal. This local response may be reflected in the stator or rotor windings, or collections thereof. These local responses may control the various communication and control channels within the machine. For instance, provided a global signal which may be comprised of output torque, rotor position, and/or machine configuration (e.g., number of poles), a microinverter module may determine its own current output to produce field and torque current or voltage responses. The composite machine response may be made up of various local module commands in response to a global command. Further, this control schema is bi-directional. That is, a global controller can collect and aggregate commands from the microinverter network modules. For instance, reporting motor state (e.g., voltages) may be provided by multiple modules and aggregated by a global controller to provide location or position data. See also the discussion below related to microinverter network 715 of FIGS. 7A and 7C, where local microinverters 720 include a microinverter controller 725 to process signals (e.g., global signals) from the motor controller 110.

Returning to FIG. 3A-2, a rotor drive circuit 321 is illustrated. The rotor drive circuit 321 is similar to the rotor drive circuit 300, except that a rotor inverter 322 is provided in place of the rotor microinverter network 310. Whereas the rotor microinverter network 310 may include at least a pair of switching elements per rotor winding to independently control the current through each slot or pair of adjacent slots (e.g., for a field winding wound around a rotor tooth), the rotor inverter 322 is an inverter bridge such as described in further detail below with respect to FIGS. 9A-9C. The other components of the diagram in FIG. 3A-2 are similar to the like-numbered elements of FIG. 3A-1 and the discussion above for these elements applies similarly here with respect to FIG. 3A-2.

Returning to FIG. 3B, a rotor drive circuit 325 is illustrated. The rotor drive circuit 325 is a part of the drive circuit 115 that connects the DC power supply 105 to rotor windings 315 of the rotor assembly 185. The rotor drive circuit 325 includes a rotor power circuit 330 that is connected to the DC power supply 105 to receive power. The rotor power circuit 330 is further connected to the rotor field windings 315 and to the motor controller 110. The motor controller 110 controls the rotor drive circuit 325 and, in particular, the rotor power circuit 330, to selectively drive the rotor field windings 315 with current from the DC power supply 105 to induce magnetic fields that rotate the rotor assembly 185 of FIG. 1.

The rotor power circuit 330 provides a power coupling between the power supply 105, which is stationary (i.e., non-rotating), and the rotor field windings 315 of the rotor assembly 185, which rotate. Thus, the rotor power circuit 330 may, like the rotor power circuit 305, also include a stationary portion and a rotary portion.

The rotor power circuit 330 includes, for example, a plurality of power switching elements connected in a bridge configuration as the stationary portion (e.g., a rotor inverter). The power switching elements are semiconductor switching devices such as, for example, a field effect transistor (FET) (e.g., a metal-oxide-semiconductor field effect transistors (MOSFETs)), a bipolar junction transistor (BJT), or insulated gate bipolar transistor (IGBT). The rotor power circuit 330 may include an output terminal for each set of one or more rotor field windings 315 that may be driven independently (e.g., for each rotor phase). The motor controller 110 may control the rotor power circuit 330 to generate a periodic drive signal at each output terminal to drive each rotor phase with a respective periodic drive signal. The periodic drive signal may be, for example, sinusoidal, trapezoidal, square wave, or another drive signal that is periodic. In some embodiments, each output terminal of the rotor power circuit 330 is connected to a conductive brush that, like the power switching elements, are stationary. Each conductive brush engages a respective conductor of a slip ring that rotates with the rotor assembly 185. Each of the conductors of the slip ring, which form the rotary portion, may be coupled to one or more of the field windings 315. In some embodiments, a capacitive or inductive slip ring or coupling is provided to connect the rotor power circuit 330 to the field windings 315.

In some embodiments, the rotor power circuit 330 includes conductive brushes coupled to the DC power supply 105 that intermittently engage segmented conductors of a slip ring. The segmented conductors are arcuate portions that are rotationally aligned such that the conductive brushes make contact with particular arcuate portions of the slip ring to provide desired drive current to the rotor field windings 315. In other words, as the rotor assembly 185 rotates, the conductive brushes make and break contact with the segments conductors at appropriate times to generate the desired current flow in the rotor windings 315. In some of these embodiments, because of the described physical arrangement of the conductive brushes and segmented conductors, the rotor power circuit 330, may drive the rotor field windings 315 without communications and control from the motor controller 110.

As noted with respect to FIG. 3A-1, in some embodiments of the synchronous motor 120 incorporating the rotor drive circuit 325, the rotor assembly 185 includes rotor permanent magnets 320 in addition to the rotor field windings 315. The discussion of the inclusion of rotor permanent magnets 320 provided with respect to FIG. 3A-1 similarly applies to the rotor assembly 185 of FIG. 3B.

In some embodiments, the rotor assembly 185 is a permanent magnet rotor assembly without rotor field windings. In these embodiments, the rotor drive circuit 325 may be eliminated because the rotor assembly 185 does not include rotor field windings to be driven.

FIG. 3H provides another diagram of a rotor assembly (e.g., the rotor assembly 185) including the rotor power circuit 330. In this example, the rotor power circuit 330 includes a rotor inverter 350 (e.g., including the above-described power switching elements) connected to a slip ring 355 that is connected to a rotor circuit 360. The rotor inverter 350 is driven by the motor controller 110 to provide power from the DC power supply 105 (see FIG. 3B) to the slip ring 355. As previously described, the slip ring 355 may provide a connection between stationary components (e.g., the rotor inverter 350) and rotating components of the rotor assembly (e.g., the rotor circuit 360 and the rotor windings 315). The slip ring connection may be one or more of a conductive coupling, an inductive coupling, or a capacitive coupling, such as described above. The rotor circuit includes the traces, terminals, and other on-board circuit elements (e.g., resistors, capacitors, etc.) that connect the rotor windings 315 to the slip ring 355. As illustrated, four channels 365 are provided from the rotor inverter 350 to the rotor windings 315, enabling up to four rotor phases. For clarity, each channel 365, although drawn as a single line, may define a complete electrical circuit. In some embodiments, each channel may represent a separate conductive path. In some embodiments, a portion of one or more of the channels 365 connecting two elements (e.g., the rotor inverter 350, slip ring 355, rotor circuit 360, and/or rotor windings 315) may be implemented by a shared conductor that is multiplexed (e.g., time multiplexed or frequency multiplexed). In other embodiments, more or fewer channels 365 are provided. Although the stator drive circuit 225 is illustrated in FIG. 3H, in some embodiments, the stator drive circuit 200 is provided in place of the stator drive circuit 225 and coupled to the motor controller 110.

FIG. 3I provides another diagram of a rotor assembly (e.g., the rotor assembly 185) including the rotor drive circuit 300. In this example, the rotor assembly uses embedded power transfer and embedded communications from the stator windings 215 to the rotor drive circuit 300, represented by the four channels 370 to transfer power and communications (e.g., control signals for the rotor microinverter network 310) from the stator windings 215 to the rotor drive circuit 300. To simplify the diagram, the rotor power circuit 305 and rotor communication circuit 312 are illustrated as a single rotor power-communication circuit 372. The rotor drive circuit 300 may be connected to the rotor windings 315 via four circuit or conductive paths 380, enabling up to four rotor phases. In other embodiments, more or fewer conductive paths 380 are provided. For clarity, each path 380, although drawn as a single line, may define a complete electrical circuit. Although not illustrated in FIG. 3I, in addition to transmitting the power and communications via channels 370, current through the stator windings 215 also generates magnetic fields that generate torque on the rotor assembly 185 and control field modulation for rotation of the rotor assembly 185 incorporating the windings 315. In some embodiments, the rotor drive circuit 321 (including the rotor inverter 322) is provided in place of the rotor drive circuit 300 in the rotor assembly illustrated in FIG. 3I. Additionally, as previously discussed with respect to FIGS. 3A-1 and 3A-2, in some embodiments, rather than embedded power transfer and communications, a slip ring is provided for power transfer and communications to the rotor drive circuit 300 or 321 via brushed, inductive, or capacitive couplings. Although the stator drive circuit 225 is illustrated in FIG. 3I, in some embodiments, the stator drive circuit 200 is provided in place of the stator drive circuit 225 and coupled to the motor controller 110.

FIG. 3J provides another diagram of a rotor assembly (e.g., the rotor assembly 185) including a hybrid rotor drive circuit 375, which is a combination of features from the rotor drive circuits 300 or 321 and 325. In this example, the rotor assembly may use embedded power transfer and embedded communications from the stator windings 215 to the rotor drive circuit 300 or 321 (as described with respect to FIG. 3I) to drive the rotor windings 315, and/or may use the rotor power circuit 330 to drive the rotor windings 315 (as described with respect to FIG. 3H). The motor controller 110 may switch between drive modes (i.e., between using the rotor power circuit 330 and the rotor drive circuit 300) in different scenarios. Although not illustrated in FIG. 3J, in addition to transmitting the power and communications via channels 370, current through the stator windings 215 also generates magnetic fields that generate torque on the rotor assembly 185 and control field modulation for rotation of the rotor assembly 185 incorporating the windings 315. Although shown separately, the rotor circuit 360 may be considered part of the rotor power circuit 330 or the rotor drive circuit 300. Although the stator drive circuit 225 is illustrated in FIG. 3J, in some embodiments, the stator drive circuit 200 is provided in place of the stator drive circuit 225 and coupled to the motor controller 110.

As should be appreciated from FIGS. 3H-3J and the accompanying discussion, the rotor assembly 185 may receive power via an auxiliary channel(s) (e.g., slip ring with conductive coupling (e.g., brushes), capacitive coupling, or inductive coupling), via embedded channels (e.g., for embedded power transfer and/or communication), or via a combination of auxiliary and embedded channels. Similarly, the rotor assembly 185 may receive and transmit communications via an auxiliary channel(s) (e.g., slip ring with conductive coupling (e.g., brushes), capacitive coupling, inductive coupling, or optical coupling), via embedded channels (e.g., for embedded power transfer and/or communication), or via a combination of auxiliary and embedded channels. Additionally, in examples in which the rotor assembly 185 includes both auxiliary and embedded channels, these channels may be alternated between in various modes (e.g., auxiliary channel mode vs embedded channel modes), may operate simultaneously (e.g., auxiliary power transfer channel(s)+embedded communication channel(s), or auxiliary communication channel(s)+embedded power transfer channel(s)), or may be used in combination in other ways.

Returning to FIG. 1, different embodiments of the motor drive circuit 115 may include different combinations of the stator and rotor drives circuits of FIGS. 2A, 2B, 3A-1, 3A-2, and 3B. For example, the motor drive circuit 115 may include (1) the stator drive circuit 200 and the rotor drive circuit 300, (2) the stator drive circuit 200 and the rotor drive circuit 321, (3) the stator drive circuit 200 and the rotor drive circuit 325, (4) the stator drive circuit 200 and the rotor drive circuit 300 or 321 and the rotor power circuit 330 (hybrid design of FIG. 3J), (5) the stator drive circuit 225 and the rotor drive circuit 300, (6) the stator drive circuit 225 and the rotor drive circuit 300, (7) the stator drive circuit 225 and the rotor drive circuit 300 (with rotor inverter 350 shown in FIG. 3H), and (8) the stator drive circuit 225 and the rotor drive circuit 300 or 321 and the rotor power circuit 330 (hybrid design of FIG. 3J).

When the motor drive circuit 115 includes the stator drive circuit 200 and the rotor drive circuit 300, the microinverter network(s) 175 include the stator microinverter network 210 and the rotor microinverter network 310. When the motor drive circuit 115 includes the stator drive circuit 200 and the rotor drive circuit 321 or 325, the microinverter network(s) 175 includes the stator microinverter network 210. When the motor drive circuit 115 includes the stator drive circuit 225 and the rotor drive circuit 300, the microinverter network(s) 175 includes the rotor microinverter network 310. Accordingly, in each of these combinations, the motor drive circuit 115 includes at least one microinverter network 175, the rotor inverter 322, and/or the rotor inverter 350, and, therefore, provides for reconfiguring the motor assembly 190, as discussed further below.

Figure 4A:
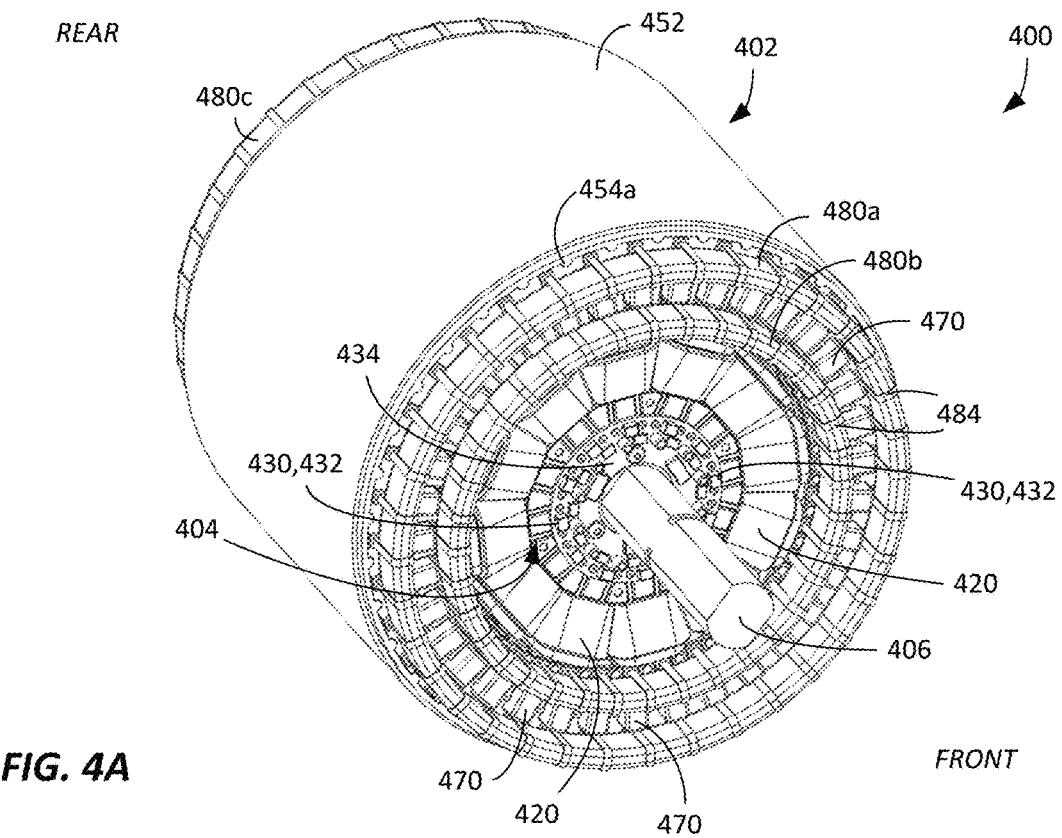
FIGS. 4A-4E illustrate an example of a motor assembly in accordance with some embodiments.
Figure 4B:
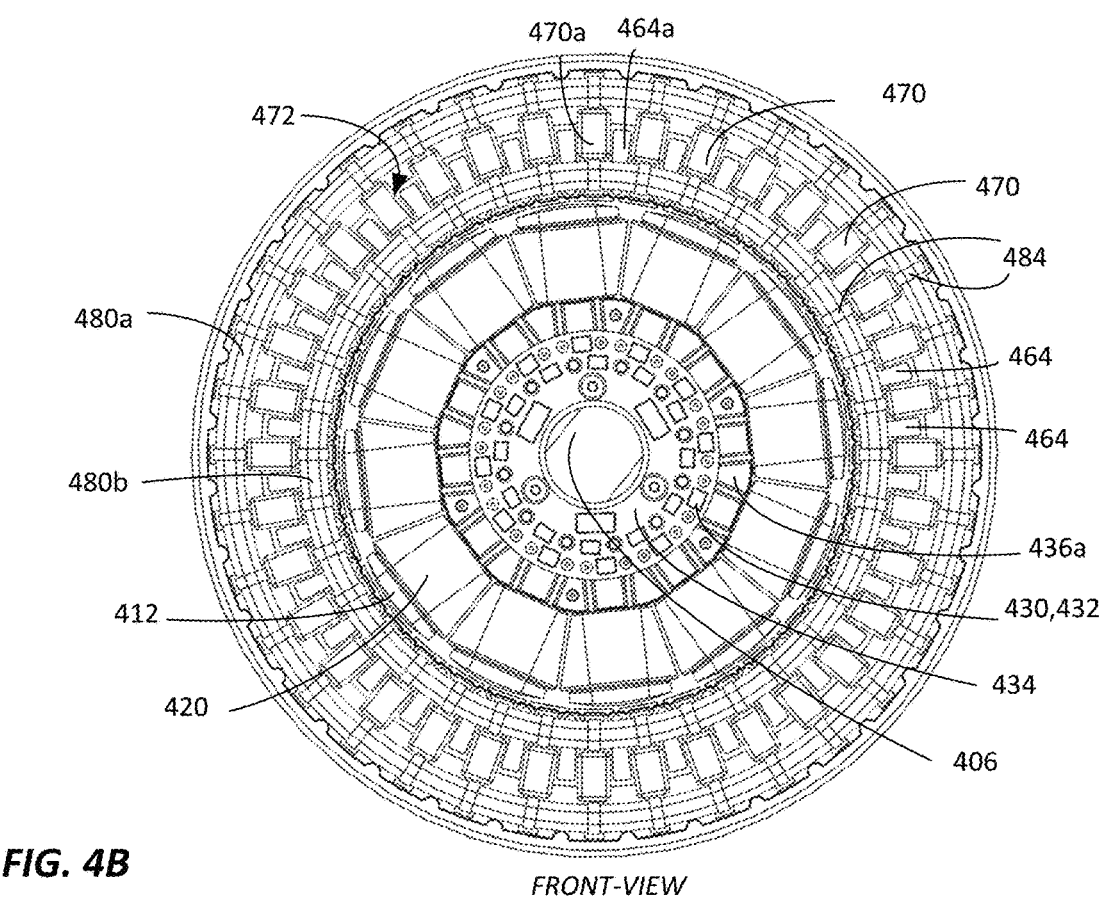
Figure 4C:
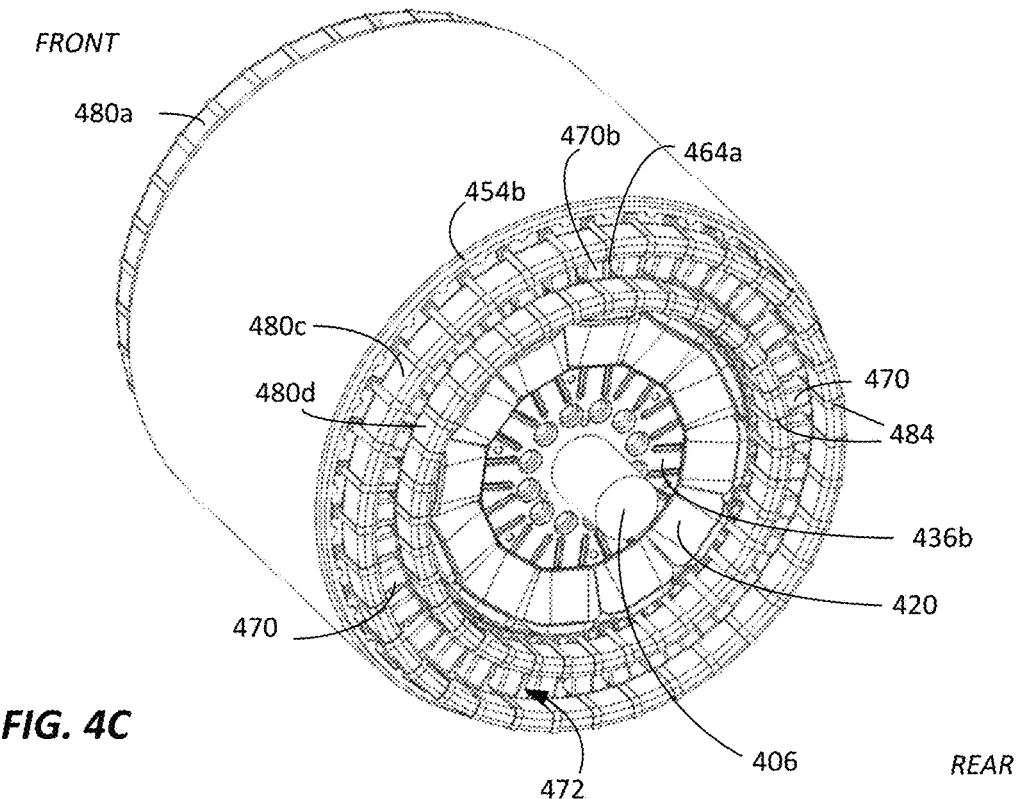
Figure 4D:
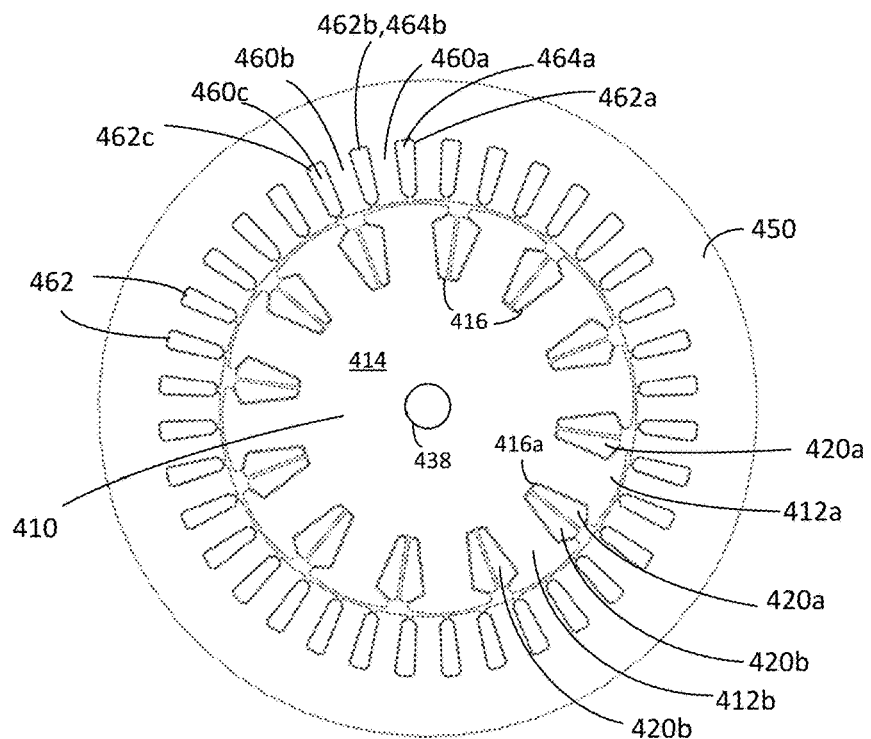
Figure 4E:
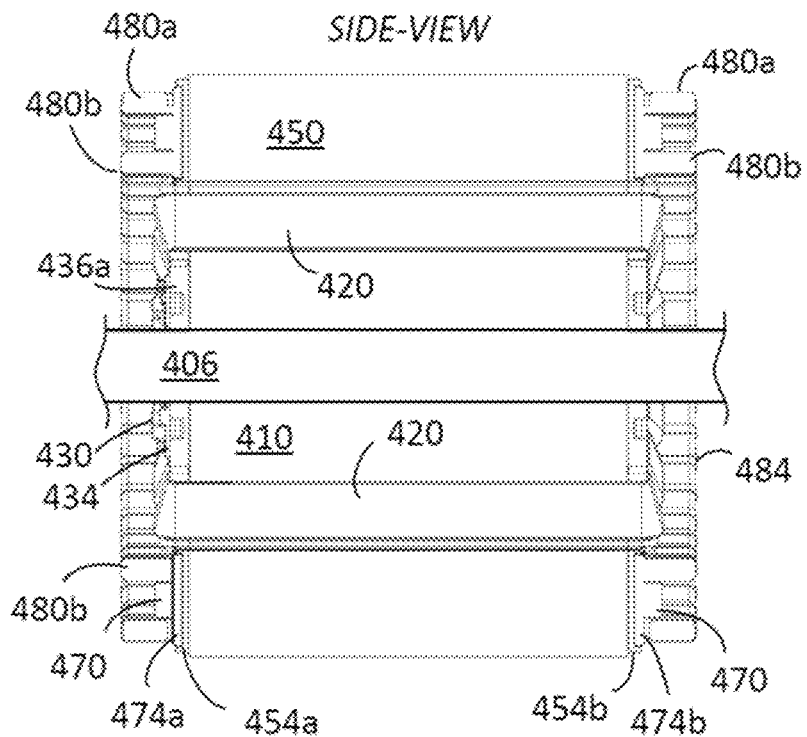

FIGS. 4A-E illustrate a synchronous motor assembly 400, which is an example of the motor assembly 190 of FIG. 1. The synchronous motor assembly 400 includes a stator assembly 402 and a rotor assembly 404 that rotates within the stator assembly 402. FIG. 4A illustrates a front perspective view, FIG. 4B illustrates a front view, FIG. 4C illustrates a rear perspective view, FIG. 4D illustrates a front cross-sectional view, and FIG. 4E illustrates a side cross-sectional view.

The rotor assembly 404 includes a rotor shaft 406 coupled to and axially extending through a rotor core 410 (see FIG. 4D). The rotor core 410 includes twelve rotor teeth 412 extending radially outward from a central portion 414 of the rotor core 410. The rotor core 410 further includes a plurality of slots 416, where a rotor slot 416 is located between each pair of adjacent teeth of the teeth 412. Each tooth 412 supports a rotor field winding 420 that is wrapped around the particular tooth 412 and passes through slots 416 on both sides of the tooth 412. For example, with reference to FIG. 4D, a rotor field winding 420a is wrapped around a tooth 412a of the teeth 412, and a rotor field winding 420b is wrapped around a tooth 412b of the teeth 412. Further, the rotor windings 420a and 420b pass through the rotor slot 416a that is located between the teeth 412a and 412b.

The rotor assembly 404 further includes a plurality of rotor microinverters 430 that, together, form a rotor microinverter network 432. The rotor field windings 420 are an example of the rotor field windings 315 of FIG. 3, and the rotor microinverter network 432 is an example of the rotor microinverter network 310 of FIG. 3. The rotor microinverter network 432 includes twelve of the rotor microinverters 430, one per rotor tooth 412. To simplify the diagram, only one rotor microinverter 430, one tooth 412, and one rotor field winding 420 are labeled in FIGS. 4A-C; however, each of the twelve rotor microinverters 430, rotor teeth 412, and rotor field windings 420 are shown at least in FIG. 4B.

The rotor microinverters 430 are mounted on a printed circuit board (PCB) 434, with each rotor microinverter 430 aligned with a tooth 412. The printed circuit board 434 is annular, substantially flat, and extends around the rotor shaft 406. The printed circuit board 434 is secured to a front face of the rotor core 410 and rotates with the rotor assembly 404.

In some embodiments, the rotor core 410 is made up of a stack of rotor laminations, each lamination being a thin metal plate, and the stack of rotor laminations sandwiched between insulating front and rear rotor end caps 436a, 436b. In some embodiments, the printed circuit board 434 is secured to a front face of the front rotor end cap 436a. As shown in FIG. 4D, the laminations include a through hole 438 through which the rotor shaft 406 passes.

In some embodiments, the stator assembly 402 includes a stator core 450 (FIGS. 4D-4E), which is generally cylindrically shaped and envelops the rotor assembly 404, which is also generally cylindrically shaped. The stator core 450 is made up of a stack of stator laminations, each lamination being a thin metal plate, and is surrounded by an outer cylindrical shell 452. The stack of stator laminations are sandwiched between insulating front and rear stator end caps 454a, 454b, As shown in FIG. 4D, the stator core 450 includes thirty-six (36) stator teeth 460 extending radially outward from a central portion 414 of the rotor core 410. The stator core 450 further includes thirty-six (36) slots 462, where one of the slots 462 is located between each pair of adjacent teeth of the teeth 460. Within each slot 462 is a stator winding 464. In the illustrated embodiment, stator winding 464a is a single conductive bar. Accordingly, although referred to as stator windings 464, in some embodiments, like the embodiment of FIGS. 4A-4E, the stator windings 464 are not wound (e.g., about the teeth 460). In other embodiments, the stator windings 464 are wound or take a different form, as described in further detail below. With reference to FIG. 4D, a tooth 460a of the teeth 460 has a stator winding 464a passing through an adjacent slot 462a and a stator winding 464b passing through another adjacent slot 462b. Additionally, a tooth 460b is adjacent to the slot 462b with the conductor 464b, and a stator winding 464c passes through a slot 462c on the other side of the tooth 460b.

The stator assembly 402 further includes a plurality of stator microinverters 470 that, together, form a stator microinverter network 472. The stator windings 464 are an example of the stator windings 215 of FIG. 2, and the stator microinverter network 472 is an example of the stator microinverter network 210 of FIG. 2. The stator microinverter network 472 includes seventy-two (72) stator microinverters 740, two per stator winding 464. Thirty-six (36) of the stator microinverters 470 are positioned on the front of the motor assembly 400 mounted on a front printed circuit board 474a, and thirty-six (36) of the stator microinverters 470 are positioned on the rear of the motor assembly 400 on a rear printed circuit board 474b. Each of the stator microinverters 470 is aligned with a tooth 460 and has a terminal connected to an adjacent stator winding 464. Thus, each stator winding 464 is connected to a stator microinverter 470 on the front and to a stator microinverter 470 on the rear of the motor assembly 400. For example, as shown in FIG. 4B, the stator microinverter 470a has a terminal connected to the stator winding 464a and a stator microinverter 470 on the rear of the motor assembly 400 (e.g., the stator microinverter 470b shown in FIG. 4C) has a terminal connected to the stator winding 464a at the rear side.

The printed circuit boards 474a and 474b are annular, substantially flat, extend around the rotor shaft 406, and have inner diameters that are greater than a diameter of the rotor core 405. The front printed circuit board 474a is secured to a front face of the stator core 450 (e.g., on the front stator end cap 452a) and the rear printed circuit board 474b is secured to a rear face of the stator 450 (e.g., on the rear stator end cap 452b).

The stator assembly 402 further includes annular bus bar rings including a first bus bar ring 480a and a second bus bar 480b on the front of the motor assembly 400, and a third bus bar ring 480c and a fourth bus bar ring 480d on the rear of the motor assembly 400. The bus bar rings 480a-d are an example of the bus bar rings 205 of FIG. 2A, and provide connections between the stator microinverter network 472 and the DC power supply 105 (see FIG. 2A). The bus bar rings 480a and 480b are positioned on the front printed circuit board 474a and secured thereto with conductive straps 484. The conductive straps 484 may connect to terminals of the stator microinverters 470, either directly or via a trace on the front PCB 474a. For example, each stator microinverter 470 on the front PCB 474a may have a first power terminal connected to the bus bar ring 480a via a first conductive strap 484 and a second power terminal connected to the bus ring 480b via a second conductive strap 484. As illustrated, the bus bar ring 480a is an outer bus ring having a larger diameter than the bus bar ring 480b, which is an inner bus bar ring. Further, the microinverters 470 are located radially between the bus bar rings 480a and 480b, simplifying the connections thereto.

Similarly, the bus bar rings 480c and 480d are positioned on the rear printed circuit board 474b and secured thereto with conductive straps 484. The conductive straps 484 may connect to terminals of the stator microinverters 470, either directly or via a trace on the rear PCB 474b. For example, each stator microinverter 470 on the rear PCB 474b may have a first power terminal connected to the bus bar ring 480c via a first conductive strap 484 and a second power terminal connected to the bus ring 480d via a second conductive strap 484. As illustrated, the bus bar ring 480c is an outer bus ring having a larger diameter than the bus bar ring 480d, which is an inner bus bar ring. Further, the microinverters 470 are located radially between the bus bar rings 480c and 480d, simplifying the connections thereto.

As least one bus ring 480a-d is connected to a positive leg of the DC power supply 105, and ad least one other bus ring 480a-d is connected to a negative leg of the DC power supply 105. The other bus rings 480a-d may provide interconnections between the stator microinverters 470.

Figure 5:
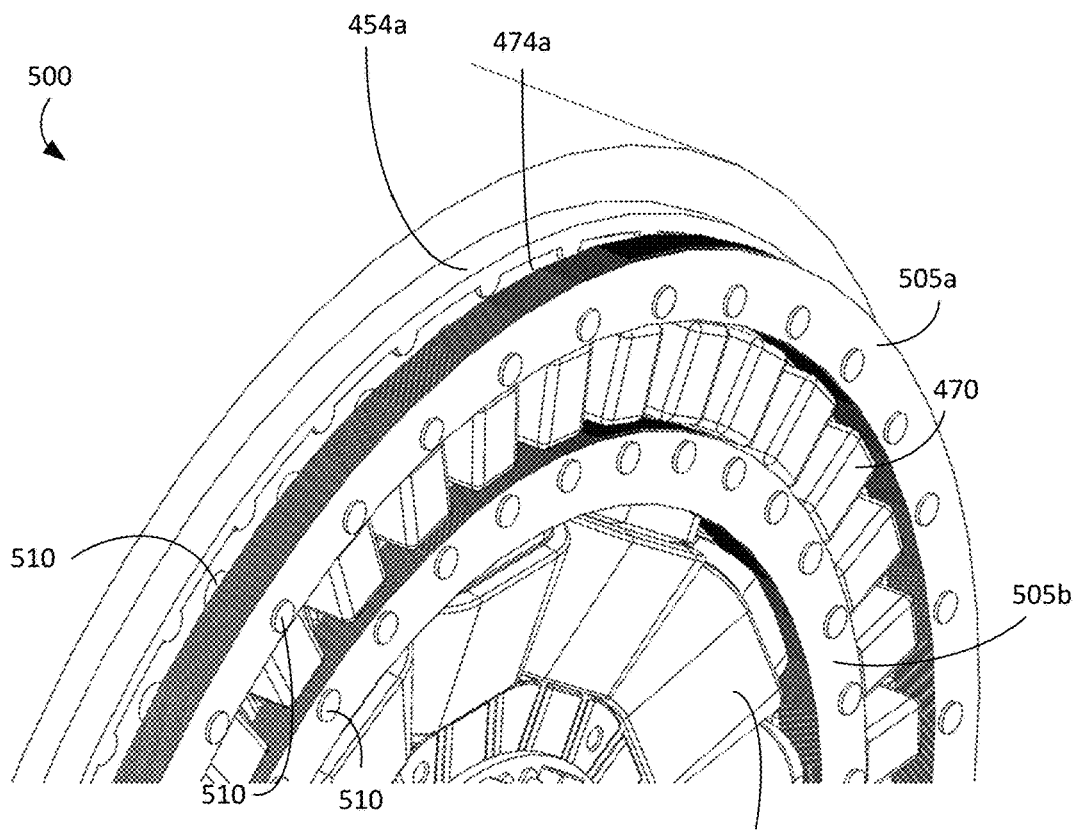
FIG. 5 illustrates a motor assembly with a laminated bus bar ring in accordance with some embodiments.

By integrating the bus-bars 480a-d on the motor assembly 400, manufacturing is simplified relative to connections by end-windings in a typical motor, and long leads to the microinverters 470 are avoided. The illustrated bus bars 480a-d are solid conductive bars. In other embodiments, the bus bars may be laminated or interleaved, which may reduce power losses and/or increase capacitance relative to solid bus bar rings. For example, FIG. 5 illustrates a motor assembly 500 that is similar to the motor assembly 400 except that the motor assembly 500 includes laminated bus bar rings 505a and 505b, in contrast to the solid bus bar rings 480a-d shown in FIGS. 4A-C and 4E. In place of conductive straps, the laminated bus bar rings 505a and 505b are secured and electrically connected to the front printed circuit board 474a via conductive pegs 510. Elements of the motor assembly 500 in FIG. 5 that are similar to elements of the motor assembly 400 are labeled with the same element numbers as in FIGS. 4A-E. Interleaved bus bars are braided or alternating laminations, where layers are alternated throughout the bus bar ring. By alternating the layers, current may be more evenly distributed, which can assist in managing eddy currents and proximity effects. Although the bus bar rings are illustrated and described herein as "rings" or "annular," the bus bar rings may include breaks or open segments and thus made up of a one or more arcuate portions or straight portions that, collectively, have a generally annular footprint around the stator assembly. Such embodiments of the bus bar ring may be referred to as a segmented bus bar ring, in comparison to complete bus bar rings that form an unbroken annular ring. In still further embodiments, the microinverters are not connected to a bus ring, but, rather, another conductor serving as a DC bus (e.g., a wire or cable, a trace on a board, or a conductive plate or disc).

The synchronous motor assembly 400 of FIG. 4 is merely an example of a motor assembly 190 of FIG. 1. The motor assembly 190 may take various other forms. For example, some embodiments, in contrast to the motor assembly 400 of FIGS. 4A-E, the motor assembly 190 of the motor system 100 of FIG. 1 may: (1) have a different number of stator microinverters or no stator microinverters on the front, rear, or both front and rear sides; (2) have a different number of rotor microinverters or no rotor microinverters on the front, rear, or both front and rear sides; (3) have a different number of bus bar rings on the front, rear, or both front and rear sides; (4) have a different number of windings per slot in the stator and/or rotor; (5) have a different type of stator winding conductor; (6) have a permanent magnet rotor or a hybrid rotor with permanent magnets and field windings; (7) have a different number of rotor teeth; (8) have a different number of stator teeth; (9) have an outer rotor with teeth that extend radially inward, and an inner stator with teeth that extend radially outward (toward the rotor); (10) be a motor with an axial air gap between rotor and stator (also referred to as an axial flux motor or axial gap motor); (11) be a linear motor with a sliding assembly driven linearly by the stator assembly 180, rather than a rotor assembly 185 driven rotationally; among other variations. Furthermore, in some embodiments, the motor 120 is an asynchronous motor, such as an induction motor. For example, the one or more microinverter network(s) 175 may be incorporated into a motor assembly 190 having an asynchronous motor (e.g., on one or both of a stator assembly and rotor assembly of the asynchronous motor) to control the current through the stator windings or rotor windings more precisely, such as described herein with respect to the motor 120.

Figure 6A:
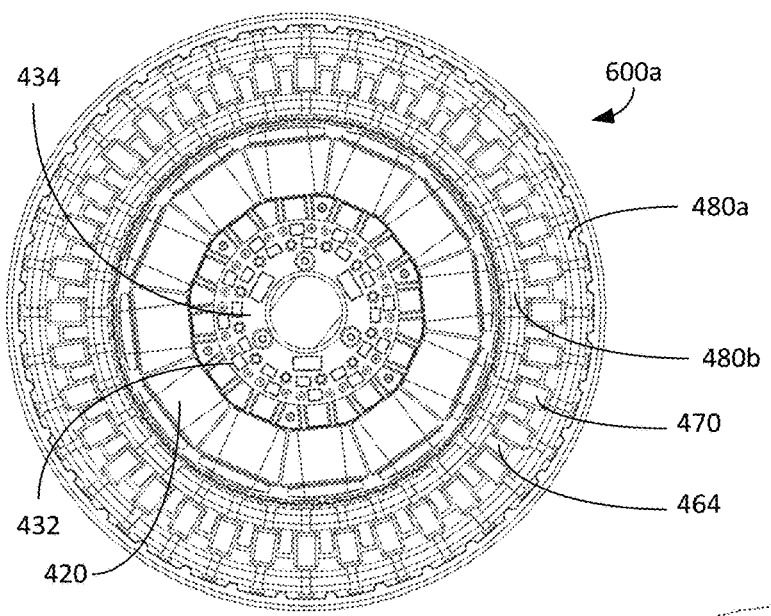
FIGS. 6A-6U illustrate examples of motor assemblies in accordance with some embodiments.

FIGS. 6A-AQ illustrate examples of further motor assemblies 600a-j that may implement the motor assembly of the motor system 100 of FIG. 1. The motor assemblies 600a-j are generally similar to the motor assembly 400 of FIGS. 4A-E. Accordingly, the discussion of the motor assembly 400 similarly applies to the motor assemblies 600a-j, except for the differences between the motor assemblies noted herein. Additionally, like numbers are used to reference like components between the motor assemblies 600a-j and the motor assembly 400.

Figure 6B:
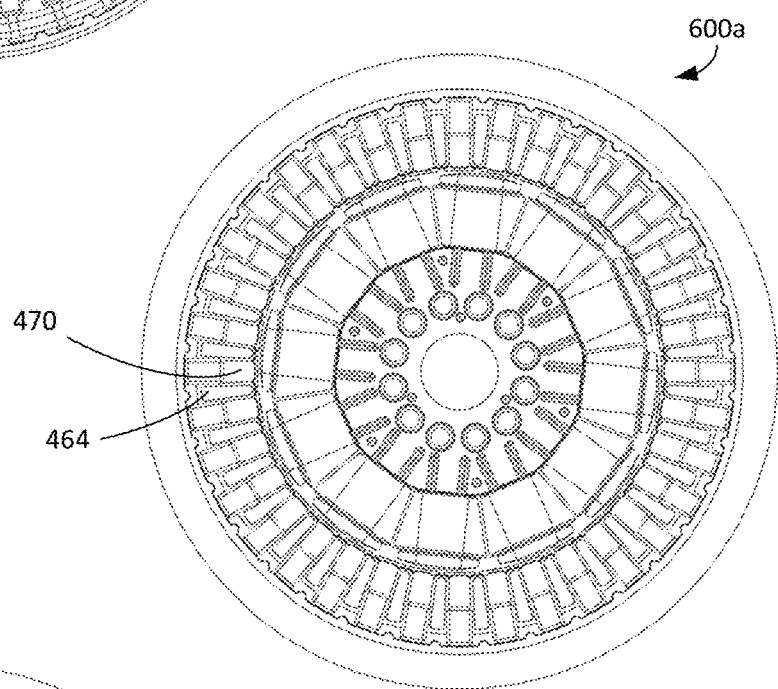
Figure 6C:
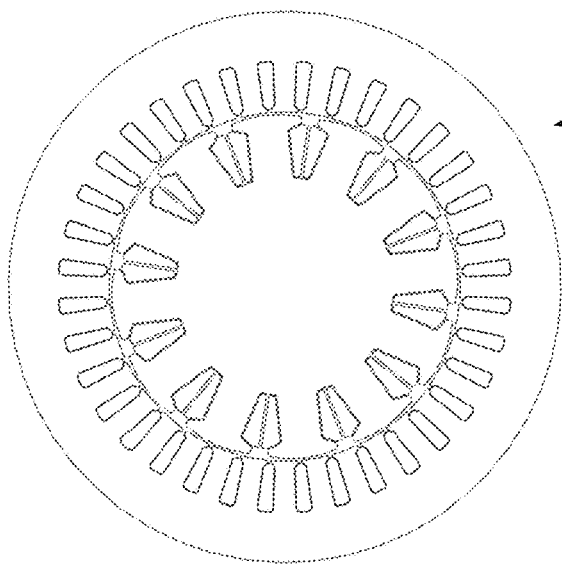

FIG. 6A-C illustrate the motor assembly 600a. More particularly, FIG. 6A illustrates a front view, FIG. 6B illustrates a rear view, and FIG. 6C illustrates a front cross sectional view of the motor assembly 600a. The motor assembly 600a is similar to the motor assembly 400 except that the motor assembly 600a includes two bus bar rings 480a and 480b on the front side, and no bus bar rings on the rear side. Accordingly, the microinverters 470 on the rear side of the motor (FIG. 6B) are connected to an adjacent winding 464, but not bus bar rings. The motor assembly 600a is also shown with the rotor PCB 434 and rotor microinverter network 432. However, in some embodiments of the motor assembly 600a, the motor assembly 600a does not include the rotor PCB 434 with the rotor microinverter network 432, such as described with respect to FIG. 3B.

Figure 6D:
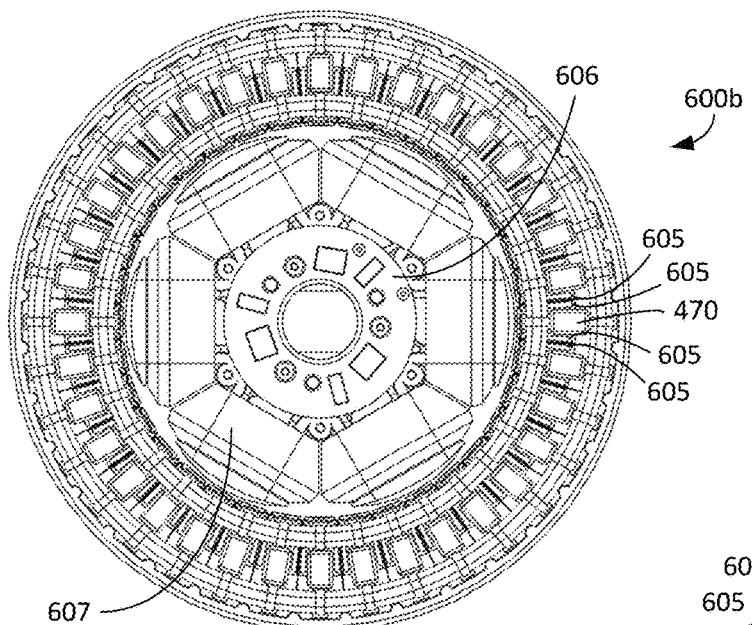
Figure 6E:
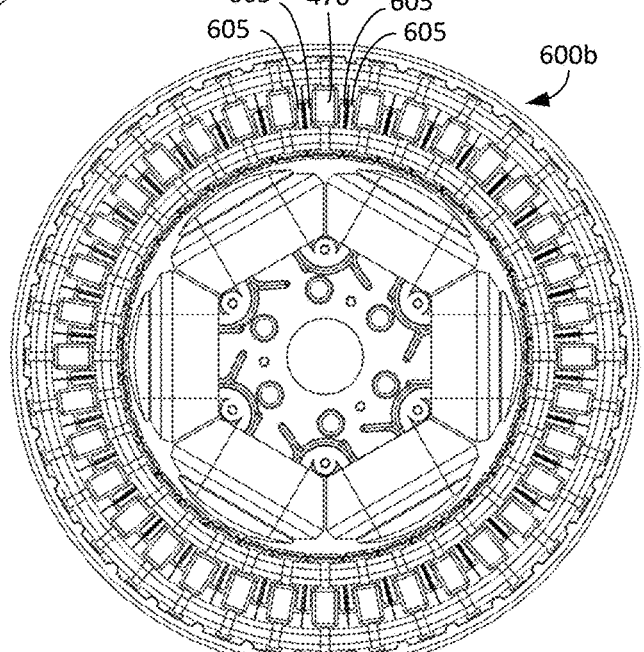
Figure 6F:
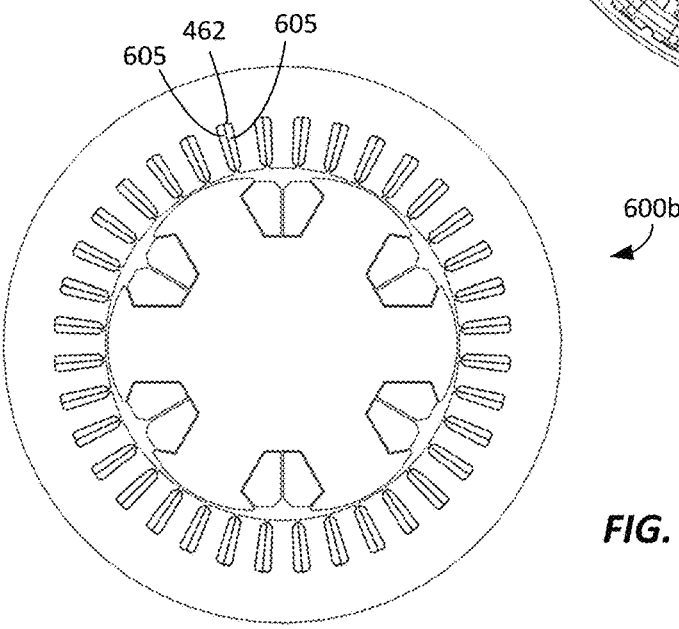

FIG. 6D-F illustrate the motor assembly 600b. More particularly, FIG. 6D illustrates a front view, FIG. 6E illustrates a rear view, and FIG. 6F illustrates a front cross sectional view of the motor assembly 600b. The motor assembly 600b is similar to the motor assembly 400 except that the motor assembly 600b includes two stator windings 605 per slot, rather than a single stator winding 464 per slot. Accordingly, each of the microinverters 470 is connected to two stator windings 605 (one on each side of a tooth 460). In some embodiments, however, the motor assembly 600b does not include rear-side bus bar rings 480c and 480d, like the motor assembly 600a of FIGS. 6A-C. Additionally, in contrast to rotor PCB 434 of the motor assembly 600a, the motor assembly 600b is shown with a rotor PCB 606 having a reduced circuit footprint for a rotor microinverter network, for example, due to the presence of fewer rotor windings 607 (six total) than the motor assembly 600a, which has twelve rotor windings 420. However, in some embodiments, the motor assembly 600b does not include a rotor PCB with a rotor microinverter network, such as described with respect to FIG. 3B.

Figure 6G:
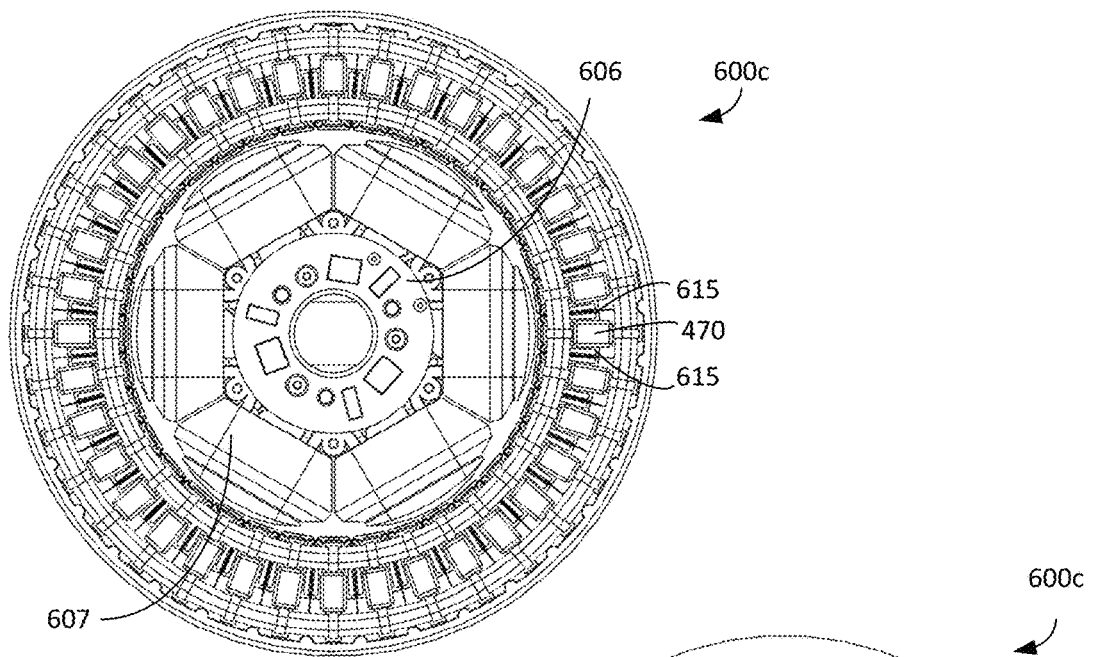
Figure 6H:
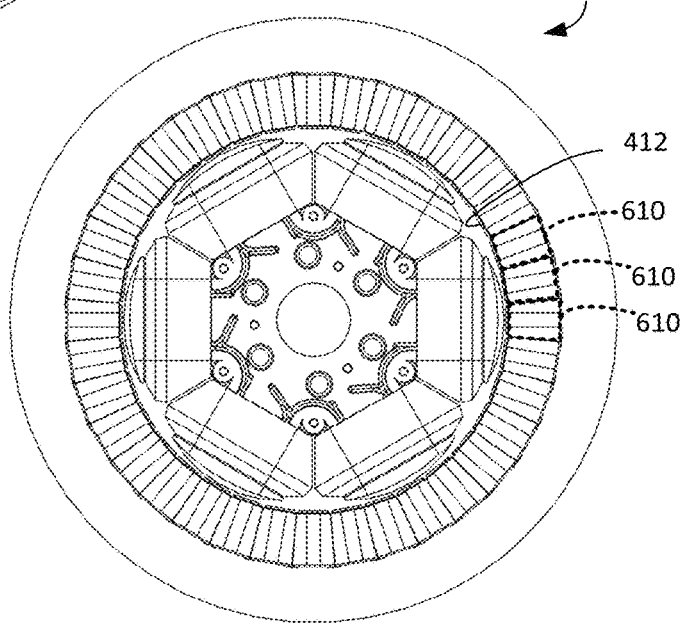
Figure 6I:
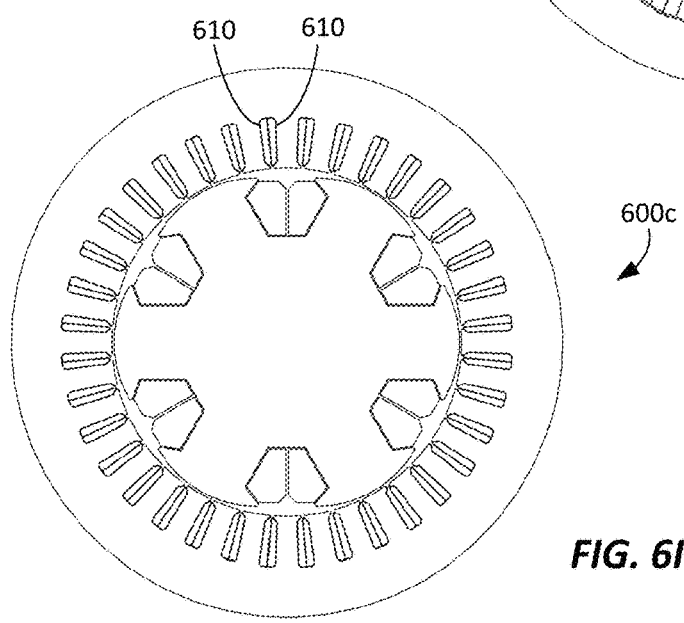

FIG. 6G-I illustrate the motor assembly 600c. More particularly, FIG. 6G illustrates a front view, FIG. 6H illustrates a rear view, and FIG. 6I illustrates a front cross sectional view of the motor assembly 600c. In contrast to the motor assembly 400, the motor assembly 600c includes two stator windings 610 per slot, similar to the motor assembly 600b. Additionally, in contrast to the motor assembly 400, the motor assembly 600c does not include a rear printed circuit board 474b or microinverters 470 on the rear side. Rather, the stator windings 610 wrap around the rear side of the teeth 612, as shown in FIG. 6H. Accordingly, each microinverter 470 is coupled, on the front side of the rotor assembly 600, to the bus bar rings 480*a* and 480*b*, and to two ends 615 of a stator winding 610 that extends through slots 462 on either side of the stator tooth 612 aligned with that particular microinverter 470. Additionally, in some embodiments, the motor assembly 600*c* does not include a rotor PCB with a rotor microinverter network, such as described with respect to FIG. 3B.

Figure 6J:
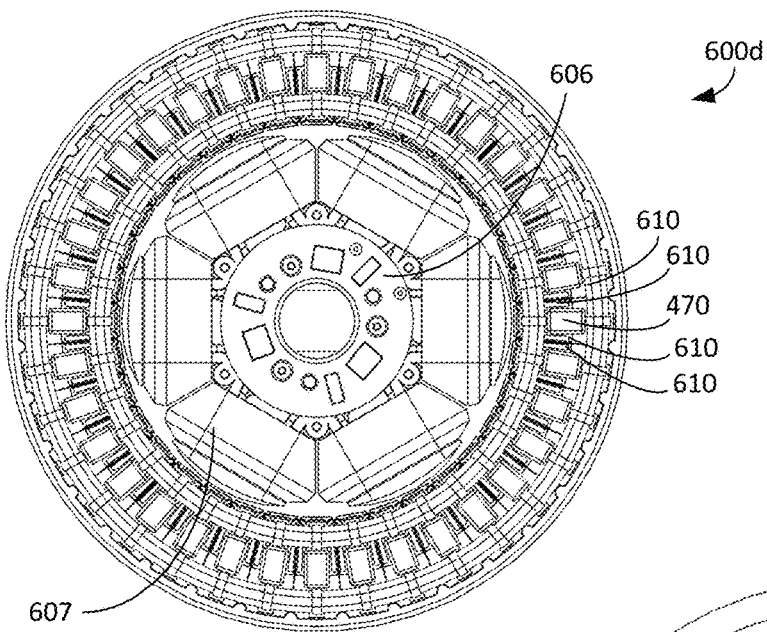
Figure 6K:
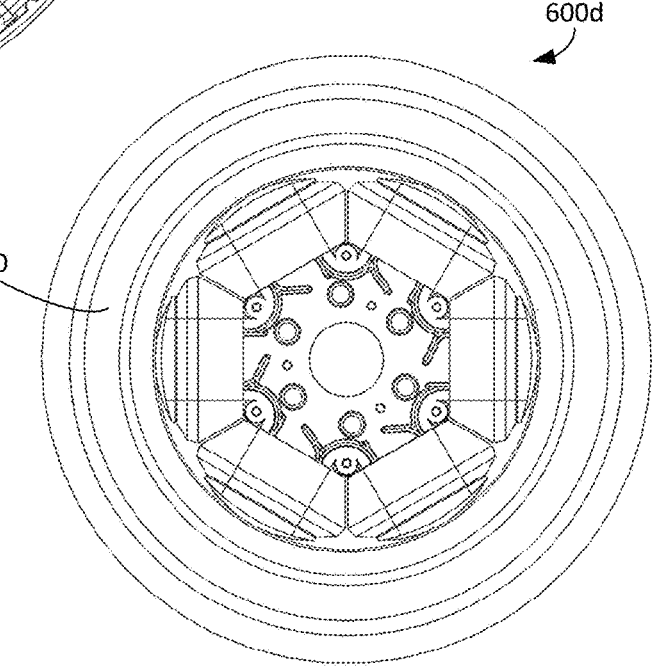
Figure 6L:
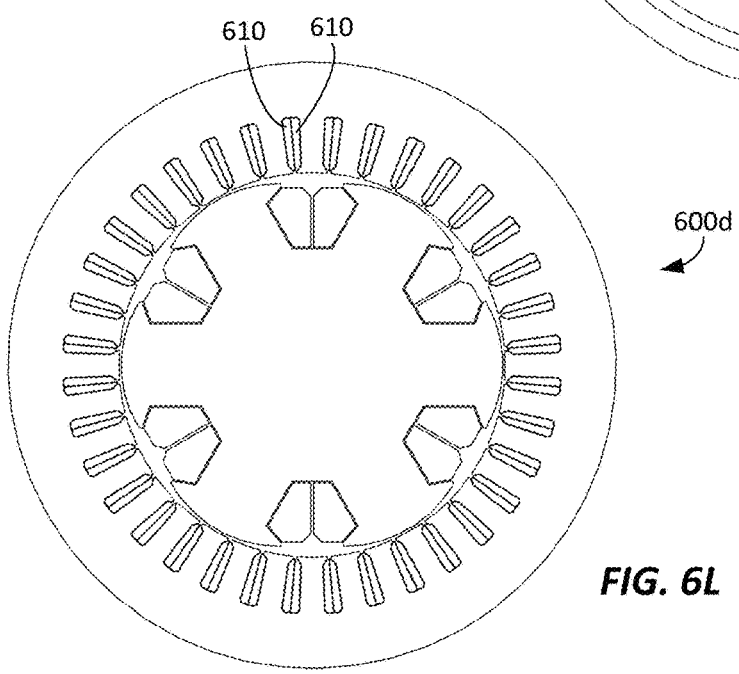

FIG. 6J-L illustrate the motor assembly 600*d*. More particularly, FIG. 6J illustrates a front view, FIG. 6K illustrates a rear view, and FIG. 6L illustrates a front cross sectional view of the motor assembly 600*d*. In contrast to the motor assembly 400, the motor assembly 600*d* includes two stator windings 610 per slot, similar to the motor assemblies 600*b* and 600*c*. Additionally, in contrast to the motor assembly 400, the motor assembly 600*d* does not include a rear printed circuit board 474*b* or microinverters 470 on the rear side, similar to the motor assembly 600*c*. Rather, each of the thirty-six stator windings 610 is connected together on the rear side as a neutral node 620, as shown in FIG. 6K. Accordingly, each microinverter 470 is coupled, on the front side of the rotor assembly 600, to the bus bar rings 480*a* and 480*b*, and to two stator windings 610 that extend through slots 462 on either side of the stator tooth 612 aligned with that particular microinverter 470. Additionally, in some embodiments, the motor assembly 600*d* does not include a rotor PCB with a rotor microinverter network, such as described with respect to FIG. 3B.

Figure 6M:
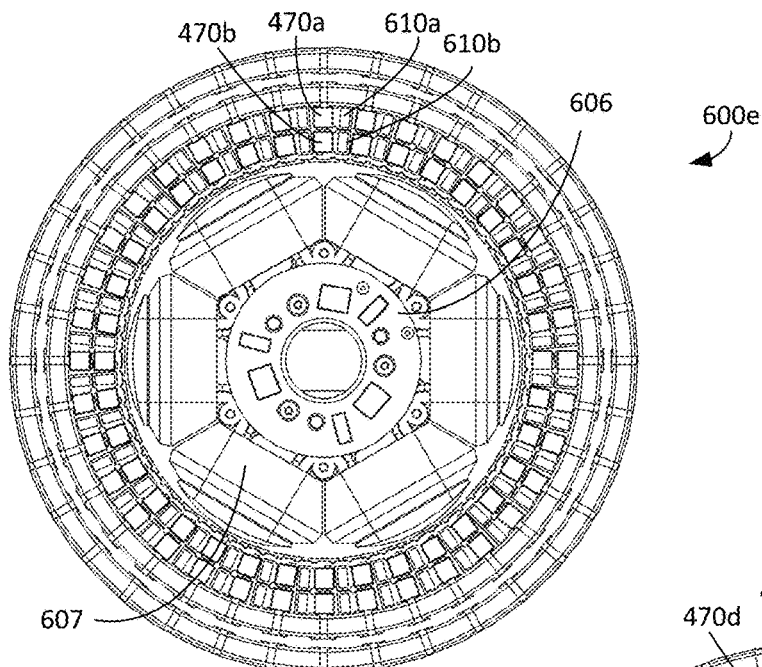
Figure 6N:
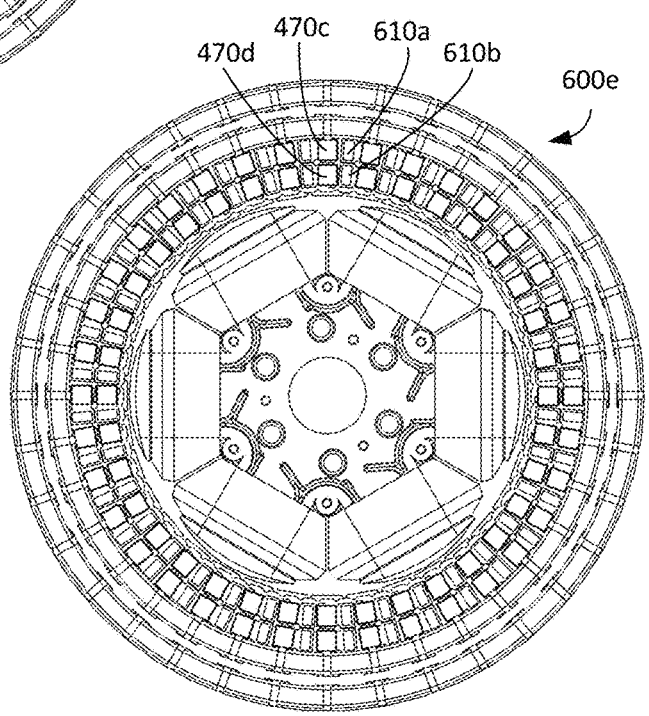
Figure 6O:
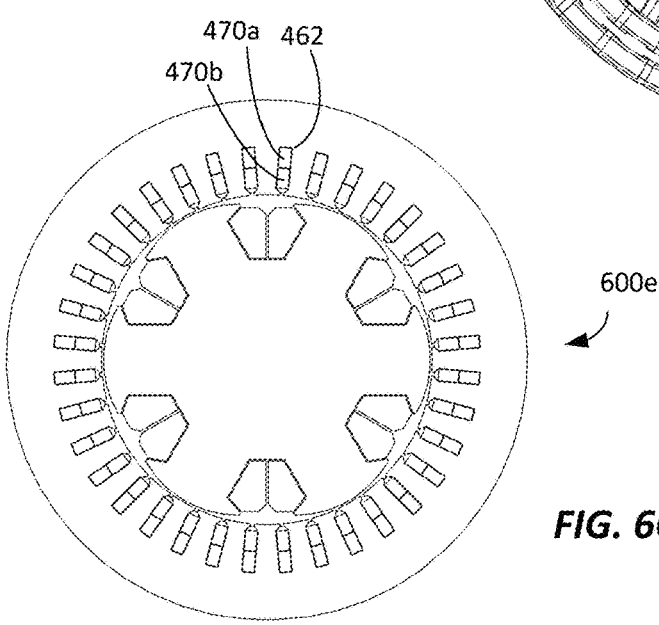

FIG. 6M-O illustrate the motor assembly 600*e*. More particularly, FIG. 6M illustrates a front view, FIG. 6N illustrates a rear view, and FIG. 6O illustrates a front cross sectional view of the motor assembly 600*e*. In contrast to the motor assembly 400, the motor assembly 600*e* includes two stator windings 610 per slot. Additionally, the motor assembly 600*e* includes two microinverters 470 per slot on each side of the motor assembly 600*e*. Accordingly, each microinverter 470 (see, e.g., microinverters 470*a-d*) is associated with one stator winding 610 (see, e.g., stator windings 610*a-b*), and each stator winding 610 is connected to one microinverter 470 on the front side and to one microinverter 470 on the rear side of the motor assembly 600*e*. For example, the conductors 610*a* and 610*b* pass through a slot 462; a microinverter 470*a* is connected to the conductor 610*a* on the front side and to the microinverter 470*b* on the rear side; and the microinverter 470*c* is connected to the conductor 610*b* on the front side and to the microinverter 470*d* on the rear side. Additionally, in some embodiments, the motor assembly 600*e* does not include a rotor PCB with a rotor microinverter network, such as described with respect to FIG. 3B.

Figure 6P:
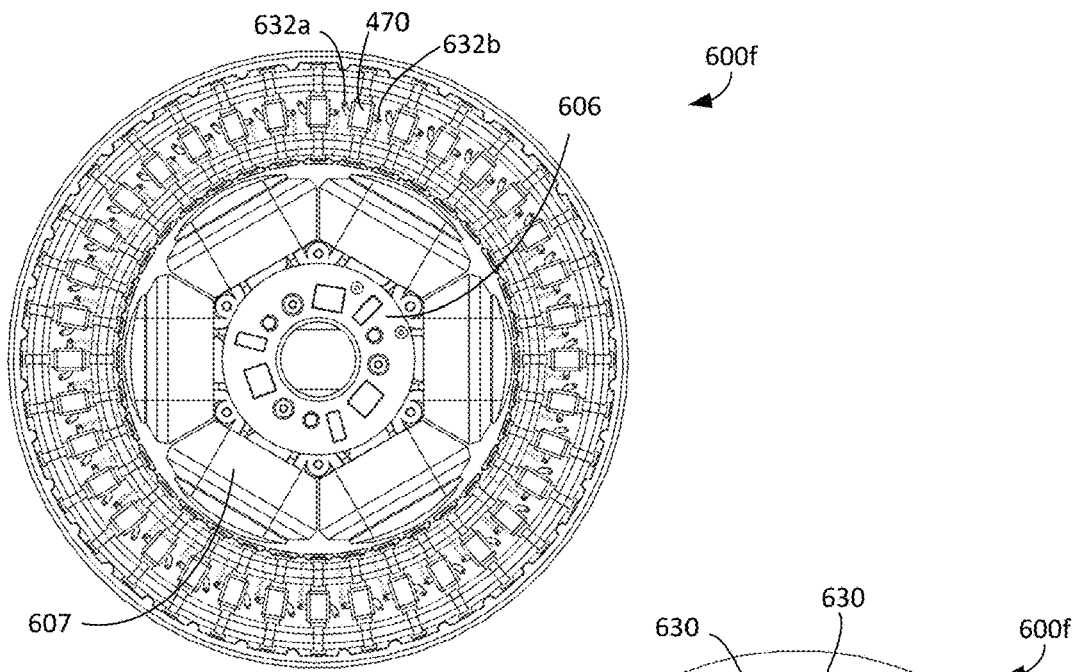
Figure 6Q:
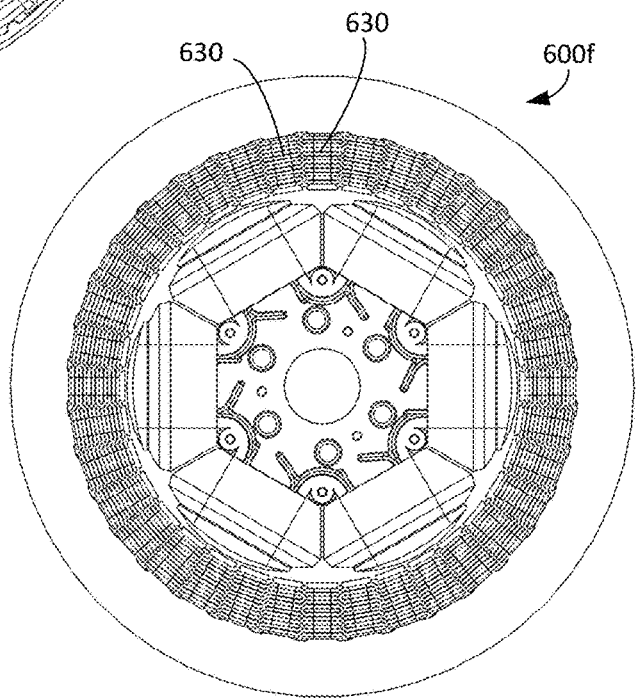
Figure 6R:
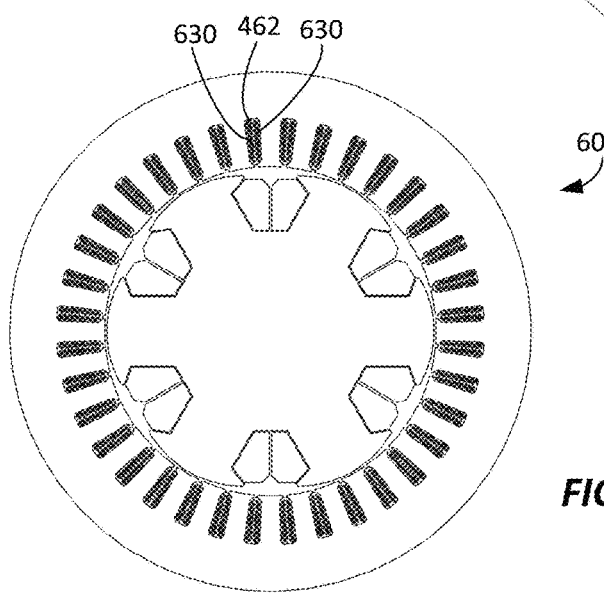

FIG. 6P-R illustrate the motor assembly 600*f*. More particularly, FIG. 6P illustrates a front view, FIG. 6Q illustrates a rear view, and FIG. 6R illustrates a front cross sectional view of the motor assembly 600*f*. In contrast to the motor assembly 400, the motor assembly 600*f* includes two stator windings 630 per slot 462, and each stator winding 630 is a concentrated, wound, multi-turn conductor. Each microinverter 470 is associated with one stator winding 630, with each end of the stator winding 630 being connected to the microinverter 470 (see, e.g., connection points 632*a* and 632*b*). Additionally, in contrast to the motor assembly 400, the motor assembly 600*f* does not include a rear printed circuit board 474*b* or microinverters 470 on the rear side. Additionally, in some embodiments, the motor assembly 600*f* does not include a rotor PCB with a rotor microinverter network, such as described with respect to FIG. 3B.

Figure 6S:
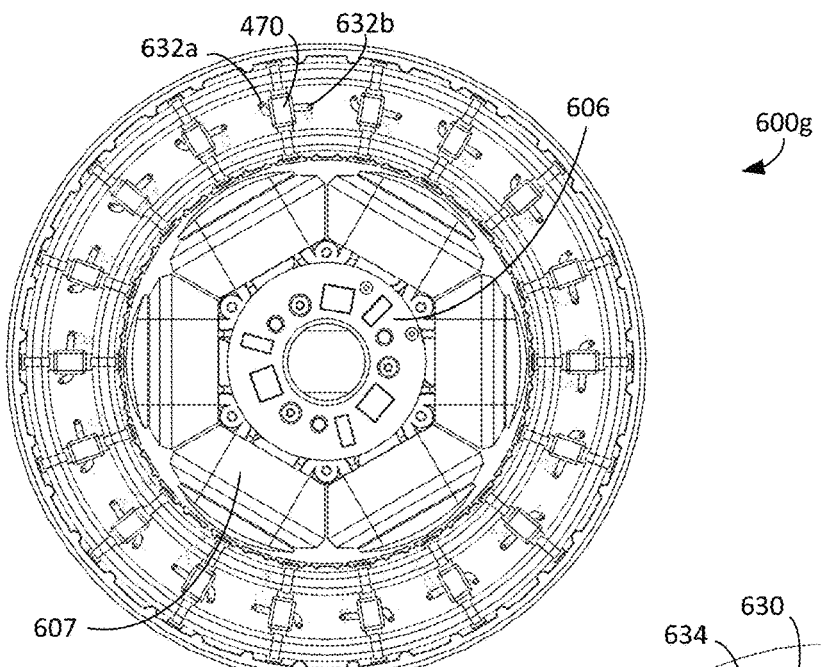
Figure 6T:
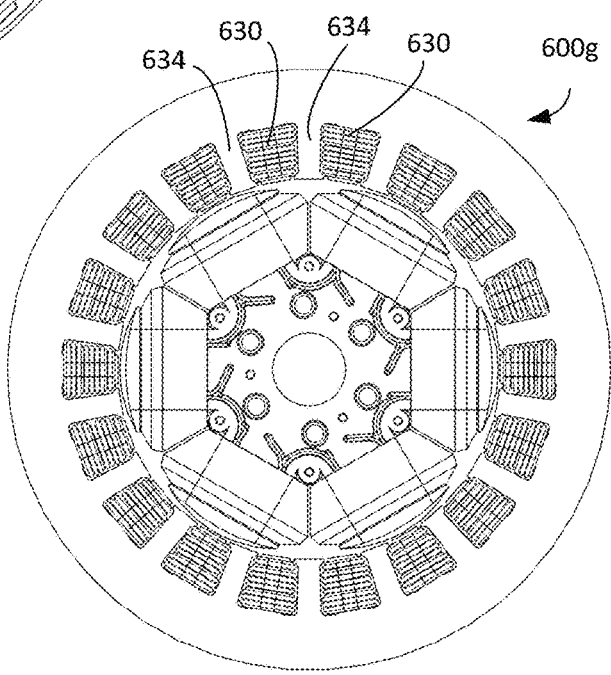
Figure 6U:
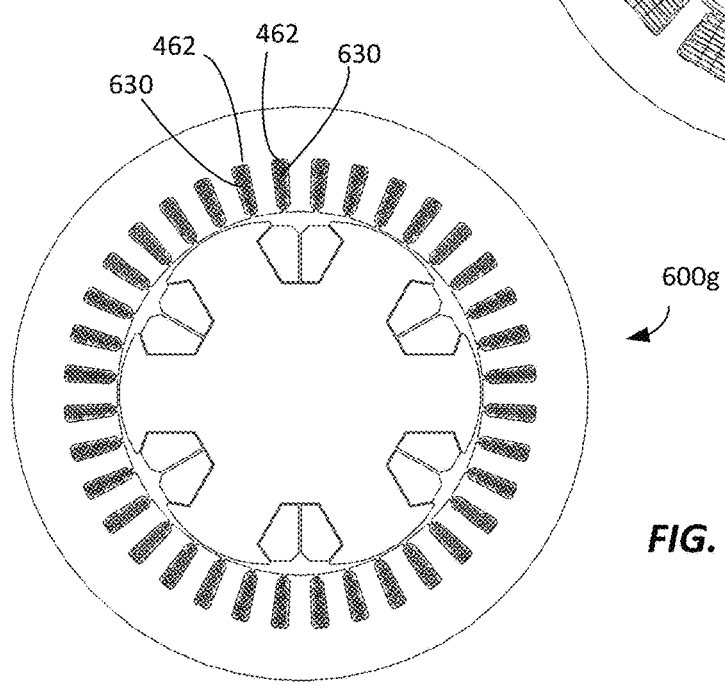

FIG. 6S-U illustrate the motor assembly 600*g*. More particularly, FIG. 6S illustrates a front view, FIG. 6T illustrates a rear view, and FIG. 6U illustrates a front cross sectional view of the motor assembly 600*g*. The motor assembly 600*g* is similar to the motor assembly 600*f* except that the motor assembly 600*g* has stator windings 630 on half of the teeth 612, leaving half of the teeth (see teeth 634) with exposed axial ends and resulting in a single conductor through each slot 462. More particularly, every other tooth of the teeth 612 has a stator winding 630 in the form of a concentrated, multi-turn conductor wound around the particular tooth. The motor assembly 600*g* also has one microinverter 470 connected to each stator winding 630 and, accordingly, half as many of the microinverters 470 as the motor assembly 600*f*. For example, each end of each respective stator winding 630 is connected to a respective one of the microinverters 470 (see, e.g., connection points 632*a* and 632*b*). Additionally, in some embodiments, the motor assembly 600*g* does not include a rotor PCB with a rotor microinverter network, such as described with respect to FIG. 3B.

Figure 6V:
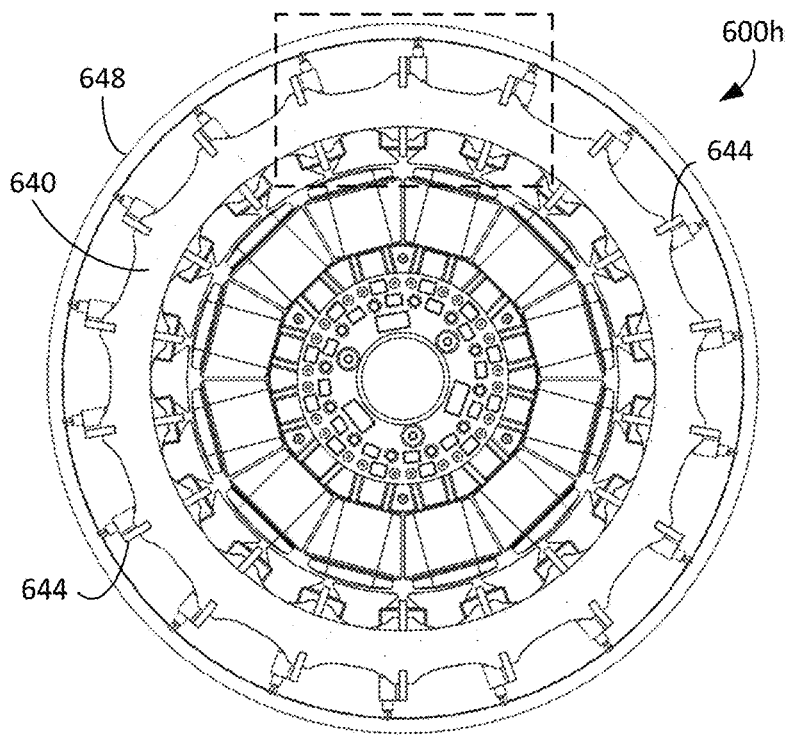
Figure 6W:
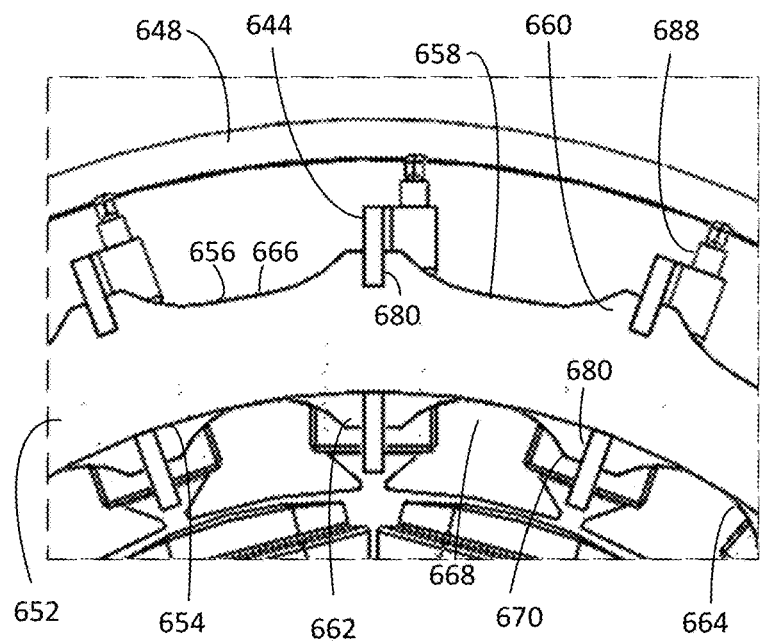
Figure 6X:
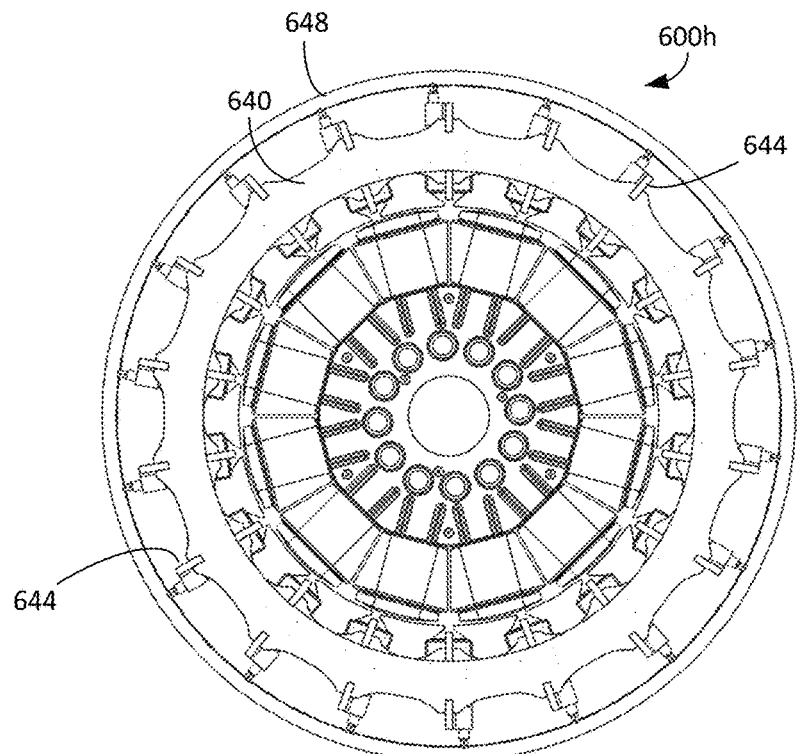
Figure 6Y:
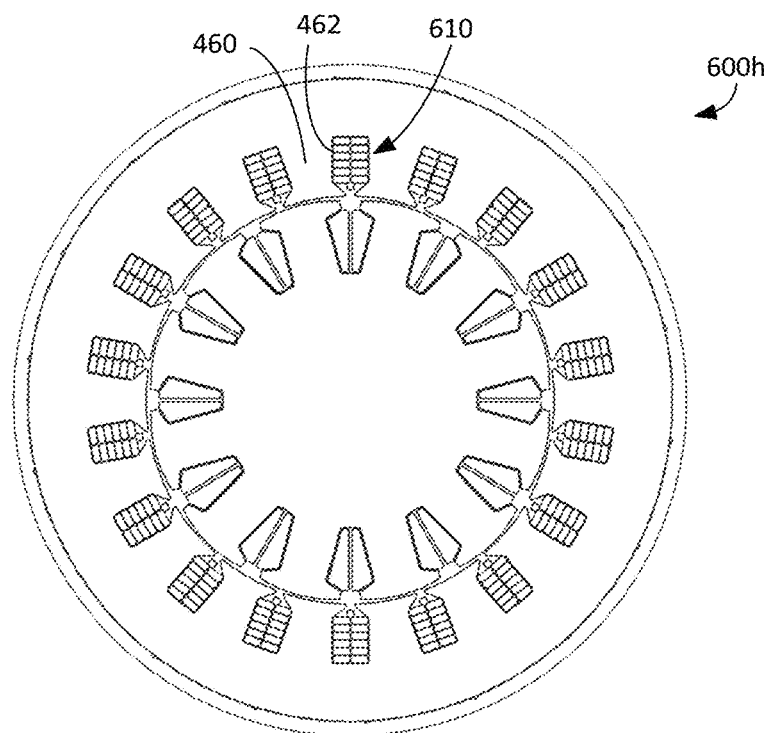
Figure 6Z:
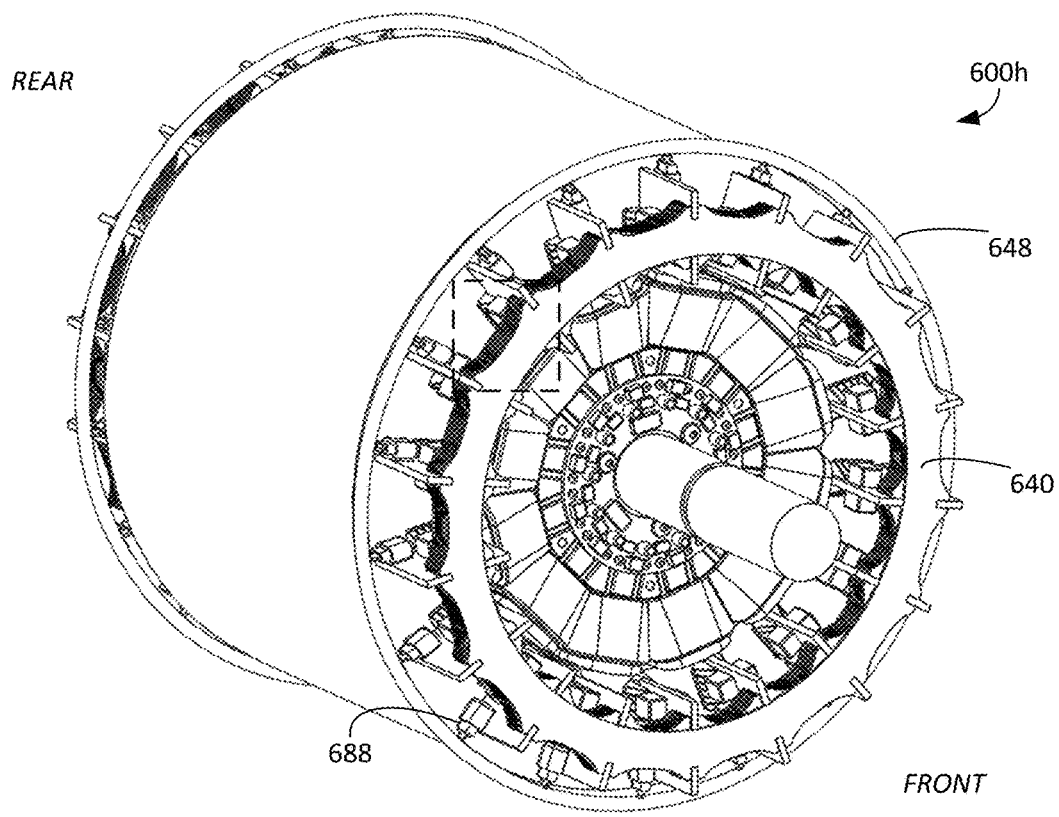
Figure 6A:
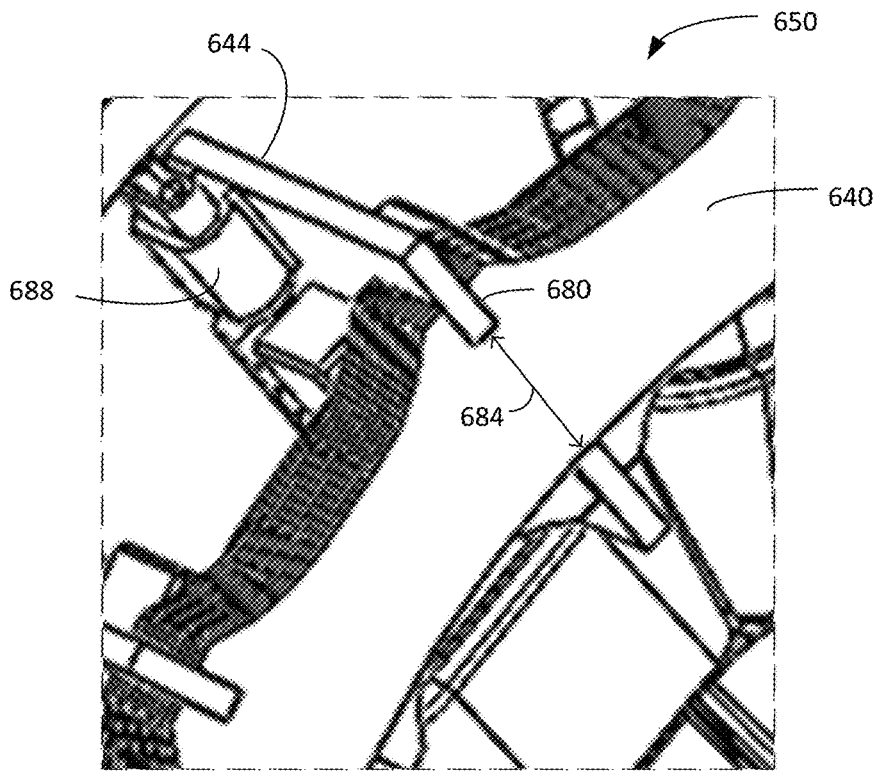
Figure 6A:
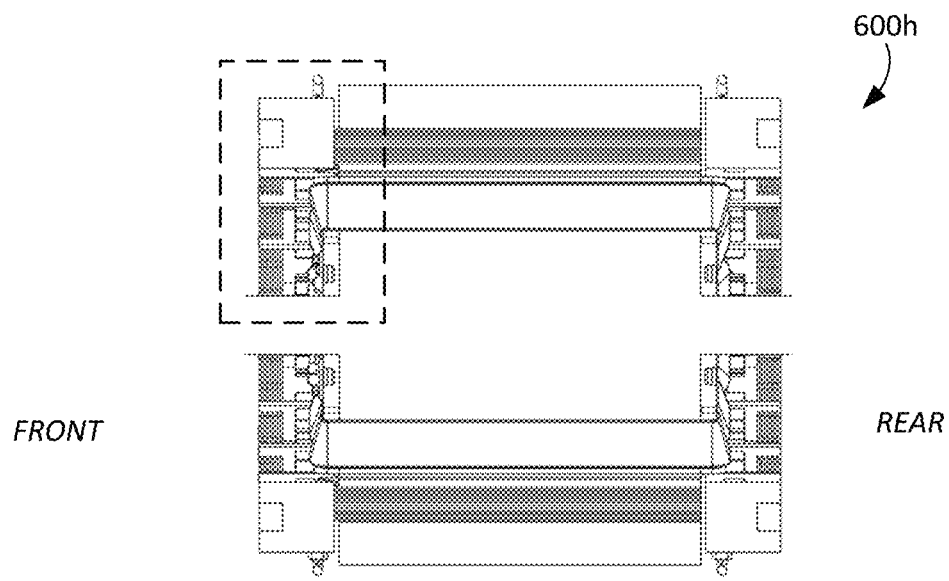
Figure 6A:
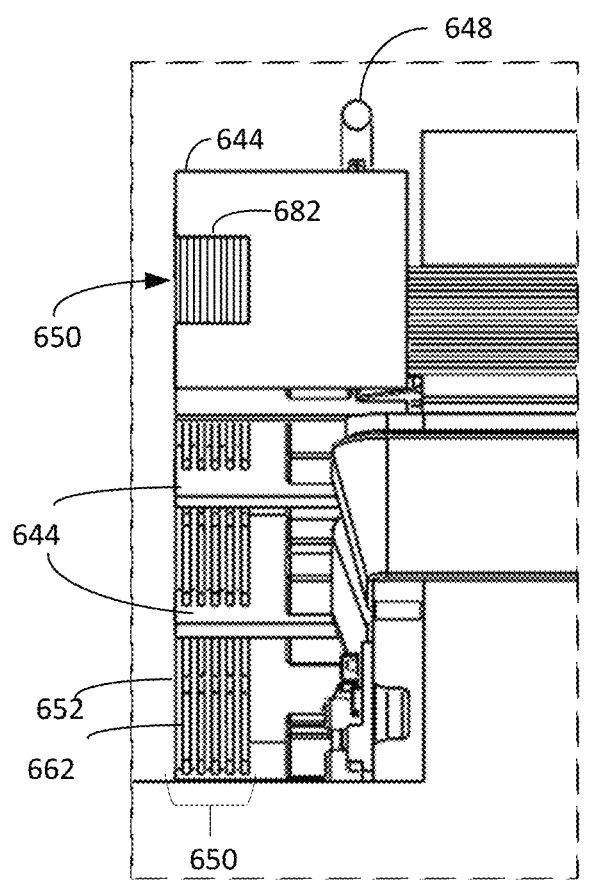
Figure 6A:
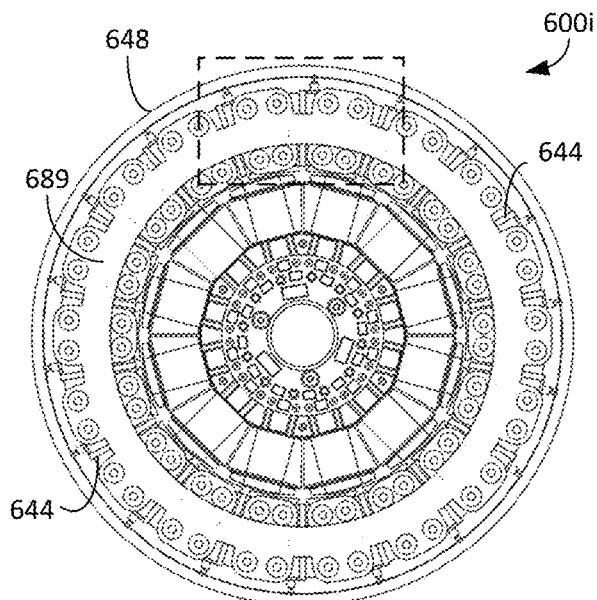
Figure 6A:
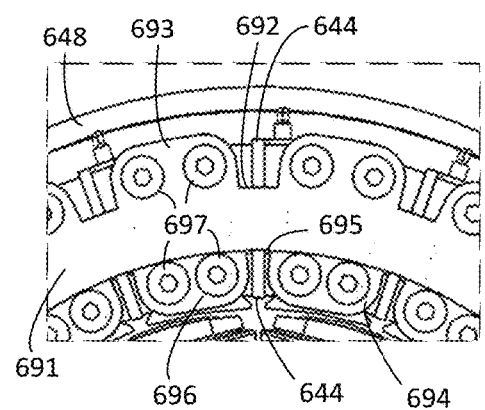
Figure 6A:
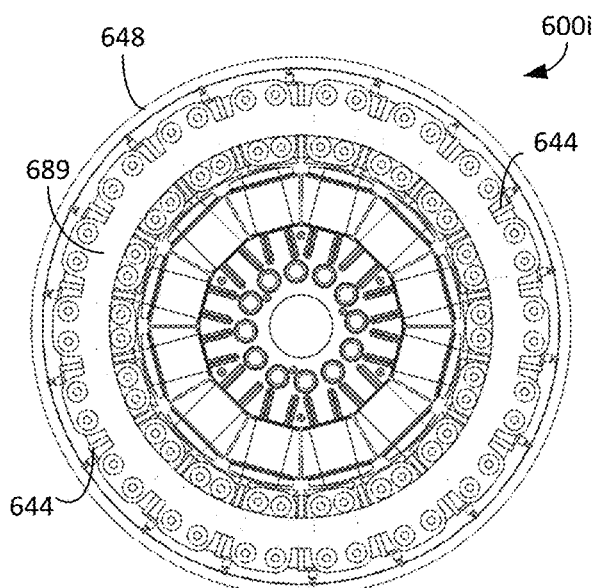
Figure 6A:
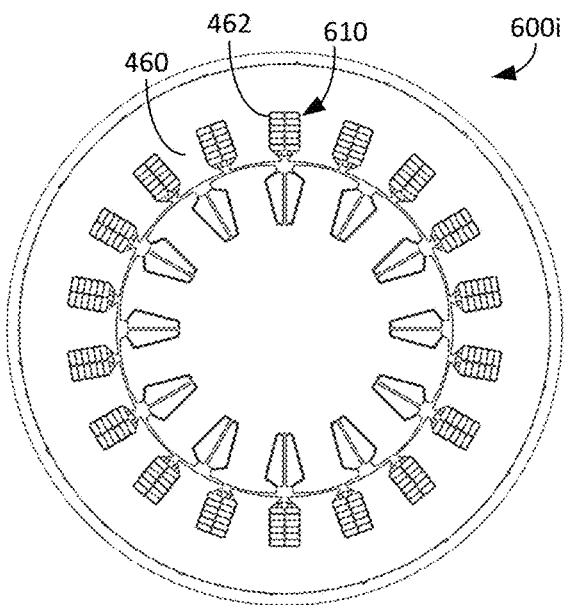
Figure 6A:
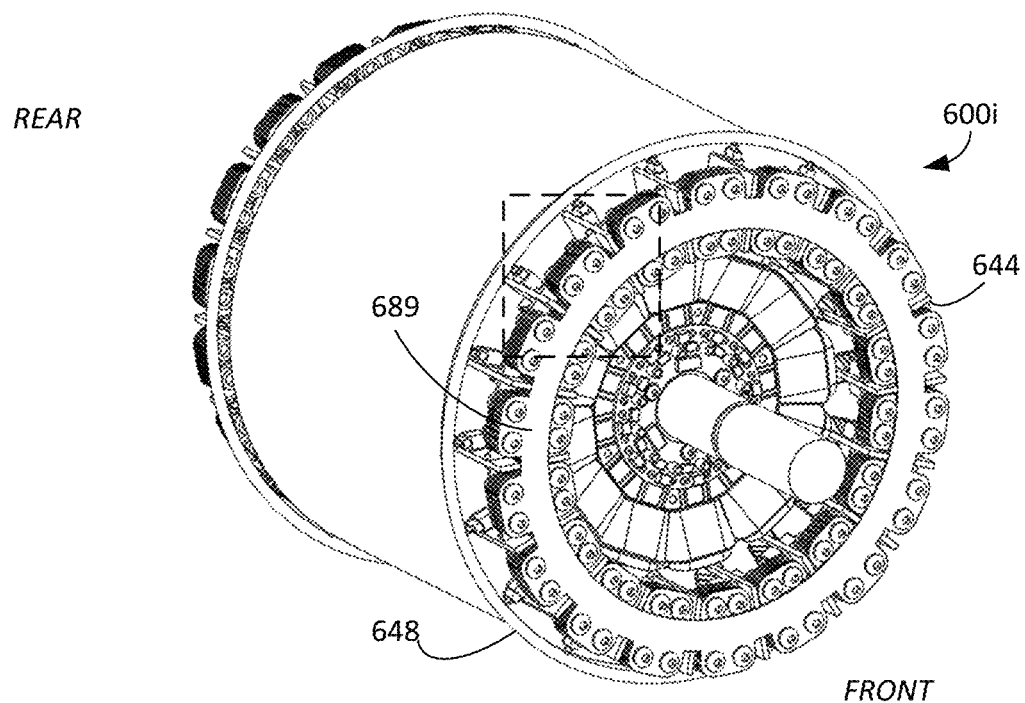
Figure 6A:
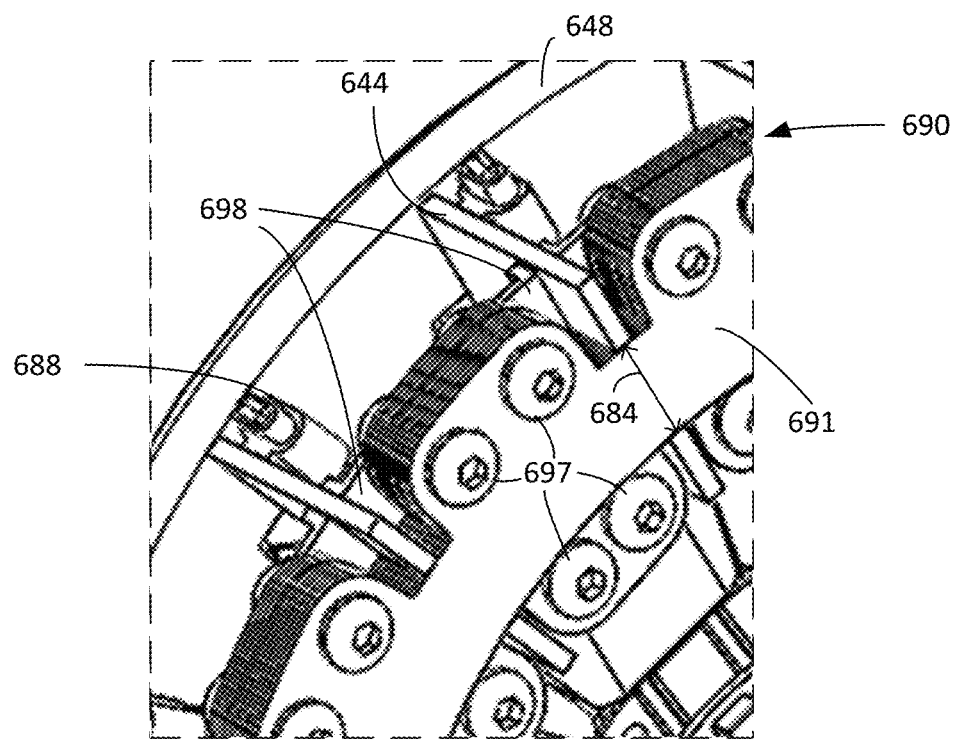
Figure 6A:
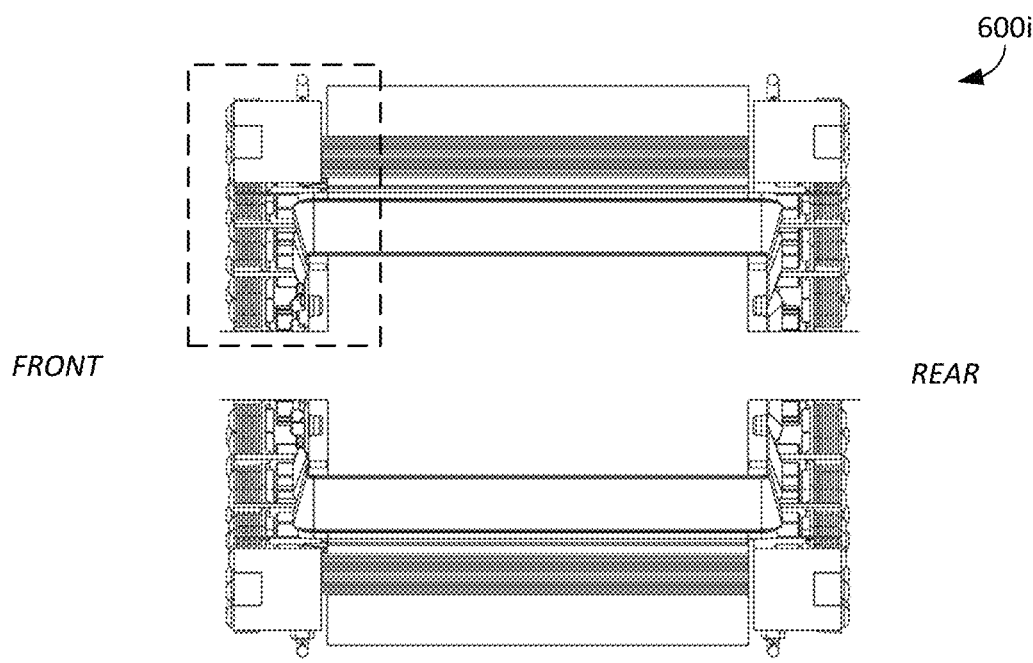
Figure 6A:
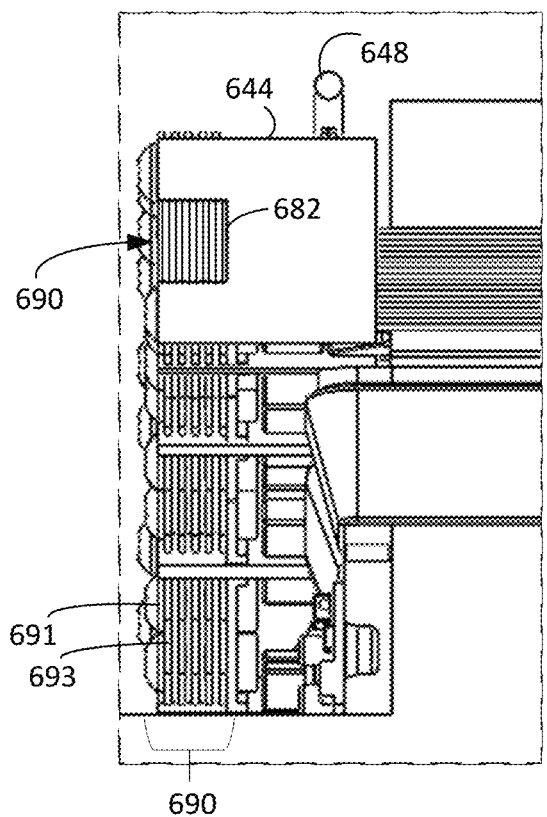
Figure 6A:
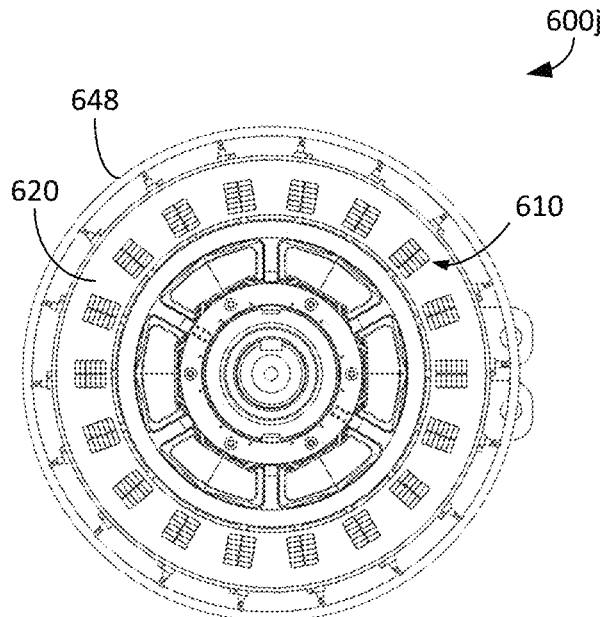
Figure 6A:
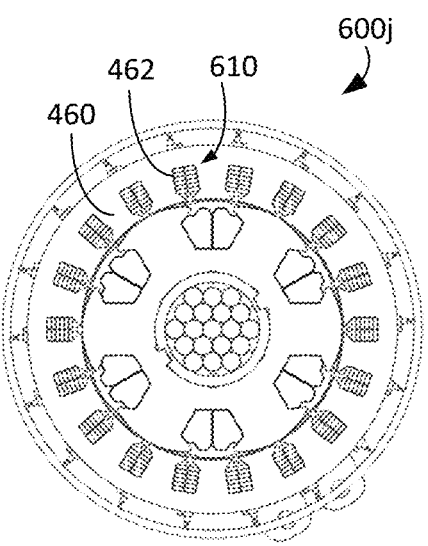
Figure 6A:
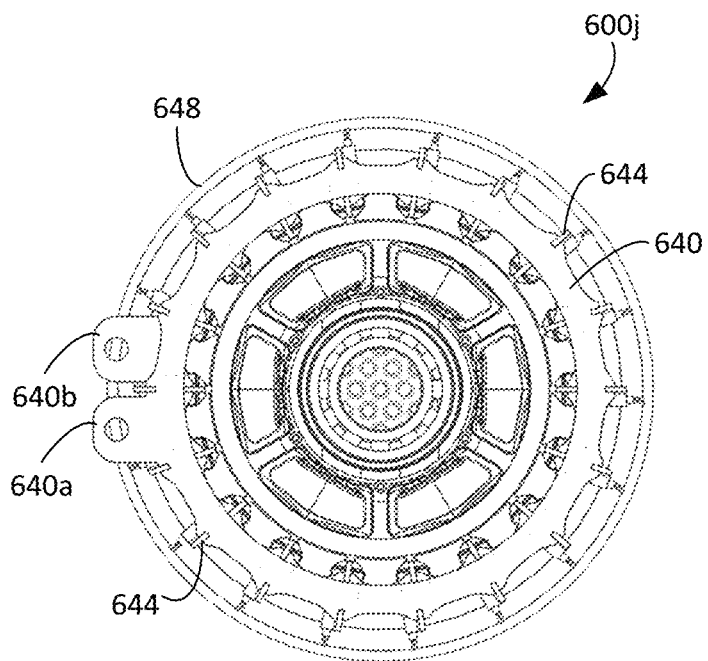
Figure 6A:
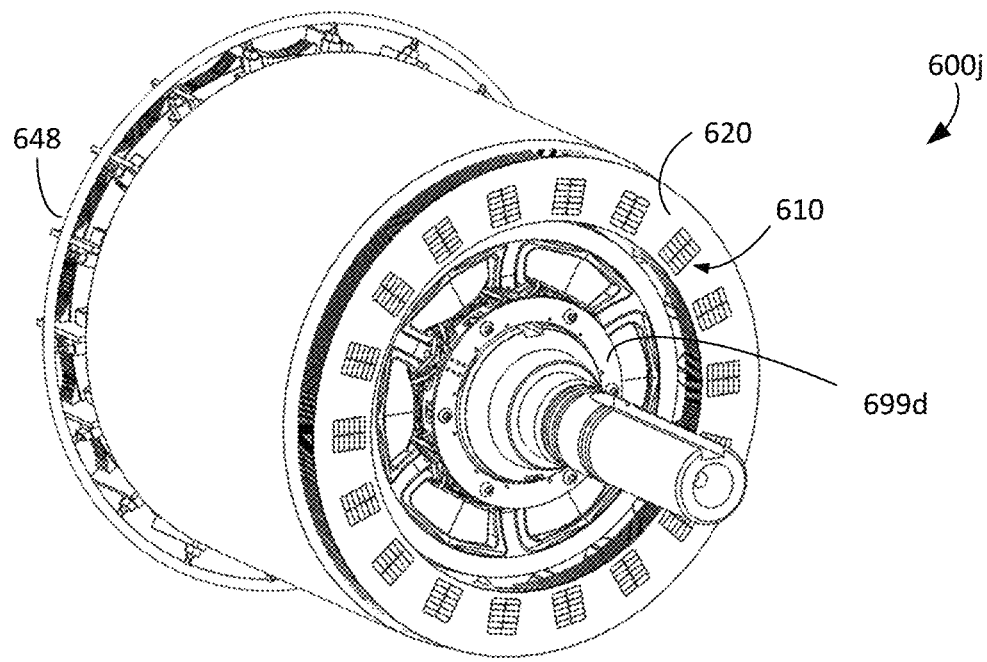
Figure 6A:
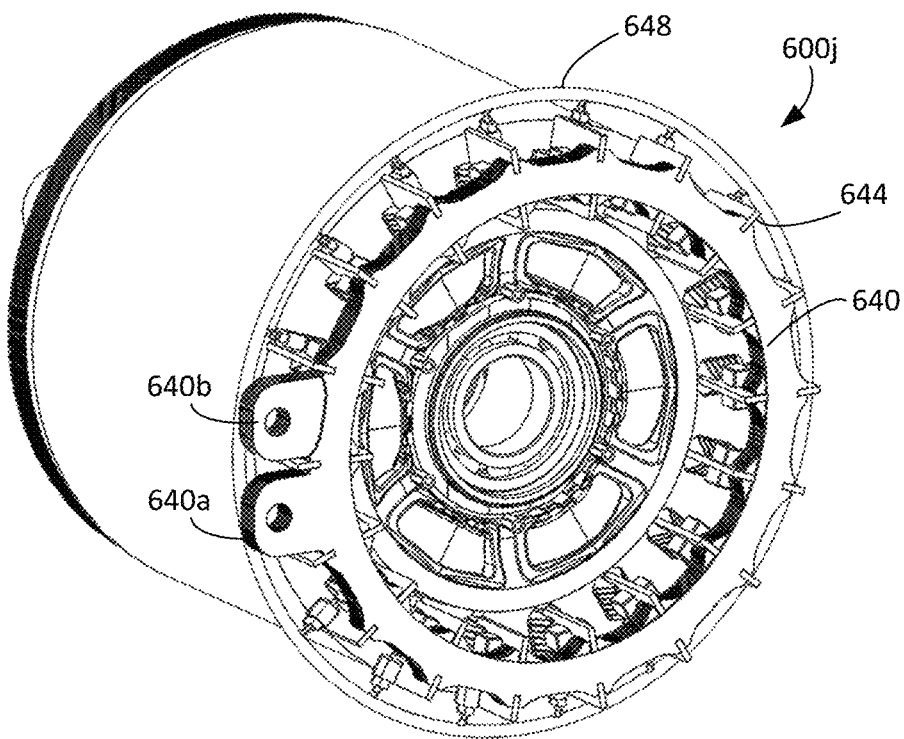
Figure 6A:
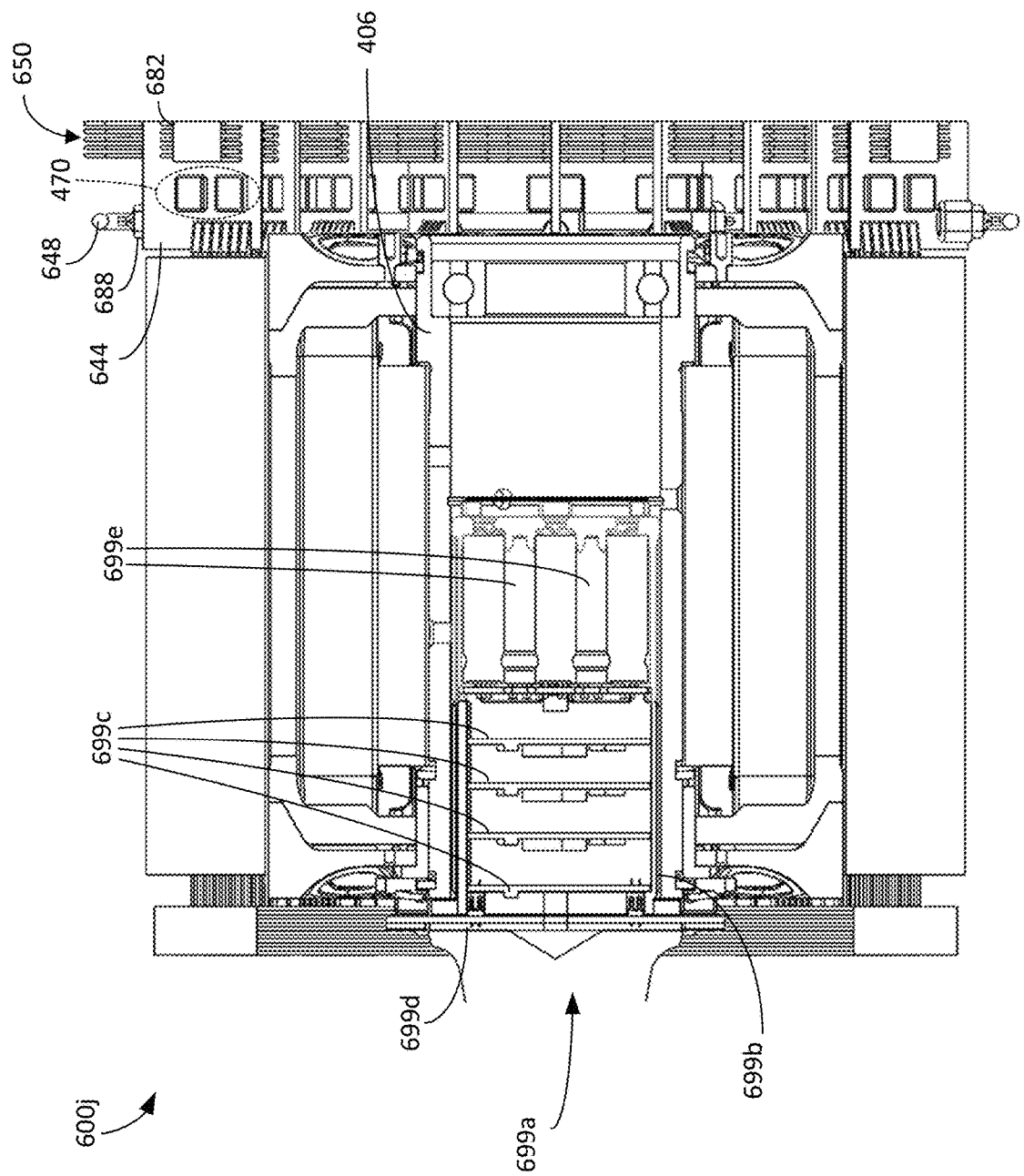
Figure 6A:
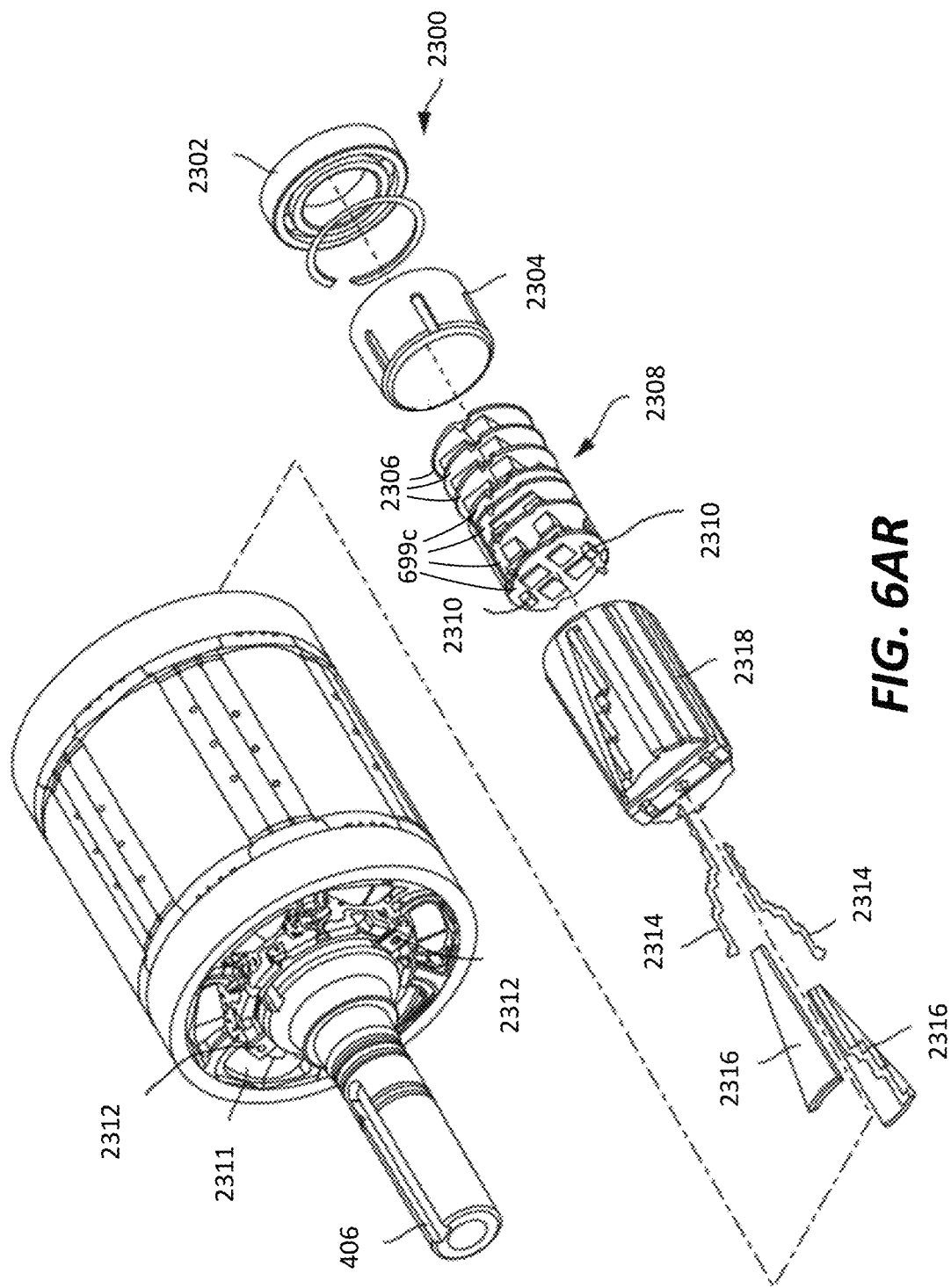

FIG. 6V to 6AC illustrate the motor assembly 600*h*. More particularly, FIG. 6V illustrates a front view of the motor assembly 600*h*, 6W provides an enlarged view of a dashed-box portion of FIG. 6V, FIG. 6X illustrates a rear view of the motor assembly 600*h*, FIG. 6Y illustrates a front cross-sectional view of the motor assembly 600*h*, FIG. 6Z illustrates a front perspective view of the motor assembly 600*h*, FIG. 6AA provides an enlarged view of a dashed-box portion of FIG. 6Z, FIG. 6AB illustrates a side cross-sectional view of the motor assembly 600*h*, and FIG. 6AC provides an enlarged view of a dashed-box portion of FIG. 6AB. In contrast to the motor assembly 400, the motor assembly 600*h* includes twelve stator windings 610 per slot (see FIG. 6Y). Additionally, the motor assembly 600*h* includes four microinverters 470 per slot, two on each of the front and rear sides of the motor assembly 600*h* for each slot. Each microinverter 470 generally includes a high side power switching element and a low side power switching element that are connected, at a mid-point node, to a stator winding 610 (see, e.g., the various circuit diagrams of FIG. 8A-F). With four microinverters 470 for each slot, half of the windings 610 of a slot may be controlled by a first pair of microinverters 470 for the slot (one on each of the front and rear of the motor) and the other half of the windings 610 may be controlled by the remaining (second) pair of microinverters 470 for the slot (again, one on each of the front and rear of the motor). Of course, as with the various motor assemblies 600*a-j* described herein, the particular number of slots, windings within the slots, microinverters per slot varies, and windings per microinverter pair, and the particular quantities for these elements shown in FIGS. 6V-6AC are merely examples for illustrative purposes. Additionally, in contrast to the motor assemblies 400 and 600*a-g* (as illustrated), the motor assembly 600*h* includes (i) a laminated bus bar ring 640 on each of the front side and rear side of the motor (see FIGS. 6V and 6W), (ii) a plurality of transversely positioned printed circuit boards (PCBs) 644 for the microinverters (one per stator slot) on each of the front side and rear side of the motor; and (iii) a communication ring 648 on each of the front side and rear side of the motor.

The laminated bus bar ring 640 includes an interleaved stack of laminated conductors 650. Each laminated conductor 650 includes, for example, a copper sheet or layer (or another conductive sheet or layer) that is laminated or sandwiched between thin layers of electrically insulative material. Thus, the conductive layer of each laminated conductor 650 is electrically insulated from neighboring laminated conductors 650. The laminated conductors 650 carry a DC voltage and are interleaved in that the laminated conductors in the stack alternate shapes and/or voltage polarity. For example, the laminated bus bar ring 640 includes a stack of ten laminated conductors, where the first, third, fifth, seventh, and ninth laminated conductors (the "odd laminated conductors") may carry positive DC voltage, and the second, fourth, sixth, eighth, and tenth laminated conductors (the "even laminated conductors") may carry negative DC voltage (and vice versa). The particular number of laminated conductors 650 is more or fewer than ten in other examples of the laminated bus bar ring.

While each of the laminated conductors 650 illustrated has a generally annular profile, each of the odd laminated conductors has a different shape than the even laminated conductors. In the particular example illustrated, the odd laminated conductors, including the front-facing first laminated conductor most clearly viewable in FIGS. 6V, 6W, 6Z, and 6AA, includes an inner radial boundary that forms a circle and outer radial boundary formed of a series of peaks (or projections) and valleys (or concavities). For example, with reference to FIG. 6W, the first laminated conductor 652 includes inner boundary 654 and outer boundary 656. The outer boundary 656 further includes alternating valleys 658 and peaks 660. The peaks 660 generally line up with the slots 462 of the stator, while the valleys 658 generally line up with the stator teeth 460. The even laminated conductors, partially viewable in FIGS. 6V, 6W, 6Z, and 6AA (because partially blocked by the first laminated conductor 652), includes an outer radial boundary that forms a circle and an inner radial boundary formed of a series of peaks (or projections) and valleys (or concavities). As an example, with reference to FIG. 6W, the second laminated conductors 662 includes an inner boundary 664 and an outer boundary 666. The outer boundaries of the even laminated conductors may be more easily viewed in FIG. 6AA, although the peaks of the odd laminated conductors still partially obscure a portion of the outer boundaries of the even laminated conductors. The inner boundary 664 further includes alternatively valleys 668 and peaks 670. Thus, while the peaks of the odd laminated conductors project radially outward, the peaks of the even laminated conductors project radially inward. In some examples, the laminated conductors 650 have a different shape or form than illustrated in FIGS. 6V-6AC.

Each peak 660 and 670 of the laminated conductors 650 includes a slit or cut-away 680 for receipt of one of the transverse PCBs 644. Additionally, each transverse PCBs 644 includes a slot or cut-away 682 (see FIG. 6AB), creating a gap 684 (see FIG. 6AA), for a main body of the laminated conductors 650 to pass through. In some embodiments, the laminated conductors 650 are soldered to the PCBs 644 to provide the conductive connections therebetween. For example, the laminated conductors may be coupled to the PCBs 644 at each of the peaks of the respective laminated conductors 650, on one or both sides of the slits 680. Thus, the even laminated conductors (with outer radial peaks) may couple to the PCBs 644 at an outer radial portion of the laminated conductors, while the odd laminated conductors (with inner radial peaks) may couple to the PCBs 644 at an inner radial portion of the laminated conductors. Because the alternating nature of the stack of the laminated conductors 650, where the even laminated conductors may carry a positive DC voltage, while the odd laminated conductors may carry a negative DC voltage (or vice-versa), a spacing is provided between opposite polarity connections, which provides an increased capacitance on the DC bus of the laminated conductors 650. This increased capacitance on the DC bus can filter out transient currents and voltages (e.g., current or voltage spikes), which can protect one or both of (i) circuitry on the motor assembly 600h (e.g., components on the PCBs 644 or on the rotor), and (ii) circuitry connected to the motor assembly 600h, such as circuitry connecting the motor assembly 600h to a power source and the power source circuitry itself.

The PCBs 644 are transversely positioned in that their mounting surfaces of these PCBs 644 extend substantially in an axial dimension and radial dimension (i.e., these two dimensions defining a plane of each mounting surface). This positioning contrasts with the annular PCBs of other embodiments that having a mounting surface that faces axially outward (e.g., a line extending normal to the mounting surface is substantially parallel with the rotation axis of the rotor shaft). Each transverse PCB 644 includes two microinverters 470, one on each side (or mounting face) of the transverse PCB 644. Further, each transverse PCB 644 includes connections to the stator windings 610 of the slot 462 adjacent to the particular PCB 644. Such an example of the transverse PCB 644 is more clearly shown in FIG. 6AQ with respect to the motor assembly 600j described further below. By including a plurality of transverse PCBs 644, the motor assembly 600h can provide manufacturing benefits. For example, if one relatively small transverse PCB 644 has a fault or failed component, the one failed transverse PCB 644 may be swapped out with a replacement. In contrast, as an example, if a motor assembly includes one larger, annular PCB with all of the microinverters and one of those microinverters fails, the entire annular PCB may need to be swapped out with a replacement. Similarly, with the transverse PCBs 644, the entire power electronics assembly can be swapped with or without the entire rotor assembly.

As noted above, the motor assembly 600h also includes the separate communication ring 648. This communication ring 648 enables communication between and among the transverse PCBs 644 and their microinverters 470, as well as external control circuitry (e.g., the motor controller 110) that may not be positioned on the stator of the motor assembly 600h. Each PCB 644 may include a communication ring connector 688 (see, e.g., FIGS. 6W, 6Z, and 6AA) that connects the particular PCB 644 to the communication ring 648 to enable the noted communication.

The motor assembly 600h, as illustrated, is a particular example of a motor assembly including a laminated conductor ring with transverse PCBs. However, in other examples, the motor assembly 600h includes more or fewer microinverters 470 per slot, more or fewer windings 610 per slot, more or fewer stator slots and teeth, and/or more or fewer rotor slots and teeth. For example, in some embodiments of the motor assembly 600h, the rear of the motor assembly 600h does not include microinverters 470 and, instead, includes a neutral node connecting the various stator windings, similar to the neutral node 620 of the motor assembly 600d of FIGS. 6J-6L and as described below with respect to FIGS. 6AL-6AQ.

FIG. 6AD to 6AK illustrate the motor assembly 600i. More particularly, FIG. 6AD illustrates a front view of the motor assembly 600i, 6AE provides an enlarged view of a dashed-box portion of FIG. 6AD, FIG. 6AF illustrates a rear view of the motor assembly 600i, FIG. 6AG illustrates a front cross-sectional view of the motor assembly 600i, FIG. 6AH illustrates a front perspective view of the motor assembly 600i, FIG. 6AI provides an enlarged view of a dashed-box portion of FIG. 6AH, FIG. 6AJ illustrates a side cross-sectional view of the motor assembly 600*i*, and FIG. 6AK provides an enlarged view of a dashed-box portion of FIG. 6AJ. The motor assembly 600*i* is generally similar to the motor assembly 600*h*, except for the arrangement of the laminated bus bar ring. For example, the motor assembly 600*i* similarly includes twelve stator windings 610 per slot and four microinverters 470 per slot, with two microinverters 470 on each of the front and rear sides of the motor assembly 600*h* for each slot. Of course, as with the various motor assemblies 600*a-j* described herein, the particular number of slots, windings within the slots, microinverters per slot varies, and windings per microinverter pair, and the particular quantities for these elements shown in FIGS. 6AD-6AK are merely examples for illustrative purposes. Additionally, the motor assembly 600*i* includes (i) a laminated bus bar ring 689 on each of the front side and rear side of the motor (see FIGS. 6AD and 6AE), (ii) a plurality of transversely positioned printed circuit boards (PCBs) 644 for the microinverters (one per stator slot) on each of the front side and rear side of the motor; and (iii) a communication ring 648 on each of the front side and rear side of the motor.

The laminated bus bar ring 689 of the motor assembly 600*i* is similar to the laminated bus bar ring 640 of the motor assembly 600*h* in that it also includes an interleaved stack of laminated conductors 690. Like the laminated conductors 650, each laminated conductor 690 includes, for example, a copper sheet or layer (or another conductive sheet or layer) that is laminated or sandwiched between thin layers of electrically insulative material; each laminated conductor 690 carries a DC voltage; and the laminated conductors 690 are interleaved in the stack with alternating shapes and/or voltage polarities. For example, the laminated bus bar ring 689 includes a stack of ten laminated conductors, where the first, third, fifth, seventh, and ninth laminated conductors (the "odd laminated conductors") may carry positive DC voltage, and the second, fourth, sixth, eighth, and tenth laminated conductors (the "even laminated conductors") may carry negative DC voltage (and vice versa). The particular number of laminated conductors 690 is more or fewer than ten in other examples of the laminated bus bar ring.

In contrast to the laminated bus bar ring 640 (e.g., of FIG. 6V), the laminated bus bar ring 689 and its laminated conductors 690 (e.g., of FIG. 6AD) include a different shape and are connected to the PCBs 644 differently than on the motor assembly 600*h*. Each of the laminated conductors 690 illustrated has a generally annular profile; however, each of the odd laminated conductors has a different shape than the even laminated conductors. In the particular example illustrated, the odd laminated conductors, including the front-facing first laminated conductor most clearly viewable in FIGS. 6AD, 6AE, 6AH, and 6AI, includes an inner radial boundary that forms a circle and outer radial boundary formed of a series of peaks (or projections) and valleys (or concavities). For example, with reference to FIG. 6W, the first laminated conductor 691 includes inner boundary and outer boundary. The outer boundary further includes alternating valleys 692 and peaks 693. As shown in FIG. 6AE, the peaks 693 have a width greater than their height (in the radial direction) and greater than a width of the valleys 692, although, in other examples, these width-to-height relationships are different than illustrated. Additionally, the valleys 692 generally line up with the slots 462 of the stator, while the peaks 693 generally line up with the stator teeth 460, which is in contrast to the laminated conductors 650 of the motor assembly 600*h*. The even laminated conductors, partially viewable in FIGS. 6AD, 6AE, 6AH, and 6AI (because partially blocked by the first laminated conductor 691), include an outer radial boundary that forms a circle and an inner radial boundary formed of a series of peaks (or projections) and valleys (or concavities). As an example, with reference to FIG. 6AE, the second laminated conductors 694 includes an inner boundary and an outer boundary. The outer boundaries of the even laminated conductors may be more easily viewed in FIG. 6AI, although the peaks of the odd laminated conductors still partially obscure a portion of the outer boundaries of the even laminated conductors. The inner boundary further includes alternatively valleys 695 and peaks 696. The peaks 696 have a width greater than their height (in the radial direction) and greater than a width of the valleys 695. Thus, while the peaks 693 of the odd laminated conductors project radially outward, the peaks 696 of the even laminated conductors project radially inward. Additionally, the valleys 695 generally line up with the slots 462 of the stator, while the peaks 696 generally line up with the stator teeth 460.

Each transverse PCBs 644 includes a slot or cut-away 682 (see FIG. 6AK), creating a gap 684 (see FIG. 6AI), for a main body of the laminated conductors 690 to pass through. The laminated conductors 690 are connected to the PCBs 644 via bolts 697 and L-shaped conductive plates 698. The bolts 697 may be conductive themselves or may include a conductive sleeve around each bolt to provide the conductive connection between the laminated conductors 690 (e.g., via engaging with conductive holes or faces of the laminations with washers or shorting laminations) and the respective L-shaped conductive plates 698. More particularly, each peak 693 and 696 includes two through-holes through which respective bolts 697 pass. Each bolt 697 further passes through a through-hole of a respective one of the plates 698, which is further mounted to a respective one of the PCBs 644. Thus, each side of each PCB 644 has a connection to both the stack of odd laminated conductors and the stack of even laminated conductors. Because the alternating nature of the stack of the laminated conductors 690, where the even laminated conductors may carry a positive DC voltage, while the odd laminated conductors may carry a negative DC voltage (or vice-versa), a spacing is provided between opposite polarity connections, which provides an increased capacitance on the DC bus of the laminated conductors 690. This increased capacitance on the DC bus can filter out transient currents and voltages (e.g., current or voltage spikes), which can protect one or both of (i) circuitry on the motor assembly 600*i* (e.g., components on the PCBs 644 or on the rotor), and (ii) circuitry connected to the motor assembly 600*i*, such as circuitry connecting the motor assembly 600*i* to a power source and the power source circuitry itself.

The motor assembly 600*i*, as illustrated, is a particular example of a motor assembly including a laminated conductor ring with transverse PCBs. However, in other examples, the motor assembly 600*i* includes more or fewer microinverters 470 per slot, more or fewer windings 610 per slot, more or fewer stator slots and teeth, and/or more or fewer rotor slots and teeth. For example, in some embodiments of the motor assembly 600*i*, the rear of the motor assembly 600*i* does not include microinverters 470 and, instead, includes a neutral node connecting the various stator windings, similar to the neutral node 620 of the motor assembly 600*d* of FIGS. 6J-6L and as described below with respect to FIGS. 6AL-6AQ.

FIGS. 6AL to 6AR illustrate the motor assembly 600*j*. More particularly, FIG. 6AL illustrates a front view of the motor assembly 600*j*, FIG. 6AM illustrates a rear view of the motor assembly 600j, FIG. 6AN illustrates a front cross-sectional view of the motor assembly 600j, FIG. 6AO illustrates a front perspective view of the motor assembly 600j, FIG. 6AP illustrates a rear perspective view of the motor assembly 600j, and FIG. 6AQ illustrates a side cross-sectional view of the motor assembly 600j. The motor assembly 600j is generally similar to the motor assembly 600h, except for (i) the front side of the motor assembly 600j including a neutral node 620 in place of the front-side laminated bus bar ring, front-side PCBs, and front-side communication ring, and (ii) the positioning of the rotor microinverter circuitry within the rotor shaft. Accordingly, the motor assembly 600j includes twelve stator windings 610 per slot, but only two microinverters 470 per slot, with both microinverters 470 on the rear side of the motor assembly 600h for each slot. Of course, as with the various motor assemblies 600a-j described herein, the particular number of slots, windings within the slots, microinverters per slot varies, and windings per microinverter pair, and the particular quantities for these elements shown in FIGS. 6AL-6AQ are merely examples for illustrative purposes. Additionally, the motor assembly 600j includes (i) the laminated bus bar ring 640 on the rear side of the motor (see FIGS. 6AM and 6AP), (ii) a plurality of transversely positioned printed circuit boards (PCBs) 644 for the microinverters (one per stator slot) on the rear side of the motor; and (iii) a communication ring 648 on the rear side of the motor.

On the rear side, the laminated bus bar ring 640 and traverse PCBs 644 of the motor assembly 600j are similar to the laminated bus bar ring 640 and traverse PCBs 644 of the motor assembly 600h, except for the illustration of terminals 640a and 640b that provide connection points for the odd and even laminated conductors, respectively, to a power supply circuit (e.g., the DC power supply 105). On the front side of the motor assembly 600j, the neutral node 620 is provided, which is similar to the neutral node 620 of FIGS. 6J-6L. That is, the neutral node 620 of the motor assembly 600j is connected to each of the stator windings 610 of the motor assembly 600j on the front side of the motor assembly 600j. The neutral node 620 in the motor assembly 600j may include an annular conductive bus bar with connection points for the stator windings 610 at each of the slots 462 of the stator.

As noted above, in the motor assembly 600j, the rotor microinverter circuitry is positioned within the rotor shaft. For example, as illustrated in FIG. 6AQ the motor assembly 600j includes a rotor cartridge assembly 699a including a rotor cartridge or housing 699b, which may be generally cylindrical and fit within the rotor shaft 406 for rotation therewith. In other words, the rotor shaft 406 includes an outer circumferential portion defining a cavity therein, which receives the rotor cartridge 699b. The rotor shaft 406 interfaces with bearings and/or bushings of the motor that enable rotation of the rotor within the motor assembly 600j. The rotor cartridge 699b may include multiple axially-spaced-apart PCBs 699c, with each PCB 699c including a portion of the rotor microinverter circuitry (e.g., the rotor microinverters 430 may be distributed among these PCBs 699c). In some examples, the PCBs 699c may be arranged transversely, rather than stacked in an axially-spaced manner as illustrated. In either case, this arrangement contrasts with the rotor microinverters 430 being positioned on an annular PCB, such as PCB 434 shown in FIG. 4A-4B. However, the motor assembly 600j may still include an annular rotor PCB 699d to provide a connection point for the rotor windings 420 to connect to the rotor cartridge assembly 699a. The annular rotor PCB 699d is then further connected to the PCBs 699c and the microinverters 430 thereon. The rotor cartridge 699b may further house components 699e, which may be energy storage devices such as capacitors, super capacitors, inductors, batteries, or combinations thereof. In some examples, such energy storage devices are not included in the rotor cartridge 699b or for the rotor circuit generally. The rotor cartridge assembly 699a may further include high voltage bus bars on an outer portion of the rotor cartridge 699b, to which each of the PCBs 699c connects via tangs or pins that extend through the cartridge housing. The PCBs 699c may further be connected by low voltage power rails to provide supply power to controller(s) and/or other low voltage circuitry on the PCBs 699c. Such high voltage bus bars are more clearly shown in FIG. 6AR.

FIG. 6AR provides an exploded view of another embodiment of a rotor cartridge assembly 2300 that may be used in place of the rotor cartridge assembly 699e (e.g., in the motor assembly 600j). The rotor cartridge assembly 2300 is similar to the rotor cartridge assembly 699a, except for the inclusion of additional PCBs 699c. The rotor cartridge assembly 2300 includes a bearing 2302, a main body including a cap 2304 and cartridge housing 2318, capacitor boards 2306 and PCBs 699c forming a printed circuit board stack 2308 including the circuit elements (e.g., analog circuit elements, digital circuit elements, passive circuit elements, active circuit elements, and/or integrated circuits) of a rotor microinverter network (e.g., network 310).

The PCB stack 2308 is conductively connected to rotor windings 2311 by interconnects 2310 at the PCB stack 2308, e.g., conductors passed through a passage in the shaft to access the rotor windings. In some embodiments, the rotor windings 2311 may be linked at a PCB or interconnect 2312 located outside the shaft 406, which then interfaces to the PCB stack 2308 (and the components thereon) through the interconnect at 2310. Within the PCB stack 2308, low voltage connectors are present, alongside high voltage bus bar interconnects 2314. The bus bars 2314 may be covered and retained by respective insulative plates 2316, which may be retained in position by adhesive, ultrasonic welding, or mechanical retention by a cartridge component housing 2318. Alternatively, in certain embodiments, bus bar interconnects may be located inside the housing 2318 along with the PCB stack 2308. The various circuit boards 699c of the PCB stack 2308 may be connected to each other through connectors, contacts, harnesses, soldering, or the like.

By positioning the rotor microinverter circuitry within the rotor shaft, as illustrated in FIGS. 6AQ and 6AR, a more axially compact rotor (and motor) may be provided.

The motor assembly 600j, as illustrated, is a particular example of a motor assembly including a laminated conductor ring with transverse PCBs. However, in other examples, the motor assembly 600j includes more or fewer microinverters 470 per slot, more or fewer windings 610 per slot, more or fewer stator slots and teeth, and/or more or fewer rotor slots and teeth.

Additionally, although the rotor cartridge assembly is described with respect to the particular embodiment of the motor assembly 600j of FIGS. 6AL-6AQ the rotor cartridge assembly may also be implemented in the other embodiments of motor assemblies and rotors described herein. That is, in the various other embodiments of motor assemblies and rotors described herein, the rotor microinverters may be positioned within a rotor cartridge assembly integrated into the rotor shaft, rather than positioned on an annular rotor PCB on one or both sides of the rotor, or another location of the rotor assembly (e.g., as shown in FIGS. 4A-B and some of the embodiments of FIGS. 6A-6AK).

The various motor assemblies 400 and 600a-j are merely a nonexhaustive set of examples of motor assemblies that include at least one microinverter network 175 and may be implemented in the system 100 of FIG. 1. In other embodiments of the system 100 of FIG. 1, other variations of these motor assemblies are used. For example, the various features described with respect to the motor assemblies 400 and 600a-j may be interchanged to result in new combinations of features of a motor assembly that may be used as the motor assembly 190 in the system 100 of FIG. 1. For example, each of the motor assemblies 400 and 600a-j may use laminated bus bar rings (see FIG. 5) or interleaved bus bar rings, rather than the solid bus bar ring as illustrated. Further, the number of stator teeth and rotor teeth (and corresponding numbers of slots) of each of the motor assemblies 400 and 600a-j was selected as an example, and other embodiments of these motor assemblies include more or fewer teeth (e.g., 4, 6, 12, or 24 stator teeth in combination with 2, 4, 6, or 12 rotor teeth, or other quantities). Additionally, the number of conductors in each slot may vary in each of these embodiments. For example, each of the motor assemblies 400 and 600a-j may have one, two, or four conductors in each slot, or another number of conductors in each slot, with the number of microinverters being adjusted to correspond to the number of conductors. Additionally, in each example motor assembly 400 and 600a-j, both the rotor assembly and stator assembly may include microinverters (see, e.g., FIGS. 2A and 3A-1), the stator assembly may be constructed without microinverters (see FIG. 2B) while the rotor assembly includes microinverters (see FIG. 3A-1), or the rotor assembly may be constructed without microinverters (see FIG. 3B) while the stator assembly includes microinverters (see FIG. 2A).

In still further embodiments, the motor assembly 190 includes a reconfigurable motor 120 that does not include a microinverter 175; rather, for example, the motor assembly 190 includes the stator assembly 180 driven by a stator drive circuit 225 and the rotor assembly 185 driven by the rotor drive circuit 321 or 325. Accordingly, in these embodiments, the configuration of the stator assembly 180 may be static, but the configuration of the rotor assembly 185 is reconfigurable (e.g., the rotor assembly 185 may be controlled to have different pole configurations, as described herein).

Figure 7A:
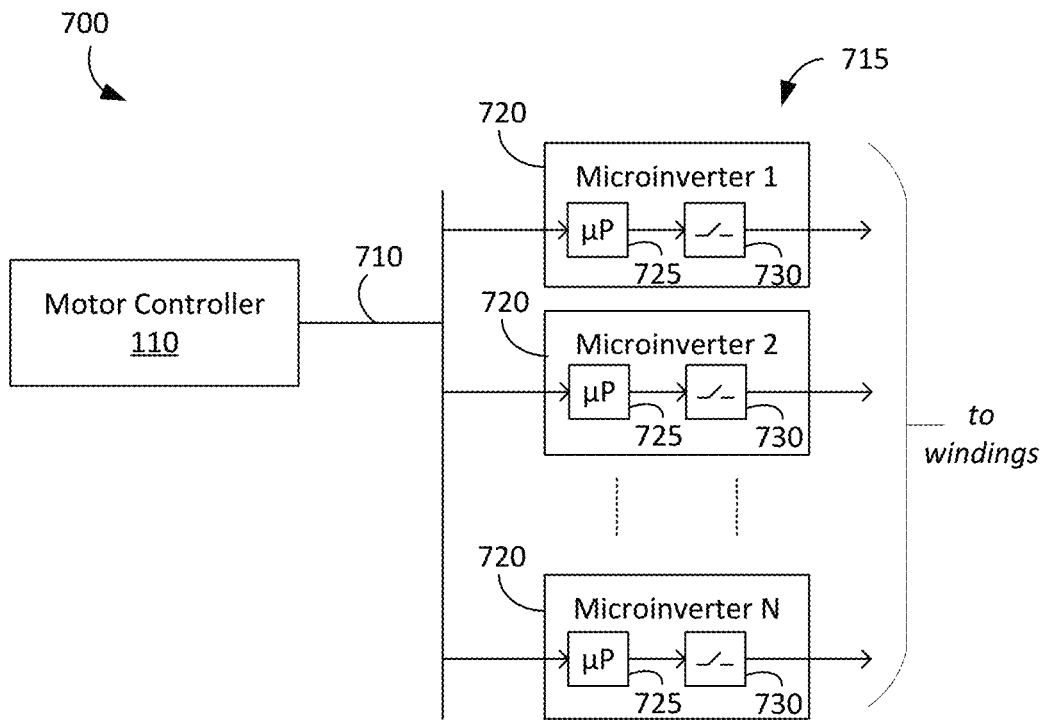
FIGS. 7A-7B illustrate diagrams of microinverter network configurations in accordance with some embodiments.
Figure 7B:
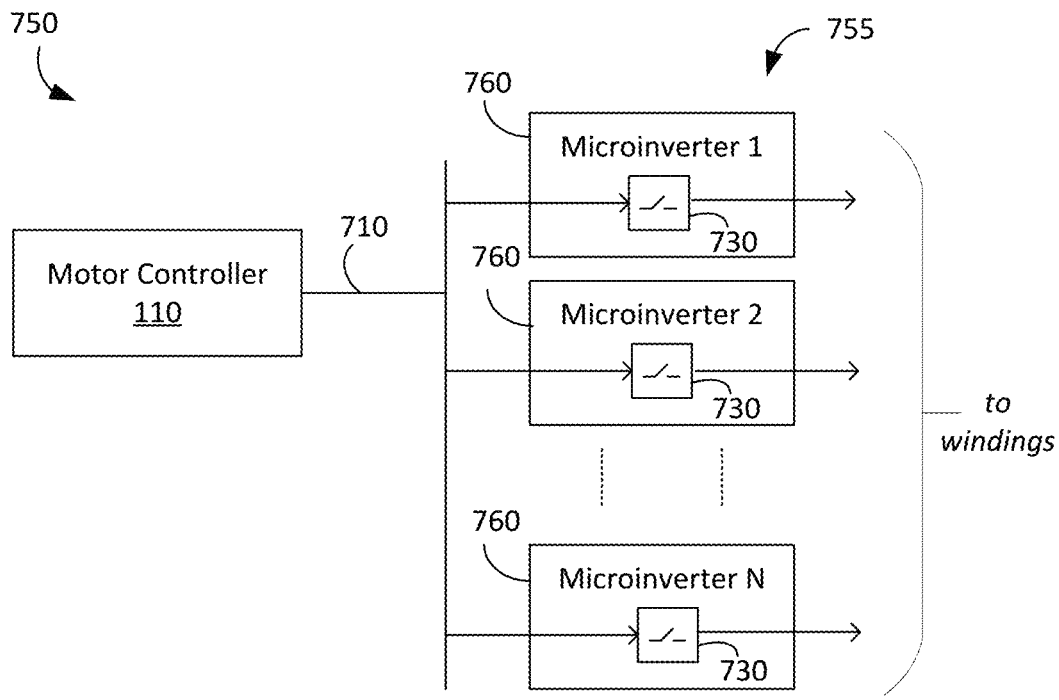

FIGS. 7A-B illustrate alternate microinverter network configurations 700 and 705. The microinverter network configuration 700 includes the motor controller 110 connected by a communication bus 710 to a microinverters network 715 having N microinverters 720. The microinverter network 715 is an example of the microinverter network 175 of FIG. 1. Further, the microinverter network 715 may be an example of the stator microinverter network 210 of FIG. 2A or of the rotor microinverter network 310 of FIG. 3A-1. The communication bus 710 may be a multiplexed communication bus or may include individual connections (e.g., wires and/or traces) to each microinverter 720.

Each of the microinverters 720 includes an electronic controller 725 (also referred to as a microinverter electronic controller), and power switching elements 730 (also referred to as microinverter power switching elements). The electronic controller 725, like the motor controller 110, includes an electronic processor and memory to perform the functionality of the electronic controller 725. The electronic controller 725 is configured to receive a command from the motor controller 110 and to generate control signals for the power switching elements 730 to drive the windings of the stator or rotor to which the microinverters 720 are coupled.

To simplify the diagrams of FIG. 7A, the power line connections to the microinverters 720 (e.g., connections to the DC bus bar rings 205 or rotor power circuit 305) are not illustrated.

Turning to FIG. 7B, the microinverter network configuration 750 includes the motor controller 110 connected by the communication bus 710 to a microinverters network 755 having N microinverters 760. The microinverter network 755 is an example of the microinverter network 175 of FIG. 1. Further, the microinverter network 755 may be an example of the stator microinverter network 210 of FIG. 2A or of the rotor microinverter network 310 of FIG. 3A-1. The communication bus 710 may be a multiplexed communication bus or may include individual connections (e.g., wires and/or traces) to each microinverter 760.

Each of the microinverters 760 includes the power switching elements 730 (also referred to as microinverter power switching elements). In contrast to the microinverters 720, the microinverters 760 do not include an electronic controller. Rather, the processing performed by the electronic controller 725 in the microinverters 720 is incorporated into the motor controller 110. Accordingly, the motor controller 110 sends controls signals that control the power switching elements 730, rather than a command that is interpreted by a microinverter controller that then generates control signals for the power switching elements 730. The control signals from the motor controller 110 control the power switching elements 730 to drive the windings of the stator or rotor to which the microinverters 720 are coupled. To simplify the diagrams of FIG. 7B, the power line connections to the microinverters 760 (e.g., connections to the DC bus bar rings 205 or rotor power circuit 305) are not illustrated.

Figure 7C:
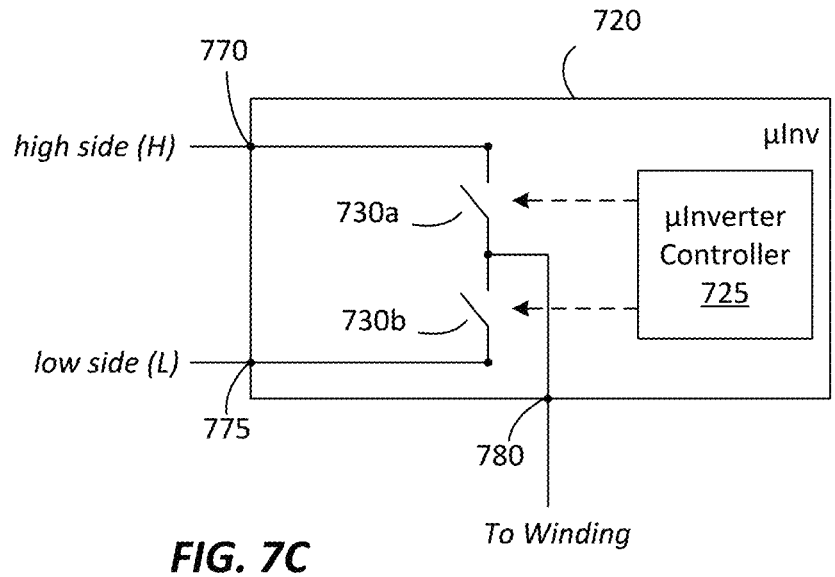
FIGS. 7C-7D illustrate diagrams of microinverters in accordance with some embodiments.
Figure 7D:
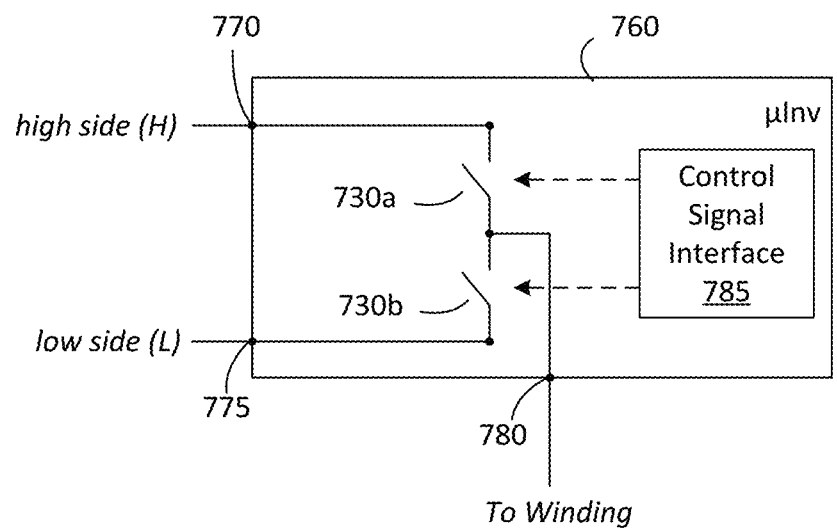

FIGS. 7C-D illustrate examples of the microinverters 720 and 760, respectively, in further detail. In FIG. 7C, the microinverter 720 includes two power switching elements 730, labeled 730a and 730b, coupled between a high side terminal 770 and a low side terminal 775 of the microinverter 720. A midpoint between the power switching elements 730a and 730b is coupled to a winding terminal of the microinverter 720. The controller 725 is configured to receive commands from the motor controller 110 and generate control signals for the power switching elements 730a and 730b.

In FIG. 7D, the microinverter 760 is configured similarly to the microinverter 720, except that the microinverter controller 725 is replaced with a control signal interface 785. The control signal interface is configured to receive control signals from the motor controller 110 and to provide the control signals to the power switching elements 730a and 730b.

FIGS. 8A-I illustrate example circuit diagrams for stator microinverters (e.g., stator microinverters 470) that may be used to implement the stator microinverter networks described herein (e.g., the networks 210, 472, 715, or 755). More particularly, the circuit diagrams of FIGS. 8A-I, which may be referred to as stator microinverter network circuits, illustrate example arrangements of power switching elements of the stator microinverters in relation to power supply lines (e.g., DC bus bar rings 205) and stator windings (e.g., stator windings 215, 464, 605, 610, or 630) for one slot of a motor assembly 190 of FIG. 1.

Figure 8A:
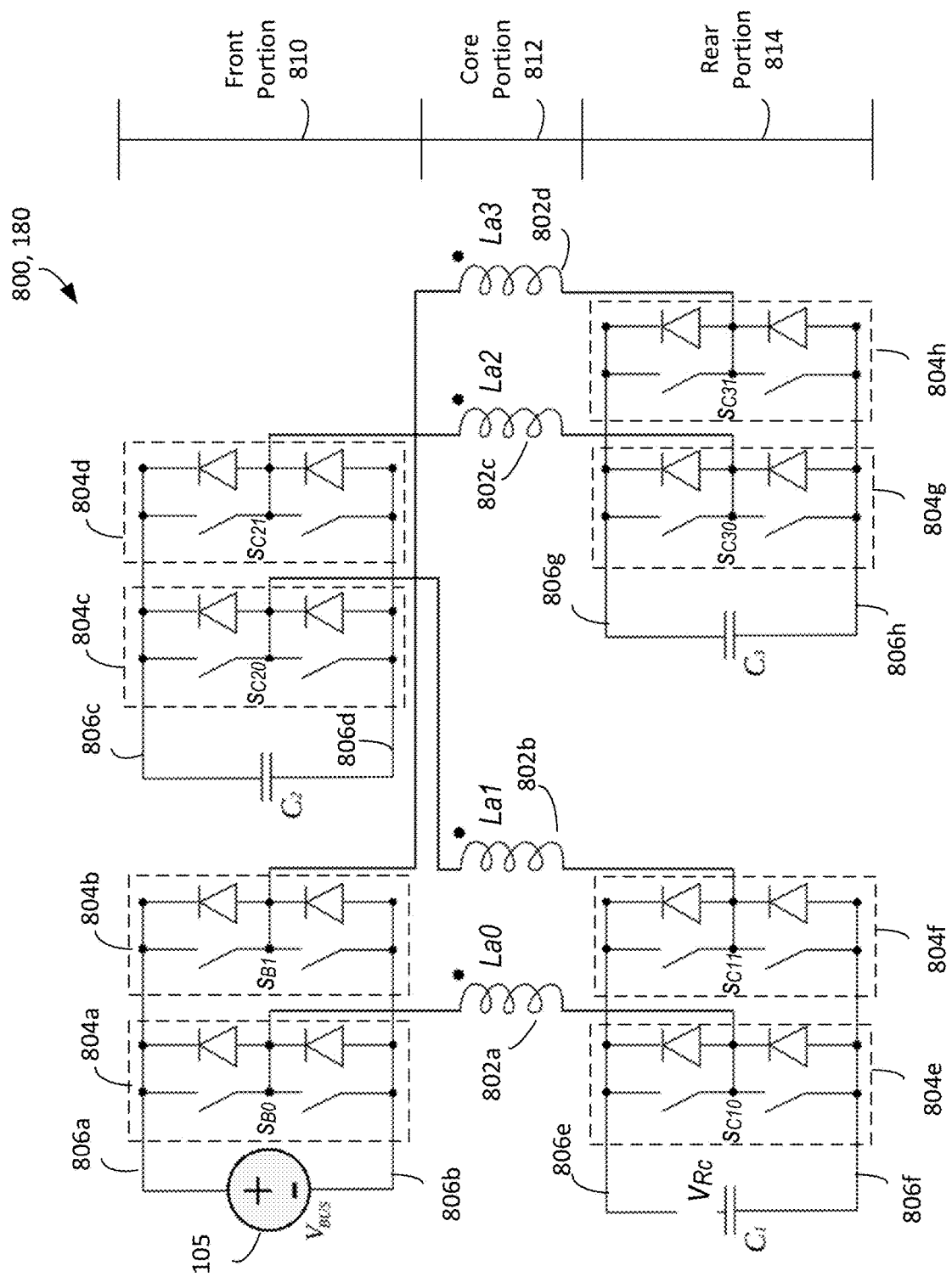
FIGS. 8A-8I illustrate diagrams of microinverter network circuits in accordance with some embodiments.

FIG. 8A illustrates a first stator microinverter network circuit 800 representing an example of the motor assembly 190 having a stator assembly 180 with four stator windings per slot 802a-d, eight microinverters 804a-h per slot (two per stator winding, each on opposite axial sides of the motor assembly), and eight bus bar rings 806a-h (four per axial side of the motor assembly). The circuit 800 represents a portion of the overall microinverter network 175 and stator windings of the stator assembly 180. The circuit 800 may be replicated for each slot of the stator assembly 180, with the bus bar rings 806a-h being shared among the multiple instances of the circuit 800. Accordingly, if the stator assembly 180 includes thirty-six slots, the motor assembly 190 may include thirty-six instances of the circuit 800 (with the bus bar rings 806a-h being shared among the circuits). As one example, the first circuit 800 could apply to a motor assembly that is similar to the motor assembly 600e, but that has double the amount of bus rings and inverters on the front and rear side of the motor assembly, and double the amount of stator windings in each slot.

In FIG. 8A, the circuit 800 is divided into three portions: a front portion 810 representing a front side or face of the stator assembly 180; a core portion 812 representing a middle or core of the stator assembly 180; and a rear portion 814 representing a rear side or face of the stator assembly 180. Like the motor assembly 400, the stator assembly 180 may include a front printed circuit board on a front side (e.g., on a stator end cap) on which the circuit elements of the front portion 810 are mounted; a stator core comprised of stator lamination stack defining stator teeth with slots therebetween; and a rear printed circuit board on a rear side (e.g., on a rear stator end cap) on which the circuit elements of the rear portion 814 are mounted. The DC power supply 105 is shown as being in the front portion 810; however, in some examples, the DC power supply 105 in the diagram of FIG. 8A represents terminals that are connected to the DC power supply 105 that is positioned elsewhere and separate from the motor assembly itself.

In the circuit 800, the DC power supply 105 is connected across bus bar rings 806a-b, as are the microinverters 804a-b. The microinverters 804c-d are connected across bus bar rings 806c-d; the microinverters 804e-f are connected across bus bar rings 806e-f; and the microinverters 804g-h are connected across bus bar rings 806g-h. Additionally, a capacitor C1 is coupled across bus bar rings 806e-f, a capacitor C2 is coupled across bus bar rings 806c-d, and a capacitor C3 is coupled across bus bar rings 806g-h. Each of the microinverters 804a-h is similar to one of the microinverters 720 or 740 of FIGS. 7A-B and includes two power switching elements connected between high side and low side terminals, and a winding terminal coupled to a midpoint between the two power switching elements. Additionally, the microinverters 804a-h each include diodes connected across the midpoint and the high side terminal and across the midpoint and the low side terminal. Similar diodes may be included in the microinverters 720 and 740, but are not illustrated to simplify FIGS. 7A-B.

The microinverters 804a-h may be grouped into microinverter pairs, with each pair having a microinverter on opposite sides of the motor and a stator winding connected therebetween. For example, the microinverters 804a and 804e are a microinverter pair having the stator winding 802a connected to the winding terminals of each of the microinverters 804a and 804e; the microinverters 804b and 804h are a microinverter pair having the stator winding 802d connected to the winding terminals of each of the microinverters 804b and 804h; the microinverters 804c and 804f are a microinverter pair having the stator winding 802b connected to the winding terminals of each of the microinverters 804c and 804f; and the microinverters 804d and 804g are a microinverter pair having the stator winding 802c connected to the winding terminals of each of the microinverters 804d and 804g.

The circuit 800 forms a multi-level inverter topology enabling the selective driving of the four windings 802a-d within a slot of the stator assembly 180 to one of a plurality of voltage levels. For example, the power switching elements within the microinverters 804a-h may be selectively enabled and disabled to obtain different voltage levels across the windings 802a-d within a slot and, thus, to obtain different current levels through the slot. The windings 802a-d within the slot may be forced by the physics of the topology to have the same voltage, after imbalance that temporarily occurs during microinverter switch transitions subsides. Generally, each additional level in a multi-level inverter topology allows more precise voltage level control in the additional fractions of bus voltage can be applied to the load (i.e., stator winding(s)).

Figure 8B:
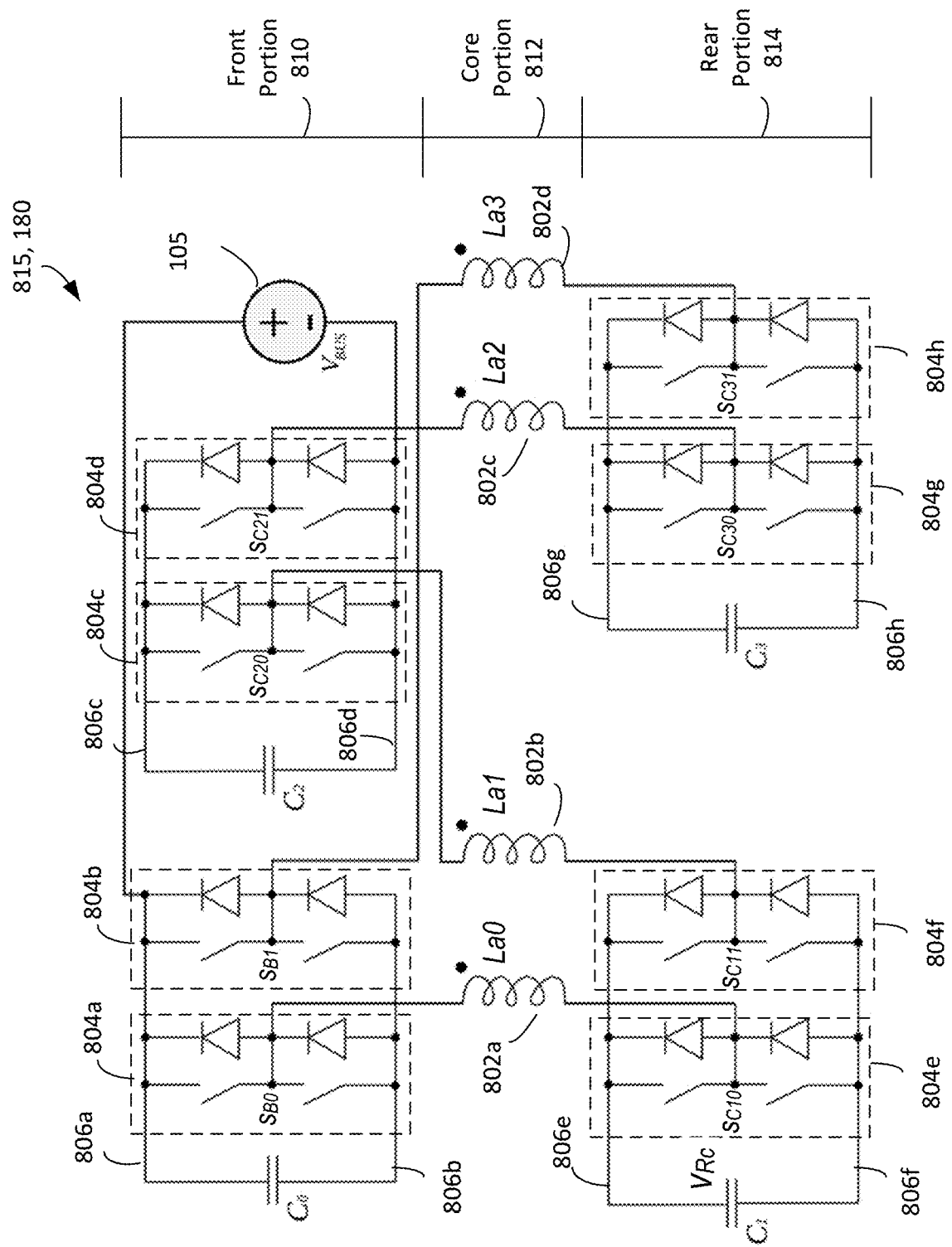

FIG. 8B illustrates a second stator microinverter network circuit 815 that may be used with the stator assembly 180. The circuit 815 has similar components as the circuit 800 and, accordingly, like numbers are used to identify like components. Further, the description of the circuit 800 generally applies to the circuit 815, except for the differences between the circuits 800 and 815 described herein or inherent. In contrast to the circuit 800, in the circuit 815, the DC power supply 105 is coupled across DC bus ring 806a and 806d, and an additional capacitor $C_0$ is provided across DC bus rings 806a and 806b.

The circuits 800 and 815 apply to examples of the motor assembly 190 including four stator windings per slot in the stator assembly 180. However, in some examples, such as shown in the motor assemblies 400 and 600a-j, the motor assembly 190 includes a different number of stator windings per slot. The circuits 800 and 815 may be modified to account for varying numbers of stator windings per slot by, for example, adding another microinverter pair for each additional stator winding through the slot, and removing a microinverter pair for each stator winding removed from the slot. For example, for a motor assembly including two stator windings per slot, the circuit 800 may be modified by removing the right half of the circuit 800, as detailed further in FIG. 8C.

Figure 8C:
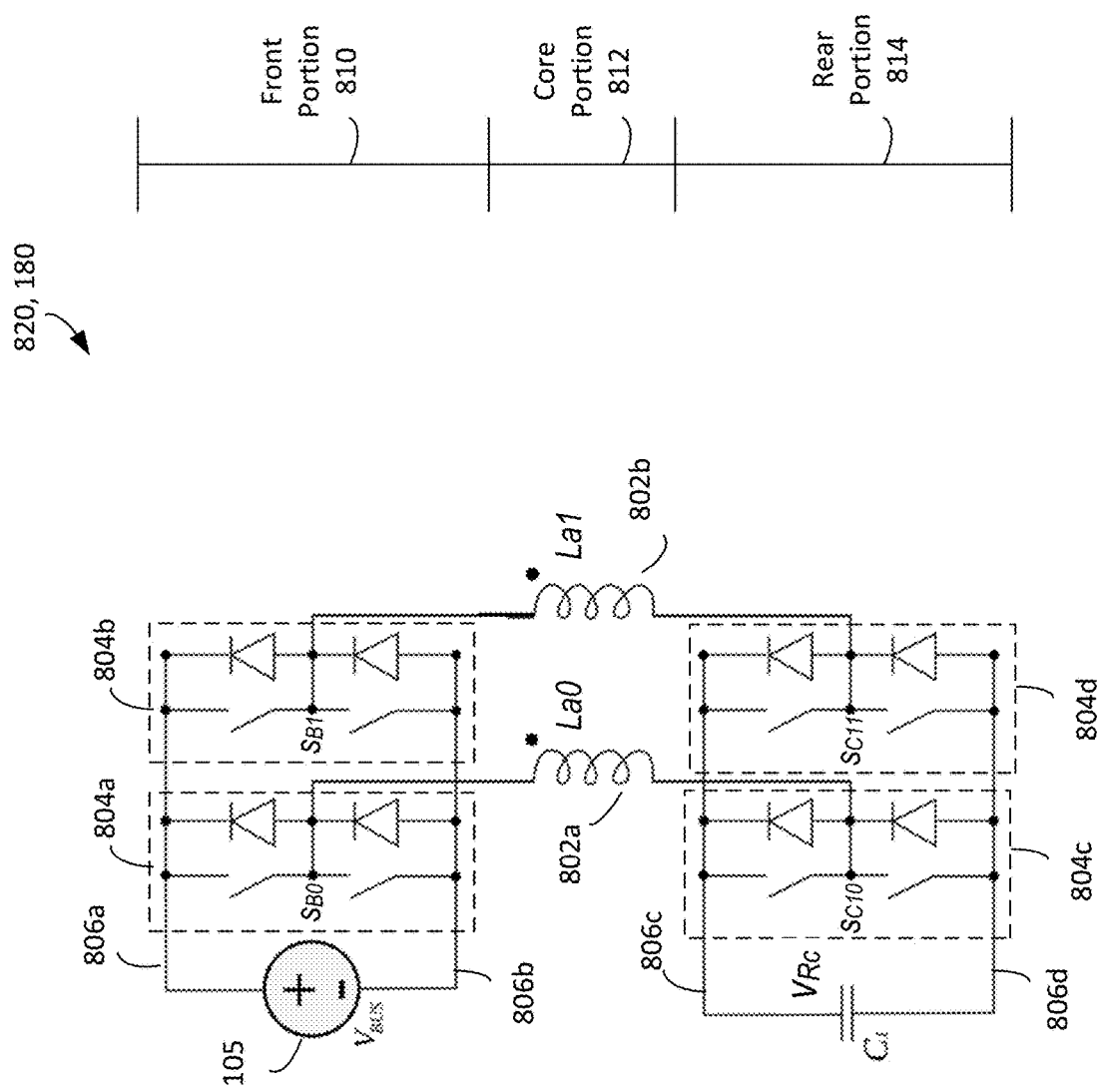

FIG. 8C illustrates a third stator microinverter network circuit 820 that may be used with the stator assembly 180. The circuit 820 has similar components as the circuit 800 and, accordingly, like numbers are used to identify like components. Further, the description of the circuit 800 generally applies to the circuit 820, except for the differences between the circuits 800 and 820 described herein or inherent. In contrast the circuit 800, the circuit 820 includes two microinverter pairs per slot: microinverters 804a and 804c for the stator winding 802a, and microinverters 804b and 804d for the stator winding 802b. Relative to the circuit 800, the circuit 820 may be configured to drive the stator windings 802a and 802b at fewer discrete voltage levels.

Figure 8D:
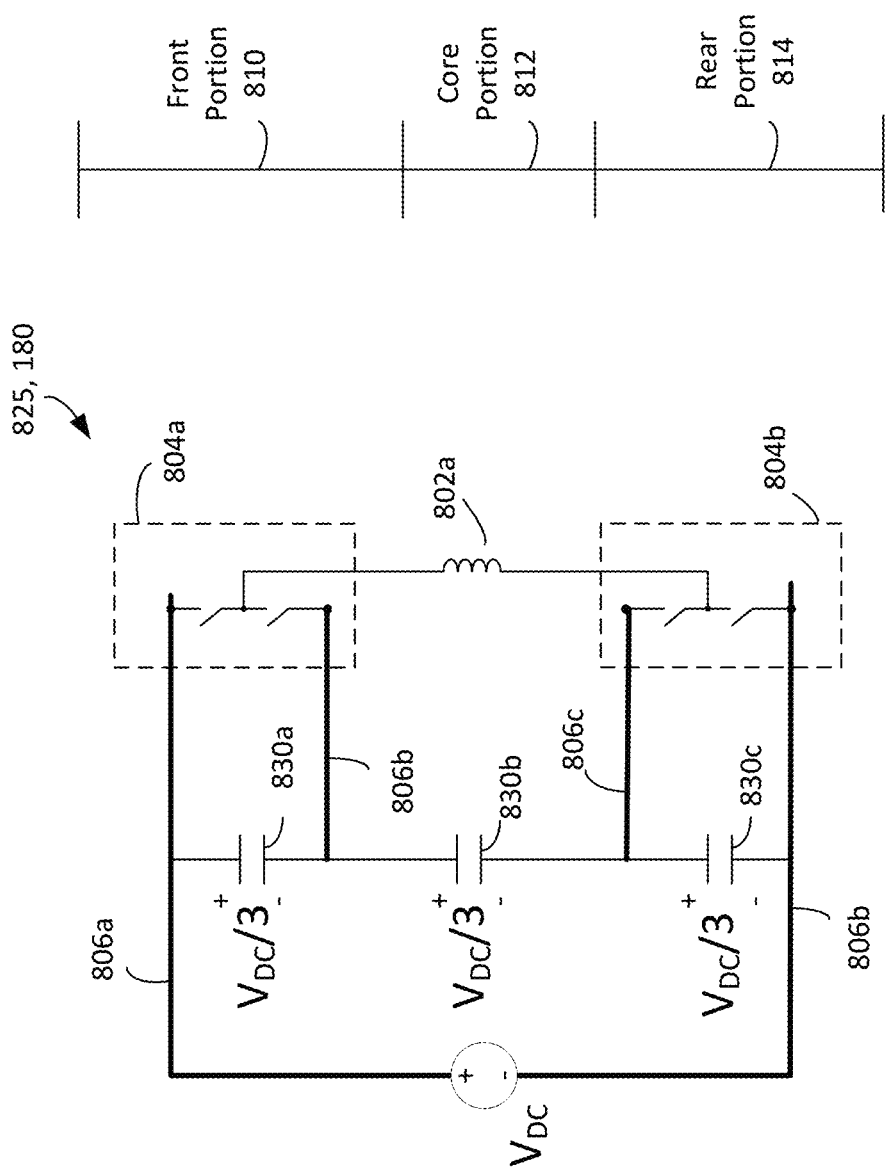

FIG. 8D illustrates a fourth stator microinverter network circuit 825 that may be used with the stator assembly 180. The circuit 825 has similar components as the circuit 800 and, accordingly, like numbers are used to identify like components. Further, the description of the circuit 800 generally applies to the circuit 825, except for the differences between the circuits 800 and 825 described herein or inherent. In contrast the circuit 800, the circuit 825 includes one microinverter pair per slot: microinverters 804a and 804b for the stator winding 802a. Additionally, in the circuit 825, the microinverter 804a is coupled between bus bar rings 806a and 806b and the microinverter 804b is coupled between bus bar rings 806c and 806d. Further, a capacitor 830a is coupled between bus bar rings 806a and 806b, a capacitor 830b is coupled between bus bar rings 806b and 806c, and a capacitor 830c is coupled between bus bar ring 806c and 803d. Although the capacitor 830b is illustrated as being in the core portion 812 of the stator assembly 180, in some examples, the capacitor 830b is positioned on the front portion 810 or the rear portion 814. Depending on which switches of the microinverters 804a-b are enabled, the circuit 825 may be configured to drive the stator winding 802a at $+V_{DC}$, $+\frac{2}{3} V_{DC}$, $+\frac{1}{3} V_{DC}$, 0V, $-\frac{1}{3} V_{DC}$, $-\frac{2}{3} V_{DC}$, and $-V_{DC}$.

In some examples, the stator assembly 180 includes microinverter network 175 with microinverters on only one axial end (e.g., on the front side). Examples of such stator assemblies are present in the motor assemblies 600c, 600d, 600f, and 600g. In these embodiments, a stator microinverter network circuit may be provided in which stator windings are not connected between microinverter pairs. For example, with reference to FIG. 8E, a stator microinverter network circuit 835 is provided for use with the motor assembly 600c, and with reference to FIG. 8F, a stator microinverter network circuit 845 is provided for use with the motor assembly 600d.

Figure 8E:
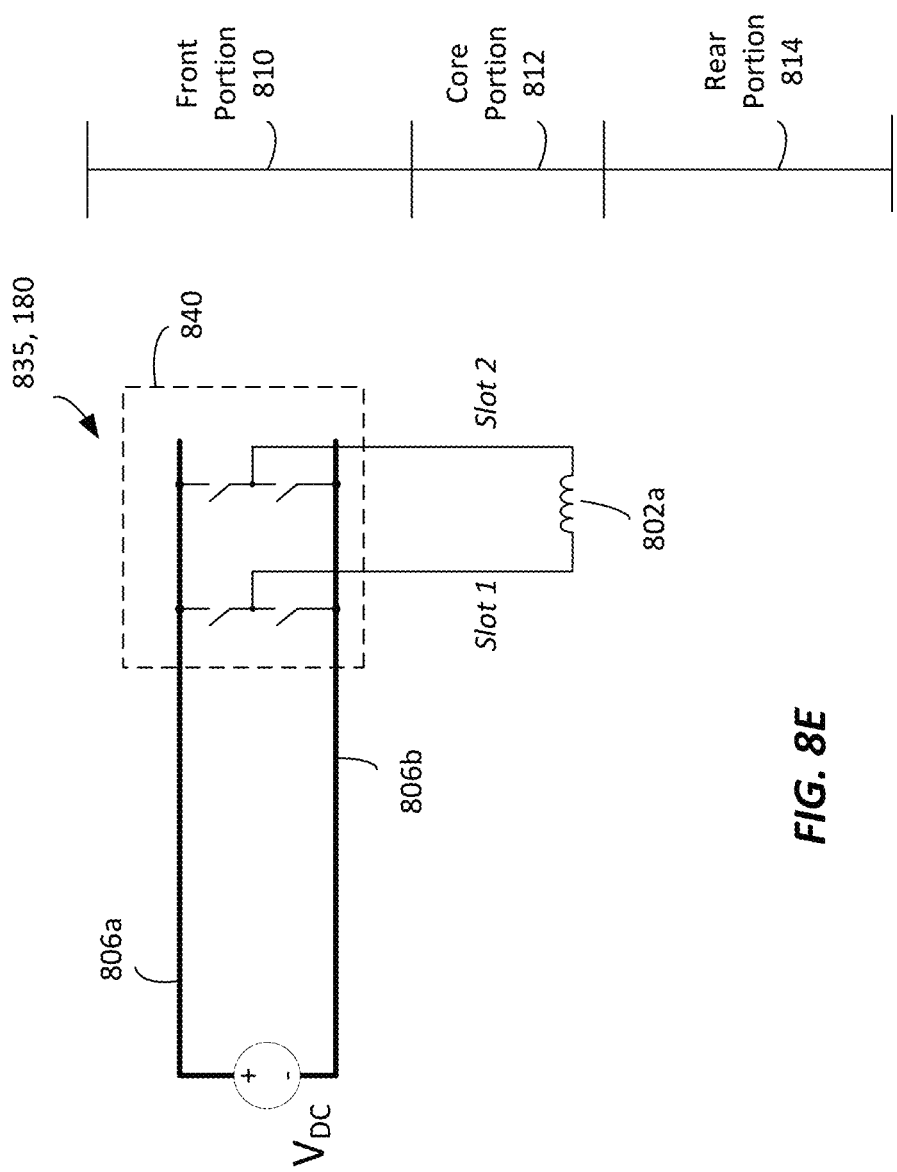

The circuit 835 of FIG. 8E may be used with the stator assembly 180. The circuit 835 has some similar components as the circuit 800 and, accordingly, like numbers are used to identify like components. Further, the description of the circuit 800 generally applies to the circuit 825, except for the differences between the circuits 800 and 835 described herein or inherent. In contrast to the circuit 800, the circuit 835 includes an H-bridge microinverter 840 in place of the microinverters 804, although the microinverter 840 may be implemented by two microinverters 804 in other embodiments. In the H-bridge microinverter 840, a midpoint between each pair of power switching elements is coupled to the stator winding 802a. The stator winding 802a passes through adjacent slots in the stator assembly 180, such as provided in the motor assemblies 600c, 600f, and 600g of FIGS. 6C, 6P, and 6S, respectively. In some examples, each H-bridge microinverter 840 is associated with two slots and each slot has two stator windings, each controlled by a different H-bridge microinverter 840 (see, e.g., the motor assembly 600c and motor assembly 600f). In other examples, each H-bridge microinverter 840 is associated with two slots, but each slot has one stator windings (see, e.g., the motor assembly 600g).

Figure 8F:
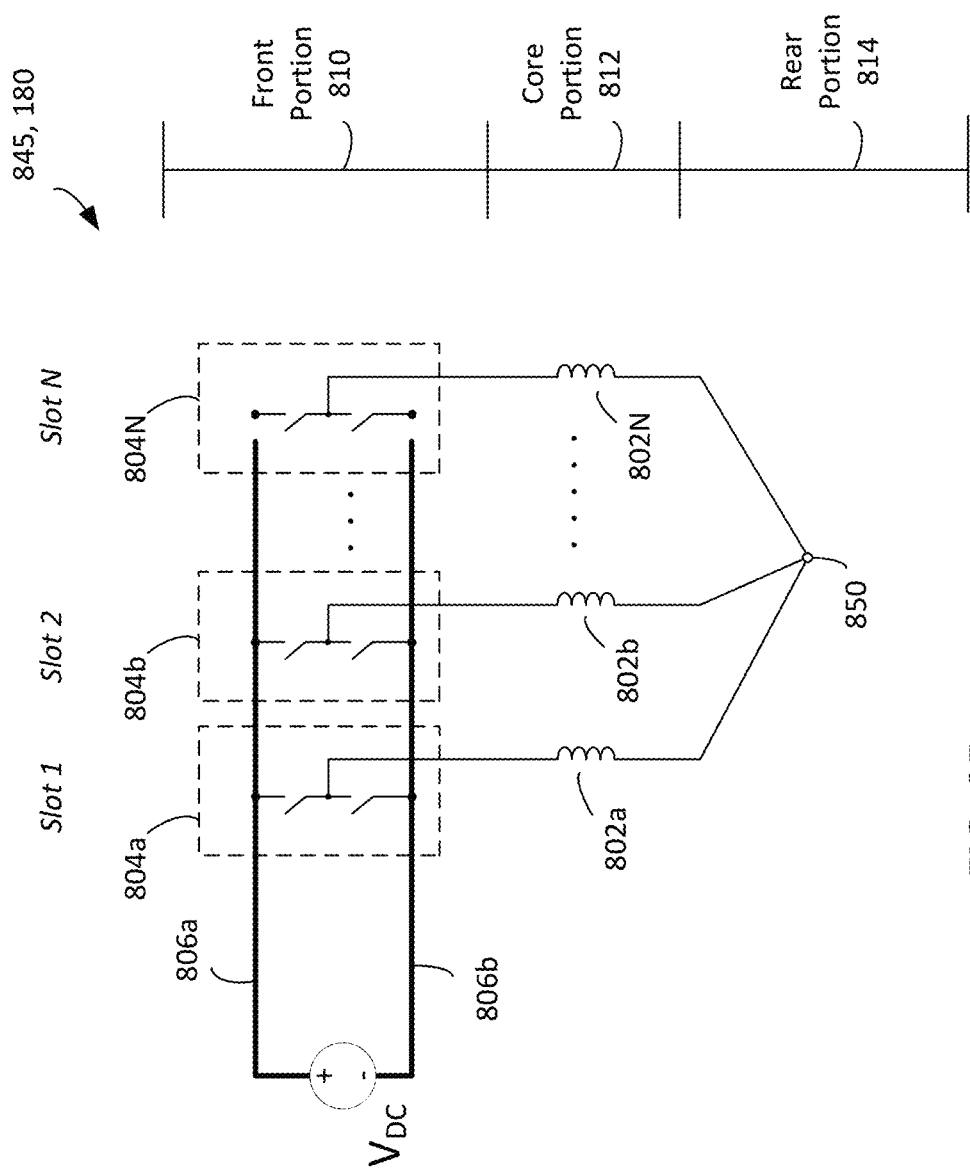

The circuit 845 of FIG. 8F may be used with the stator assembly 180. The circuit 845 has some similar components as the circuit 800 and, accordingly, like numbers are used to identify like components. Further, the description of the circuit 800 generally applies to the circuit 845, except for the differences between the circuits 800 and 845 described herein or inherent. In contrast to the circuit 800, the circuit 845 includes microinverters 804a-N, one for each slot, on the front portion 810 of the stator assembly 180, but does not include microinverters on the rear portion 814. Rather, the windings 802a-N are coupled together at a neutral node 850. The circuit 845 may be applicable to the motor assembly 600d of FIGS. 6J-6L and the motor assembly 600j of FIG. 6AL-6AQ.

Figure 8G:
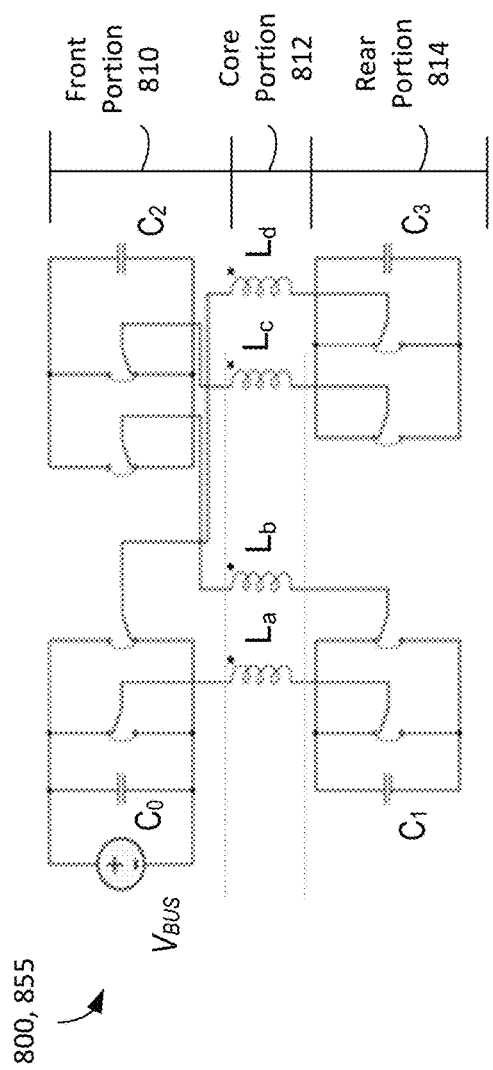

FIG. 8G illustrates a simplified diagram for the circuit 800 of FIG. 8A, except that in this diagram, stator windings $L_a$ and $L_b$ are presumed to be in a first stator slot, and stator windings $L_c$ and $L_a$ are in an adjacent stator slot. In FIG. 8G, the circuit 800 has a particular switching state 855. In the switching state 855, $V_{BUS}$ is applied across the four stator windings $L_a$-$L_a$, and the four capacitors $C_0$-$C_3$ have zero current.

Figure 8H:
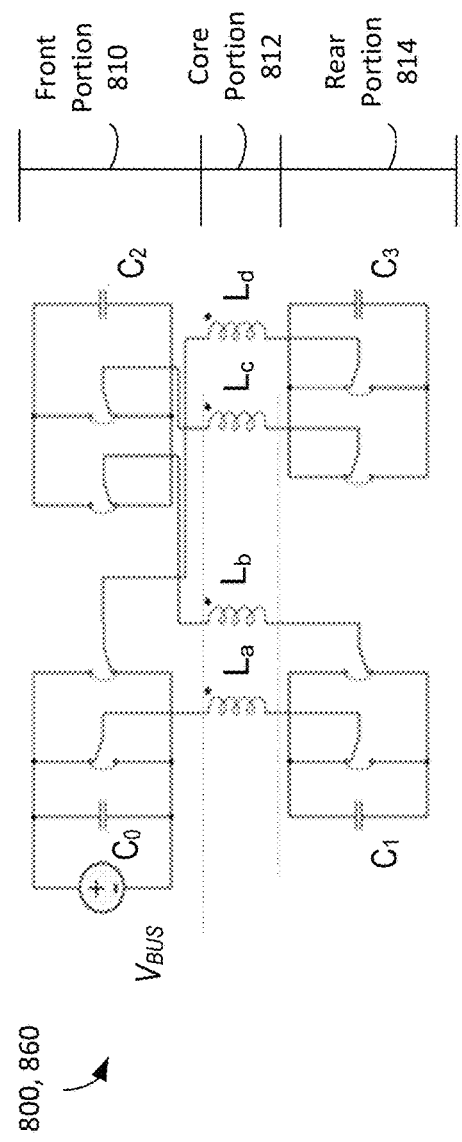

FIG. 8H illustrates another simplified diagram for the circuit 800 of FIG. 8A where the stator windings $L_a$ and $L_b$ are presumed to be in a first stator slot, and stator windings $L_c$ and $L_a$ are in an adjacent stator slot. In FIG. 8H, the circuit 800 has a buck-boost switching state 860. By changing switching states in the circuit 800, the capacitors $C_0$-$C_3$ can be placed in one of three states: series, anti-series, or bypassed (as shown in FIG. 8G) to maintain charge balance between them and to provide additional voltage levels to impose on the stator windings. In the buck-boost switching state 860 of FIG. 8H, $C_1$ is placed in series with the four stator windings $L_a$-$L_a$ and would charge to $V_{BUS}$ in steady state, at which point the net voltage across the terminals of the stator windings $L_a$-$L_a$ would be zero. After reaching steady state, the switches associated with $C_1$ are inverted, and now $2 \times V_{BUS}$ is imposed across the four windings. The same may be applied to capacitors $C_2$ and $C_3$, allowing for up to $4 \times V_{BUS}$ to be applied across the stator winding group $L_a$-$L_a$. The circuit 815 of FIG. 8B may similarly be operated in a buck-boost mode.

Figure 8I:
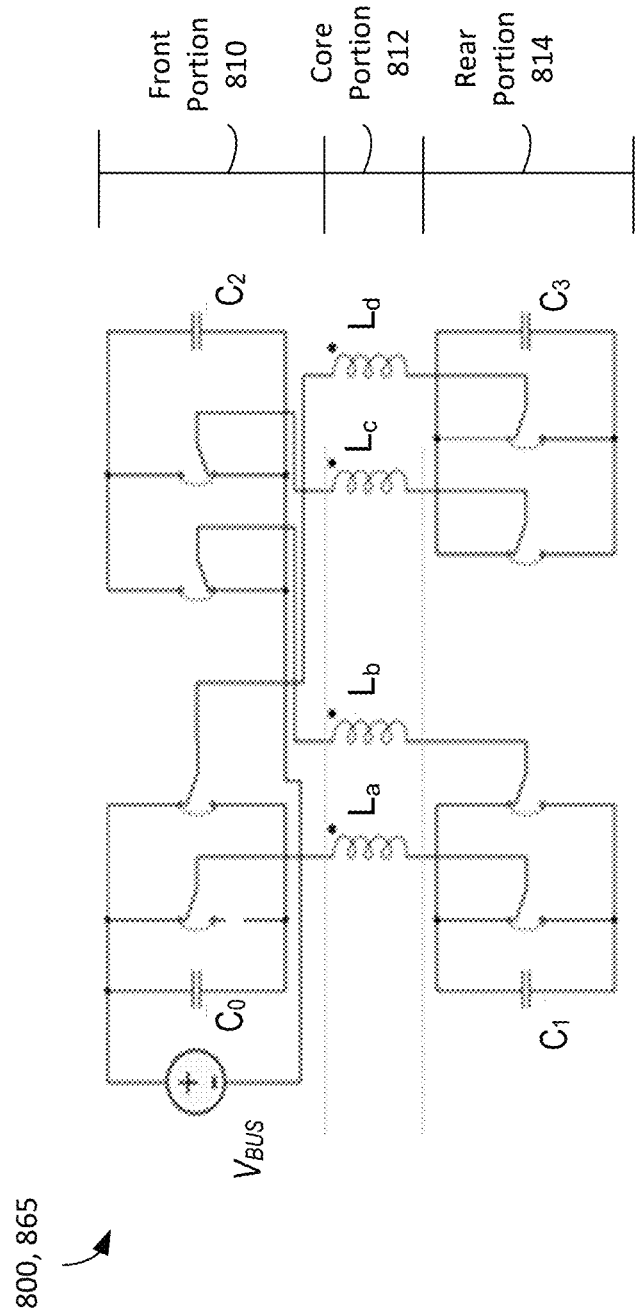

FIG. 8I illustrates a simplified diagram for the circuit 815 of FIG. 8B where the stator windings $L_a$ and $L_d$ are presumed to be in a first stator slot, and stator windings $L_b$ and $L_c$ are in an adjacent stator slot. In FIG. 8I, the circuit 815 has a switching state 865. In the switching state 865, $V_{BUS}$ is applied across $(L_a, L_b)$ and $(L_c, L_d)$, twice the voltage as in the circuit 800 of FIG. 8G, by connecting $V_{BUS}$ to $C_0$+ and $C_2$−, while the capacitors are still in the zero current state. In FIG. 8I, the stator winding pairing is different relative to FIG. 8G. Specifically, $L_a$ and $L_d$ windings are in one slot, and $L_b$ and $L_c$ windings are in the complementary slot, so that the polarity of voltage and current is matched within a conductor pair.

As previously described with respect to the stator windings 215, the various stator windings 802 in FIGS. 8A-I may take various forms, such as a conductive bar, a laminated bar, a stranded winding, a Litz wire type, a hybrid Roebel bar type (e.g., stranded winding near airgap (e.g., 5%, 10%, 20%, 30%) and with a bar toward bottom of slot), concentrated wound winding around a tooth (with a "go" and "return" in respective slots on opposite sides of the tooth), or a toroidal winding (a slot's "go" strands wrapped around a back iron of the stator for the "return"). Unless otherwise noted, as used herein, the terms stator winding and stator slot conductor may refer to any of the various forms of conductive elements that occupy the slots between stator teeth (e.g., a stator winding may refer to a conductive bar in a stator slot and also a concentrated wound winding around a stator tooth). Further, as described herein, the number of stator windings within each slot may vary depending on the design. For example, each slot may include one, two, three, four, five, or another number of stator windings 802. Additionally, although some of the diagrams of the microinverters in FIGS. 8A-I do not illustrate respective diodes coupled between the midpoints of the power switching elements and the high and low side terminals, such diodes may be present in at least some embodiments. Further, the microinverter network circuits 800 of FIGS. 8A-8I show windings 802 represented as an inductance. It should be understood that such windings 802 may also define a capacitance, resistance, and/or system impedance, wherein a discrete capacitor or resistor may be included or such capacitance, resistance, and/or system impedance may be defined by the winding 802 itself.

As should be apparent from the various circuits in FIGS. 8A-I, the microinverters forming a stator microinverter network (e.g., as the microinverter network 175 of FIG. 1)

enable more particular control of the current through each slot of the stator assembly 180 as compared to a stator using a traditional inverter bridge. This enhanced control capability allows the reconfiguration and precise control of the motor assembly, as described in further detail below. As one example, the stator microinverter networks described herein allow for interleaving of switching events for individual slots or windings, rather than a switching event that is implemented simultaneously across a greater number or all slots or windings. By providing slight time offsets between the switching events of the individual stator slots or windings (i.e., interleaving or staggering the switching events), the total noise or transient signals at a given moment can be reduced and, instead, spread or distributed across a longer period of time. This reduction and distribution can reduce noise or transients (e.g., the amplitude or intensity of the noise or transients) that occur at the time of switching and would otherwise impact or be experienced by the windings, microinverters, controllers, power supplies, and/or other coupled circuitry of the motor assemblies. By reducing the potential noise or transients that circuitry may experience, lower-rated components may be used, which may be generally smaller and less costly.

Similarly, use of a multi-level microinverter network, such as shown in FIGS. 8A, 8B, 8C, 8G, 8H, and 8I, can also reduce the total voltage, current, and or power that is switched at a given moment and, instead, spread or distribute it across a longer period of time. This reduction and distribution can also reduce noise or transients (e.g., the amplitude or intensity of the noise or transients) that occur at the time of switching and would otherwise impact or be experienced by the windings, microinverters, controllers, power supplies, and/or other coupled circuitry of the motor assemblies.

The various stator microinverter networks of FIGS. 8A-I may also be used to implement a rotor microinverter networks for the rotor assembly 185. For example, with reference to FIG. 8A, the coils 802a-d may be rotor field windings 315 through a slot of the rotor assembly 185. The rotor assembly 185 may have the bus bar rings 806a-h that are coupled to the DC power supply 105 via embedded power transfer techniques or a slip ring, as described above, or the rotor assembly 185 may have conductive couplings other than bus bar rings to couple the microinverters to the DC power supply 105. The other circuits of FIGS. 8B-8I may similarly be used to implement a rotor microinverter network, where the illustrated DC bus rings, power switching elements, and windings are those of the rotor microinverter network and/or rotor assembly 185, rather than being used with respect to the stator assembly 180.

Like the stator windings 215, the rotor field windings 315 in the various examples of the motors 120 described herein may take various forms, such as a conductive bar, a laminated bar, a stranded winding, a Litz wire type, a hybrid Roebel bar type (e.g., stranded winding near airgap (e.g., 5%, 10%, 20%, 30%) and with a bar toward bottom of slot), concentrated wound winding around a tooth (with a "go" and "return" in respective slots on opposite sides of the tooth), or a toroidal winding. Unless otherwise noted, as used herein, the terms rotor field winding, rotor winding, and rotor slot conductor may refer to any of the various forms of conductive elements that occupy the slots between rotor teeth.

As should be apparent from the various circuits in FIGS. 8A-I, when the microinverters form a rotor microinverter network (e.g., as the microinverter network 175 of FIG. 1), the rotor microinverter network enables more particular control of the current through each slot of the rotor assembly 185 as compared to a rotor using a traditional inverter bridge. This enhanced control capability allows the reconfiguration and precise control of the motor assembly, as described in further detail below. As one example, like noted for the stator microinverter networks, the rotor microinverter networks described herein allow for interleaving of switching events for individual slots or windings, rather than a switching event that is implemented simultaneously across a greater number or all slots or windings. By providing slight time offsets between the switching events of the individual stator slots or windings (i.e., interleaving or staggering the switching events), the total noise or transient signals at a given moment can be reduced and, instead, spread or distributed across a longer period of time. This reduction and distribution can reduce noise or transients (e.g., the amplitude or intensity of the noise or transients) that occur at the time of switching and would otherwise impact or be experienced by the windings, microinverters, controllers, power supplies, and/or other coupled circuitry of the motor assemblies. Additionally, by interleaving wireless power transfer signals and/or communication across channels or phases, the power transfer and/or communication may be more continuous. By reducing the potential noise or transients that circuitry may experience, lower-rated components may be used, which may be generally smaller and less costly. Similarly, use of a multi-level microinverter network for the rotor microinverter network, such as shown in FIGS. 8A, 8B, 8C, 8G, 8H, and 8I, can also reduce the total voltage, current, and or power that is switched at a given moment and, instead, spread or distribute it across a longer period of time.

Figure 9A:
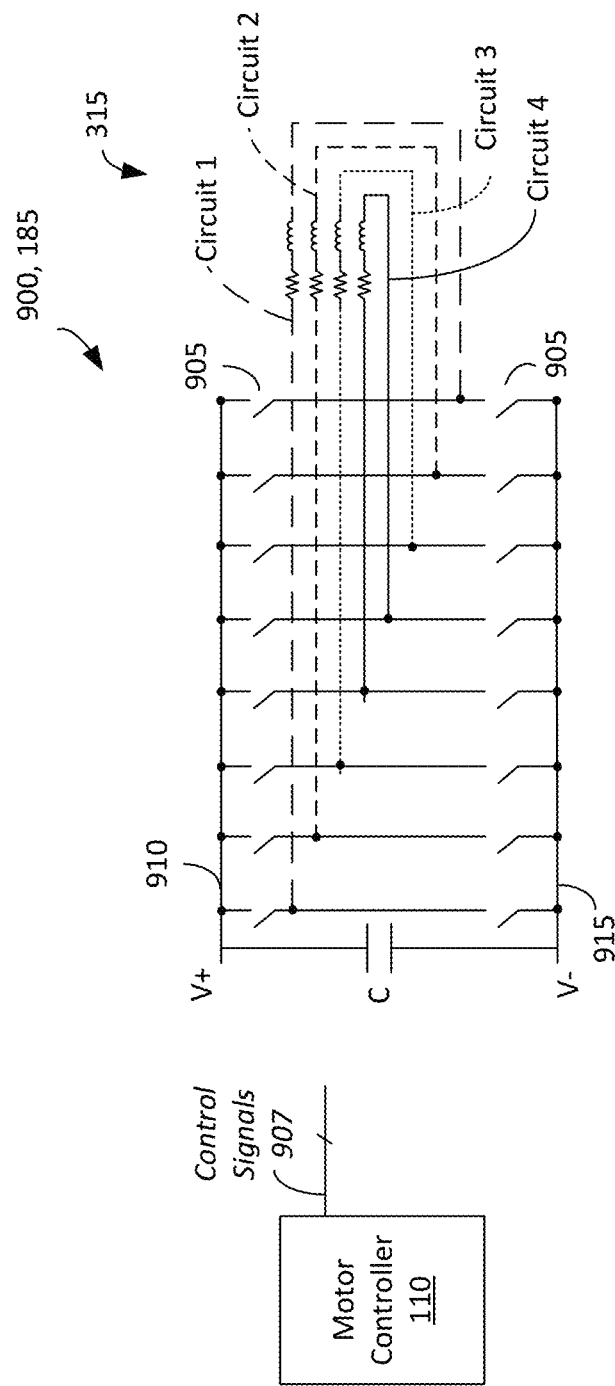
FIGS. 9A-9C illustrate rotor inverter circuits in accordance with some embodiments.
Figure 9B:
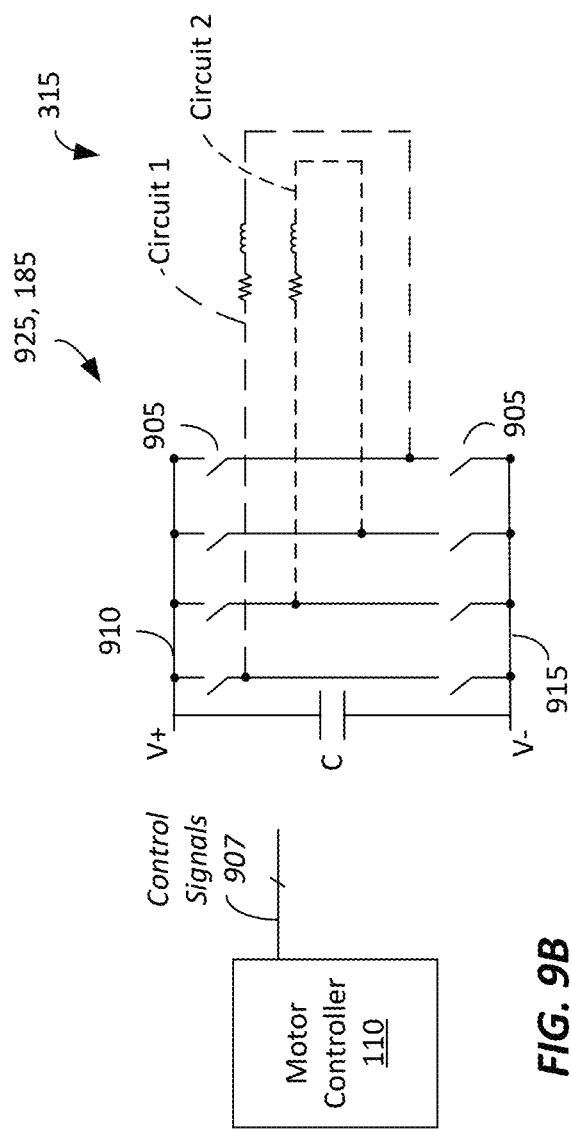
Figure 9C:
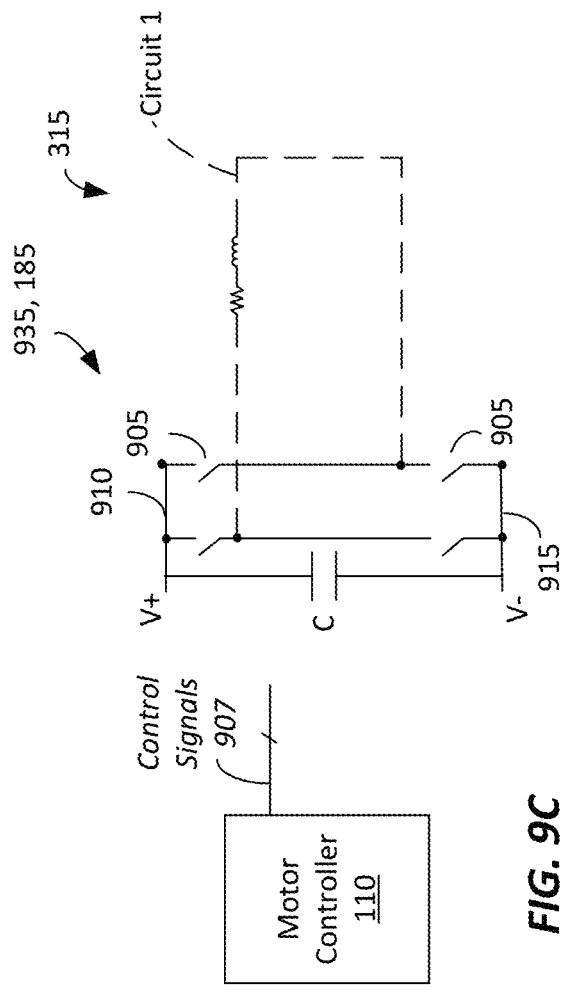

FIGS. 9A-C illustrate example inverter circuit diagrams that may be used to implement the rotor inverter described herein (e.g., the rotor inverters 322 or 350). More particularly, the circuit diagrams of FIGS. 9A-C illustrate example arrangements of power switching elements of the rotor inverters in relation to power supply lines (e.g., rotor power circuit 305) and rotor windings (e.g., rotor windings 315 or 420). In comparison to the rotor microinverters, the power switching element pairs in the rotor inverters of FIGS. 9A-C are configured to control circuits that include stator windings in non-adjacent slots.

The rotor inverter 322 may be an on-board inverter that is affixed to the rotor assembly 185 and rotates therewith during operation of the synchronous motor 120. The rotor inverter 350 may be an off-board inverter that is stationary and does not rotate with the rotor assembly 185 during operation of the synchronous motor 120. The power supply lines of each of FIGS. 9A-C may be fed power via a slip ring or via the stator windings through the embedded power transfer technique. Similarly, the motor controller 110 may be coupled to each of the power switching elements 905 via a slip ring or via the stator windings through the embedded communication technique.

In some embodiments, the motor controller 110 is a distributed controller such that a portion of the motor controller (e.g., a first sub-controller) is on-board the rotor assembly 185 and another portion of the motor controller (e.g., a second sub-controller) is off-board the rotor assembly. In these embodiments, the second sub-controller may provide control commands to the first sub-controller, which interprets and executed the commands to generate control signals to the power switching elements 905. Additionally, the first and second sub-controllers may be coupled through a slip ring or via the stator windings through the embedded communication technique.

FIG. 9A illustrates a first circuit 900 including eight pairs of power switching elements 905 that are controlled by the motor controller 110. The power switching elements 905 may be FETs, BJTs, or the like, and have a control terminal coupled to the motor controller 110 to receive a respective control signal of the control signals 907. The power switching elements 905 are either high side elements connected to the positive DC bus 910 or low side elements connected to negative DC bus 915. Each high side element is coupled to a low side element at a node to form a switch pair, and each node is coupled to a respective winding circuit terminal (terminals of circuits 1-4) of the rotor windings 315. Each circuit may include more than one winding, loop of at least one turn, or conductor, but is represented in the diagram as a single winding with a resistive component. In addition to an inductance and resistance, the winding, loop, or conductor can also define a capacitance on the rotor and/or rotor pole. That is, it should be understood that the such winding, loop, or conductor may also define a capacitance, or system impedance, wherein a discrete capacitor may be included or such capacitance may be defined by the winding, loop, or conductor itself. Rotor windings and/or circuits may be electrically isolated from one another.

FIG. 9B illustrates a second circuit 925 including four pairs of power switching elements 905 that are controlled by the motor controller 110. The power switching elements 905 may be FETs, BJTs, or the like, and have a control terminal coupled to the motor controller 110 to receive a respective control signal of the control signals 907. The power switching elements 905 are either high side elements connected to the positive DC bus 910 or low side elements connected to negative DC bus 915. Each high side element is coupled to a low side element at a node to form a switch pair, and each node is coupled to a respective winding circuit terminal (terminals of circuits 1-2) of the rotor windings 315. Each circuit may include more than one winding, loop of at least one turn, or conductor, but is represented in the diagram as a single winding with a resistive component. In addition to an inductance and resistance, the winding, loop, or conductor can also define a capacitance on the rotor and/or rotor pole. That is, it should be understood that the such winding, loop, or conductor may also define a capacitance, or system impedance, wherein a discrete capacitor may be included or such capacitance may be defined by the winding, loop, or conductor itself. Rotor windings and/or circuits may be electrically isolated from one another.

FIG. 9C illustrates a second circuit 935 including two pairs of power switching elements 905 that are controlled by the motor controller 110. The power switching elements 905 may be FETs, BJTs, or the like. The power switching elements 905 are either a high side element connected to the positive DC bus 910 or low side element connected to negative DC bus 915. The high side element is coupled to a low side element at a node to form a switch pair, and the node is coupled to a winding circuit terminal (terminals of circuits 1) of the rotor windings 315. Each circuit may include more than one winding, loop of at least one turn, or conductor, but is represented in the diagram as a single winding with a resistive component. In addition to an inductance and resistance, the winding, loop, or conductor can also define a capacitance on the rotor and/or rotor pole. That is, it should be understood that the such winding, loop, or conductor may also define a capacitance, or system impedance, wherein a discrete capacitor may be included or such capacitance may be defined by the winding, loop, or conductor itself. Rotor windings and/or circuits may be electrically isolated from one another.

In some examples of the inverter circuits 900, 925, and 935, one terminal of each of the circuits 1-4 is coupled to shared neutral node, either directly or by way of another power switching element 905 controlled by the motor controller 110.

The rotor inverters of FIGS. 9A-C, which are part of the drive circuit 115 of FIG. 1, enable a more particular control of the current through and polarity of the rotor field windings 315, as compared to a permanent magnet rotor or a rotor using a traditional excitation circuit. This enhanced control capability allows the reconfiguration and precise control of the motor assembly, as described in further detail below.

As described above with respect to FIG. 1, the motor controller 110 may include a plurality of motor control configurations 195, one for each of the motor configurations of the motor assembly 190. Execution of a particular motor control configuration by the motor controller 110 causes the motor assembly 190 to enter and be controlled in a particular motor configuration. A particular motor configuration may include a particular stator pole configuration, rotor pole configuration, or both stator pole configuration and rotor pole configuration.

Each motor control configuration 195 may define a pole configuration for each microinverter network 175 and, thus, for the stator assembly 180 and/or rotor assembly 185. For example, when the microinverter network 175 includes a stator microinverter network 210, the motor control configuration may define a pole configuration for the stator microinverter network 210 and, thereby, for the stator assembly 180. Likewise, when the microinverter network 175 includes a rotor microinverter network 310, the motor control configuration 195 may define a pole configuration for the rotor microinverter network 310 and, thereby, for the rotor assembly 185.

The pole configuration(s) may be defined by a drive control scheme of each motor control configuration. For example, the way in which the stator windings 215 are driven by the motor controller 110 (and stator microinverter network 210) defines the direction of current through the slots and, thus, the magnetic poles of the stator assembly 180. Likewise, the way in which the rotor windings 315 are driven by the motor controller 110 (and rotor microinverter network 310) defines the current through the slots and, thus, the magnetic poles of the rotor assembly 185. Accordingly, the motor controller 110 can control the number and position of magnetic poles of the stator assembly 180 by controlling the stator microinverter network 210 and of the rotor assembly 185 by controlling the rotor microinverter network 310.

Figure 10A:
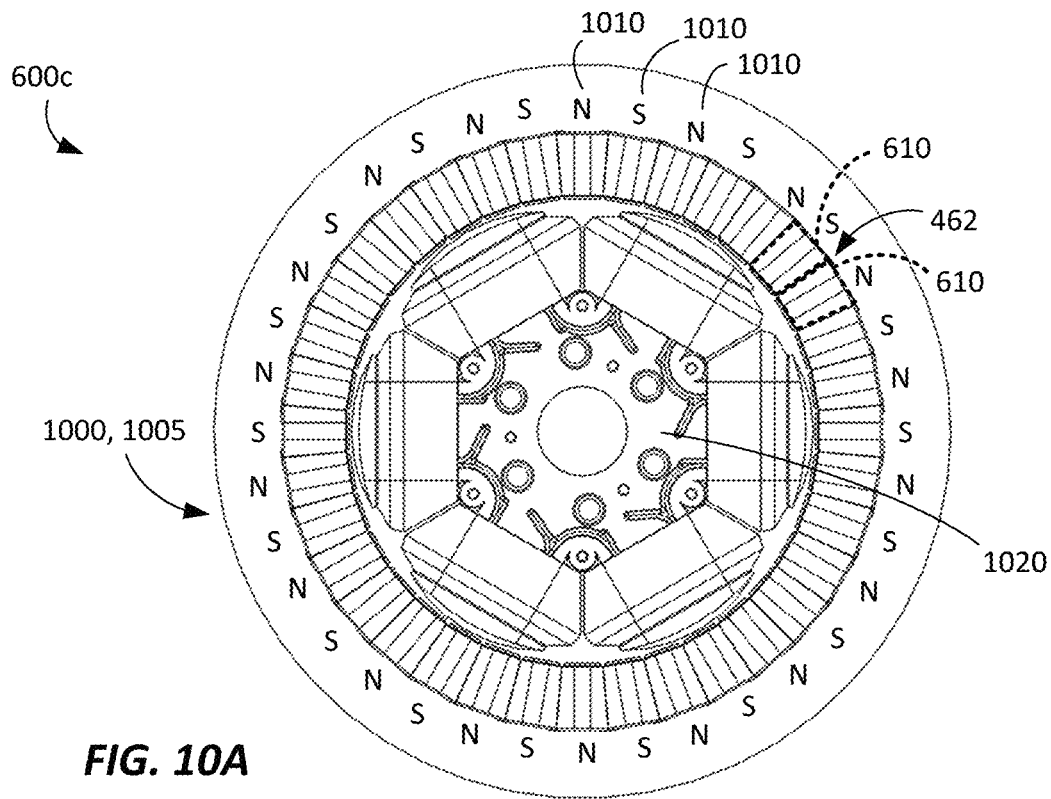
FIGS. 10A-10D illustrate stator pole configurations for a stator assembly in accordance with some embodiments.

FIGS. 10A-D illustrate examples of different pole configurations for the stator assembly of the motor assembly 600c, shown previously in FIG. 6G-I. The motor assembly 600c includes a stator assembly 1000 (which is an example of the stator assembly 180) having thirty-six stator slots 462 and two stator windings 610 per slot. FIG. 10A shows the motor assembly 600c having a first motor or stator configuration 1005 with thirty-six (36) stator poles 1010 that alternate (N-S-N-S . . . N-S). That is, at a given moment in time when the motor controller 110 is controlling the stator microinverter network 210 to drive the motor assembly 600c, current through the stator windings 610 generates magnetic fields resulting in the illustrated set of poles 1010. To simplify the diagram, only select stator poles 1010, stator windings 610, and slots 462 are labeled. Of course, as the generated magnetic fields cause the rotor 1020 to rotate, the motor controller 110 controls the stator microinverter network 210 to drive current through the stator windings 610 that causes the poles to rotate such that, at a second moment in time, each of the thirty-six (36) stator poles 1010 has an inverted polarity and, thus, still alternate (S-N-S-N . . . S-N). By continuously changing currents in the stator windings 610, the magnetic fields continuously change and, thereby, rotate the rotor 1020.

Figure 10B:
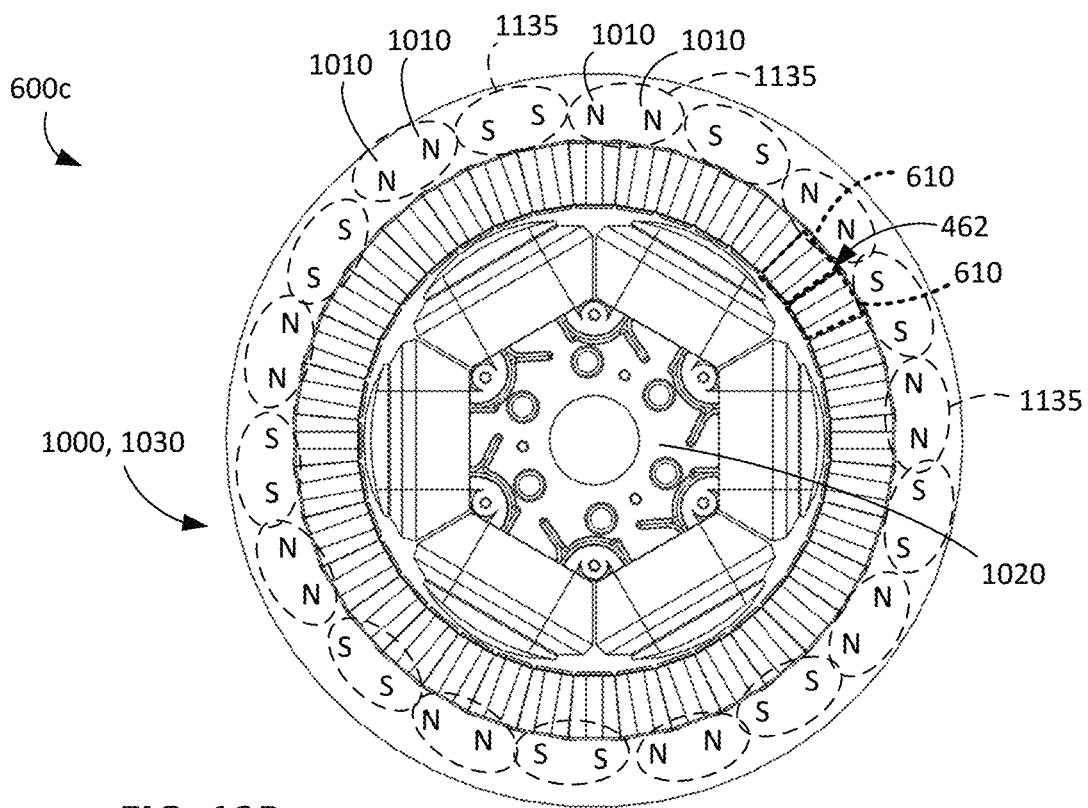

FIG. 10B shows the motor assembly 600c having a second motor or stator configuration 1030 with thirty-six (36) stator poles 1010 that alternate polarity every two poles (N-N-S-S . . . N-N-S-S). Thus, in effect, the second motor configuration 1030 has eighteen (18) effective poles 1035, each effective pole 1035 including a pair of stator poles 1010. Each pair of stator poles 1010 in one of the effective poles 1035 is controlled as a unit or single pole. That is, control signals to microinverters of the stator microinverter network 210 controlling one stator pole 1010 in an effective pole 1035 is the same or matches the control signals to microinverters of the stator microinverter network 210 controlling the other stator pole 1010 in the effective pole 1035. Accordingly, at a given moment in time when the motor controller 110 is controlling the stator microinverter network 210 to drive the motor assembly 600c, current through the stator windings 610 generates magnetic fields resulting in the illustrated set of effective poles 1035. Of course, as the generated magnetic fields cause the rotor 1020 to rotate, the motor controller 110 controls the stator microinverter network 210 to drive current through the stator windings 610 that causes the poles to rotate such that, at a second moment in time, each of the effective poles 1035 has inverted, but still alternate (S-S-N-N . . . S-S-N-N). The continuously changing currents in the stator windings 610 causes the magnetic fields to continuously change and, thereby, rotate the rotor 1020.

Figure 10C:
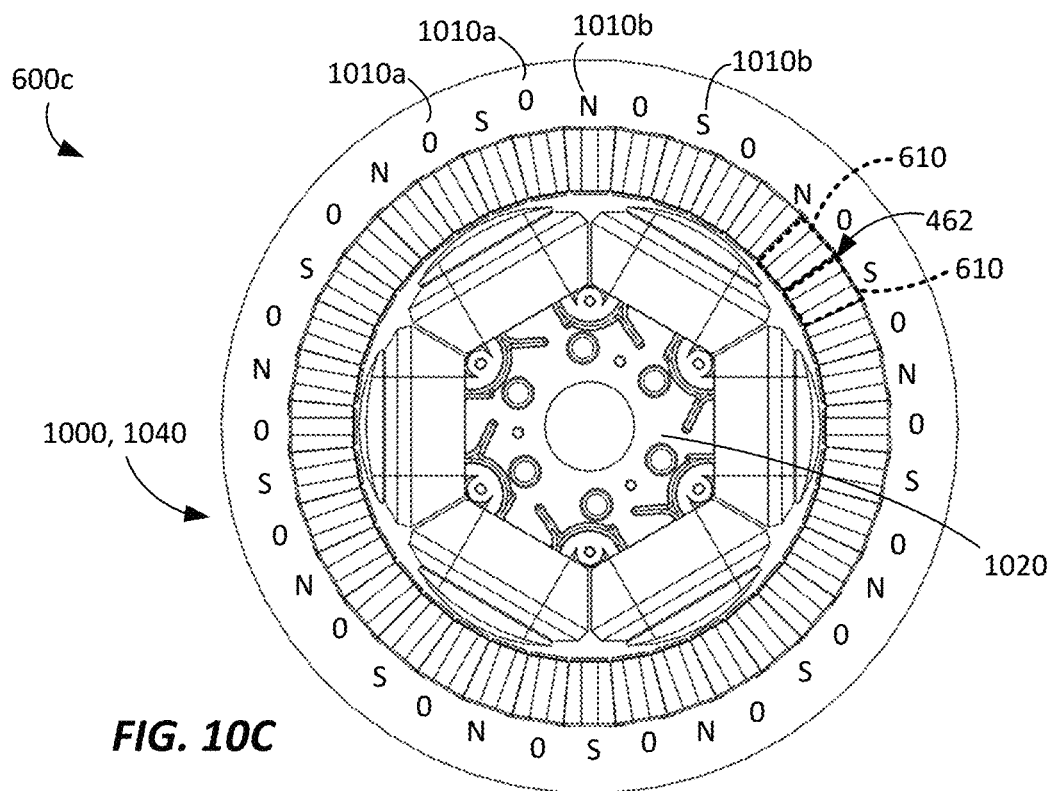

FIG. 10C shows the motor assembly 600c having a third motor configuration 1040 with thirty-six (36) stator poles 1010 that have every other pole 1010 as an inactive pole 1010a and that have the remaining poles 1010 as active poles 1010b that alternate polarity (N-0-S-0-N . . . S-0-N-0-S; where "0" represents an inactive pole). Thus, in effect, the third motor configuration 1040 has eighteen (18) effective poles, each effective pole being an active pole 1010b. Each inactive pole 1010a is associated with stator windings 610 through adjacent slots on either side of a stator tooth that are not driven with current. In other words, the microinverters of the stator microinverter network 210 that control the stator windings 610 of an inactive pole 1010a are controlled to have open power switching elements, disconnecting the stator windings 610 from the DC bus bar rings 205, resulting in essentially no current through the disconnected or inactive stator windings 610. Accordingly, at a given moment in time when the motor controller 110 is controlling the stator microinverter network 210 to drive the motor assembly 600c, current through the stator windings 610 generates magnetic fields resulting in the illustrated set of active poles 1010b as effective poles. Of course, as the generated magnetic fields cause the rotor 1020 to rotate, the motor controller 110 controls the stator microinverter network 210 to drive current through the stator windings 610 that causes the poles to rotate such that, at a second moment in time, each of the active poles 1010b has inverted, but still alternate polarity (S-0-N-0-S . . . N-0-S-0-N). The continuously changing currents in the stator windings 610 causes the magnetic fields to continuously change and, thereby, rotate the rotor 1020.

Figure 10D:
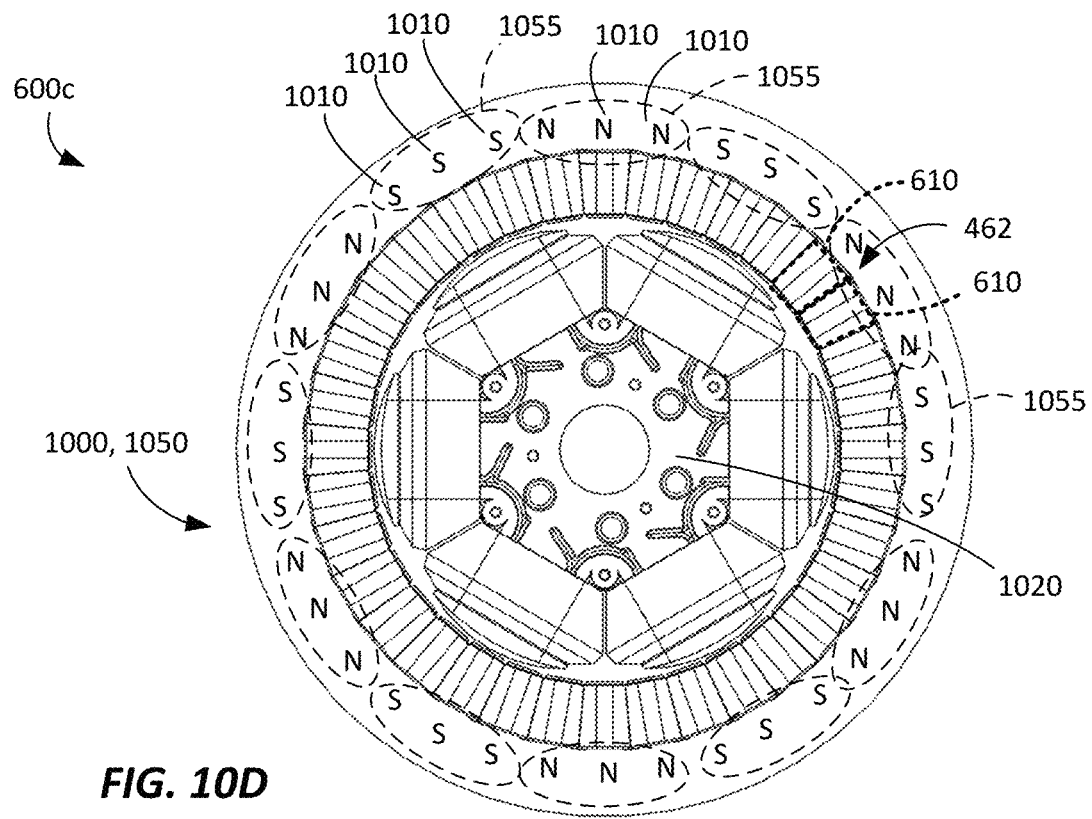

FIG. 10D shows the motor assembly 600c having a fourth motor configuration 1050 with thirty-six (36) stator poles 1010 that are controlled to provide twelve (12) effective poles 1055, each effective pole 1055 including three stator poles 1010 controlled to have the same polarity (N-N-N-S-S-S-N-N-N . . . S-S-S). Each stator pole 1010 in one of the effective poles 1055 is controlled as a unit or single pole. That is, the control signals to microinverters of the stator microinverter network 210 controlling one stator pole 1010 in an effective pole 1055 are the same or match the control signals to microinverters of the stator microinverter network 210 controlling the other stator poles 1010 in the effective pole 1055. Accordingly, at a given moment in time when the motor controller 110 is controlling the stator microinverter network 210 to drive the motor assembly 600c, current through the stator windings 610 generates magnetic fields resulting in the illustrated set of effective poles 1055. Of course, as the generated magnetic fields cause the rotor 1020 to rotate, the motor controller 110 controls the stator microinverter network 210 to drive current through the stator windings 610 that causes the poles to rotate such that, at a second moment in time, each of the effective poles 1055 has inverted, but still alternate (S-S-S-N-N-N-S-S-S . . . N-N-N). The continuously changing currents in the stator windings 610 causes the magnetic fields to continuously change and, thereby, rotate the rotor 1020.

The motor configurations of FIGS. 10A-D are a nonexhaustive set of example motor configurations for the motor assembly 600c, as other groupings of stator poles 1010 that result in different effective poles are used in some embodiments. Additionally, as previously noted, the motor assembly 600c is but one example of the motor assembly 190 implemented in some embodiments described herein. The motor assembly 190 may be implemented by other motor assemblies, such as other motor assemblies described herein, and may similarly be configured into different motor configurations through control of the microinverter network(s) 175 of the particular motor assembly 190. For example, the motor controller 110 may control the microinverter network(s) 175 of each of the motor assemblies 400, 600a-g to configure the respective motor assembly into any of a plurality of motor configurations for that particular motor assembly.

The stator assembly 180 of the motor assembly 190 may be described in terms of a ratio of highest pole count (i.e., number of controllable slots) to active pole count (i.e., the number of independent slot commands at a given time or effective poles) (e.g., highest pole count:active pole count). For an example of the motor assembly 190 including a twelve slot stator in the stator assembly 180, the following ratios and pole configurations can be achieved through control of the stator microinverter network 210 by the motor controller 110:

| Ratio | Pole Mapping of Stator Slots: 1-2-3-4-5-6-7-8-9-10-11-12 | Notes |
|---|---|---|
| 1:1 | N-S-N-S-N-S-N-S-N-S-N-S | |
| 2:1 | N-N-S-S-N-N-S-S-N-N-S-S | |
| 2:1 | N-0-S-O-N-0-S-O-N-0-S-0 | 0 = inactive slot |
| 3:1 | N-N-N-S-S-S-N-N-N-S-S-S | |
| 3:1 | N-N-S-S-S-N-N-N-S-S-S-N | Poles 1, 4, 7, 10 do not reverse with respect to 1:1 configuration |
| 3:1 | N-0-0-S-0-0-N-0-0-S-0-0 | No pole reversals with respect to 1:1 configuration; 0 = inactive slot |
| 6:1 | N-N-N-N-N-N-S-S-S-S-S-S | Poles 1, 3, 5, 8, 10, 12 do not reverse with respect to 1:1 configuration |
| 6:1 | N-0-0-0-0-0-S-0-0-0-0-0 | 0 = inactive slot |

Although stator assembly 1000 is illustrated with stator windings 610 that wrap around the stator teeth, in some embodiments, the stator assembly 1000 may include conductors through respective slots 462 that do not surround a given tooth, or combinations thereof.

Stator winding sets may be used in series or parallel to change voltage and amperage in a particular winding set around a fixed pole. However, this alone does not enable motor or stator reconfiguration. The microinverter network(s) 175 is/are not limited to simply taking two coils that encircle the same region of a magnetic circuit, but, rather, control voltage or current at multiple stator conductors to synthesize an mmf waveform as a physical distribution such that it can drive currents in stator slots discretely. In doing so, the microinverter network 175 (e.g., a multilevel stator microinverter network) can reconfigure how voltages are applied throughout the motor 120 and its slots, and the periodicity of motor 120 based upon how voltages are applied.

Thus, the motor 120 herein is able to operate with a network of conductors that do not comprise the same magnetic circuit. In other words, it can utilize conductors that have a different phase offset from the fundamental of mmf waveform around the airgap to shape the response of the motor 120, which may include the airgap flux density, back emf, and rotor coupling. The microinverter network(s) 175 can change the magnetic circuit based upon periodicity and waveform shape within that period. Further, the microinverter network(s) 175 can provide periodic air gap distribution, e.g., trapezoidal or sinusoidal, based upon how current is driven in the conductors. In particular, the microinverter network(s) 175 is/are not limited to strands that comprise a fixed coil, nor how those coils are connected, to define a magnetic circuit. Rather, the motor controller 110 can determine pitch of that magnetic circuit or the periodicity of the circuit, and the shape of the mmf within a period, through the control of the microinverter network(s) 175.

Figure 11A:
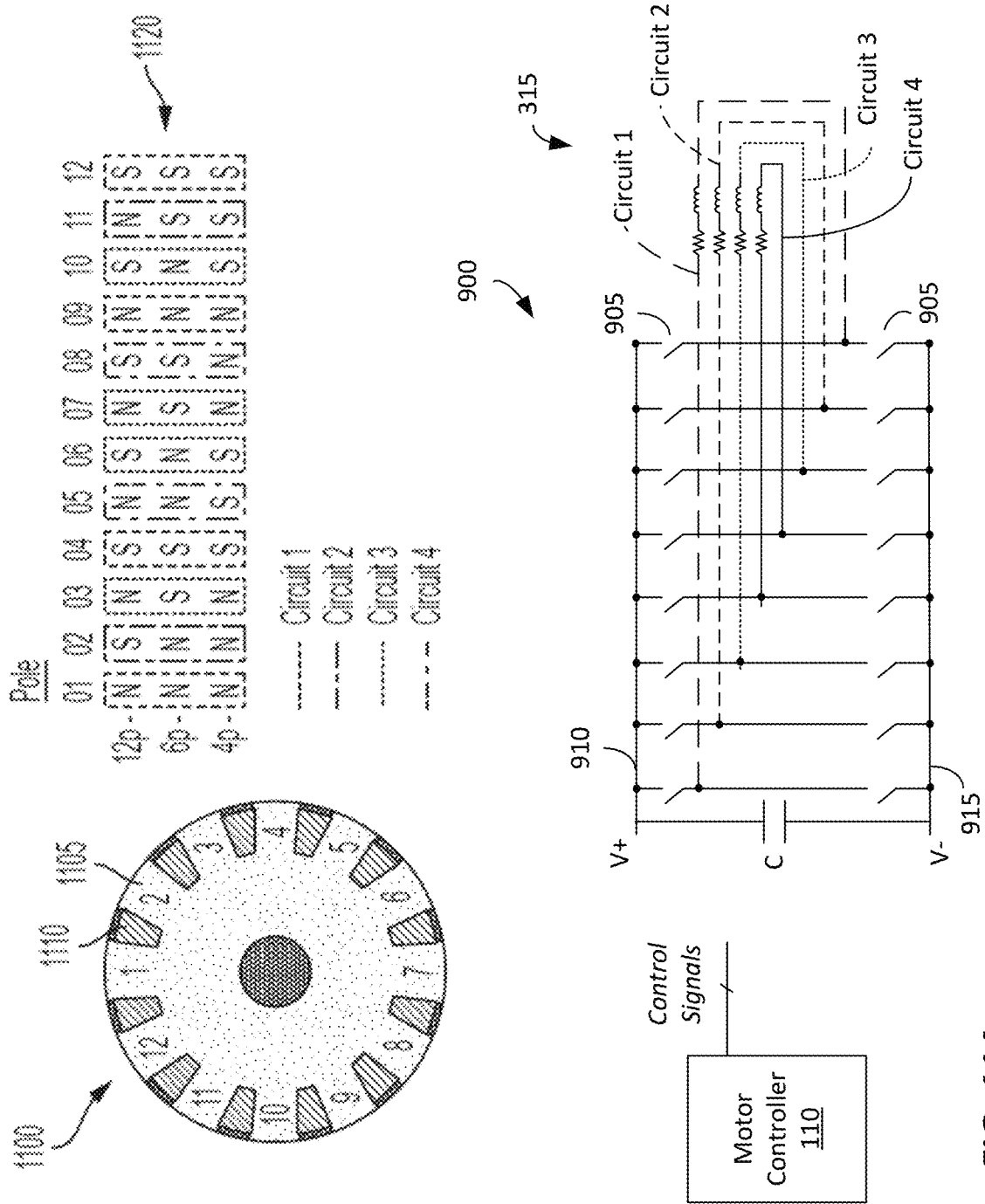
FIGS. 11A-11D illustrate rotor pole configurations for a rotor assembly in accordance with some embodiments.
Figure 11B:
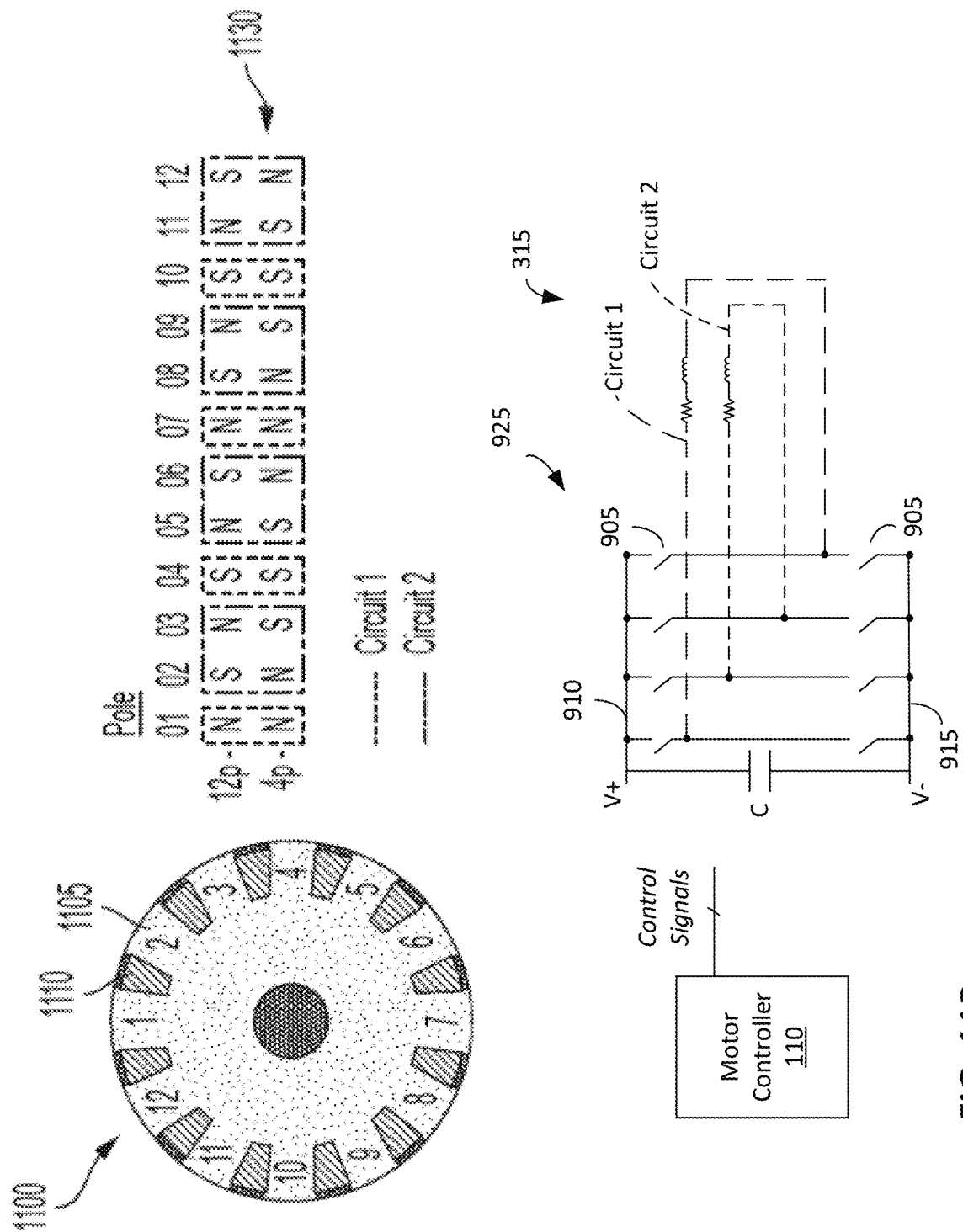
Figure 11C:
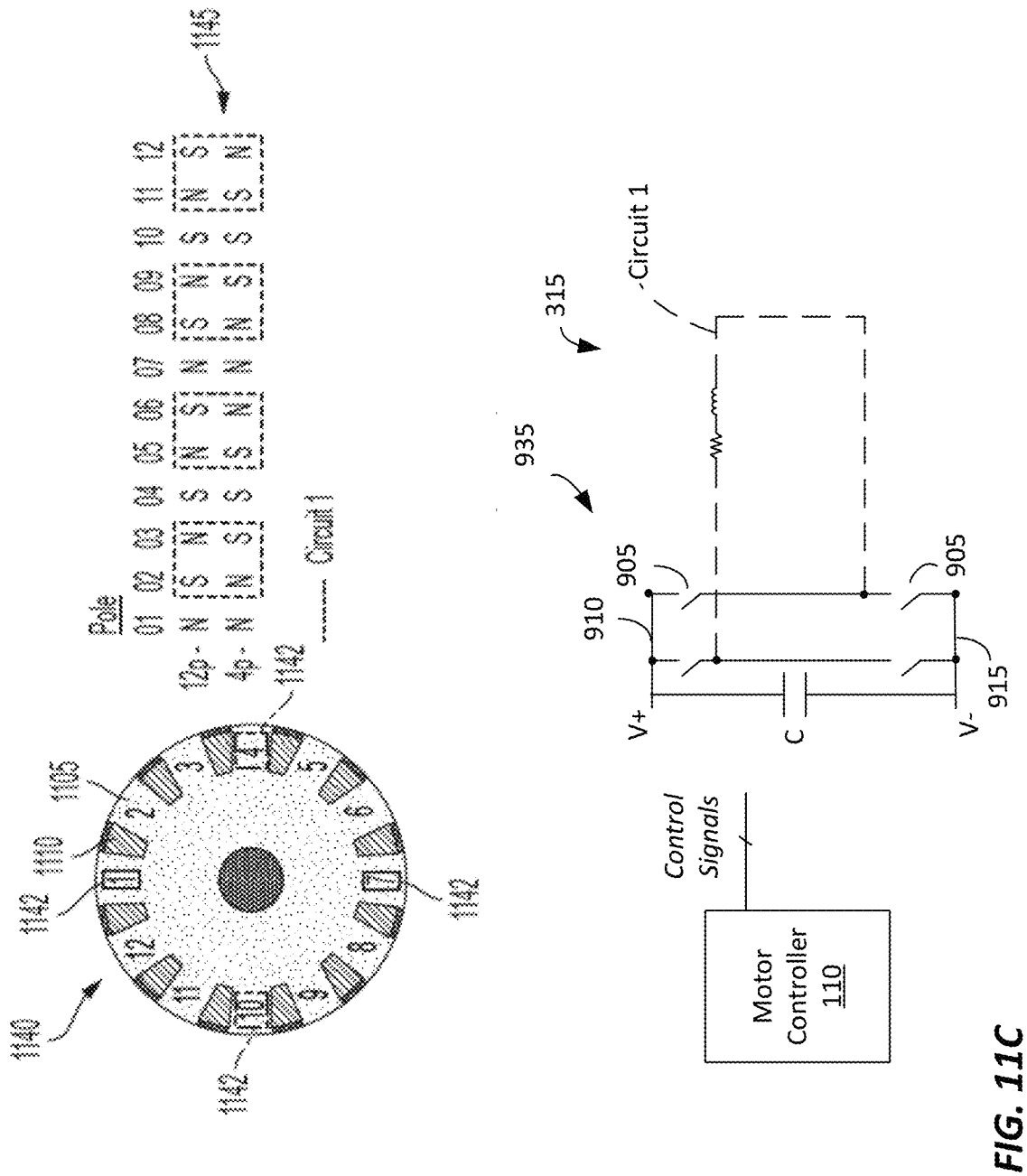

FIGS. 11A-C illustrate examples of different pole configurations for a rotor assembly 1100, which is an example of the rotor assembly 185 of FIG. 1. The rotor assembly 1100 has twelve rotor slots 1105 separating twelve rotor teeth 1110, where each rotor slot 1105 has at least one rotor winding of the rotor windings 315. FIG. 11A also shows the circuit 900 of FIG. 9A, which may be used to drive the windings 315 of the rotor assembly 1100. Additionally, FIG. 11A illustrates a pole map 1120 illustrating a magnetic pole for each of the twelve potential poles (one for each rotor slot/tooth). The pole map 1120 shows the mapping of magnetic poles to each of the twelve potential poles for three different configurations: a twelve pole configuration, a six pole configuration, and a four pole configuration. In the twelve pole configuration, the rotor assembly 185 has twelve effective poles that alternate polarity (N-S-N-S . . . -N-S). In the six pole configuration, the rotor assembly 185 has six effective poles, with each effective pole including a pair of adjacent poles that are controlled to have the same polarity. Each effective pole alternates polarity. For example, poles 1 and 2 form a first effective pole and both have a polarity N; poles 3 and 4 form a second effective pole and both have a polarity S; and so on. In the four pole configuration, the rotor assembly 185 has four effective poles, with each effective pole including three adjacent poles that are controlled to have the same polarity. Each effective pole alternates polarity. For example, poles 1, 2, and 3 form a first effective pole and have a polarity N; poles 4, 5, and 6 form a second effective pole and have a polarity S; and so on.

The twelve poles of the rotor assembly 1100 are each associated with (i.e., controlled by) one of the four circuits of the rotor windings and, thus, one of the four switch pairs of the circuit 900. In particular, poles 1, 4, 9, and 12 are associated with circuit 1; poles 2 and 11 are associated with circuit 2; poles 3, 6, 7, and 10 are associated with the circuit 3; and poles 5 and 8 are associated with the circuit 4. Each circuit may include more than one winding, loop of at least one turn, or conductor, but is represented in the diagram as a single winding with a resistive component. In addition to an inductance and resistance, the winding, loop, or conductor can also define a capacitance on the rotor and/or rotor pole. Rotor windings and/or circuits may be electrically isolated from one another.

FIG. 11B illustrates the rotor assembly 1100, along with the circuit 925 of FIG. 9B, which may be used to drive the windings 315 of the rotor assembly 1100. Additionally, FIG. 11B illustrates a pole map 1130 illustrating a magnetic pole for each of the twelve potential poles (one for each rotor slot/tooth). The pole map 1130 shows the mapping of magnetic poles to each of the twelve potential poles for two different configurations: a twelve pole configuration and a four pole configuration. In the twelve pole configuration, the rotor assembly 185 has twelve effective poles that alternate polarity (N-S-N-S . . . -N-S). In the four pole configuration, the rotor assembly 185 has four effective poles, with each effective pole including three adjacent poles that are controlled to have the same polarity. Each effective pole alternates polarity. For example, poles 12, 1, and 2, form a first effective pole and have a polarity N; poles 3, 4, and 5 form a second effective pole and have a polarity S; and so on.

Figure 11D:
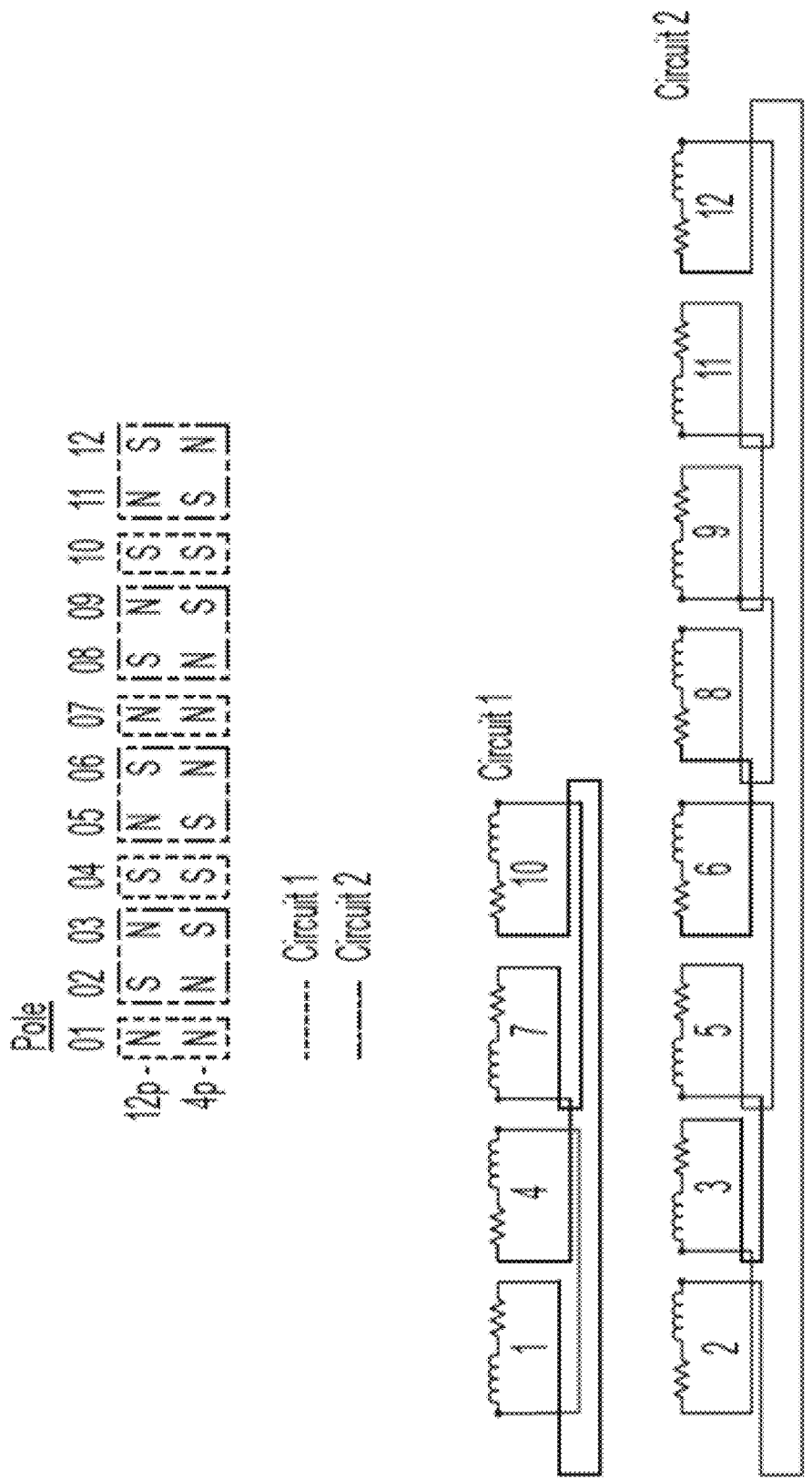

The twelve poles of the rotor assembly 1100 are each associated with (i.e., controlled by) one of the two circuits of the rotor windings and, thus, one of the two switch pairs of the circuit 925. In particular, poles 1, 4, 7, and 10 are associated with circuit 1; and poles 2, 3, 5, 6, 8, 9, 11, and 12 are associated with circuit 2. Each circuit may include more than one winding, but is represented in the diagram as a single winding with a resistive component. For example, FIG. 11D illustrates an example of circuit 1 and circuit 2 of FIG. 11B in further detail, where each of the twelve poles is associated with a rotor winding (and a resistive component).

FIG. 11C illustrates a rotor assembly 1140, along with circuit 935 of FIG. 9C, which may be used to drive the windings 315 of the rotor assembly 1140. The rotor assembly 1140 is similar to the rotor assembly 1100, except that the rotor assembly 1140 further includes fixed coils for poles 1, 4, 7, and 10 (i.e., fixed poles 1142). In some examples, further include permanent magnets arranged to align with the poles 1, 4, 7, and 10 (i.e., so that the fixed poles are formed from a combination of fixed permanent magnets and the fixed coils). Additionally, FIG. 11C illustrates a pole map 1145 illustrating a magnetic pole for each of the twelve potential poles (one for each rotor slot/tooth). The pole map 1145 shows the mapping of magnetic poles to each of the twelve potential poles for two different configurations: a twelve pole configuration and a four pole configuration. In the twelve pole configuration, the rotor assembly 185 has twelve effective poles that alternate polarity (N-S-N-S . . . -N-S). In the four pole configuration, the rotor assembly 185 has four effective poles, with each effective pole including three adjacent poles that are controlled to have the same polarity. Each effective pole alternates polarity. For example, poles 12, 1, and 2, form a first effective pole and have a polarity N; poles 3, 4, and 5 form a second effective pole and have a polarity S; and so on.

The eight poles of the rotor assembly 1100 that are not the fixed poles 1142 are each associated with (i.e., controlled by) the circuit (circuit 1) of the rotor windings, and, thus, the switch pair of the circuit 935. In particular, poles 2, 3, 5, 6, 8, 9, 11, and 12 are associated with circuit 1. Each circuit may include more than one winding, loop of at least one turn, or conductor, but is represented in the diagram as a single winding with a resistive component. In addition to an inductance and resistance, the winding, loop, or conductor can also define a capacitance on the rotor and/or rotor pole. Rotor windings and/or circuits may be electrically isolated from one another.

In each of the configurations of the pole maps 1120, 1130, and 1145, the poles of the rotor assembly 185 are shown at a given moment in time. That is, at a given moment in time when the motor controller 110 is controlling the circuit 900, current through the rotor windings 315 generates magnetic fields resulting in the illustrated set of poles of the particular configuration shown in each map. As the generated magnetic fields cause the rotor assembly 1100 to rotate, the motor controller 110 controls the circuit 900, 925, or 935 (as the case may be) to drive current through the rotor windings 315 that cause the poles to rotate such that, at a second moment in time, each of the effective rotor poles has an inverted polarity. The continuously changing currents in the rotor windings 315 cause the magnetic fields to continuously change and, thereby, rotate the rotor assembly 1100.

Figure 12:
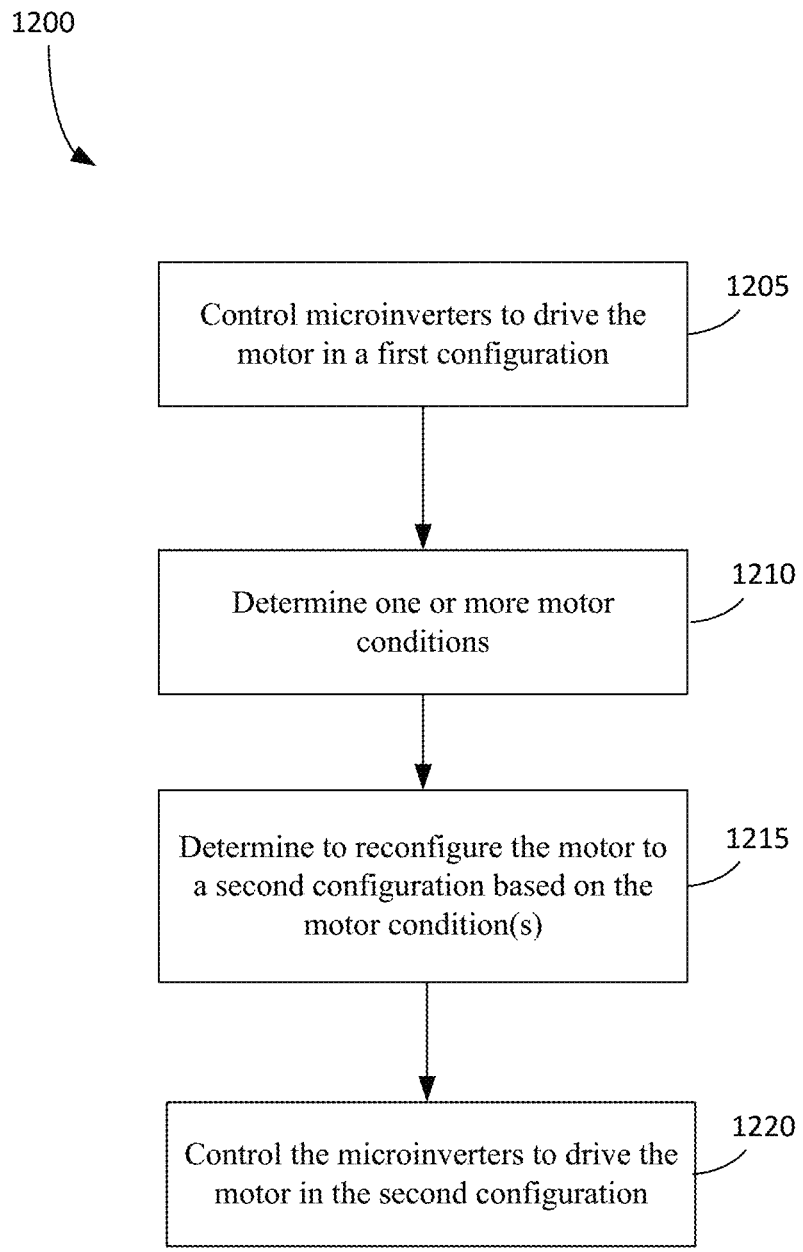
FIG. 12 illustrates a process for controlling a synchronous motor in accordance with some embodiments.

FIG. 12 illustrates a process 1200, also referred to as a flowchart 1200, for controlling a synchronous motor. The process 1200 is described as being carried out by the motor system 100. However, in some embodiments, the process 1200 may be implemented by another motor system. Additionally, although the blocks of the process 1200 are illustrated in a particular order, in some embodiments, one or more of the blocks may be executed partially or entirely in parallel, may be executed in a different order than illustrated in FIG. 12, or may be bypassed.

In block 1205, the motor controller 110 controls microinverters of one or more microinverter networks 175 to drive the synchronous motor 120 in accordance with a first motor configuration of the plurality of motor configurations of the motor assembly 190. For example, the first motor configuration may be an initial motor configuration used, for example, at motor startup, or may be a motor configuration in use in on-going operation of the synchronous motor 120. In some embodiments, the initial motor configuration may be the configuration having the highest number of poles. In other embodiments, the starting motor configuration may provide the highest amount of efficiency used for the starting torque response, or startup region. The first motor configuration, like each of the plurality of motor configurations, is associated with one of the motor control configurations 195 of the motor controller 110. Accordingly, to control the microinverters of one or more microinverter networks 175 to drive the synchronous motor 120 in accordance with the first motor configuration, the motor controller 110 drives the motor assembly 190 according to a first motor control configuration of the motor control configurations 195.

More particularly, the first motor control configuration may define a control algorithm or scheme for the motor assembly 190. Based on the control scheme, the motor controller 110 determines motor conditions and generates control signals to the one or more microinverter networks 175 to drive current in the windings of the synchronous motor 120 to rotate the rotor assembly 185. Based on the control scheme, each of the motor control configurations 195, including the first control configuration, defines the pole configurations for the motor assembly 190. In the case of the one or more microinverter networks 175 including the stator microinverter network 210, the motor controller 110 generates control signals to the stator microinverter network 210 based on determined motor conditions, and thereby defines the stator pole configuration. In the case of the one or more microinverter networks 175 including the rotor microinverter network 310, the motor controller 110 generates control signals to the rotor microinverter network 310 based on determined motor conditions, and thereby defines the rotor pole configuration. In some embodiments, where the motor assembly 190 includes the rotor drive circuit 321 (e.g., and not a rotor microinverter network), in block 1220, in addition to the motor controller 110 controlling a plurality of microinverters of a stator microinverter network to drive the synchronous motor in accordance with the first configuration, the motor controller 110 generates control signals to the rotor inverter 322 based on determined motor conditions to define the rotor pole configuration for the first configuration.

As described with respect to FIGS. 10A-11C, the stator and rotor pole configurations define the number of effective or active poles for the stator and rotor assemblies 180, 185, respectively. In other words, the stator and rotor pole configurations define the number of effective or active poles for the stator and rotor assemblies 180, 185, respectively. As a result of the motor controller 110 driving the one or more microinverter networks 175 in accordance with the control scheme of the first control configuration, the motor assembly 190 is configured in the first motor configuration.

Taking the stator assembly 1000 of FIGS. 10A-D, for example, when the first configuration defines the stator configuration 1005 (FIG. 10A), the motor controller 110 generates control signals to the stator microinverter network 210 to independently control each of the thirty-six windings 610, providing thirty-six active poles. For example, the motor controller 110 may generate and provide thirty-six independent commands, each command provided to a subgroup of one or more microinverters of the stator microinverter network 210 that is associated with one of the stator windings 610. The command may indicate, directly or implicitly, which power switching elements of the microinverter subgroup to enable and disable. For example, with reference to the stator microinverter network circuit 835 of FIG. 8E, a command may indicate whether each of the four power switching elements of the microinverter 840 should be enabled or disabled to control the current through the stator winding 802a. When the stator microinverter network circuit 835 of FIG. 8E is used in the stator assembly 1000 having the stator configuration 1005, such that the stator assembly 1000 includes thirty-six microinverters 840, the motor controller 110 may provide thirty-six independent commands, one to each microinverter 840.

In contrast, when the first configuration defines the stator configuration 1030 (FIG. 10B), the motor controller 110 generates control signals to the stator microinverter network 210 to independently control the pair of windings of each of the eighteen effective poles 1135 provided by the thirty-six windings 610. Accordingly, the control signals to the microinverters driving current in each pair of stator windings 610 of each of the eighteen effective poles 1135 are shared control signals among these microinverters. In other words, the microinverters for each group of stator windings 610 that are controlled together to act as an effective pole 1135 are controlled in unison. For example, when the stator microinverter network circuit 835 of FIG. 8E is used in the stator assembly 1000 having the stator configuration 1030 (FIG.

10B), the stator assembly 1000 still has thirty-six microinverters 840, but the thirty-six microinverters 840 are grouped into eighteen pairs of two microinverters 840 (a pair for each effective pole 1135). Thus, in this example, the motor controller 110 may provide eighteen independent commands, one to each pair of microinverters 840. By jointly controlling pairs of the microinverters 840 with a shared command, the current through the stator windings associated with the pair of microinverters 840 is the same (or approximately the same), causing neighboring windings or conductors to have the same polarity and act as a single pole (i.e., an effective pole).

Accordingly, whereas the motor controller 110 may generate thirty-six independent commands for the stator configuration 1005 of FIG. 10A, the motor controller 110 may generate half as many (eighteen) independent commands for the stator configuration 1030 of FIG. 10B. The number of independent commands that the motor controller 110 generates corresponds to the number of active, effective poles of the stator configuration.

In the case of the one or more microinverter networks 175 including the rotor microinverter network 310, the motor controller 110 generates control signals to the rotor microinverter network 310 based on determined motor conditions to define the rotor pole configuration in a similar manner as the motor controller 110 generates control signals to the stator microinverter network 210. For example, the motor controller 110 may generate an independent commands for each active, effective pole of the particular rotor configuration. The rotor differs from the stator in that it is operated in synchrony with the field in the air gap. Whereas the stator coil currents must be updated and even reverse polarity to maintain correct orientation with the air gap field, the rotor merely varies the bulk coil current to achieve the desired distribution of air gap field energy. FIG. 11A illustrates how, in a machine which is reconfigured to have a slot-to-pole ratio of 1:1, 6:1, or 4:1, the control of mmf through individual teeth to the air gap in each of these configurations may be decomposed into 3 distinct groups, such that 1, 2, or 3 distinct current commands may be issued and controlled. This issue and control embodiment may be logically, in the case of micro-inverters on each slot, or physically, in the case of physical conductors encircling the rotor structure to enforce the desired mmf-through-tooth pattern. Note, in the case of the logical grouping, that the rotor issue and control implementation is the same as the stator's synchronous-frame commands.

In the case that the stator assembly 180 is not associated with a microinverter network 175 (see, e.g., FIG. 2B), the motor controller 110 may generate control signals to the stator drive circuit 225 (e.g., to drive the stator network 230).

In the case that the rotor assembly 185 is not associated with a microinverter network 175 (see, e.g., FIG. 3B), but includes rotor windings 315, the motor controller 110 generates control signals to the rotor power circuit 330 to control the rotor windings 315. In the event that the rotor assembly 185 includes permanent magnets 320, but does not include rotor windings 315, the motor controller 110 may not generate controls signals for the rotor drive circuit 325.

In some embodiments, to generate the particular commands and control signals to the power switching elements of the one or more microinverters 175, the motor controller 110 may use field-oriented controls in a synchronous reference frame using a current or voltage source inverter. For example, for a motor assembly 190 having three phases (A, B, C), the stator may be represented in a stationary stator ABC reference frame, with current in the A phase windings being $i_A$, current in the B phase windings being $i_B$, and current in the C phase windings being $i_C$. The stationary ABC reference frame can be transformed into the rotational, synchronous reference frame dqnull by the given expression:

$$\begin{bmatrix} i_d \\ i_q \\ i_{null} \end{bmatrix} = [K_{CP}] \begin{bmatrix} i_A \\ i_B \\ i_C \end{bmatrix}$$

where $K_{CP}$ is the Clarke-Park transformation, defined as:

$$[K_{CP}] = \sqrt{\frac{2}{3}} \times \begin{bmatrix} \cos(\theta_R^e - k\Delta_k) & \cos(\theta_R^e - 120°) & \cos(\theta_R^e - 240°) \\ -\sin(\theta_R^e - k\Delta_k) & -\sin(\theta_R^e - 120°) & -\sin(\theta_R^e - 240°) \\ \frac{1}{\sqrt{2}} & \frac{1}{\sqrt{2}} & \frac{1}{\sqrt{2}} \end{bmatrix}$$

and where θ is the rotational position of the rotor assembly 185 (e.g., between 0 and 360 degrees).

Further, the inverse of this matrix is the transpose and, accordingly, the currents $i_d$, $i_q$, and $i_{null}$ may be transformed back into the stationary ABC reference frame using the following equation:

$$\begin{bmatrix} i_A \\ i_B \\ i_C \end{bmatrix} = [K_{CP}]^T \begin{bmatrix} i_d \\ i_q \\ i_{null} \end{bmatrix}$$

Additionally, when the motor assembly 190 includes additional phases (i.e., K stator phases), the kth column of the transformation matrix can be given by the following equation:

$$[K_{CP}]_k = \sqrt{\frac{2}{K}} \times \begin{bmatrix} \cos(\theta_R^e - k\Delta_k) \\ -\sin(\theta_R^e - k\Delta_k) \\ \frac{1}{\sqrt{2}} \end{bmatrix}$$

$$\Delta_K = \begin{cases} 180°/K & K = 2, 4, 6, \\ 360°/K & K = 3, 5, 7, \end{cases}$$

$$k = 0, 1, \ldots K - 1$$

In operation, the motor controller 110 may determine a desired motor characteristic (e.g., a desired motor speed or torque), which may be, for example, input via the input/output device 160 or retrieved from the memory 145. The motor controller 110 may determine a desired motor current for rotor and stator based on the desired motor characteristic, then transform the stator currents according to the previous relationship to command the desired currents in the stationary stator coils, i.e. desired $i_A$, desired $i_B$, and desired $i_C$. For example, the motor controller 110 may include a lookup table or function that maps the desired motor characteristic to the desired motor current in each rotor and stator phase.

The motor controller 110 may further determine the rotational position of the rotor (θ) based on an output from the position sensor 170. The position sensor 170 may include, for example, Hall sensors or a rotary encoder that outputs a signal indicative of the rotor position to the motor controller 110. In other embodiments, the motor controller 110 determines the rotational position of the rotor (θ) based on current or voltage levels on the stator windings 215, sometimes referred to as a "sensorless" rotor position determination.

The motor controller 110 may then transform the desired motor currents from the stationary stator reference frame to the dqnull reference frame using the above-noted Clarke-Park transformation (e.g., to obtain desired_$i_d$, desired_$i_q$, desired_$i_{null}$). In some embodiments, the motor controller 110 may directly translate the desired motor characteristic to the desired currents in the dqnull reference frame, e.g., using a lookup table.

Additionally, the motor controller 110 may determine the actual current in each phase of the motor assembly 190 (actual_$i_A$, actual_$i_B$, actual_$i_C$), where the actual current is either the measured current in each phase or an estimation of the measured current in each phase. For example, as shown in FIG. 1, the motor system 100 may include current sensors 165 providing an indication of current in each phase of the stator assembly 180. The motor controller 110 may then transform the actual currents from the stationary stator reference frame to the dqnull reference frame using the above-noted Clarke-Park transformation (e.g., to obtain actual_$i_d$, actual_$i_q$, actual_$i_{null}$).

A regulator of the motor controller 110, such as a proportional integral derivative (PID) controller, may compare the actual currents to the desired currents for each axis (e.g., d-axis, q-axis, and null-axis) of the stator assembly 180, and generate control signals (e.g., voltage or current control signals) for each phase of the stator assembly 180 to drive the actual currents to be closer to the desired currents. For example, if the actual current is less than the desired current for one of the axes (e.g., actual_$i_d$<desired_$i_d$), the regulator will increase the voltage (or current) command for the d-axis.

The motor controller 110 will further translate the commands output by the regulator back to the stationary reference frame (e.g., ABC) using the inverse Clark-Park transformation noted above.

To determine a rotor command (e.g., a rotor voltage or rotor current command) or an equivalent rotor response for the operating condition, the motor controller 110 may also map the DQN axes to another rotational reference system, FDQ where D and Q axes are the same as in the DQN reference system, and the F axis is the rotor field axis. The motor controller 110 may use the determined D and Q axes (e.g., actual_$i_d$ and actual_$i_q$) and a measured or estimated rotor field current (e.g., actual_$i_r$) in the following dynamic equations:

$$\begin{bmatrix} \psi_f \\ \psi_d \\ \psi_q \end{bmatrix} = \begin{bmatrix} L_{m,d} + L'_{l,f} & L_{m,d} & 0 \\ L_{m,d} & L_{m,d} + L_{l,d} & 0 \\ 0 & 0 & L_{m,q} + L_{l,q} \end{bmatrix} \begin{bmatrix} i'_f \\ i_d \\ i_q \end{bmatrix}$$

$$\psi_f = f_f(i_f, i_d, i_q)$$
$$\psi_d = f_d(i_f, i_d, i_q)$$
$$\psi_q = f_q(i_f, i_d, i_q)$$

These dynamic equations can be written individually, then written as one line expressions:

$$\frac{d\psi_f}{dt} = v'_f - R'_f i'_f = \bar{v}'_f$$

$$\frac{d\psi_d}{dt} = v_d - R_s i_d + \omega \psi_q = \bar{v}_d + \omega \psi_q$$

$$\frac{d\psi_q}{dt} = v_q - R_s i_q - \omega \psi_d = \bar{v}_q + \omega \psi_d$$

$$\frac{d\psi_{fdq}}{dt} = \bar{v}_{fdq} - \omega J \psi_{fdq}$$

$$J = \begin{bmatrix} 0 & 0 & 0 \\ 0 & 0 & -1 \\ 0 & 1 & 0 \end{bmatrix}$$

And, when expanded into matrix format:

$$\begin{bmatrix} \dot{\psi}_f \\ \dot{\psi}_d \\ \dot{\psi}_q \end{bmatrix} = \begin{bmatrix} 0 & 0 & 0 \\ 0 & 0 & \omega \\ 0 & -\omega & 0 \end{bmatrix} \begin{bmatrix} \psi_f \\ \psi_d \\ \psi_q \end{bmatrix} + \begin{bmatrix} 1 & 0 & 0 \\ 0 & 1 & 0 \\ 0 & 0 & 1 \end{bmatrix} \begin{bmatrix} \bar{v}'_f \\ \bar{v}_d \\ \bar{v}_q \end{bmatrix}$$

A torque equation may be written in the fdq frame as:

$$T = \frac{3}{2} p_p i_{fdq}^T J \psi_{fdq}$$

$$T = \frac{3}{2} p_p (\psi_d i_q - \psi_q i_d)$$

and, substituting $\Psi_d$ and $\Psi_q$ yields:

$$T = \frac{3}{2} p_p \big(((L_{m,d} + L_{l,d}) - (L_{m,q} + L_{l,q})) i_d + L_{m,d} i'_f \big) i_q$$

$$T = \frac{3}{2} p_p \big((L_{m,d} + L_{l,d} - L_{m,q} + L_{l,q}) i_d + L_{m,d} i'_f \big) i_q$$

The motor controller 110 may calculate the rotor command using these above equations for each rotor field winding group or effective rotor pole of the rotor assembly 185 to determine a rotor command for each rotor field winding group. In some embodiments, rather than performing these calculations "on the fly" during motor operation, the motor controller 110 may include a multiple input multiple output (MIMO) table or component that is pre-populated with mappings of various potential motor conditions to multiple output commands (e.g., stator commands and rotor commands) based on the above equations or other field orientated control equations, reducing the computational burden on the motor controller 110 during operation.

The motor controller 110 will then map the translated commands for the phases of the stator to commands for each microinverter of the one or more microinverter networks 175. For example, in some embodiments, the motor controller 110 may use a lookup table to translate a voltage or current command for a first phase into microinverter commands for each stator microinverter associated with the first phase. The motor controller 110 may similarly translate the commands for each other phase to microinverter commands for each stator microinverter associated with the other phases, respectively. The microinverter commands may be or may indicate a pulse-width modulated (PWM) signal for each power switching element of the microinverter receiving the command.

In another embodiment, the motor controller 110 may perform the duties of determining desired pole configuration and respected synchronous-frame currents for the rotor assembly 185 and that stator assembly 180. The motor controller 110 then communicates updated current or voltage commands to the system microinverters, with each microinverter determining the requisite transformation from synchronous reference frame (e.g., DQZ reference frame) to the reference frame of the conductors under its control. To perform the transformation, each stator microinverter may obtain and use that particular microinverter's location (position offset) with respect to the synchronous reference frame through the Clarke-Park transformation. For the rotor microinverters to perform the transformation, each rotor microinverter may determine and use the logical grouping of the rotor windings or poles (see, e.g., the different groupings illustrated in FIGS. 11A-D. Thus, the burden of determining gate control commands to a specific microinverter is removed from the motor controller 110 and distributed among the microinverters. For example, the configuration illustrated in FIG. 7A may be used in this manner, where a motor controller 110 is coupled to controllers 725 in each microinverter 720.

The mapping of the voltage commands to commands for each microinverter of the one or more microinverter networks 175 may be particular to each motor control configuration 195 of the motor assembly 190. For example, each motor control configuration 195 may include one or more lookup tables or other translation functions to map voltage or current commands to microinverter commands. Accordingly, the appropriate number of microinverter commands may be generated for the particular motor configuration associated with the motor control configuration 195. For example, with reference back to the stator configurations 1005 and 1030 of FIGS. 10A and 10B, respectively, the lookup table(s) of the motor control configuration 195 for the stator configuration 1005 may provide thirty-six (36) stator microinverter commands, whereas the lookup table(s) of the motor control configuration 195 for the stator configuration 1030 may provide eighteen (18) stator microinverter commands.

Returning to FIG. 12, in block 1210, the motor controller 110 determines one or more motor conditions of the synchronous motor 120. The motor conditions may include one or more of motor current, motor voltage, motor power, motor torque, rotor rotational speed, rotor rotational acceleration, the present motor configuration (e.g., in this case, the first motor configuration), a received motor command, among other conditions. The motor controller 110 may determine the motor conditions based on output from one or more of the motor sensors 155. For example, the motor controller 110 may receive one or more current values from the current sensors 165 to calculate an overall motor current, average motor current, current per phase, current per stator winding, or the like. Similarly, the motor controller 110 may receive one or more voltage value from one or more voltage sensors of the motor sensors 155 to calculate an overall motor voltage, average motor voltage, voltage per phase, voltage per stator winding, or the like. Additionally, by tracking rotor position over time via the position sensor 170, the motor controller 110 can deduce the rotor rotational speed and/or acceleration. Further, motor torque may be inferred from motor current sensed by the current sensors 165, or may be sensed by a torque sensor of the motor sensors 155. Additionally, motor power may be calculated based on sensed motor current and voltage sensed by motor sensors 155.

As noted, the motor condition determined by the motor controller 110 may be a received motor command for the synchronous motor 120. The received motor command may be, for example, a speed or torque command. The speed or torque command may be, for example, provided by the input/output device 160 to the motor controller 110 or may be retrieved from the memory 145 by the motor controller 110 (e.g., as part of a control program for the synchronous motor 120). The speed or torque command may indicate a requested speed or torque amount, respectively, for the synchronous motor 120.

In block 1215, the motor controller 110 determines, based on the one or more motor conditions, to reconfigure the synchronous motor from the first configuration to a second configuration of the plurality of motor configurations, wherein the first configuration has a first pole count that is different than a second pole count of the second configuration. For example, the motor controller 110 may include a lookup table or other similar function that maps the one or more motor conditions to particular configurations of the plurality of motor configurations. Accordingly, the motor controller 110 may access the lookup table with the one or more motor conditions determined in block 1210, and the lookup table may indicate that the one or more motor conditions map to the second configuration.

In some embodiments, when one or more of the motor condition(s) (e.g., motor current, motor torque, motor speed, motor acceleration, or motor power) reaches a threshold value (e.g., meets, exceeds, or falls below, depending on the condition), the motor controller 110 may determine to reconfigure the synchronous motor to the second configuration. For example, the plurality of motor configurations may have a sequence or order (e.g., high pole count to low pole count) and, when an actual motor torque or a received torque command falls below a torque threshold, the motor controller 110 may determine to change to a motor configuration later in the sequence of motor configurations (i.e., having a lower pole count, in this example). In some embodiments, the motor controller 110 may include one or more further thresholds in addition to the torque threshold, such as a motor speed threshold wherein the motor controller 110 changes to the second motor configuration (having a lower pole count) when the motor speed is above a speed threshold and the actual or requested torque falls below a torque threshold. The motor controller 110 may use various combinations of thresholds and motor conditions to determine whether to reconfigure the motor and which motor configuration to select.

In some embodiments, the motor controller 110 may determine an efficiency rating (or power "cost") for the first motor configuration given the determined motor conditions, and estimate the efficiency rating for the second motor configuration. When the efficiency rating for the second motor configuration exceeds the first motor configuration, or when the efficiency rating for the second motor configuration exceeds the first motor configuration by at least a threshold amount, the motor controller 110 determines to reconfigure the synchronous motor 120 to the second motor configuration. In some embodiments, the motor controller 110 may estimate the efficient rating for each motor configuration of the plurality of motor configurations and select the motor configuration that is most efficient, given the determined motor conditions, as the second motor configuration to which the synchronous motor 120 is reconfigured.

In block 1220, the motor controller 110 controls the plurality of microinverters of the microinverter network to drive the synchronous motor in accordance with the second configuration. For example, the motor controller 110 controls the plurality of microinverters of the microinverter network to drive the synchronous motor in accordance with the second configuration using similar techniques as described above with respect to block 1205. More particularly, the second motor configuration is associated with one of the motor control configurations 195 of the motor controller 110. Accordingly, to control the microinverters of one or more microinverter networks 175 to drive the synchronous motor 120 in accordance with the second motor configuration, the motor controller 110 drives the motor assembly 190 according to a second motor control configuration of the motor control configurations 195. More particularly, the second motor control configuration may define a control algorithm or scheme for the motor assembly 190. Based on the control scheme, the motor controller 110 determines motor conditions and generates control signals to the one or more microinverter networks 175 to drive current in the windings of the synchronous motor 120 to rotate the rotor assembly 185.

The second control configuration defines the pole configurations for the motor assembly 190. In the case of the one or more microinverter networks 175 including the stator microinverter network 210, the motor controller 110 generates control signals to the stator microinverter network 210 based on determined motor conditions, and thereby defines the stator pole configuration. In the case of the one or more microinverter networks 175 including the rotor microinverter network 310, the motor controller 110 generates control signals to the rotor microinverter network 310 based on determined motor conditions, and thereby defines the rotor pole configuration. In some embodiments, where the motor assembly 190 includes the rotor drive circuit 321 or 325 (e.g., and not a rotor microinverter network), in block 1220, in addition to the motor controller 110 controlling the plurality of microinverters of the stator microinverter network to drive the synchronous motor in accordance with the second configuration, the motor controller 110 generates control signals to the rotor inverter 322 or 350 based on determined motor conditions to define the rotor pole configuration for the second configuration.

As described with respect to FIGS. 10A-11C, the stator and rotor pole configurations define the number of effective or active poles for the stator and rotor assemblies 180, 185, respectively. In other words, the stator and rotor pole configurations define the number of effective or active poles for the stator and rotor assemblies 180, 185, respectively. As a result of the motor controller 110 driving the one or more microinverter networks 175 in accordance with the control scheme of the second control configuration, the motor assembly 190 is configured in the second motor configuration.

In some embodiments, the motor controller 110 implements a transition control mode during a transition period between the first and second motor configuration. In the transition control mode, the motor controller 110 will reduce the stator d-axis command corresponding to the given rotor pole in synchronicity to rotor pole movement and current. The controller 220 dials currents down both on the d-axis and rotor pole for the given pole that is changing polarity. The other poles can see an increase in net torque production during transition period. In embodiments where the microinverter networks 175 include the stator microinverter network 210, because of the presence of the stator microinverter network 210, the motor controller 110 is able to change the pole configuration of the stator assembly 180 without changing the series and parallel connections of the stator windings 215.

In some embodiments, in the transition control mode, the motor controller 110 identifies a separate current target for each slot of the assembly to be reconfigured (e.g., the stator assembly 180, the rotor assembly 185, or both), which can be the superposition of two adjacent configurations. The motor controller 110 may accomplish the transition on a time basis (e.g. transition from 12 poles to 6 poles within 100 ms or another time period), or with a weighted superposition of the first and second configurations (e.g., 12- and 6-pole configuration).

In some embodiments, when the second configuration is not adjacent to the first configuration, the controller 110 may control the motor assembly to an intermediate configuration as an intermediate step, and then transition to the second configuration. For example, with reference to FIG. 11A, where the rotor assembly 185 may have a 12-, 6-, and 4-pole configuration, the 12-pole and 6-pole configurations are considered adjacent, and the 6-pole and 4-pole configurations may be considered adjacent, whereas the 12-pole and 4-pole configurations are not considered adjacent. When the motor controller determines to transition from the 12-pole configuration (a first configuration) to the 4-pole configuration (a second configuration) based on determined motor conditions, the motor controller 110 may first control the motor assembly 190 to be in the 6-pole configuration as an intermediate state, and then control the motor assembly 190 to be in the 4-pole configuration.

For the stator assembly 180, the slot currents are continually changing according to the position and pole configuration of the rotor assembly 185. Accordingly, the stator windings 215 may only be "static" when the machine is at zero speed. For the rotor assembly 185, slot commands may be static in terms of their position for a given configuration, but individual switches are continually transitioning to achieve the desired rotor current command and/or power transfer. In the time-based transition, the slots (on stator and rotor assemblies 180, 185) corresponding to the "obsoleted" poles would see their command decreased to zero (possibly even reversed), while the slots corresponding to the "continued" poles would see their command adjusted to maintain torque output. Obsoleted poles may be those poles that in the first configuration are active, but in the second configuration become inactive. Continued poles may be those poles that are active in the first configuration, and remain active in the second configuration.

Accordingly, by executing blocks 1205, 1210, 1215, and 1220, the motor controller 110 reconfigures the motor 120, and this reconfiguration may include one or more of changing the pole count, winding pattern, mmf-distribution, current distribution, and/or voltage distribution within the motor 120 (e.g., of the (e.g., the stator assembly 180, the rotor assembly 185, or both).

In some embodiments, after executing block 1220, the motor controller 110 returns to block 1210. Thus, the motor controller 110 may continuously loop through the process 1200, monitoring motor conditions over time and adjusting the motor configuration of the synchronous motor 120 as dictated by the motor conditions.

In some embodiments, block 1205 is bypassed and the process 1200 begins at block 1210, for example, at startup of the synchronous motor 120. For example, a motor command received by the motor controller 110 (serving as a motor condition of the one or more motor conditions in block 1210) may map to a particular motor configuration. Here, in block 1215, the motor controller 110 determines a motor configuration based on the motor condition, using similar techniques as described above with respect to block 1215. Then, in block 1220, the motor controller 110 controls the synchronous motor in the determined motor configuration.

In some embodiments of the process 1200, the motor assembly 190 may not include a microinverter network 175 and, rather, the motor 120 is reconfigured through reconfiguration of the rotor assembly 185 via the rotor drive circuit 321 or 325. Accordingly, in some embodiments, in block 1205, the motor controller 110 controls an inverter network to drive the motor 120 in a first configuration. The inverter network, in this sense, may be the rotor inverter 322, the rotor inverter 350 in embodiments in which the motor assembly 190 does not include a microinverter network 175 or includes a stator microinverter network, or the inverter network may be the rotor microinverter network 310 or the stator microinverter network 210. Examples of the motor controller 110 controlling the inverter network, in whichever of the noted forms it may take, to drive the motor 120 in the second configuration are provided in preceding discussions. The motor controller 110 may further execute blocks 1210 and 1215 similarly to embodiments for controlling a motor with a microinverter network. Then, in block 1220, the motor controller 110 may control the inverter network to drive the motor 120 in the second configuration. Again, examples of the motor controller 110 controlling the inverter network, in whichever of the noted forms it may take, to drive the motor 120 in the second configuration are provided in preceding discussions.

In some embodiments of the process 1200, the motor being controlled is not a synchronous motor but, rather, an asynchronous motor.

Figure 13:
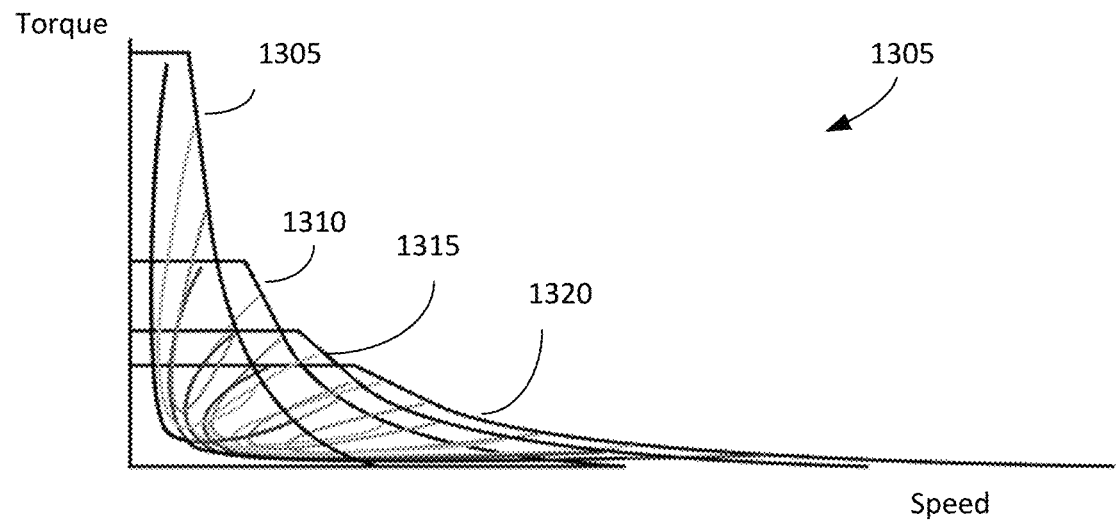
FIG. 13 illustrates a graph of speed and torque efficiency for example motor configurations in accordance with some embodiments.

FIG. 13 illustrates a graph 1300 of speed and torque efficiency for four example motor configurations of the synchronous motor 120. The graph includes four plots 1305, 1310, 1315, and 1320, one for each configuration, where the configurations progressively have fewer poles from left to right. For example, plot 1305 is associated with the configuration having the highest poles, and plot 1320 is associated with the configuration having the fewest poles. Generally, a higher pole count provides higher torque capability, but with a limited speed range, whereas lower pole count provides a higher speed range, but with lower torque capability. The two intermediate configurations provide various virtual gearings for the synchronous motor 120. Beyond just the torque-speed range, efficiency of operating points can be tuned across each configuration to identify a preferred or most efficient point to operate for a given load demand.

Application Examples

FIGS. 14-20 illustrate flow charts for example applications or use-cases for the motor system 100 having reconfigurable/adaptive capabilities. Each of the blocks of the flow chart may be implemented by the motor system 100 using, for example, techniques and features described in the preceding sections.

Figure 14:
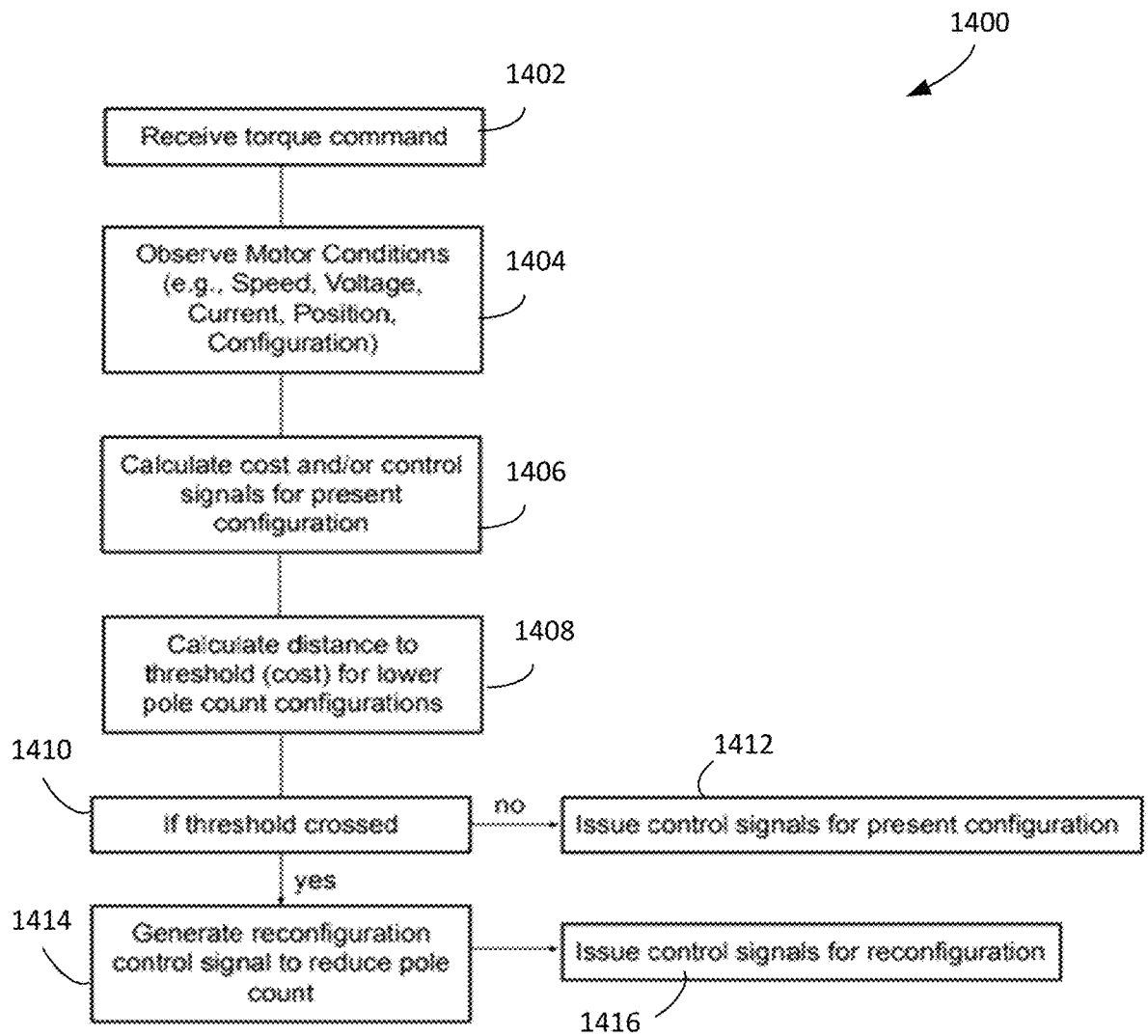
FIGS. 14-20 illustrate processes for controlling a synchronous motor in accordance with some embodiments.

FIG. 14 illustrates a flow chart 1400. In block 1402, the motor controller receives a torque command (e.g., via the input/output device 160 or from the memory 145). In block 1404, the motor controller determines one or more motor conditions (e.g., similar to block 1210). In block 1406, the motor controller 110 calculates a cost and/or control signals for a present motor configuration of the synchronous motor 120. In block 1408, the motor controller calculates a distance or difference between the calculated cost and respective cost estimates for one or more other motor configurations of the synchronous motor 120 having a lower pole count than the present motor configuration. In block 1410, the motor controller 110 determines whether the difference exceeds a threshold (e.g., indicating at least a certain efficiency benefit could be gained by switching configurations). When the threshold is not crossed, in block 1412, the motor controller 110 issues the control signals for the present motor configuration (i.e., the synchronous motor 120 does not change configurations). When the threshold is crossed, in block 1414, the motor controller 110 selects one of the motor configurations (a second configuration) having the lower pole count and having a difference that exceeds the threshold, and generates control signals to reconfigure the synchronous motor 120 to the second configuration. In block 1416, the motor controller 110 issues the control signals to reconfigure the synchronous motor 120 to the second configuration. At least in some examples, the flow chart 1400 may be considered a specific example of the flow chart 1200. For example, in the flow chart 1400, blocks 1402 and 1404 may correspond to block 1210 of the process 1200, blocks 1406-1410 may correspond to block 1215, and blocks 1414-1416 may correspond to block 1220.

Figure 15:
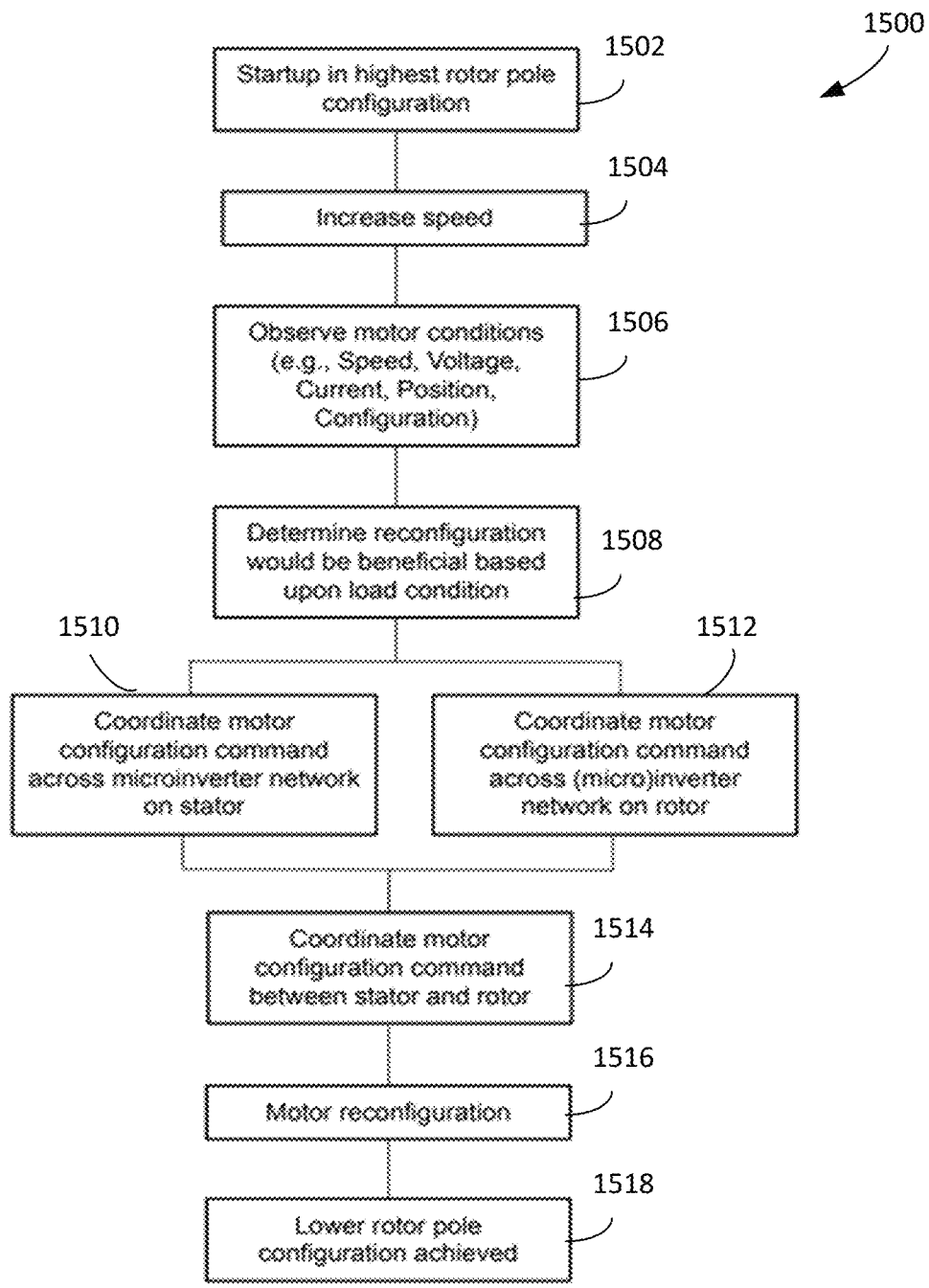

FIG. 15 illustrates a flow chart 1500. In block 1502, the motor controller 110 controls the synchronous motor 120 in a first configuration that has the highest rotor pole count of the plurality of configurations of the synchronous motor 120. In block 1504, the motor controller 110 controls the motor drive circuit 115 to increase the speed of the synchronous motor 120. In block 1506, the motor controller 110 determines one or more motor conditions (e.g., similar to block 1210). In block 1508, the motor controller 110 determines that reconfiguring the synchronous motor 120 to a second (lower pole count) configuration would be beneficial (e.g., to increase efficiency while still meeting a load demand) based upon a load condition of the motor 120 (e.g., determined in block 1506). In block 1510, the motor controller 110 coordinates a motor configuration command across microinverters of the stator microinverter network 210. In block 1512, the motor controller 110 coordinates a motor configuration command across microinverters of the rotor microinverter network 310, across the rotor inverter 322, or across the rotor inverter 350. In block 1514, the motor controller 110 coordinates motor configuration commands between the stator assembly 180 and rotor assembly 185 (and their respective drive circuits). In block 1516, the motor controller 110 reconfigures the stator assembly 180 and the rotor assembly 185 to the second motor configuration. For example, the motor controller 110 controls the drive circuit 115 (e.g., a stator microinverter network of the microinverter network(s) 175) to reconfigure the stator assembly 180 to the second configuration, and the motor controller 110 controls the drive circuit 115 (e.g., a rotor microinverter network of the microinverter network(s) 175, a rotor inverter 322, or a rotor inverter 350) to reconfigure the rotor assembly 185 to the second configuration. In block 1518, the motor controller 110 continues to control the motor 120 in the second (lower pole count) configuration. At least in some examples, the flow chart 1500 may be considered a specific example of the flow chart 1200. For example, in the flow chart 1500, blocks 1502 and 1504 may correspond to block 1205; block 1506 may correspond to block 1210 of the process 1200; block 1508 may correspond to block 1215; and blocks 1510-1518 may correspond to block 1220.

Figure 16:
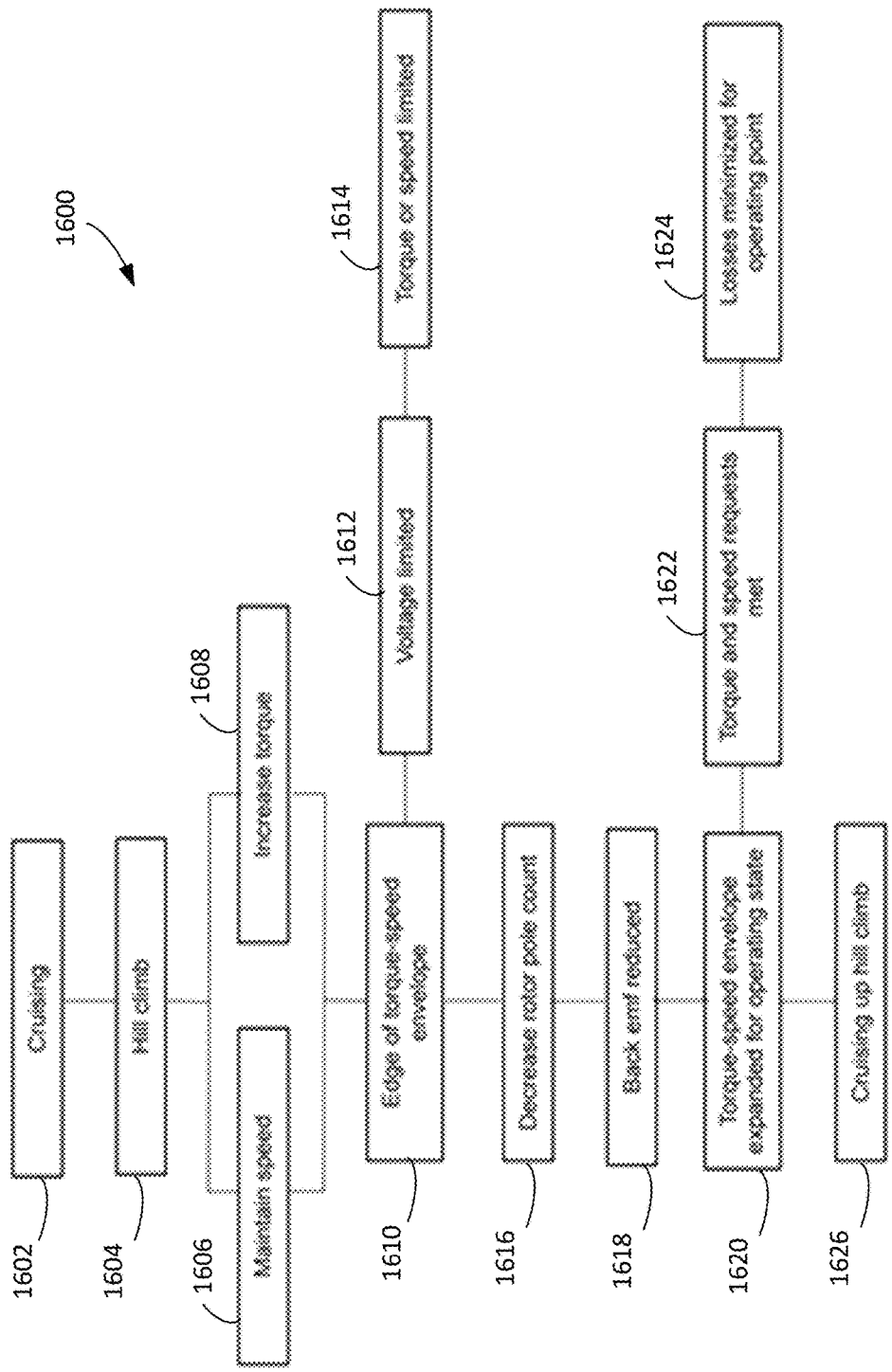

In FIG. 16, illustrates a flow chart 1600. In the flow chart 1600, the motor system 100 may be in a vehicle (e.g., an automobile, a truck, a bus, or the like) as a traction/drive motor for propelling the vehicle. In block 1602, the motor controller 110 controls the synchronous motor 120 in a first configuration to propel the vehicle at a relatively constant speed (i.e., to cruise). In block 1604, the vehicle encounters a hill, which may be detected by the motor controller 110 based on sensor output (e.g., tilt or accelerometer sensors, torque sensing indicating an increase in torque load on the motor 120). In block 1606 and 1608, the motor controller 110 controls the motor drive circuit 115 to maintain the speed of the motor 120 and to increase the torque of the motor 120 (for example, by increasing PWM duty cycles of power switching elements of the drive circuit 115). At block 1610, the motor controller 110 determines that the motor 120 is at or near the edge of a torque-speed envelope for the first configuration of the motor 120, resulting in motor voltage limitations while controlling the motor 120 (represented by block 1612) and/or torque or speed limitations while controlling the motor 120 (represented by block 1614). Based on the determination in block 1610, the motor controller proceeds to block 1616 and reconfigures the motor 120 to a second motor configuration having a lower pole count (e.g., a lower rotor pole count, a lower stator pole count, or both a lower rotor and stator pole count). While operating in the second motor configuration, back emf of the synchronous motor 120 is reduced relative to the first motor configuration (block 1618), the torque-speed envelope is expanded (block 1620), the torque and speed requests are being met (block 1622), and losses are reduced or minimized for the operating point (block 1624). In block 1626, the vehicle cruises up the hill. Although the flow chart 1600 is described with respect to a land-based vehicle, in some embodiments, the flow chart similarly may apply to other types of vehicles (e.g., aerial or water-based vehicles), where, in place of a hill, the vehicle encounters another obstacle representing increased load demand.

At least in some examples, the flow chart 1600 may be considered a specific example of the flow chart 1200. For example, in the flow chart 1600, blocks 1602-1608 may correspond to block 1205; block 1610-1614 may correspond to blocks 1210 and 1215 of the process 1200; and block 1616-1626 may correspond to block 1220.

Figure 17:
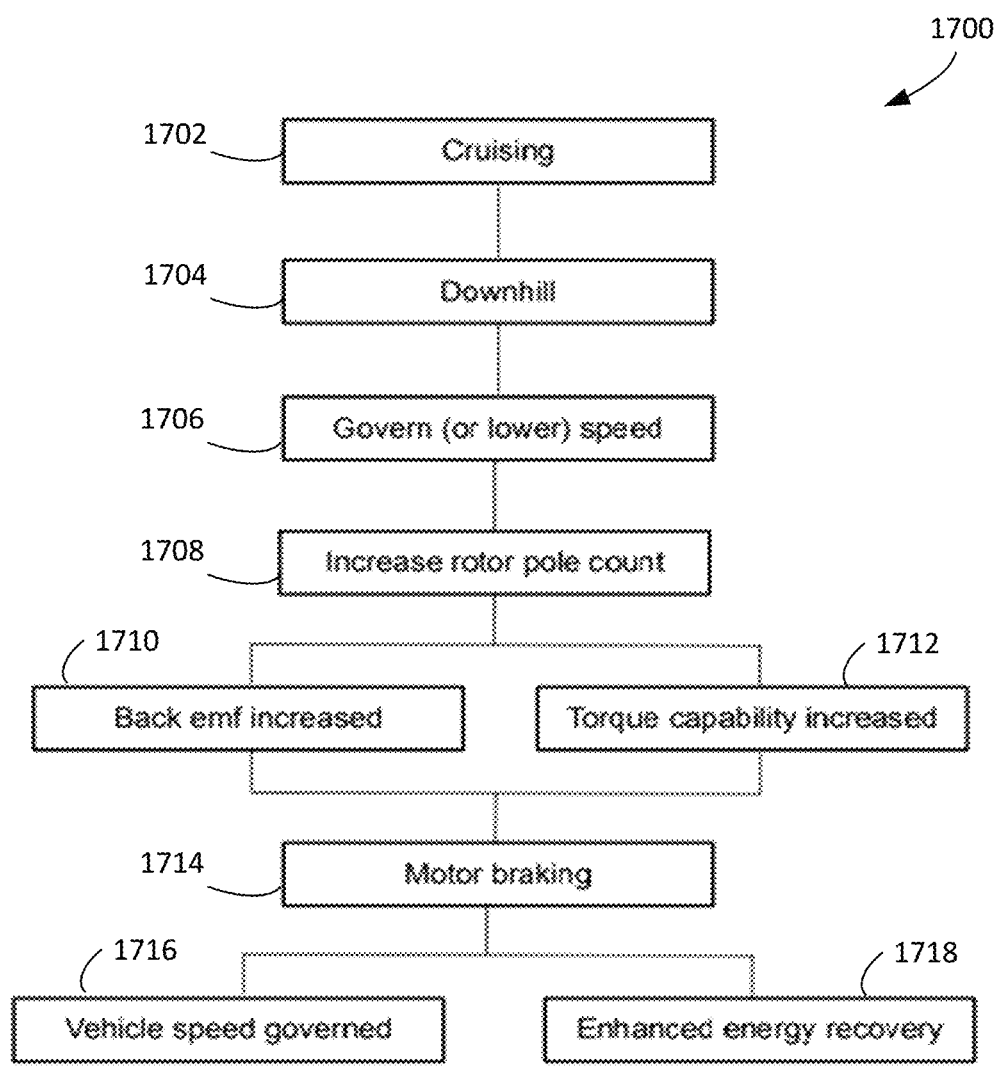

In FIG. 17, illustrates a flow chart 1700. In the flow chart 1700, the motor system 100 may be in a vehicle (e.g., an automobile, a truck, a bus, or the like) as a traction/drive motor for propelling the vehicle. In block 1702, the motor controller 110 controls the synchronous motor 120 in a first configuration to propel the vehicle at a relatively constant speed (i.e., to cruise). In block 1704, the vehicle encounters a downward slope of a hill, which may be detected by the motor controller 110 based on sensor output (e.g., tilt or accelerometer sensors, torque sensing indicating a decrease in torque load on the motor 120). In block 1706, the motor controller 110 controls the motor drive circuit 115 to govern or reduce the speed of the motor 120 (for example, by decreasing PWM duty cycles of power switching elements of the drive circuit 115). At block 1708, the motor controller 110 determines to change the motor 120 to a second configuration having an increased pole count relative to the first configuration, and controls the motor 120 to change to the second configuration. The increased pole count may be an increased rotor pole count, an increased stator pole count, or both an increased rotor and stator pole count. While operating in the second motor configuration, back emf of the synchronous motor 120 is increased relative to the first motor configuration (block 1710), and torque capability is increased (block 1712). In block 1714, the motor controller 110 controls the motor 120 to perform motor braking, which governs the vehicle speed (block 1716) and allows energy recapture (i.e., regenerative braking) (block 1718). Although the flow chart 1700 is described with respect to a land-based vehicle, in some embodiments, the flow chart similarly may apply to other types of vehicles (e.g., aerial or water-based vehicles), where, in place of a hill, the vehicle encounters another situation representing decreased load demand.

At least in some examples, the flow chart 1700 may be considered a specific example of the flow chart 1200. For example, in the flow chart 1700, blocks 1702-1706 may correspond to block 1205; block 1708 may correspond to blocks 1210 and 1215 of the process 1200; and block 1710-1718 may correspond to block 1220.

Figure 18:
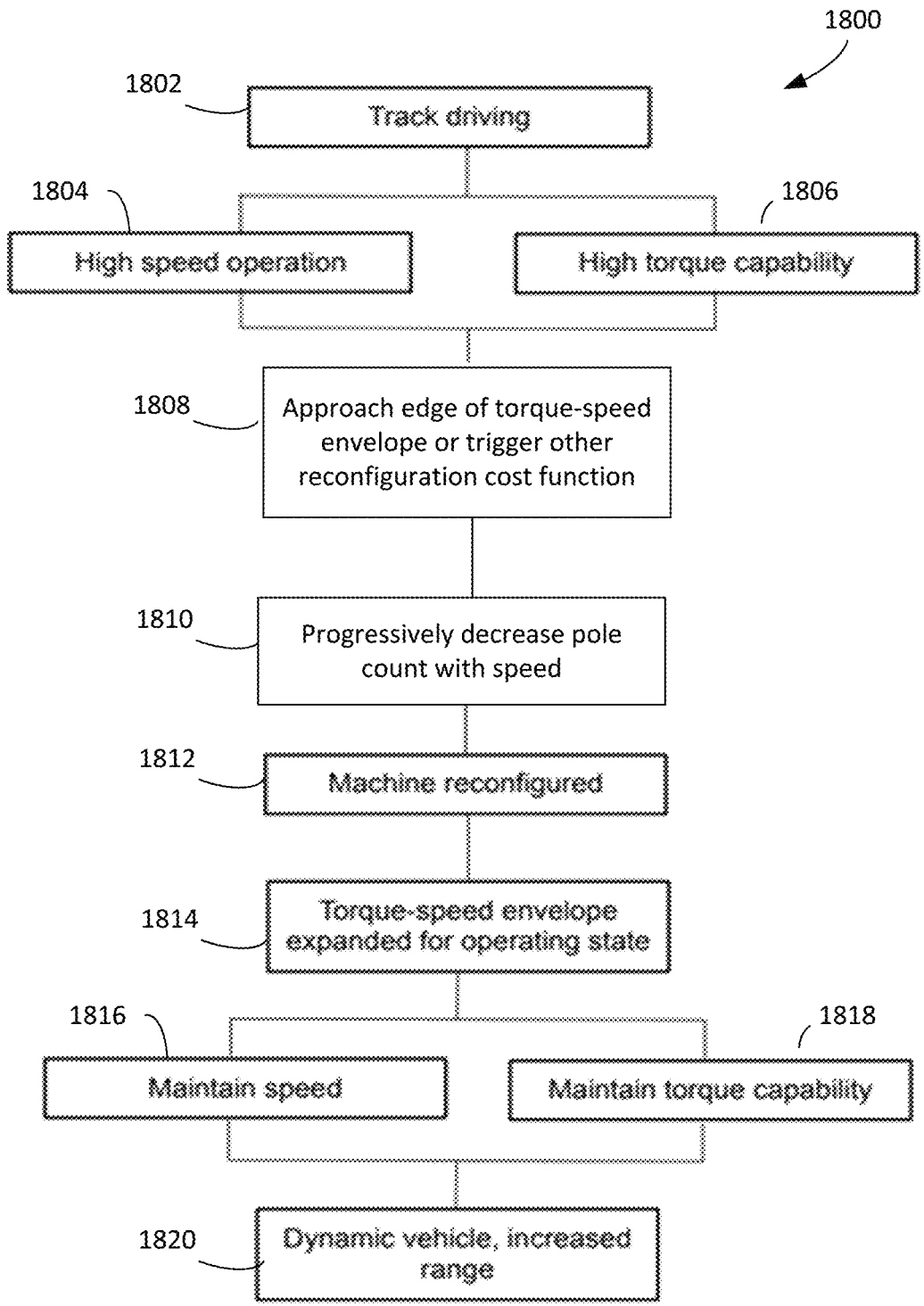

In FIG. 18 illustrates a flow chart 1800. In the flow chart 1800, the motor system 100 may be in a vehicle (e.g., an automobile, a truck, a bus, or the like) as a traction/drive motor for propelling the vehicle. In block 1802, the motor controller 110 controls the synchronous motor 120 in a first configuration to propel the vehicle (e.g., track driving). The first configuration may be referred to as a stage 1 configuration with respect to this flow chart. In blocks 1804 and 1806, the motor controller 110 is controlling the motor 120 at high speeds and with high torque capability (e.g., the first configuration may be the highest pole count configuration of the motor 120). In block 1808, the motor controller determines that the motor 120 is at or near the edge of a torque-speed envelope of the present motor configuration (or another reconfiguration trigger occurs). In block 1810, the motor controller 110 determines that the speed has increased above a threshold, and controls the motor 120 to enter a second configuration having a reduced pole count (e.g., a lower rotor pole count, a lower stator pole count, or both a lower rotor and stator pole count). The motor controller 110 may loop and repeat block 1808, reducing the pole count one or more times until a configuration associated with the present speed is implemented. In block 1812, the motor controller 110 controls the motor 120 in the configuration resulting from block 1808 (being executed one or more times), which may be referred to as the stage 2 configuration. While in the stage 2 configuration, the torque-speed envelope is expanded (block 1814), speed may be maintained (block 1816), and torque capability may be maintained (1818). As a result of the above steps 1802-1818, the total battery power/charge consumed by the motor 120 can be reduced, extending the range of the vehicle (block 1820).

At least in some examples, the flow chart 1800 may be considered a specific example of the flow chart 1200, particularly when the flow chart 1200 is looped. For example, in the flow chart 1800, blocks 1802-1806 may correspond to block 1205; block 1808 may correspond to blocks 1210, 1215, and 1220, looped until a stage 2 configuration is settled upon; block 1810 may correspond to another pass through block 1215; and block 1812-1818 may correspond to another pass through block 1220.

Figure 19:
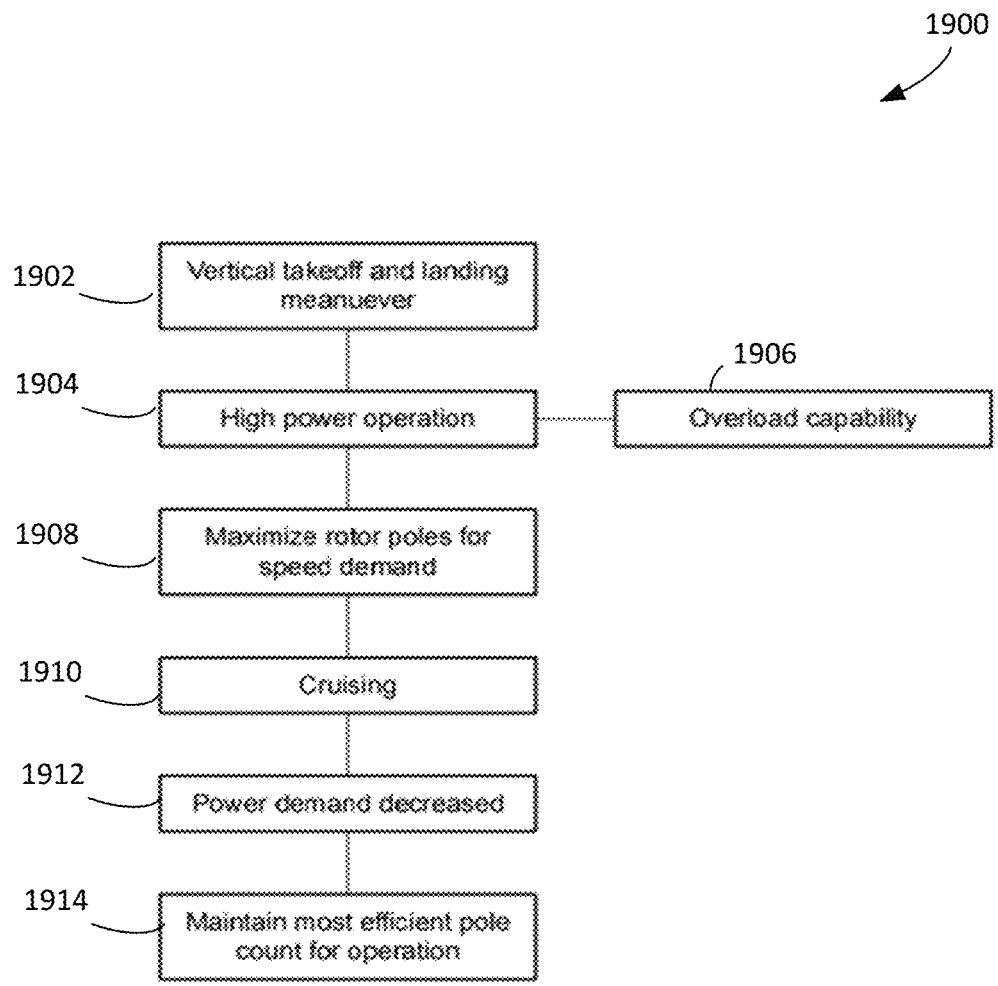

FIG. 19 illustrates a flow chart 1900. In the flow chart 1900, the motor system 100 may be in an aerial vehicle (e.g., a helicopter, a propeller plane, or the like) as a drive motor for propelling the vehicle. In block 1902, the motor controller 110 determines an operation type or state into which the vehicle (and, thus, the motor 120) is entering. As illustrated, the motor controller 110 determines that the vehicle is entering into vertical takeoff or landing (VTOL) maneuver operation state. In block 1904, the motor controller 110 determines a power demand for the operation state and, in particular, determines that the (VTOL) maneuver is a high power operation. In block 1906, the motor controller 110 determines whether to initiate an overload function (also referred to as overdrive) based on the determination of the operation state in block 1904. Here, because the operation state is a (VTOL) maneuver operation state that is a high power operation, in block 1906, the motor controller 110 determines to initiate the overload function. In block 1908, the motor controller 110 determines to change the motor 120 to a first configuration having a high or maximum pole count (rotor pole count, stator pole count, or both rotor and stator pole count), and controls the motor 120 in this configuration for the VTOL maneuver. Additionally, the motor controller 110 controls the motor 120 in this configuration with the overload function enabled.

The overload function refers to overdriving the motor 120 from thermal perspective and/or from a magnetic perspective (e.g., without demagnetizing magnets, or to prevent production of negative flux in permanent magnets of the rotor (if present) to provide increased torque to get a high torque operation for a period of time. For example, during non-overload operation, certain thermal or magnetic flux thresholds may be in place as part of a control scheme for the motor 120. In overload operation, such thresholds may be increased temporarily to allow the controller 110 to drive the motor 120 to meet the high torque demand. Enabling overload function may include the motor controller 110 changing the motor configuration to enable an operating point that is used to meet a temporary high performance demand, but that is not used for steady state operation. By providing the overload feature, the motor assembly 190 can be more particularly sized or designed for improved steady state operation (e.g., resulting in a smaller machine), but can meet a high operational demand under transient that may occur. The overload function can be useful for VTOL or other him demand aerospace operations, and then disengaged for more efficient operation in steady state (e.g., cruising). The overdrive feature can also be useful in other applications and contexts, such as in a dynamic maneuver for land-based vehicle (e.g., highway overtake).

In block 1910, the motor controller 110 determines that the vehicle is entering into a cruising state (steady state with less power demand than VTOL) and determines in block 1912 that the power demand for the motor 120 has decreased. In block 1914, the motor controller 110 determines a second configuration for the motor 120 having a different pole count than the first configuration to provide more efficient operation for cruising. Additionally, in block 1914, the motor controller 110 controls the motor 120 in the second configuration (with the overdrive function disabled). In addition to providing this overdrive function in the context of this flow chart 1900, the overdrive function is also included and applicable in other embodiments of the motor system 100 described herein, and may be considered a characteristic of (and defined by) one or more of the motor control configurations 195.

At least in some examples, the flow chart 1900 may be considered a specific example of the flow chart 1200, particularly when the flow chart 1200 is looped. For example, in the flow chart 1900, blocks 1902, 1904, 1906, and 1908 may correspond to block 1205; and blocks 1910 and 1912 may correspond to block 1210; and block 1914 may correspond to blocks 1215 and 1220.

Figure 20:
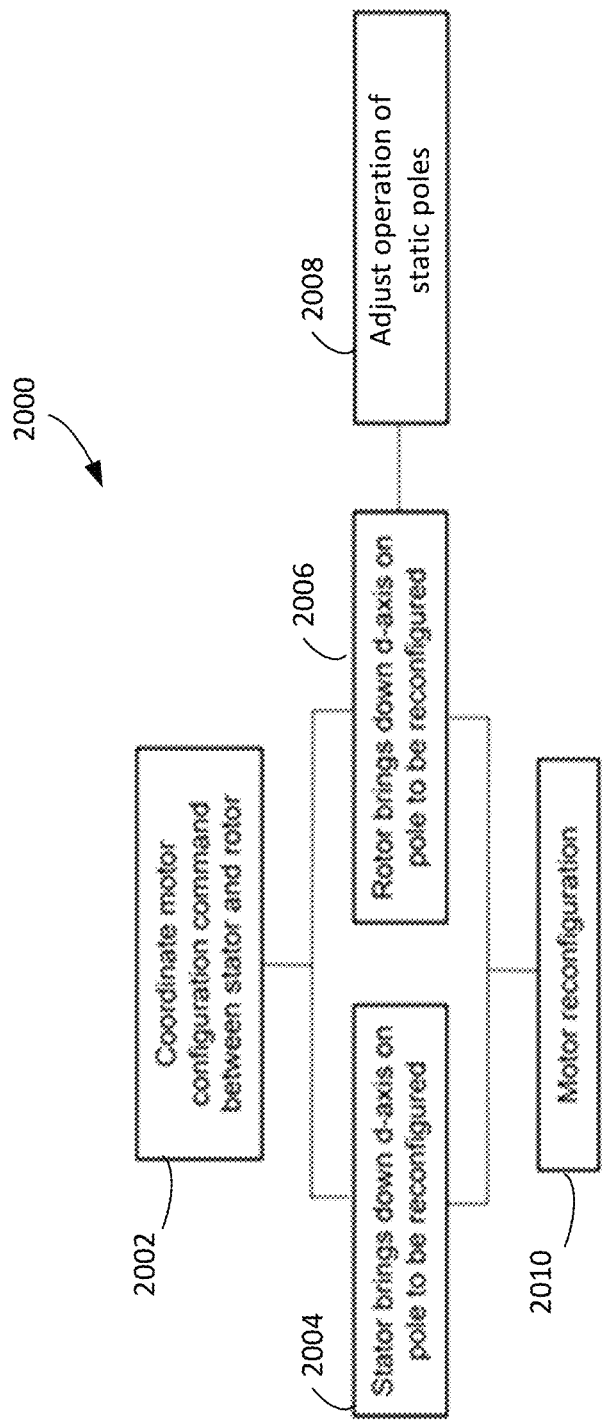

In FIG. 20, illustrates a flow chart 2000. In the flow chart 2000, the motor system 100 transitions from a first configuration to a second configuration. More particularly, in block 2002, the motor controller 110 determines to switch the motor configuration of the motor 120 from a first to a second configuration, and coordinates motor configuration commands between the stator drive circuit and the rotor drive circuit. In block 2004, the motor controller 110 controls the stator microinverter network 210 to reduce the D-axis (of the DQZ reference frame) on each stator pole that is to be reconfigured (e.g., on each stator winding that is to have its polarity inverted relative to the first configuration). In block 2006, the motor controller 110 controls the rotor drive circuit (e.g., the rotor microinverter network 310, the rotor inverter 322, or the rotor inverter 350) to reduce the D-axis (of the DQZ reference frame) on each rotor pole that is to be reconfigured (e.g., on each rotor winding that is to have its polarity inverted relative to the first configuration). In block 2008, the motor controller adjusts operation of the static poles of the stator and rotor assemblies 180, 185. For example, the motor controller 110 may provide a compensating signal to minimize a disturbance, for instance, in torque ripple, during a transition. For example, during a transition, current may be reduced in some poles (e.g., dynamic poles). Accordingly, the motor controller 110 may boost static poles to compensate for the dynamic poles during the transition. Blocks 2004, 2006, and 2008 may be considered as being part of a transition period between the first and second configurations. In block 2010, the transition is completed, and the motor controller 110 controls the motor 120 in the second configuration.

At least in some examples, the flow chart 2000 may be considered a specific example of a portion of the flow chart 1200. For example, in the flow chart 2000, blocks 2002 may correspond to block 1215; and blocks 2004-2008 may correspond to block 1220.

Back Iron Thickness and Design

The reconfigurable nature of the motor 120, as described herein, allows the motor 120 to extend the "triple saturation" region of conductor current, conductor voltage, and magnetic material field strength, allowing for increased performance for a given envelope and operating point requirements.

In motor design, the thickness of the back iron (a.k.a. yoke) is chosen such that it enters into magnetic saturation at a favorable operating point in terms of (terminal current and voltage) or (torque and speed). For generalized design practice, the thickness may be expressed as a proportionality factor acting upon (air gap diameter)/(pole pitch) (i.e., back iron thickness=proportionality factor×(air gap diameter/pole count). In alternative embodiments, it may be described as a proportion of stator tooth width to back iron thickness. Adopting the former as a convention herein, in machines with higher pole counts, the magnetic circuit is such that the yoke thickness for a given diameter is lower than that for a machine with lower pole counts.

For example, a 4-pole machine with 200 mm air gap diameter may result in a back iron thickness=0.25*(200 mm)/(4)=12.5 mm. As another example, in a 6-pole machine with 200 mm air gap diameter, an equivalent loading of the magnetic material would be near a value of: back iron thickness=0.25*(200 mm)/6=8.33 mm.

In conventional machines, there is a limited region in which the magnetic material is operating near the magnetic material saturation point. For example, at high torque, low speed, both the magnetic material and conductor currents may be "saturated" in terms of diminishing response for increased input. At higher speeds, the back-EMF (BEMF) of the rotating field approaches saturation (equal to the source voltage) and thereby imposes a restriction on the loading of the magnetic material. That is, insufficient voltage is available to increase conductor current in the desired pattern, leading to lower mmf and lower magnetic field strength in the magnetic material. The operating points at peak power conversion (between electrical and mechanical) and peak efficiency of power conversion may be very closely tied to the triple saturation point of conductor current, conductor voltage, and magnetic material field strength.

In the motor 120, which enables reconfiguration, the number of magnetic poles in the system varies based on the selected motor configuration, allowing selection of the back iron proportionality factor according to operating characteristics of the motor 120 (e.g., in a particular application or use). Although the back iron thickness will be constant across the different motor configurations, the back iron proportionality factor can still be selected to optimize performance for some configurations while not be an impeding or limiting factor in other configurations.

For example, in some embodiments, a first motor configuration with a lower pole count may be intended for use at high mechanical speeds. In such a case, the motor 120 could be designed to saturate the magnetic material for a second motor configuration having a high pole count by providing a thinner back iron than would otherwise be used for a traditional motor with a similar pole count as the high pole count configuration. For example, the back iron proportionality factor may be less than 0.50, such as a value between approximately ~0 and 0.50, between ~0 and 0.30, between ~0 and 0.20, between ~0 and 0.10, or between 0.1 and 0.50, 0.40, 0.30, 0.20, or 0.10. This thinner back iron, however, may not impose a disadvantage for the low pole configuration due to the BEMF limitation at higher speed. That is, the magnetic material comprising the back iron may still be saturated (peak utilization), while allowing for saturation of conductor voltage and current, thereby expanding the region of triple-saturation that is an indicator of peak power conversion and/or efficiency of power conversion.

In other embodiments, the back iron of the motor 120 may be sized conventionally to enable the back iron proportionality of the lowest pole count motor configuration. In other embodiments, the back iron of the machine may be sized for a specific pole count configuration and/or operating region.

Advantages and/or Impacts of Some Embodiments

A reconfigurable motor (also referred to as an adaptive motor), such as described herein, can provide several advantages. Some of these advantages provided by some of the embodiments disclosed herein are provided below.

Expanded Operating Envelope, Torque and Power Density, Virtual Gearbox

In operation, a reconfigurable motor as described herein can expand the operating range of the motor to establish a "virtual gearbox" that enables increased efficiency and torque density for a given machine and increased thermal envelope. For example, higher pole counts of a stator and/or rotor can increase torque performance, but can increase switching losses and core losses that result from higher speed or frequency operation. A higher pole count operated at higher speeds can also produce higher back emf, which can derate the operating envelope (e.g., the speed and power that can be derived from the motor). Thus, enabling higher pole count can drive higher torque levels (and hence torque density) for lower speed operation, which can then be successively reconfigured to a lower pole count motor for lower torque, higher speed operation, which enables both high power density and efficiency across a broader operating envelope.

In doing so, the operating envelope of the motor expands as the pole count is reduced at higher speeds, and then increased at lower speed. For example, the controller can virtually redistribute the motor configuration such as at high speeds when voltage limited, but not current limited. By changing the pole count of the motor, the inverter(s) can be brought closer to its/their full voltage and current rating and, thus, power output is increased at high speed.

Efficiency Improvements

Effectively, a reconfigurable motor can better match an operating point by virtually altering its mechanical geometry, electrical, and magnetic configurations. Matching an operating point can drive down losses for a given configuration, or range of configurations, and enable the motor to adapt to the load conditions. In other words, a reconfigurable motor, such as described herein, for a given speed, the motor can be reconfigured to produce torque with reduced losses. In contrast, "fixed" machines that are physically constrained by their geometry, winding patterns, etc. may not have high efficiency across the entire operating range. This is particularly true for dynamic duty cycle applications such as electric vehicles (EVS), trucks, robotics, etc.

Additionally, some embodiments disclosed herein (1) reduce or eliminate end windings and/or (2) maintain uniform directionality of electronics. Reducing or eliminating end windings can reduce costs (e.g., costs for copper (Cu) for the end windings) and costs for the battery, and increase current flow where the current is useful—in the slots. Maintaining uniform directionality refers to maintaining current flow in the same direction in windings proximate to one another, which can reduce losses. In contrast, motors with end windings may have electrons going in opposite directions in the same cross section of end turns (i.e., windings not in the slot producing torque). Thus, these systems may have some regions where net electron movement is zero, but each strand is carrying full current, which can increase losses and limit current density.

Vehicle Dynamics

Some embodiments of a reconfigurable motor described herein, when incorporated into an electric or hybrid electric vehicle (e.g., a car, bus, truck, etc.) improve dynamics of the vehicle by offering more continuous torque at the available speed condition. The continuous torque can be particularly useful in cases such as trucking (e.g., Class 4-8) where vehicle dynamics and load conditions greatly vary. For example, trucks may have more extremes between cruising and start and stop conditions. Thus, the duty cycle of a truck may be more skewed than passenger vehicles for extremely high toques and very low cruising power levels. For instance, some embodiments disclosed herein can provide a reconfigurable motor having the ability to start and stop effectively under city and/or last-mile conditions, and/or being able to start and stop effectively and reach highway speeds. Additionally, some embodiments disclosed herein can provide a reconfigurable motor with an improved ability to operate with a full, empty, or no trailer, and/or perform effectively under conditions such as hill climbs demanding high torque operation at highway speeds—or going downhill and recouping gravitational potential energy while reducing brake wear (e.g., regenerative braking).

Integration, Size, Weight

In some embodiments, the reconfigurable motor has a tight integration of the system where the motor and inverter(s) are packaged together. This integration can increase the volumetric and gravimetric density of the system, and further reduce both costs and losses by eliminating and/or reducing cabling, as well as redundant infrastructure such as housings. Additionally, reduced weight in the motor feeds forward into second order efficiency and cost savings at the battery (e.g., vehicle lightweighting).

Fault Tolerance

Some embodiments including microinverter network(s) 175 provide fault tolerance in the motor system 100. This is useful for, for example, electric vehicles, trucks, and off-road type applications to manage or eliminate catastrophic failures. The microinverter network(s) 175 can provide redundancy and high operation capability under faults in a limp mode such that, if a device or gate driver fails, the microinverter network(s) 175 can contain the fault and work around with slight degradation in performance to provide safety and continuous operation.

Direct Drive, and Overload

Due to high torque density and a wide speed range offered by various motor configurations, some embodiments of the motor system 100 can enable dynamic direct drive operation (e.g., motoring/generating without a mechanical gearbox to step down the speed and/or step up the torque). This reconfiguration capability is useful in a direct drive system for efficiently achieving startup torque (and doing so efficiently), and also providing efficient high speed operation. Because of design tradeoffs between obtaining higher torque capabilities and obtaining higher speed capabilities, static (nonreconfigurable) motors may not be able to achieve both the startup torque and high speed operation. For example, to achieve similar torque density, a static motor may use costly and volatile materials, such as rare earth metals, in significant quantities. However, by including such quantities of these materials, voltage constraints may be introduced that prevent higher speed operations.

Direct drive systems can reduce wear items, such as gearboxes, that may have precision manufacturing constraints. Additionally, eliminating the bulk of a gearbox may significantly decrease the volumetric and gravimetric size of the system and, therefore, enhance torque and power density. Additionally, using direct drive systems can reduce mechanical losses of gearbox systems, and the reduced weight in the system feeds forward into second order efficiency and cost savings at the battery (e.g., 10 s of kilograms in lightweighting).

Direct drive systems can also be useful in other (non-vehicle) applications, such as wind power generation, where direct drive machines are used to (1) prevent losses and (2) increase uptime where maintenance for mechanical items (e.g., gearboxes) are costly.

Conventional direct drive turbines may use substantial amounts of high rare earth content (e.g., up to 1 ton of NdFeB) per megawatt. Embodiments described herein can avoid such amounts of rare earth contents, reducing costs.

The particular makeup of some embodiments of the motor system 100 also allows for overload conditions—where the windings on the rotor can be maximally used to the thermal limit. Traditional machines have to keep temperature relatively low to prevent magnet damage. Other machines, such as induction motors, can be overloaded to some lesser extent, but become inefficient and reach their thermal limit quickly because current pools on the outer copper. Conversely, some embodiments of the motor system 100 provide larger surface area to distribute current and, hence, keep losses lower.

Advanced Control

Place Current where Most Advantageous

Some embodiments proposed herein enable the exact, or precise, matching of currents and/or phases to produce maximum or desired torque per loss under given condition for a machine and to eliminate or reduce current in slots that reduce torque. As discussed, having a per slot control via the microinverter network(s) 175 enables reconfiguration and pole virtualization. In certain instances, such as at high speeds when the motor system 100 may be voltage limited, but not current limited, the motor controller 110 can change pole count to bring the motor assembly 190 closer to full rating of microinverters of the microinverter network(s) 175 in terms of volts and amps, which, from an inverter or inverter network standpoint, can increase power output at high speeds. Further, in some embodiments, the microinverter network(s) 175 may include multiple types of power switching elements (e.g., FETs and IGBTs) that are selected to optimize condition and resistive losses at various loading conditions and in various configurations. Additionally, the configurations may use optimum frequencies for the particular type of power switching element being driven in each particular configuration.

Reduce or Eliminate Torque Ripple

With control over each slot via the microinverter network(s) 175, the response of the synchronous motor 120 can be interleaved, so the motor controller 110 can cancel out torque ripple and slotting effects. Effectively, the motor controller 110 can synthesize the frequency of operation such that, with each slot, with a similar response, the motor controller 110 can skew the PWM signals by ¼ or ½ of a cycle and 2× (double) switching frequency overall. This control modification can improve current regulation on the aggregate and drive down voltage ripple, which drives down circulating currents on common mode voltage due to parasitics of windings-to-stack. Collectively, these drive down bearing currents, bearing damaged, and gear damage. Additionally, it enables high speed machines and extended operating range capability.

Advantages of Power Transfer with Per Slot Control

With respect to embedded power transfer, when (1) one winding (or several windings) that are perfectly aligned (or nearly perfectly aligned) with the rotors d-axis in the synchronous reference frame and (2) side windings are less perfectly aligned, the motor controller 110 can use modulation between those windings to drive further control refinements. The rotor winding(s) 315 then pick up net flux in the system, but the side channels have better signal-to-noise ratio at modulation the motor controller 110 introduces. Additionally, the motor controller 110 can modulate the different slots at different frequencies to use as dual frequency/dual band communication channel.

More Degrees of Freedom, Sensing and Estimation

Having more degrees of freedom in the system 100 benefits other motor control concepts, such as position sensing, estimation techniques (e.g., rotor current or state of machine configuration), the ability to self-diagnose state through signal injection for condition based monitor, power transfer over the air gap (embedded power transfer), and communication to the rotor (or between the rotor and stator).

The present disclosure has described one or more embodiments, and it should be appreciated that many equivalents, alternatives, variations, and modifications, aside from those expressly stated, are possible and within the scope of the application. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated. Further, although the claims presented below are not presented with multiple dependencies, the elements of the various dependent claims are combinable, and indeed are combined in some embodiments. For example, although claim 5 is written as depending from claim 3, in some embodiments, claim 5 may depend from claim 4, resulting in a combination of the elements recited in claims 1, 2, 3, 4, and 5. Similarly, claim 8 may depend from any of claims 2-7, claim 9 may depend from any of claims 2-8, etc. That is, it is contemplated that each dependent claim may depend from any preceding dependent claim within a claim set below, so long as the preceding dependent claim does not recite a mutually exclusive feature.

The invention claimed is:

1. A method for controlling a motor, the method comprising:
   controlling microinverters of a microinverter network to drive the motor in accordance with a first configuration of a plurality of motor configurations;
   determining one or more motor conditions of the motor;
   determining, based on the one or more motor conditions, to reconfigure the motor from the first configuration to a second configuration of the plurality of motor configurations, wherein the first configuration has a first pole count that is different than a second pole count of the second configuration; and
   controlling the microinverters of the microinverter network to drive the motor in accordance with the second configuration.

2. The method of claim 1, wherein the microinverter network is a stator microinverter network that regulates power to stator slot conductors, wherein the first pole count is a first stator pole count, and wherein the second pole count is a second stator pole count.

3. The method of claim 2, wherein each of the microinverters include a first direct current (DC) terminal coupled to a first DC bus source, a second direct current terminal coupled to a second DC bus source, and power switching elements selectively connecting the first DC bus source and the second DC bus source to at least one of the stator slot conductors.

4. The method of claim 3, wherein the first DC bus source is a DC bus bar ring.

5. The method of claim 3, wherein the microinverters each include an inverter microcontroller, and wherein controlling microinverters to drive the motor in accordance with the second configuration comprises:
   receiving, by the inverter microcontrollers, control commands from a central microcontroller; and
   controlling, by each inverter microcontroller, the power switching elements of the microinverter having the inverter microcontroller with control signals generated based on the control commands.

6. The method of claim 3, wherein controlling microinverters to drive the motor in accordance with the second configuration comprises:
   receiving, by the power switching elements of the microinverters, control signals from a central microcontroller.

7. The method of claim 2, wherein the microinverters include a first subset of microinverters on a first axial side of a stator of the motor and a second subset of microinverters on a second axial side of the stator that is opposed the first axial side, each microinverter of the first subset of microinverters coupled to at least one microinverter of the second subset of microinverters by a conductor of the stator slot conductors.

8. The method of claim 1, wherein the microinverters are rotor microinverters that rotate with a rotor of the motor and regulate power to rotor slot conductors, wherein the first pole count is a first rotor pole count, and wherein the second pole count is a second rotor pole count.

9. The method of claim 1, wherein determining to reconfigure the motor to the second configuration based on the motor conditions comprises:
   determining a cost for the first configuration based on the one or more motor conditions; and
   determining a cost for the second configuration based on the one or more motor conditions.

10. The method of claim 1, wherein the second pole count is greater than the first pole count, and wherein determining to reconfigure the motor to the second configuration based on the motor conditions comprises:
    determining that a torque command of the one or more motor conditions exceeds a torque threshold.

11. A motor system, the system comprising:
    a stator assembly of a motor, wherein the stator assembly includes a plurality of teeth extending radially from a stator base and a plurality of slots, wherein a slot of the plurality of slots is between each pair of adjacent teeth of the plurality of teeth, and each slot is configured to receive at least one stator slot conductor of a plurality of stator slot conductors of the stator assembly;
    a rotor assembly of the motor configured to rotate relative to the stator assembly;
    a microinverter network including a plurality of microinverters; and
    an electronic motor controller including processing circuitry, the electronic motor controller configured to:
       control the plurality of microinverters to drive the motor in accordance with a first configuration of a plurality of motor configurations;
       determine one or more motor conditions of the motor;
       determine, based on the one or more motor conditions, to reconfigure the motor from the first configuration to a second configuration of the plurality of motor configurations, wherein the first configuration has a first pole count that is different than a second pole count of the second configuration; and
       control the plurality of microinverters to drive the motor in accordance with the second configuration.

12. The motor system of claim 11, wherein the microinverter network is a stator microinverter network that regulates power to stator slot conductors, wherein the first pole count is a first stator pole count, and wherein the second pole count is a second stator pole count.

13. The motor system of claim 12, wherein each of the plurality of microinverters includes a positive direct current terminal coupled to a positive DC bus source, a negative direct current terminal coupled to a negative DC bus source, and power switching elements selectively connecting the positive DC bus source and the negative DC bus source to at least one stator slot conductor of the stator slot conductors.

14. The motor system of claim 13, wherein each of the plurality of microinverters includes an inverter microcontroller, and wherein, to control the plurality of microinverters to drive the motor in accordance with the second configuration, the electronic motor controller is further configured to send control commands to the inverter microcontrollers; and
    wherein each inverter microcontroller is configured to control the power switching elements of the microinverter having the inverter microcontroller with control signals generated based on the control commands.

15. The motor system of claim 13, wherein, to control the microinverters to drive the motor in accordance with the second configuration, the electronic motor controller is further configured to:
send control signals to the power switching elements of the microinverters.

16. The motor system of claim 12, wherein the plurality of slots includes N slots, and the stator microinverter network has at least N/2 microinverters.

17. The motor system of claim 12, wherein the plurality of slots includes N slots, and the stator microinverter network has one selected from a group of N microinverters, 2×N microinverters, and 4×N microinverters.

18. The motor system of claim 12,
wherein the stator microinverter network includes a printed circuit board assembly, and
wherein the plurality of microinverters are positioned on the printed circuit board assembly, each of the plurality of microinverters including:
at least two power switching elements, and
a terminal connected to a stator slot conductor of the plurality of stator slot conductors that passes through a slot of the plurality of slots.

19. The motor system of claim 18, further comprising:
a first direct current (DC) bus source at a first axial end of the stator assembly; and
a second DC bus source at the first axial end of the stator assembly and located radially inward of the first DC bus source,
wherein the plurality of microinverters are positioned on the printed circuit board assembly at different circumferential positions, and
wherein each of the plurality of microinverters further includes:
a first DC terminal connected to the first DC bus source, and
a second DC terminal connected to the second DC bus source.

20. The motor system of claim 19, wherein the first DC bus source is a DC bus bar ring.

21. The motor system of claim 19, wherein the printed circuit board assembly is a first printed circuit board assembly and the plurality of microinverters on the first printed circuit board assembly is a first subset of microinverters, and
wherein the stator microinverter network further includes:
a second printed circuit board assembly on a second axial end of the stator assembly that is opposite the first axial end of the stator assembly; and
a second subset of the plurality of microinverters positioned on the second printed circuit board assembly, each of the second subset of microinverters including:
at least two power switching elements, and
a terminal connected to one of the stator slot conductors that is connected to a microinverter of the first subset of microinverters on the first axial end.

22. The motor system of claim 21, further comprising:
a third DC bus source at the second axial end of the stator assembly; and
a fourth DC bus source at the second axial end of the stator assembly and located radially inward of the third DC bus source.

23. The motor system of claim 12,
wherein the stator microinverter network includes a plurality of transverse printed circuit boards on a first axial end of the stator assembly, and
wherein each of the transverse printed circuit boards includes at least one microinverter of the plurality of microinverters, each of the plurality of microinverters including:
at least two power switching elements, and
a terminal connected to a stator slot conductor of the plurality of stator slot conductors that passes through a slot of the plurality of slots.

24. The motor system of claim 23, further comprising:
a laminated direct current (DC) bus bar ring interconnecting each of the transverse printed circuit boards.

25. The motor system of claim 24, wherein the laminated DC bus bar ring includes positive polarity laminated conductors and negative polarity laminated conductors that are interleaved.

26. The motor system of claim 23, further comprising:
a communication ring interconnecting each of the transverse printed circuit boards, wherein the electronic motor controller is configured to communicate with the plurality of microinverters on the transverse printed circuit boards via the communication ring.

27. The motor system of claim 11, wherein, to determine to reconfigure the motor to the second configuration based on the motor conditions, the electronic motor controller is further configured to:
determine a cost for the first configuration based on the motor conditions and a torque demand; and
determine a cost for the second configuration based on the motor conditions and the torque demand.

28. The motor system of claim 11, wherein the second pole count is greater than the first pole count and, to determine to reconfigure the motor to the second configuration based on the motor conditions, the electronic motor controller is further configured to:
determine that a torque demand exceeds a torque threshold.

29. The motor system of claim 11, wherein the microinverter network is a rotor microinverter network including:
a printed circuit board assembly on a first axial end of the rotor assembly; and
a plurality of rotor microinverters positioned on the printed circuit board assembly, each of the plurality of rotor microinverters including:
at least two power switching elements, and
a rotor terminal connected to a rotor slot conductor that passes through a slot of a plurality of rotor slots of the rotor assembly.

30. The motor system of claim 29, wherein the rotor assembly further includes at least a first permanent magnet around which a first rotor slot conductor is wound.

31. The motor system of claim 11, wherein the microinverter network is a rotor microinverter network, and wherein, to control the plurality of microinverters to drive the motor in accordance with the second configuration, the electronic motor controller is further configured to transmit control signals to the rotor microinverter network using embedded communications via the at least one stator slot conductor of the stator assembly.

32. The motor system of claim 11, wherein the microinverter network is a stator microinverter network, and wherein, to control the plurality of microinverters to drive the motor in accordance with the second configuration, the electronic motor controller is further configured to transmit control signals to a rotor inverter to reconfigure the rotor assembly to have a different pole count in the second configuration than in the first configuration.

33. The motor system of claim 11, wherein the microinverter network is a rotor microinverter network including:
one or more printed circuit boards of a rotor cartridge assembly positioned within a rotor shaft of the rotor assembly.

34. The motor system of claim 33, wherein the rotor microinverter network further includes:
a plurality of rotor microinverters positioned on the one or more printed circuit boards, each of the plurality of rotor microinverters including:
at least two power switching elements, and
a rotor terminal connected to a rotor slot conductor that passes through a slot of a plurality of rotor slots of the rotor assembly.

35. The motor system of claim 34, further comprising an annular rotor printed circuit board positioned on an axial end of the rotor assembly and providing a conductive connection between the rotor terminal and the rotor slot conductor.

36. A method for controlling a motor, the method comprising:
controlling an inverter network to drive the motor in accordance with a first configuration of a plurality of motor configurations;
determining one or more motor conditions of the motor;
determining, based on the one or more motor conditions, to reconfigure the motor from the first configuration to a second configuration of the plurality of motor configurations, wherein the first configuration has a first pole count that is different than a second pole count of the second configuration; and
controlling the inverter network to drive the motor in accordance with the second configuration.

37. The method of claim 36, wherein the motor includes a rotor assembly and a stator assembly, and the inverter network is at least one selected from a group of:
a rotor inverter fixed to the rotor assembly of the motor that rotates with the rotor assembly during operation of the motor;
a rotor inverter off-board the rotor assembly that remains stationary with respect to the stator assembly during operation of the motor;
a rotor microinverter network fixed to the rotor assembly of the motor that rotates with the rotor assembly during operation of the motor; and
a stator microinverter network fixed to the stator assembly of the motor.

38. A motor system, the system comprising:
a stator assembly of a motor, wherein the stator assembly includes a plurality of teeth extending radially from a stator base and a plurality of slots, wherein a slot of the plurality of slots is between each pair of adjacent teeth of the plurality of teeth, and each slot is configured to receive at least one stator slot conductor of a plurality of stator slot conductors of the stator assembly;
a rotor assembly of the motor configured to rotate relative to the stator assembly;
an inverter network; and
an electronic motor controller including processing circuitry, the electronic motor controller configured to:
control the inverter network to drive the motor in accordance with a first configuration of a plurality of motor configurations;
determine one or more motor conditions of the motor;
determine, based on the one or more motor conditions, to reconfigure the motor from the first configuration to a second configuration of the plurality of motor configurations, wherein the first configuration has a first pole count that is different than a second pole count of the second configuration; and
control the inverter network to drive the motor in accordance with the second configuration.

39. The motor system of claim 38, wherein the inverter network is at least one selected from a group of:
a rotor inverter fixed to the rotor assembly of the motor and configured to rotate with the rotor assembly during operation of the motor;
a rotor inverter off-board the rotor assembly and configured to remain stationary with respect to the stator assembly during operation of the motor;
a rotor microinverter network fixed to the rotor assembly of the motor and configured to rotate with the rotor assembly during operation of the motor; and
a stator microinverter network fixed to the stator assembly of the motor.

* * * * *

UNITED STATES PATENT AND TRADEMARK OFFICE
CERTIFICATE OF CORRECTION

PATENT NO. : 12,074,546 B2  
APPLICATION NO. : 18/560061  
DATED : August 27, 2024  
INVENTOR(S) : Walter Wesley Pennington, III et al.

Page 1 of 1

It is certified that error appears in the above-identified patent and that said Letters Patent is hereby corrected as shown below:

In the Specification

Column 47, Line 63, "$L_a$" should be --$L_d$--.

Column 47, Line 66, "$L_a$-$L_a$" should be --$L_a$-$L_d$--.

Column 48, Line 4, "$L_a$" should be --$L_d$--.

Column 48, Line 12, "$L_a$-$L_a$" should be --$L_a$-$L_d$--.

Column 48, Line 14, "$L_a$-$L_a$" should be --$L_a$-$L_d$--.

Column 54, Line 57, "N-0-S-O-N-0-S-O-N-0-S-0" should be --N-0-S-0-N-0-S-0-N-0-S-0--.

Column 74, Line 17, "(EVS)" should be --(EVs)--.

Signed and Sealed this  
Eighteenth Day of February, 2025

Coke Morgan Stewart  
*Acting Director of the United States Patent and Trademark Office*